US005827070A

United States Patent [19]

Kershaw et al.

[11] Patent Number: 5,827,070

[45] Date of Patent: Oct. 27, 1998

[54] SYSTEM AND METHODS FOR COMPUTER BASED TESTING

[75] Inventors: Roger C. Kershaw, Hopewell; Frank J. Romano, Yardville; Leonard C. Swanson; William C. Ward, Jr., both of Hopewell, all of N.J.

[73] Assignee: Educational Testing Service, Princeton, N.J.

[21] Appl. No.: 485,628

[22] Filed: Jun. 7, 1995

Related U.S. Application Data

[60] Division of Ser. No. 82,058, Jun. 22, 1993, Pat. No. 5,565,316, which is a continuation-in-part of Ser. No. 958,997, Oct. 9, 1992, abandoned.

[51] Int. Cl.[6] .................................................. G09B 3/00

[52] U.S. Cl. .......................... 434/322; 434/350; 434/362; 434/118; 395/927

[58] Field of Search ............................... 434/118, 307 R, 434/308, 322, 323, 327, 347, 350, 353, 362; 395/100, 118, 144, 152, 154, 327, 500, 502, 506, 561, 752–760, 927, 101, 173, 761, 806; 483/1, 23, 42; 381/51

[56] References Cited

U.S. PATENT DOCUMENTS

| | | |
|---|---|---|
| 4,671,772 | 6/1987 | Slade et al. . |
| 4,867,685 | 9/1989 | Brush et al. . |
| 4,895,518 | 1/1990 | Arnold et al. . |
| 4,953,209 | 8/1990 | Ryder, Sr. et al. . |
| 5,002,491 | 3/1991 | Abrahamson et al. . |

(List continued on next page.)

OTHER PUBLICATIONS

"The Integrated Instructional Systems Report", Feb. 1990, EPIE Institute.

Results of literature search re: new products and educational/psychological academic literature performed by Educational Testing Service on Jul. 29, 1992 using various commercial databases.

"The MicroCAT Testing System", 1992 Computerized Testing Products Catalog, Assessment Systems Corporation, 1992.

Wayne Patience, "Software Review–MicroCAT Testing System Version 3.0", Journal of Educational Measurement/Spring 1990, vol. 27, No. 1, pp. 82–88.

(List continued on next page.)

*Primary Examiner*—Joe Cheng
*Attorney, Agent, or Firm*—Woodcock Washburn Kurtz Mackiewicz & Norris LLP

[57] ABSTRACT

The present invention provides a system and method for computer based testing. The system of the present invention comprises a test development system for producing a computerized test, a test delivery system for delivering the computerized test to an examinee, and a workstation on which the computerized test is delivered to the examinee. The method of the present invention comprises producing a computerized test, delivering the computerized test to an examinee and recording examinee responses to questions presented to the examinee during the delivery of the computerized test. A method of producing a computerized test is also provided. This method comprises preparing a test document of items, computerizing each item, preparing scripts and other test components and packaging the items, scripts and other test components together to form the computerized test. A method of delivering a computerized test is also provided in which a standardized test is created, an electronic form of the test is then prepared, the items of the test are presented to an examinee on a workstations display and the examinee's responses are accepted and recorded. A method of administering a computerized test is further provided in which a computerized test is installed on a workstation and then the delivery of the test to an examinee is initiated. A data distribution system is further provided. The system comprises an examinee performance database and a file processing component for receiving files from the computer based testing system and updating the examinee performance database with information from these files.

33 Claims, 122 Drawing Sheets

U.S. PATENT DOCUMENTS

| | | |
|---|---|---|
| 5,011,413 | 4/1991 | Ferris et al. . |
| 5,033,969 | 7/1991 | Kamimura . |
| 5,059,127 | 10/1991 | Lewis et al. . |
| 5,170,362 | 12/1992 | Greenberg et al. . |
| 5,176,520 | 1/1993 | Hamilton . |
| 5,204,813 | 4/1993 | Samph et al. . |
| 5,211,563 | 5/1993 | Haga et al. . |
| 5,211,564 | 5/1993 | Martinez et al. . |

OTHER PUBLICATIONS

G. Gage Kingsbury, "Adapting Adaptive Testing: Using the MicroCAT Testing System in a Local School District", Issues and Practice, Summer 1990, pp. 3–6 & 29.

Anthony DePalma, "Standardized College Exam Is Customized by Computers", The New York Times, Front Page Story Mar. 21, 1992.

ETS/Access Summer 1992 Special Edition Newsletter.

Elliot Soloway, "Quick, Where Do the Computers Go; Computers In Education", Communications of the ACM, Association for Computing, Machinery 1991, Feb. 1991, vol. 34, No. 2, p. 29.

Tse–chi Hsu and Shula F. Sadock, "Computer–Assisted Test Construction: A State of the Art", TME Report 88, Educational Testing Service, Nov. 1985.

TEST PRODUCTION FUNCTIONAL FLOW DIAGRAM

FLOW OF ITEMS AND KEYS FROM TD TO TPS

COMPONENTS OF A TEST PACKAGE

ITEM LEVEL COMPONENT IN A PRESENTATION BLOB

TEST LEVEL COMPONENTS IN A PRESENTATION BLOB

FUNCTIONS, AREAS, AND SOFTWARE IN TEST PACKAGING (CONTINUED)

TEMPLATE 1

TEMPLATE 2

TEMPLATE 3

TEMPLATE 4

TEMPLATE 5

TEMPLATE 6

TEMPLATE 7

B) SCALE

TEST DEVELOPERS USE THE SCALE RESPONSE TYPE FOR ITEMS IN WHICH EXAMINEES SELECT CHOICE(S) ON A GRADIENT SCALE AS THEIR ANSWER.

ADMINISTRATIVE SYSTEM
FUNCTIONAL FLOW DIAGRAM

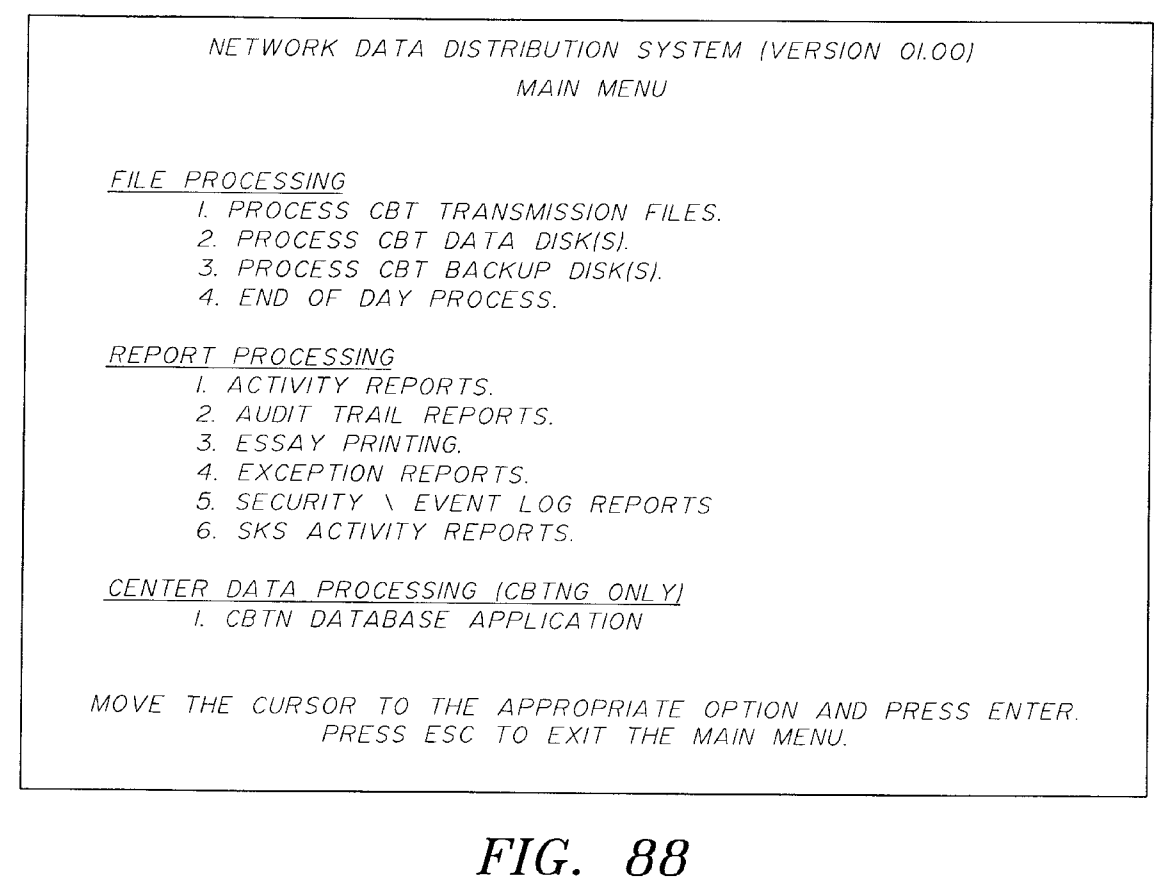

NETWORK DATA DISTRIBUTION SYSTEM (VERSION 01.00)

MAIN MENU

FILE PROCESSING
1. PROCESS CBT TRANSMISSION FILES.
2. PROCESS CBT DATA DISK(S).
3. PROCESS CBT BACKUP DISK(S).
4. END OF DAY PROCESS.

REPORT PROCESSING
1. ACTIVITY REPORTS.
2. AUDIT TRAIL REPORTS.
3. ESSAY PRINTING.
4. EXCEPTION REPORTS.
5. SECURITY \ EVENT LOG REPORTS
6. SKS ACTIVITY REPORTS.

CENTER DATA PROCESSING (CBTNG ONLY)
1. CBTN DATABASE APPLICATION

MOVE THE CURSOR TO THE APPROPRIATE OPTION AND PRESS ENTER.
PRESS ESC TO EXIT THE MAIN MENU.

FIG. 88

DIRECTORY STRUCTURE

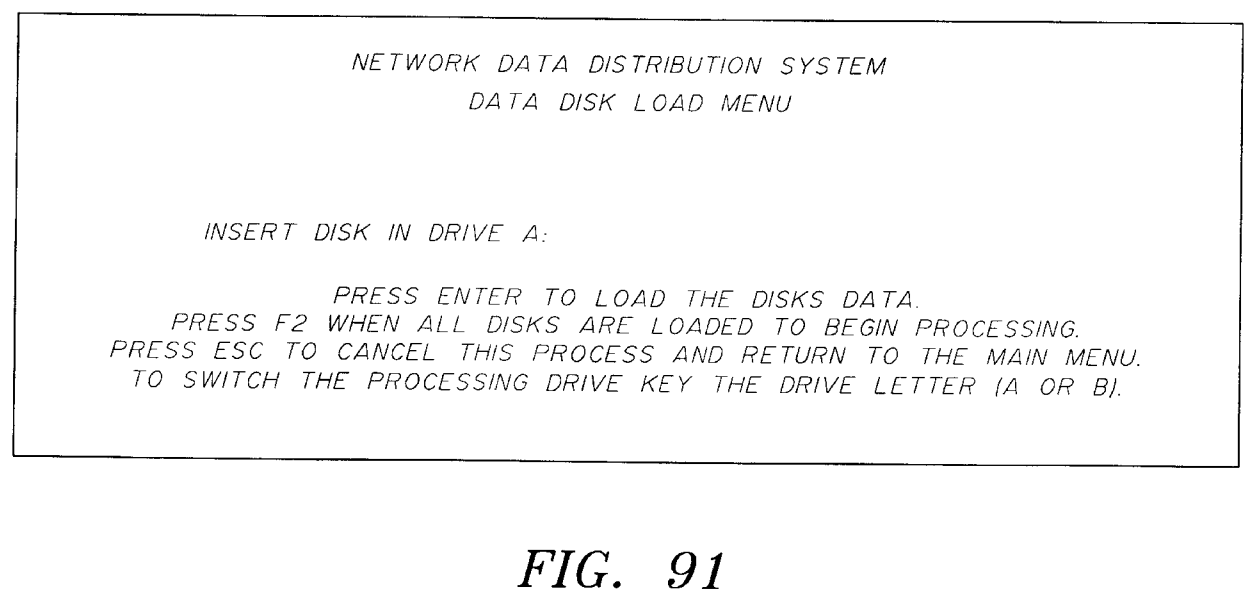

NETWORK DATA DISTRIBUTION SYSTEM

DATA DISK LOAD MENU

INSERT DISK IN DRIVE A:

PRESS ENTER TO LOAD THE DISKS DATA.
PRESS F2 WHEN ALL DISKS ARE LOADED TO BEGIN PROCESSING.
PRESS ESC TO CANCEL THIS PROCESS AND RETURN TO THE MAIN MENU.
TO SWITCH THE PROCESSING DRIVE KEY THE DRIVE LETTER (A OR B).

*FIG. 91*

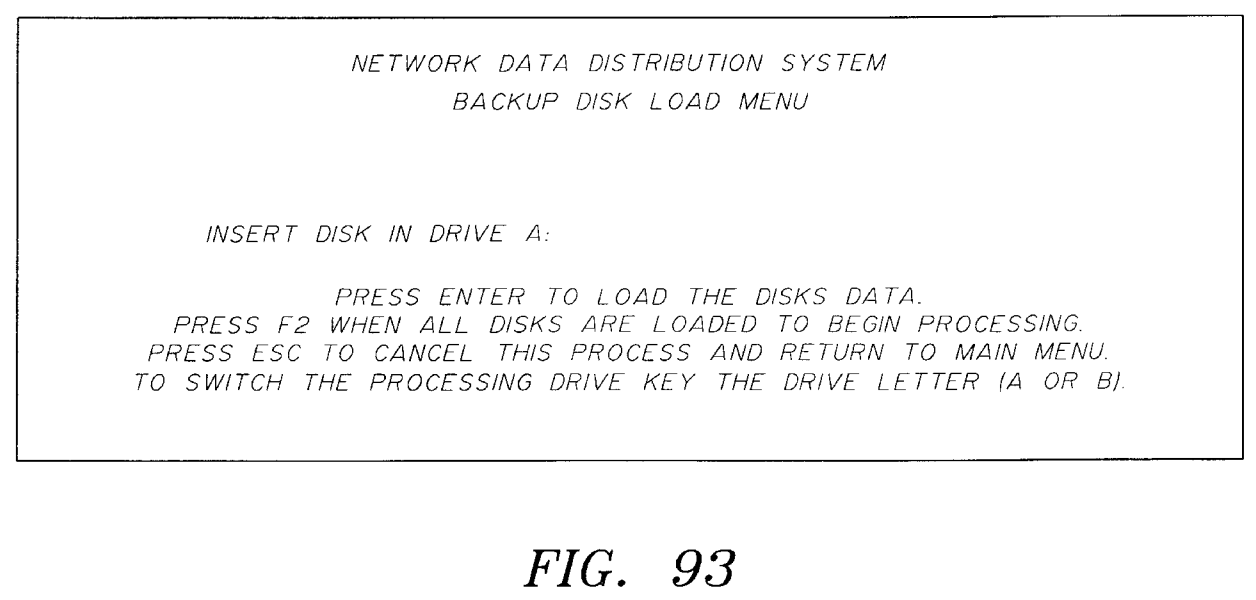

NETWORK DATA DISTRIBUTION SYSTEM

BACKUP DISK LOAD MENU

INSERT DISK IN DRIVE A:

PRESS ENTER TO LOAD THE DISKS DATA.
PRESS F2 WHEN ALL DISKS ARE LOADED TO BEGIN PROCESSING.
PRESS ESC TO CANCEL THIS PROCESS AND RETURN TO MAIN MENU.
TO SWITCH THE PROCESSING DRIVE KEY THE DRIVE LETTER (A OR B).

FIG. 93

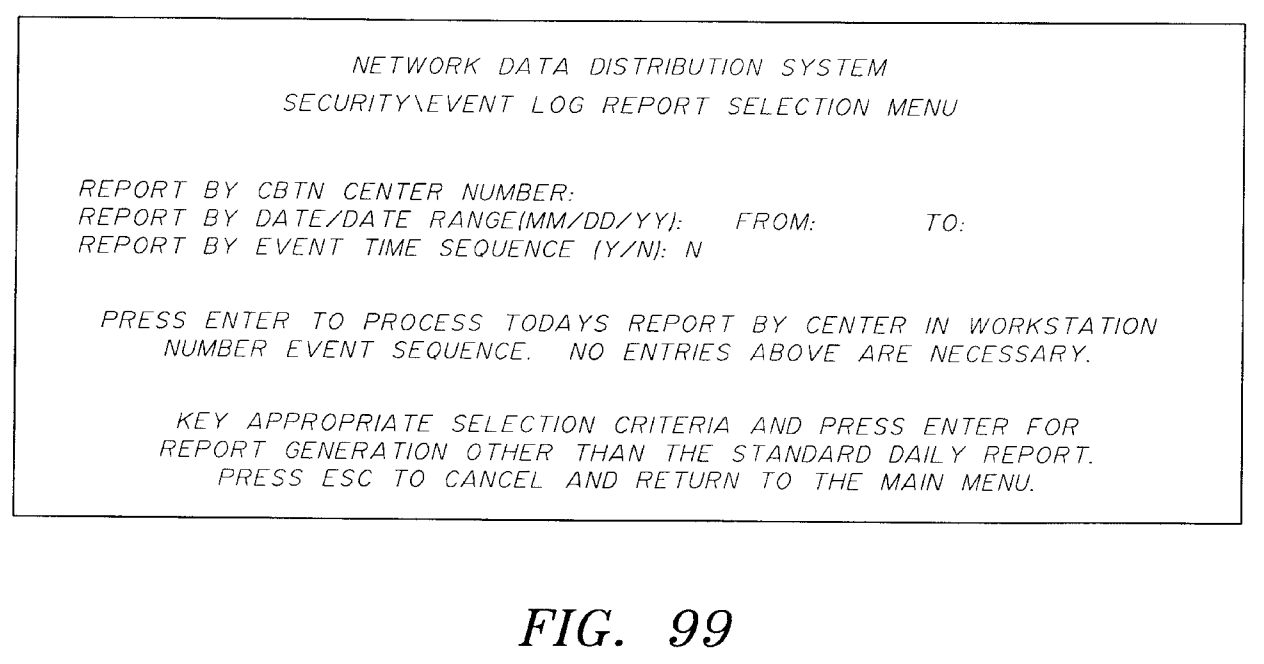

NETWORK DATA DISTRIBUTION SYSTEM
SECURITY\EVENT LOG REPORT SELECTION MENU

REPORT BY CBTN CENTER NUMBER:
REPORT BY DATE/DATE RANGE(MM/DD/YY): FROM: TO:
REPORT BY EVENT TIME SEQUENCE (Y/N): N

PRESS ENTER TO PROCESS TODAYS REPORT BY CENTER IN WORKSTATION NUMBER EVENT SEQUENCE. NO ENTRIES ABOVE ARE NECESSARY.

KEY APPROPRIATE SELECTION CRITERIA AND PRESS ENTER FOR REPORT GENERATION OTHER THAN THE STANDARD DAILY REPORT. PRESS ESC TO CANCEL AND RETURN TO THE MAIN MENU.

FIG. 99

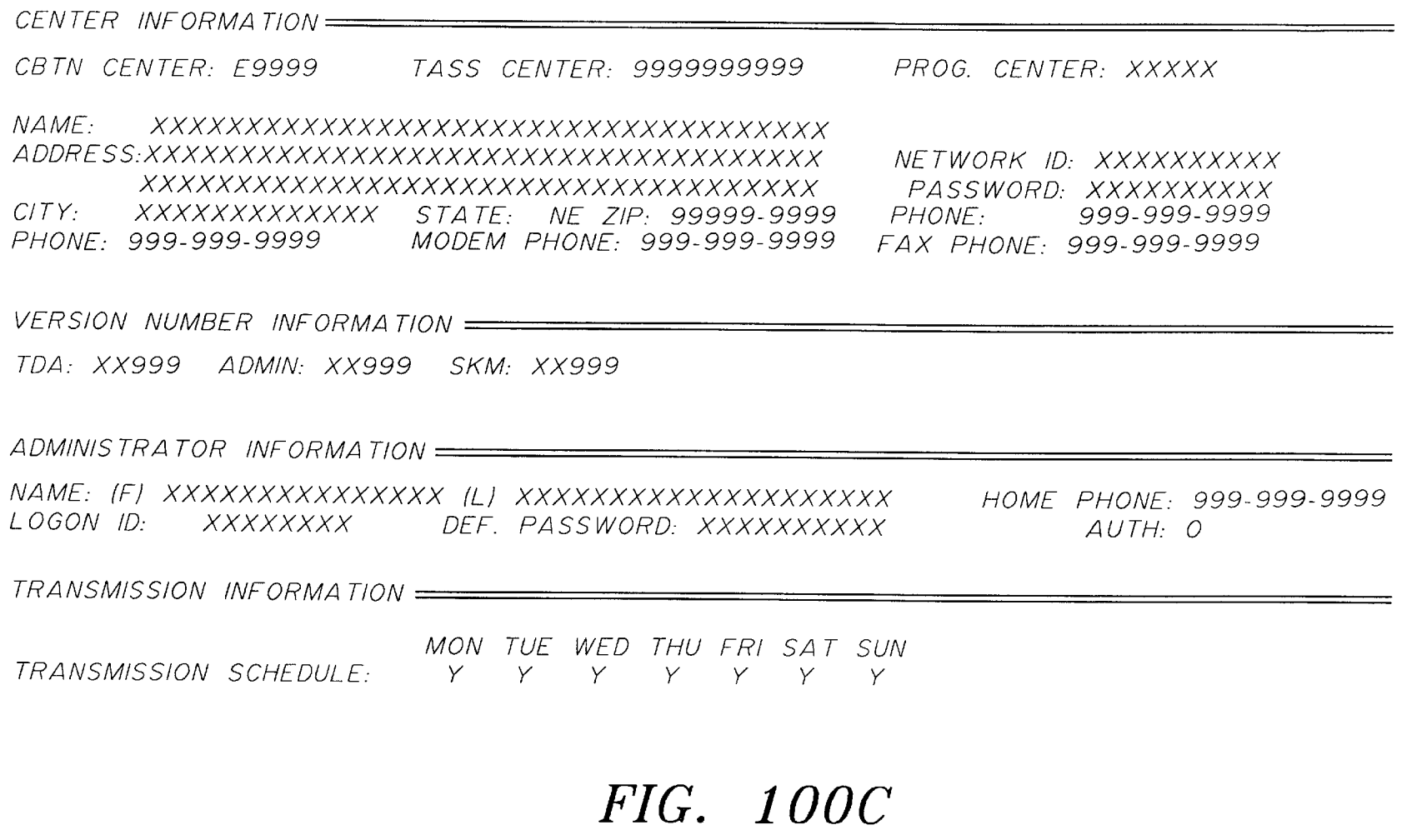

```
CENTER INFORMATION ==========================================================

CBTN CENTER: E9999      TASS CENTER: 9999999999      PROG. CENTER: XXXXX

NAME:     XXXXXXXXXXXXXXXXXXXXXXXXXXXXXXXXXXX
ADDRESS:XXXXXXXXXXXXXXXXXXXXXXXXXXXXXXXXXXX        NETWORK ID: XXXXXXXXXX
        XXXXXXXXXXXXXXXXXXXXXXXXXXXXXXXXXXX         PASSWORD: XXXXXXXXXX
CITY:    XXXXXXXXXXXXXX  STATE:  NE ZIP: 99999-9999  PHONE:      999-999-9999
PHONE: 999-999-9999      MODEM PHONE: 999-999-9999  FAX PHONE: 999-999-9999

VERSION NUMBER INFORMATION ==================================================

TDA: XX999   ADMIN: XX999   SKM: XX999

ADMINISTRATOR INFORMATION ===================================================

NAME: (F) XXXXXXXXXXXXXXX (L) XXXXXXXXXXXXXXXXXXXX     HOME PHONE: 999-999-9999
LOGON ID:    XXXXXXXX      DEF. PASSWORD: XXXXXXXXXX              AUTH: 0

TRANSMISSION INFORMATION ====================================================

                          MON TUE WED THU FRI SAT SUN
TRANSMISSION SCHEDULE:     Y   Y   Y   Y   Y   Y   Y
```

FIG. 100C

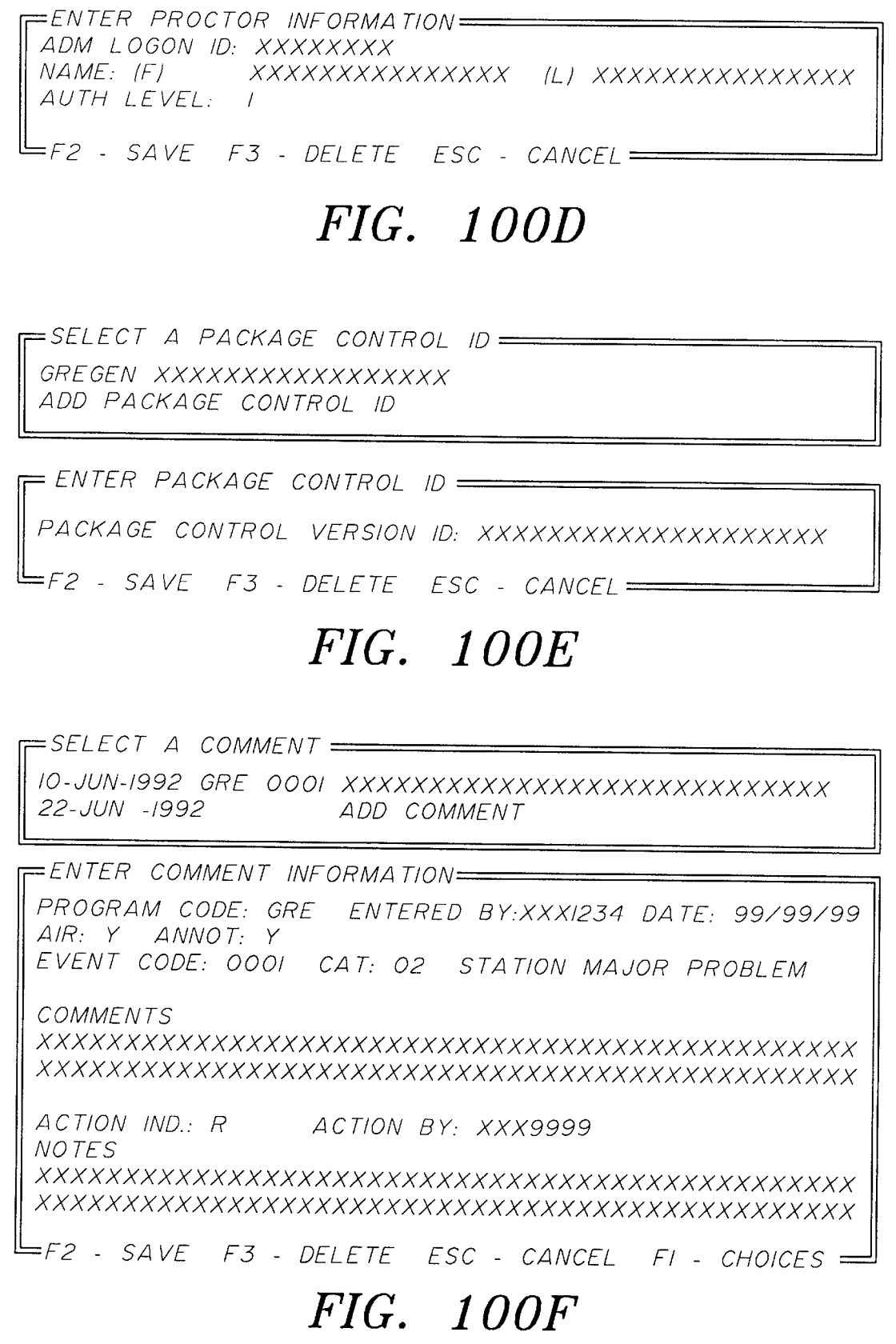

```
ENTER PROCTOR INFORMATION
ADM LOGON ID: XXXXXXXX
NAME: (F)      XXXXXXXXXXXXXXX   (L) XXXXXXXXXXXXXXX
AUTH LEVEL:  I

F2 - SAVE   F3 - DELETE   ESC - CANCEL
```

FIG. 100D

```
SELECT A PACKAGE CONTROL ID
GREGEN XXXXXXXXXXXXXXXXX
ADD PACKAGE CONTROL ID
```

```
ENTER PACKAGE CONTROL ID

PACKAGE CONTROL VERSION ID: XXXXXXXXXXXXXXXXXXXX

F2 - SAVE   F3 - DELETE   ESC - CANCEL
```

FIG. 100E

```
SELECT A COMMENT
10-JUN-1992 GRE 0001 XXXXXXXXXXXXXXXXXXXXXXXXXXXXX
22-JUN -1992         ADD COMMENT
```

```
ENTER COMMENT INFORMATION
PROGRAM CODE: GRE   ENTERED BY:XXX1234 DATE: 99/99/99
AIR: Y   ANNOT: Y
EVENT CODE: 0001   CAT: 02   STATION MAJOR PROBLEM

COMMENTS
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXX

ACTION IND.: R       ACTION BY: XXX9999
NOTES
XXXXXXXXXXXXXXXXXXXXXXXXXXXXXXXXXXXXXXXXXXXXXXXXXX
XXXXXXXXXXXXXXXXXXXXXXXXXXXXXXXXXXXXXXXXXXXXXXXXXX
F2 - SAVE   F3 - DELETE   ESC - CANCEL   F1 - CHOICES
```

FIG. 100F

SYSTEM AND METHODS FOR COMPUTER BASED TESTING

This is a division of application Ser. No. 08/082,058, filed Jun. 22, 1993, now U.S. Pat. No. 5,565,316, which is a continuation-in-part of application Ser. No. 958,997, filed Oct. 9, 1992, now abandoned.

BACKGROUND OF THE INVENTION

For many years standardized tests have been administered to examinees for various reasons such as for educational testing or for evaluating particular skills. For instance, academic skills tests (e.g. SATs, LSATs, GMATs, etc.) are typically administered to a large number of students. Results of these tests are used by colleges, universities and other educational institutions as a factor in determining whether an examinee should be admitted to study at that educational institution. Other standardized testing is carried out to determine whether or not an individual has attained a specified level of knowledge, or mastery, of a given subject. Such testing is referred to as mastery testing (e.g. achievement tests offered to students in a variety of subjects and the results being used for college entrance decisions).

FIG. 1 depicts a sample question and sample direction which might be given on a standardized test. The stem 4, the stimulus 5, responses 6 and directions 7 for responding to the stem 4 are collectively referred to as an item. The stem 4 refers to a test question or statement to which an examinee is to respond, e.g., question 13. The stimulus 5 is the text and/or graphical information (e.g., a map, scale, graph, or reading passage) to which a stem may refer. Often the same stimulus is used with more than one stem. Some items do not have a stimulus. Items having a common stimulus are defined as a set. In FIG. 1, questions 13 and 14 refer to stimulus 5 and therefore form a set. Items sharing common directions are defined as a group. Thus, questions 8–27 form a group. Only questions 8–14, however, are shown in FIG. 1.

A typical standardized answer sheet for a multiple choice exam is shown in FIG. 2. The examinee is required to select one of the responses according to the directions provided with each item and fill in the appropriate circle on the answer sheet. For instance, the correct answer to the question stated by stem 1 is choice B of the responses 3. Thus, the circle designated 8 in FIG. 2 corresponding to choice (b) is the correct answer to this item, i.e. question 13 should be filled in by the examinee as shown.

Generally, examinees register to take a particular test, by filling out a registration form and sending it to a test processing center such as Educational Testing Service, Princeton, N.J. by a specified registration date. A registration form usually requires that an examinee provide information such as the examinee's name and address, test to be taken and some related biographical information. After all of the registration forms have been received by the test administration center, the examinee information such as name, address, some recipients background questions, etc., is processed. Each examinee is scheduled to take the test by assigning to that examinee a place and time at which the test can be administered to that examinee. Typically, a number of examinees are scheduled to take the test at the same time and same place to conserve on administrative costs. One or more test administrators will be present at the locations where the test is scheduled to be taken.

Test administrators are generally responsible for distributing the test material, providing instructions to the examinees, monitoring any timing constraints required by the particular test and collecting the test material when the testing time has ended or when the examinee has finished taking the test. After collecting the examinees' responses and other test material, the administrator either directly or indirectly sends them back to the test processing facility, for scoring and evaluation.

After all of the examinees' tests are graded, statistical and other processing may be provided for various reasons. For instance, to assess one examinee's score, it is necessary to compare his or her score to those of other examinees taking the same test. Another important reason to evaluate the test results for statistical purposes is to create and update an informations bank containing the performance statistics of each item used or created for previous tests. This information may then be used for the creation of future tests.

A goal of standardized testing is to construct a test efficiently for the purpose of measuring a skill, ability, etc. Therefore, each test is constructed to conform to a test specification which defines the rules and/or constraints for selecting the items. In constructing a test, test developers select items from pool of items so that the combination of selected items satisfy the test specification.

A test is typically divided into sections of questions. The test specification generally defines the number of items to be presented in the test, the number of test sections, the number of questions in each section, the time for taking the test, and the allotted time for responding to all the items in each test section. The test specification also specifies criteria for item selection. These are based on at least four item characteristics which include: (1) item content, e.g., mathematical questions relating to arithmetic, algebra, or geometry; (2) cross-information among items, e.g., more than one item testing the same point; (3) number of items/set, i.e. a identification of a subset of items of a larger set; and (4) statistical properties of items derived from pretesting, e.g. difficulty of the selected items.

In recent years, these methods for creating, delivering, administering, and scoring tests have been determined to be inadequate. Due to the number of examinees taking standardized tests, the demand for developing new and more diverse tests and a need to provide more flexibility in scheduling tests without sacrificing administration costs and security have increased.

One solution to these demands would be to automate the entire testing process. However, up until now only a few attempts have been made to automate only portions of the testing process. Furthermore, these attempts are limited in their ability to generate a variety of item types. They are not modular in their design to allow independent replacement of software or hardware, nor do they provide security and integrity features required for a standardized testing environment.

There have been attempts to develop computerized tools for instructional purposes. These products, although primarily geared to delivering instructional systems, often contain testing components as well. Some examples of instructional programs are available from Computer Curriculum Corp., Computer Networking Specialists Inc., Computer Systems Research, DEGEM, Ideal Learning, Josten's Learning Corp., New Century Education, Plato Educational Services—TRO Inc., Unisys—ICOPN System, Wasatch Education System, and Wicat Systems. Wasatch Courseware, for instance, provides on-line tools, such as a notebook, a pop-up calculator, word processor, graphics tool, glossary, and a database embedded into the lessons.

Josten's Learning Corp. provides some flexibility in the hardware and software available for executing lessons such as networked or non-networked systems, the use of third party software, and the ability to operate its instructional system from a remote site. Ideal Learning has a management system which is also capable of accommodating third party software, and its test scoring system can score tests which are generated by a number of test developers including standardized tests. The DEGEM System is a networked system which is capable of providing statistical data on student or class progress. Therefore, although some of these instructional programs incorporate some features which could be utilized in an automated standardized computer-based testing system, none of them provides a flexible and integrated system for developing, generating, delivering, administering and processing computerized standardized tests.

There are also a number of systems for computerizing parts of the test construction process. (See e.g., a review by Hsu and Sadock (1985)). Perhaps the most comprehensive of these testing programs is the MicroCAT System developed by Assessment Systems Corporation. The MicroCAT System comprises four primary subsystems, one for each of development, examination, assessment, and conventional testing.

Although MicroCAT has been noted for its comprehensiveness, it has been criticized for a number of limitations. For instance, development of a test having a specification which does not match one of its predefined templates requires a detailed understanding of MicroCAT's programming language. Its graphics tools are very limited, and other commercial drawing packages such as PC Paint cannot be substituted for MicroCat's graphics. Furthermore, there is no on-line help available from either the test development system or from the examination system. Without an on-line help facility, a system such as MicroCAT could not practically be used to deliver and administer standardized tests to thousands of examinees each year. To use the MicroCAT assessment System, the test data must have been based on tests which were generated only by MicroCAT's specifications. Furthermore, MicroCAT does not provide security for examinee performance files nor does it provide integrity features to guard against power interruptions and the like.

To accommodate standardized tests in computer based testing, there is a need for a comprehensive computer based testing system which provides flexible test development and production, test administration and test delivery, as well as preprocessing and postprocessing of item statistics and examinee performance. Such a system should incorporate data integrity features, including system failure recovery and data security features. The design should be modular and extensible so that substantially every hardware and software component can be modified or replaced without affecting the functioning of the remainder of the system.

SUMMARY OF THE INVENTION

The present invention fulfills the above-described need by providing a computer-based testing system comprising a test development system and a test delivery system. The test development system comprises a test document creation system for specifying the test contents, an item preparation system for computerizing each of the items in the test, a test preparation system for preparing a computerized test, and a test packaging system for combining all of the items and test components into a computerized test package. The computerized test package is then delivered to authorized examinees on a workstation by the test delivery system.

The computer-based testing system in a preferred embodiment further comprises an administrative system for initiating and terminating the delivery of the computerized test to an examinee. Preferably, the administrative system also provides security to prevent access by unauthorized persons.

In a further preferred embodiment, the test development system generates, and the test delivery system presents to the examinee one or more of the following: tutorials instructing examinees how to interact with the workstation, directions for taking the test, a help facility selectable by an examinee for additional instructions, and a review facility selectable by an examinee for providing a list of questions in the test so that the examinee can select a specific question to be presented.

The present invention also provides a method of computerized testing comprising the steps of producing a computerized test, delivering the computerized test on a workstation to an examinee, and recording the examinee's responses to the questions presented. In a preferred embodiment, the method further comprises administering the test to an examinee and securing the test from access by unauthorized persons.

In a further preferred embodiment, user controls are provided to the examinee to provide navigational control and to access functions of the computerized test.

The present invention also provides a method of administering a computerized test on a computer workstation. According to the method of the present invention, the computerized test is installed on the workstation and the delivery of the computerized test to an authorized examinee is initiated. In a preferred embodiment, the method checks the installed computerized test for data integrity and viruses and protects the installed computerized test from access by unauthorized persons. In a further preferred embodiment, the method also records security-related information in log records and forms a security log file of those records.

The present invention additionally provides a method for delivering a computerized test for standardized testing. According to the method, a standardized test is created and then an electronic form of the test is prepared to produced the computerized test. A workstation is provided having a display for presenting items of the computerized test to an examinee and having a storage device. The examinees responses to the items are accepted and then recorded.

The present invention also provides a data distribution system. In a preferred embodiment, the data distribution system receives examinee performance files, security log files, and error log files all of which are preferably generated by the computer based testing system according to the present invention. The data distribution system comprises a file processing component and preferably an examinee performance database, security log database and a computer based testing network database. The file processing component processes the received files and updates the databases with information related to the delivery of the computerized tests to examinees on workstations in test centers. In further preferred embodiments, the data distribution system comprises a format post processing component for formatting information in the examinee performance database according to a definition file provided by a post processing system that maintains information about individuals who take a particular test. In an additional preferred embodiment, a report processing component is provided to retrieve data from one or more of the databases to generate any of the following reports: activity, audit trail, daily processing control, exception, security/event log, and essay.

BRIEF DESCRIPTION OF THE DRAWINGS

The present invention will be better understood, and its numerous objects and advantages will become apparent by reference to the following detailed description of the invention when taken in conjunction with the following drawings.

FIG. 88 is an example of the Main Menu Screen for the NDDS.

FIG. 91 is an example of a screen provided by the Administrative Application prompting the administrator to enter the data disk.

FIG. 93 is an example of a screen provided by the Administrative Application prompting the administrator to insert the backup disks.

FIG. 99 is an example of a screen provided by the NDDS of a Security/Event Log Report Selection Menu.

FIGS. 100A through 100F are examples of screens provided by the NDDS for carrying out Computer Based Testing Network (CBTN) processing according to a preferred embodiment of the present invention.

DETAILED DESCRIPTION

I. Computer Based Testing (CBT) System Overview

Figure 3:
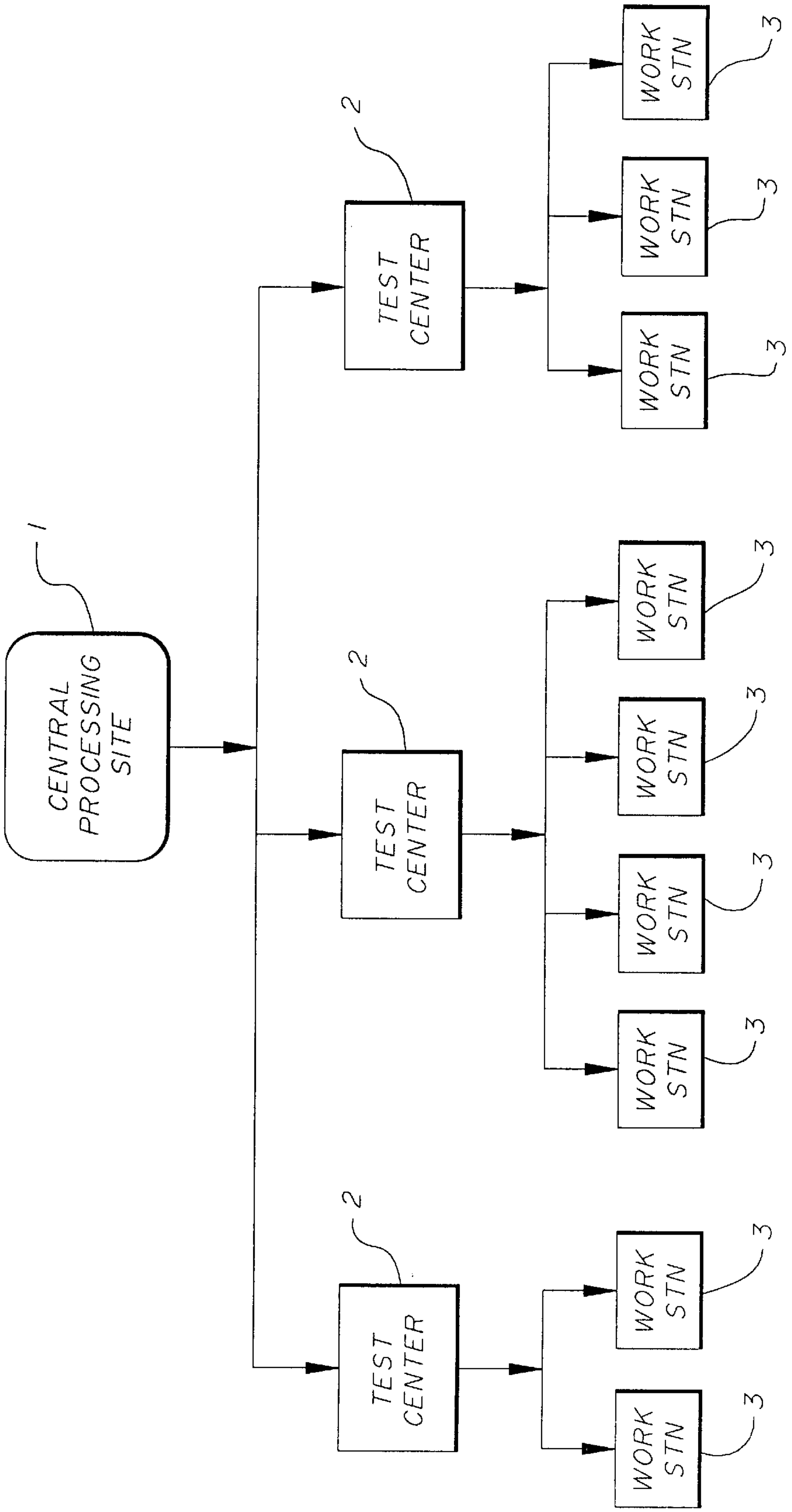
FIG. 3 is a general overview of computer based testing facilities.

Referring to the drawings wherein like numerals represent like elements, there is illustrated in FIG. 3 a general overview of computer based testing. Computerized tests are developed at a central processing site 1. Development of a computerized test includes the creation of various data files by application specific software. The computerized tests are packaged at the central processing site 1 and delivered to one or more test centers 2. Each test center 2 provides at least one workstation 3 on which a computerized test is administered to an examinee. In a preferred embodiment, the workstation 3 is a personal computer equipped with a mouse.

A test center 2 may for example be located at a school or a dedicated test site. Generally, a test administrator located at the test center 2 loads the computerized test, data files and application software developed at the central processing site 1 onto the hard disk of each workstation 3 at the test center 2. The administrator initiates the delivery of a computerized test to an examinee who is scheduled to take the test. The examinee's responses to questions presented by the test are preferably stored on the hard disk on each workstation 3 and are later preferably backed-up by the administrator and transferred to the central processing site 1 for scoring and evaluation.

In FIG. 3, one central processing site 1, three test centers 2, and 9 workstations 3 apportioned among the test centers 2 are shown. However, it should be understood, that any number test centers 2 and workstations 3 may be used by the CBT system.

Figure 4:
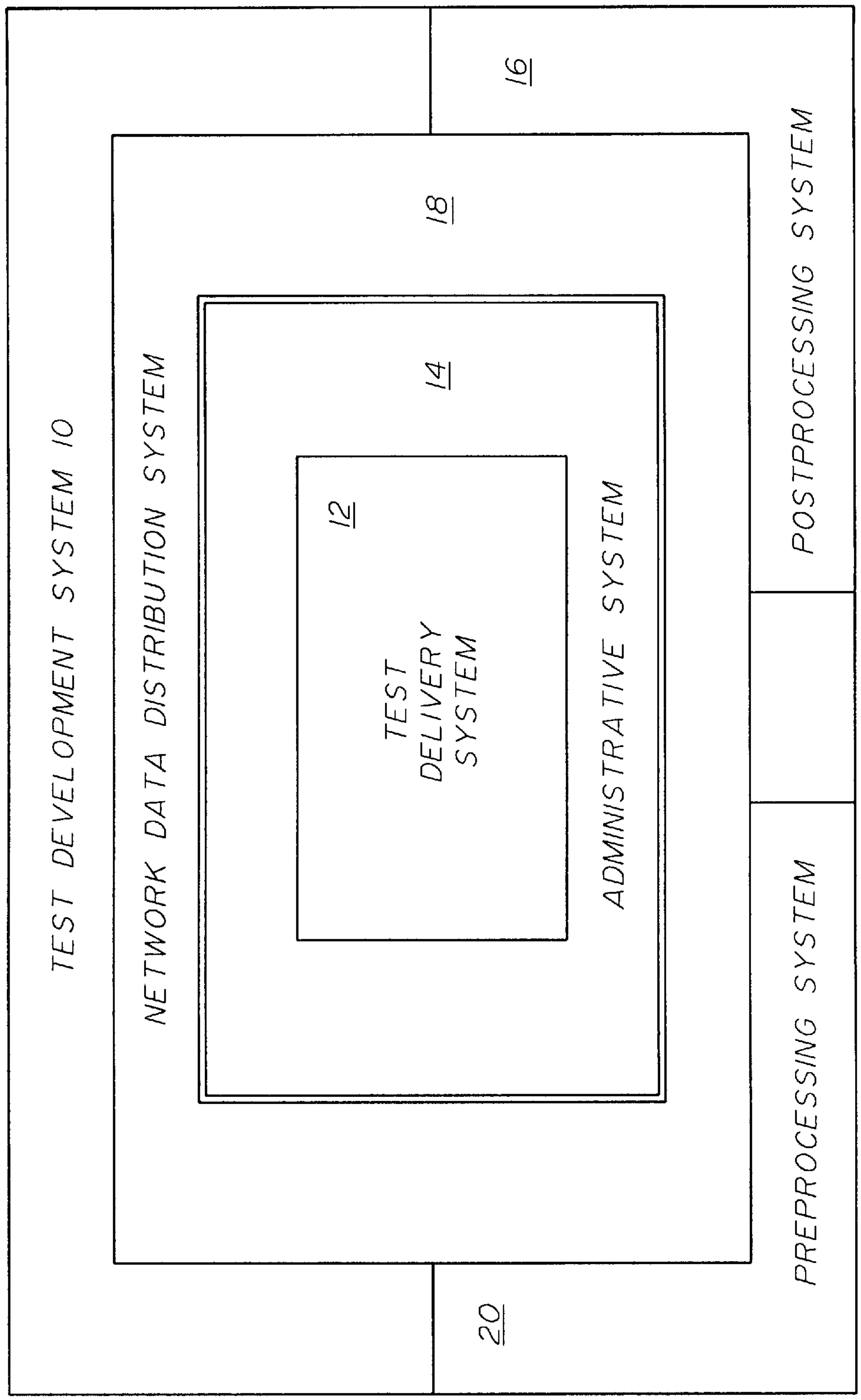
FIG. 4 is an interface diagram depicting the interfaces of each of the CBT (Computer Based Testing) systems according to the present invention.

A block diagram of the CBT system is shown in FIG. 4. The lines in the diagram demarcating each system represent interfaces that pass information between the various systems which comprise the CBT system. The double line separates those systems that reside at the test centers from those that reside at the central processing site. Those systems shown within the double lines are the systems residing at the test centers, and those systems shown outside the double lines are the systems residing at the central processing site.

Still referring to FIG. 4, the CBT system comprises six separate systems. The Administrative System 14 provides substantially all administrative and control functions at a test center. The Test Delivery System 12 actually presents questions and information to the examinee at a workstation. The Administrative System 14 initiates the delivery of a test to an authorized examinee and secures the test by prohibiting access by any unauthorized person. Communication with the Test Delivery System 12 occurs through the Administrative System 14. The Network Data Distribution System (NDDS) 18 receives data from the test centers 2 and distributes returned data to other systems at the central processing site. The Test Development System 10 provides substantially all functions necessary to create test questions and package computerized tests. The Preprocessing System 20 provides functions performed prior to the testing session, such as registration. Such Preprocessing systems are typically custom designed for a particular test and are provided commercially by various testing support companies such as Educational Testing Service, Psychological Corporation, and American College Testing Service. Like the Preprocessing System 20, Postprocessing systems are typically customized for each type of test and are provided commercially through Educational Testing Service, Psychological Corporation, and American College Testing Service. The Postprocessing System 16 provides functions performed after the testing session, such as issuing official score reports or archiving examinee records.

Figure 5:
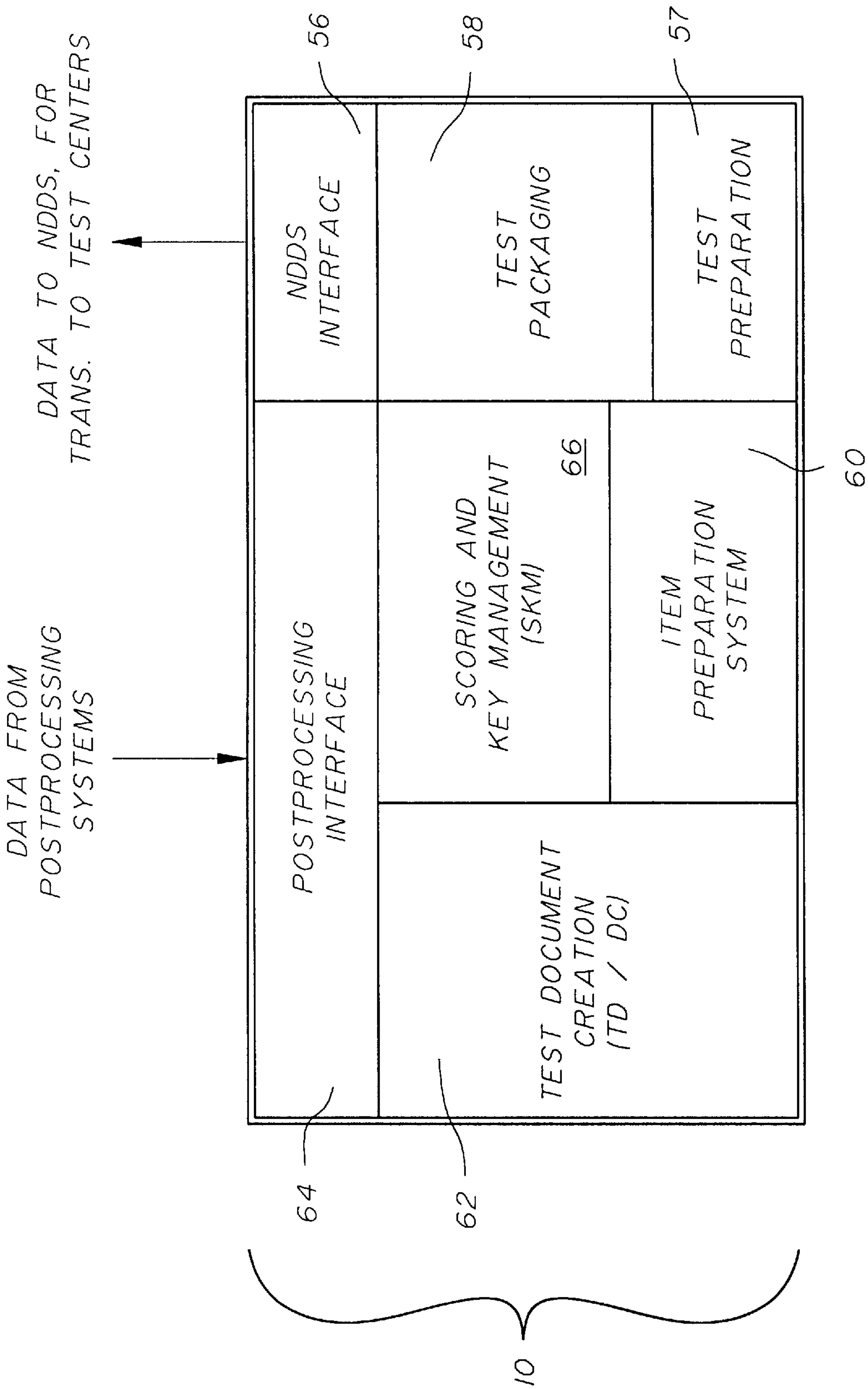
FIG. 5 is an interface diagram showing the subsystems of the test development system according to the present invention.

A detailed block diagram of the Test Development System 10 is shown in FIG. 5. Five primary functions are performed within the Test Development System 10, including test development/document creation ("TD/DC") 62, an item preparation system 60, scoring and test key management (SKM) 66, computerized test preparation system 57 and test packaging 58. The Test Development System 10 permits test developers to develop items and a Test Production Staff (TPS) to computerize the items. It also supports the creation of test scripts. A test script is the electronic form of a test. It provides option settings and configuration data necessary for delivering the test on a workstation. The Test Development System 10 also supports the creation of test keys, i.e., correct response to each item, and the packaging of all components into one test.

Items are preferably written and created using the "TD/DC" (Test Development/Document Creation) system 62. The "TD/DC" system 62 interfaces with the Item Preparation system 60 and with the scoring and key management system 66 to computerize the item content and key respectively. The Item Preparation System 60 is used to computerize the items for presentation by the Test Delivery System 12 and enter the computerized version of the item key which differs depending on the item type. The Item Preparation System 60 prepares data for the scoring and key management system 66 to communicate the computerized key information. The Item Preparation System 60 interfaces with the Test Preparation System 57 to prepare the test scripts. The Test Packaging System 58 interfaces with the Item Preparation System 60, the scoring and key management system 66, and the Test Preparation System 57 to obtain all of the item and test components packaged into a computerized test.

The NDDS Interface 56 transmits the computerized test from the Test Packaging System 58 to the NDDS 18 as shown in FIG. 4, for delivery to a test center 2 as shown in FIG. 3. After an examinee has taken a computerized test, an postprocessing interface 64 with the Postprocessing System 16 provides information about item keys to the "TD/DC" System 62 which uses this information to alter items or add new items for use in subsequent tests.

Figure 6:
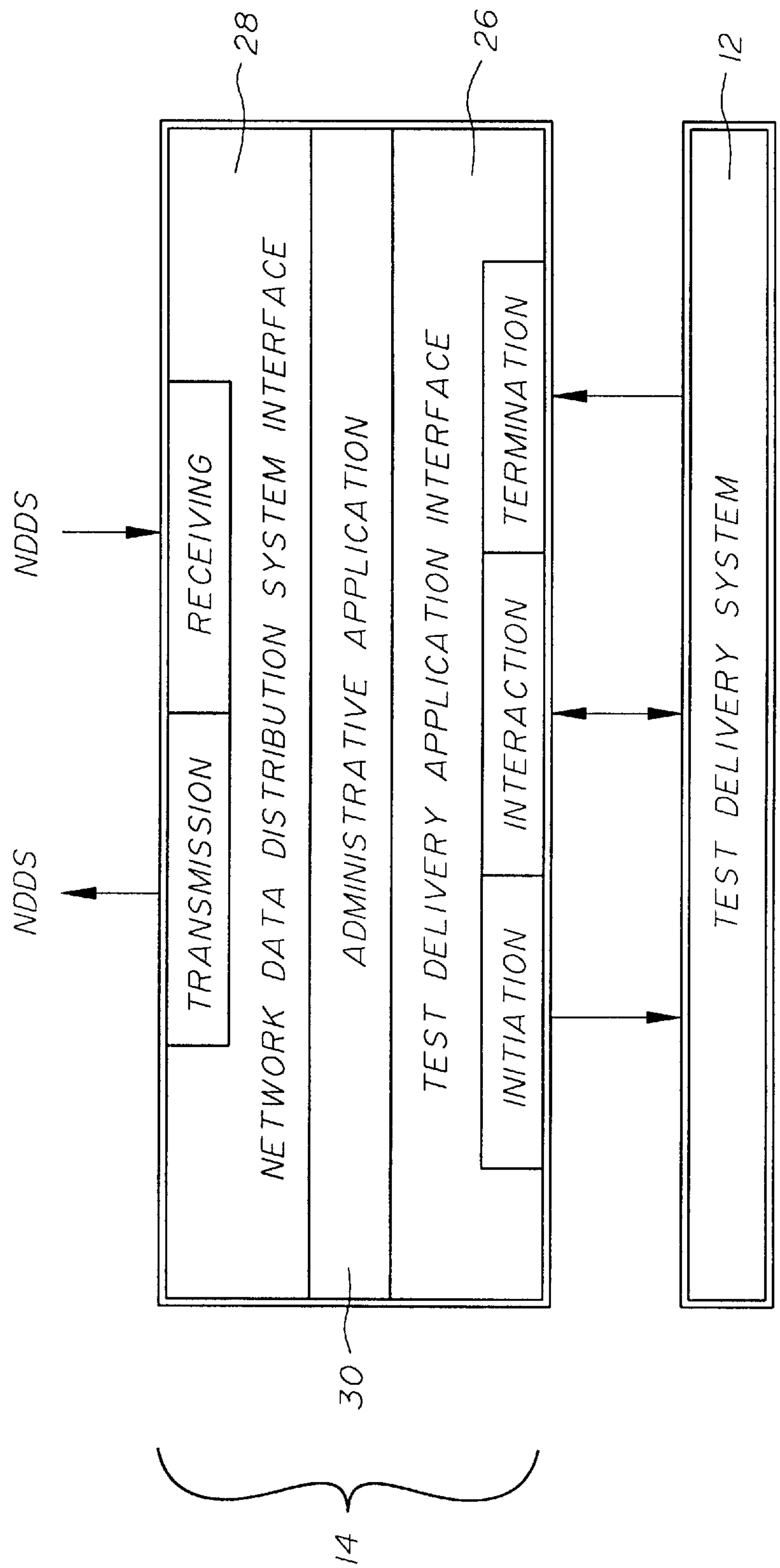
FIG. 6 is an interface diagram showing the administrative system and test delivery system interfaces according to the present invention.

FIG. 6 shows a block diagram of the Administrative System 14 and Test Delivery System 12 and their respective interfaces as shown in FIG. 4. The Administrative System 14 permits test center administrators to control delivery of tests, transmit results to a central processing site, and perform administrative functions such as backup of data, item and software maintenance, and reporting. The Administrative System 14 further prohibits access to the computerized test by unauthorized persons.

An interface with the Network Data Distribution System (NDDS) 18 at the central processing site enables the Administrative System 14 at a test center to send packaged examinee data and reports to a central processing site. Data and software are sent from the central processing site to the test centers on diskettes.

Still referring to FIG. 6, the Test Delivery application Interface 26 is shown as having three specific interface functions. First, the Administration system 14 can initiate a delivery of a computerized test and pass the necessary information to the Test Delivery System 12. The Administration System 14 may also interact with the Test Delivery System 12 for purposes such as terminating the testing session, processing examinee breaks, and timing essays, as appropriate.

After termination of the test delivery, the Test Delivery System 12 transfers information such as examinee performance data, return codes, and other processing data as appropriate to the Administration System 14 through the Test Delivery Application Interface 26. The Administration System 14 then regains control of the workstation.

The Administrative Application 30 provides test center administrators with the ability to perform various functions including: controlling access to computerized tests and related data through levels of authorization and password protection; entering and editing examinee identification information prior to the testing session; selecting the test to administer; terminating tests; backing up examinee and administrative data; transmitting data to the central processing site; changing passwords and adding or deleting administrator logon IDs; and reporting irregularity and activity data to the central processing site.

Figure 7:
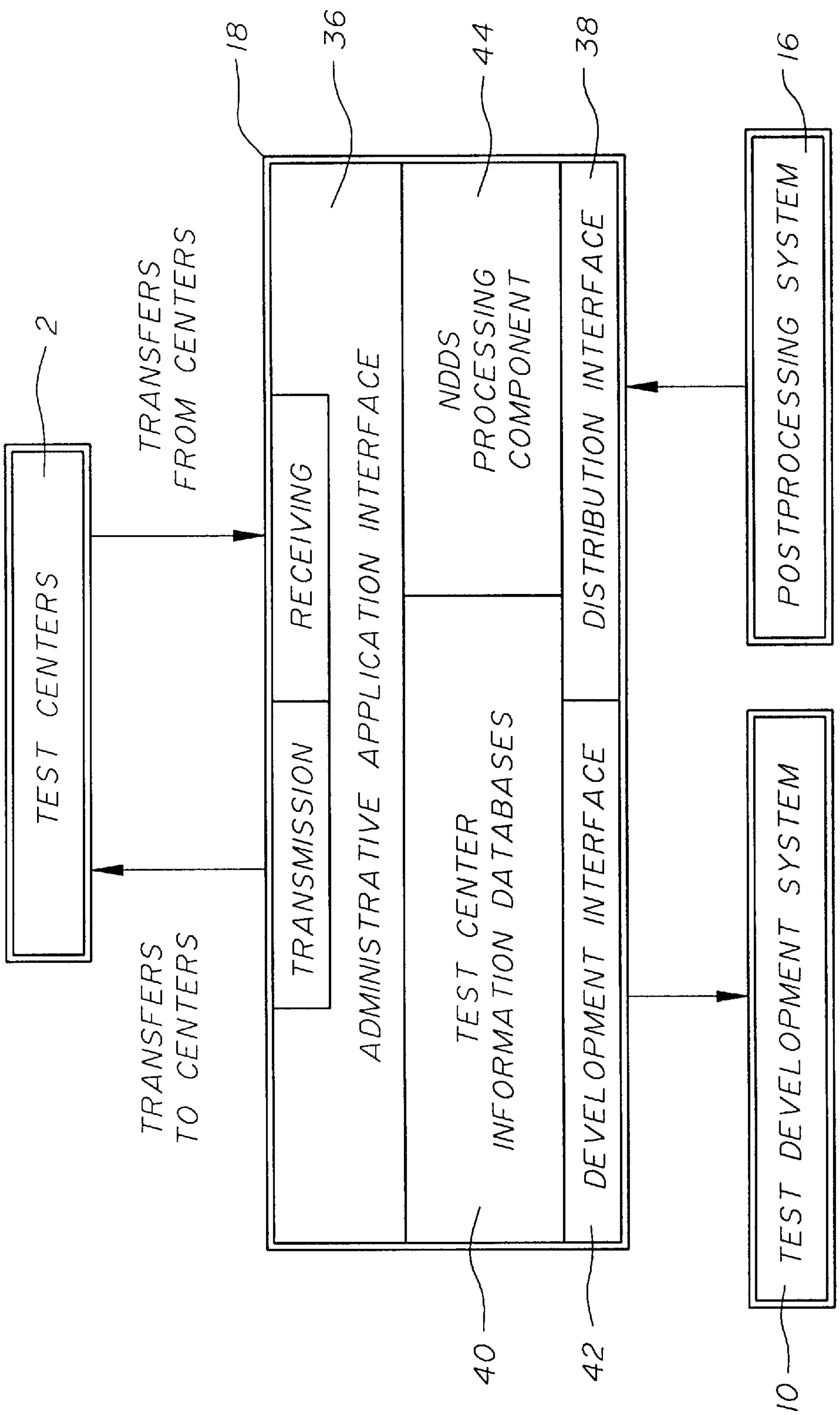
FIG. 7 is an interface diagram showing the subsystems of the NDDS (Network Data Distribution System) according to the present invention.

A detailed block diagram of the Network Data Distribution System (NDDS) 18 with its interfaces is shown in FIG. 7. The Network Data Distribution System (NDDS) 18 provides substantially all necessary support functions for the CBT system to control the network of test centers. The Test Center Administrative Application Interface 36 permits the transfer of applications and computerized tests to the test centers and examinee records and reporting information (data related to system errors and test/workstation security) from the test centers to the central processing site. The Test Development Interface 42 provides the means by which new or revised computerized tests are sent from the Test Development System 10 to the NDDS 18. The NDDS 18 uses a Test Center Information Database 40 to determine which test centers should be sent any new/revised tests, and to create reports from data received from the test centers. The NDDS Processing component 44 receives data from test centers 2 via Administrative Application Interface 36, checks it, sorts it, and processes it according to its type (program data, security data and reporting data). Reporting data is used to create the necessary reports. Program data such as examinee records, are processed to consolidate and reformat the information in a form suitable for postprocessing. The Distribution Interface 38 then distributes the processed data to the Postprocessing System 16.

II. Test Development System

A. Test Development/Document Creation

In a preferred embodiment, test developers create tests at the central processing site. In computer based testing, the tests are created by the test developers (TD) and are further processed and packaged by test production staff (TPS). The "TD/DC" System which is developed by Educational Testing Service is preferably used to create the test forms. It should be understood, however, that other test document creation systems could likewise be used to create test forms for computer based testing. Therefore, although a detailed explanation of "TD/DC" is not required for a description of the test development system, an understanding of its functional and procedural operation will aid in understanding the test development system.

The "TD/DC" System 62 (FIG. 5) is a fully automated system in and of itself. It consists of a central item database and local personal computer based workstations. The central item database stores substantially all items previously used on standardized exams as well as other items that have been created but not previously selected for inclusion in an exam. Associated with each item stored in the central item database, is data stored in fields related to the item's answer key, revisions it has undergone, a list of the test forms in which the item has previously appeared, and statistical data indicating how the item performed at each previous administration. Other descriptive data fields include information related to the item type (i.e., multiple choice or fill in the blank), the item's author, copyright information, and both content and cognitive information specific to each testing program (e.g., SAT, GRE, etc.).

Every item is assigned a unique number called an accession number that identifies the item and all of its associated data. The "TD/DC" system software allows items to be located by means of any of the data fields associated with the item.

The central item database software allows test developers to access item information within the central item database. This software supports the downloading of items and associated data to local workstations. Pools of items may also be selecting and then downloaded. This software also enables test developers to bank, edit, and classify features of the items stored in the central item database. Additionally, statistical information related to the use of an item in an administration of a test is received by the central database software. Through a statistical feedback system, this statistical data is added to the data stored in the central item database.

New items may be written by test developers at the local workstations. Software provided on the local workstations supports classifying, banking, and viewing these new items. With respect to the downloaded items, this software also allows test developers to view those items and their associated data and permits the test developers to enter and revise the statistical data.

Test developers also assemble draft tests on local workstations. The local workstations provide software supporting item selection based on a number of criteria so that tests may be assembled to satisfy substantially any test specification. When all of the items are selected to satisfy the test specification, these items and associated data are assembled into what is referred to as a Worksheet.

Figure 8:
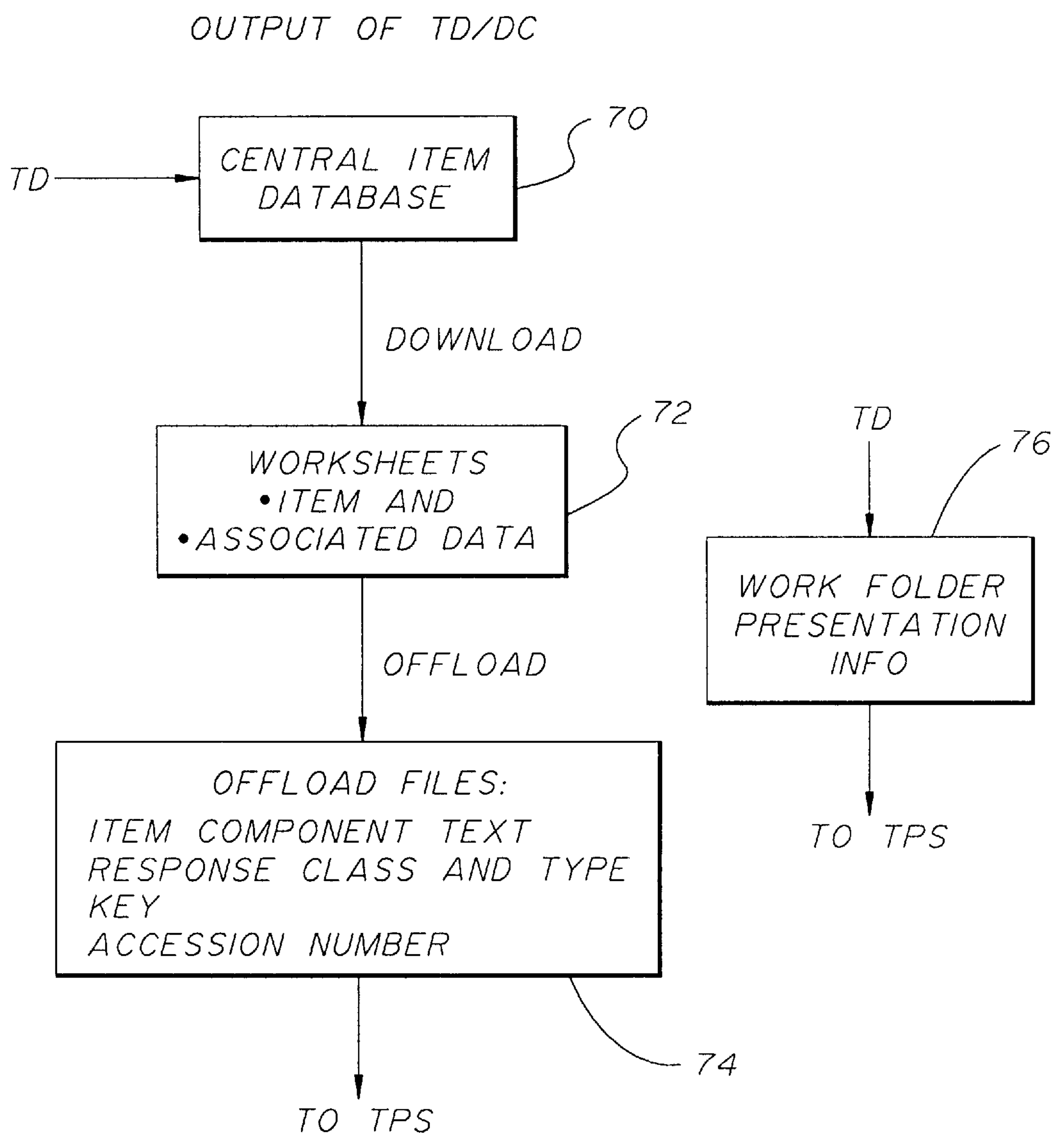
FIG. 8 is an information flow diagram for the "TD/DC" system.

Test production for computer based testing, requires certain inputs from test developers and/or a test document creation system. FIG. 8 depicts the inputs provided by the test developer and the outputs generated by "TD/DC" for use by TPS. For instance, if the "TD/DC" system is used, the information shown as offload files 74 and workfolder 76 is preferably provided to TPS. As described above, worksheets 72 are created by TD by downloading the selected items and associated data. An offload program may then be invoked to copy the offload files, such as the item component text (stem, stimulus, response, and directions), the response type, (e.g., multiple choice) response class (e.g., single response answer), the answer key and the item's accession number, onto a diskette. In preferred embodiments, the TD also prepare a workfolder 76 containing information related to the computerized presentation of the items, and graphics to be prepared as a computerized image and incorporated into the item presentation.

B. Test Production

1. Overview of Test Production

Test production comprises at least three primary functions, item preparation, test preparation and test packaging. The Item Preparation System 60 as shown in FIG. 5 is used by TPS to create an "on screen" version of the items prepared. As described above, the test questions are prepared beforehand by test developers preferably using the "TD/DC" System 62 or equivalent system. Item text is edited until the content is satisfactory to the test developers. An offload program is used by the test developers to copy the selected items to a diskette which is sent with a work folder of batch-related documents to the test production staff. The test production staff then makes a computer deliverable image of the items in the form of files and prepares a test script for implementing the test. The test packaging system 58 combines the item files with the test script to form the computerized test.

In a preferred embodiment, the Item Preparation system 60 comprises seven programs providing the functions shown in the flow diagram of FIG. 8. Table 1 below itemizes the programs used by the Item Preparation System 60. The table lists the purpose of each program, the program name, the operating environment in which the program preferably is executed and the user during the test development process. "WORD FOR WINDOWS" and "PAINTBRUSH" are commercially available from Microsoft Corporation.

TABLE 1

PROGRAM COMPONENTS OF THE ITEM PREPARATION SUBSYSTEM

| Purpose | Program Name | Environment | User |
|---|---|---|---|
| Item Offload | CBTOFF | DOS | TD* |
| Item Element Generator | IEG | DOS | TPS** |
| Word Processing | "WORD" | "WINDOWS" | TPS |
| Translation | XLATE | DOS | SYS*** |
| Graphics Prep | "PAINTBRUSH" | "WINDOWS" | TPS |
| Item Preparation | IPT | "WINDOWS" | TPS |
| Item Review | IVT | "WINDOWS" | TD/TPS |

*TD — test developers
**TPS — test production staff
***SYS — Systems

Figure 9:
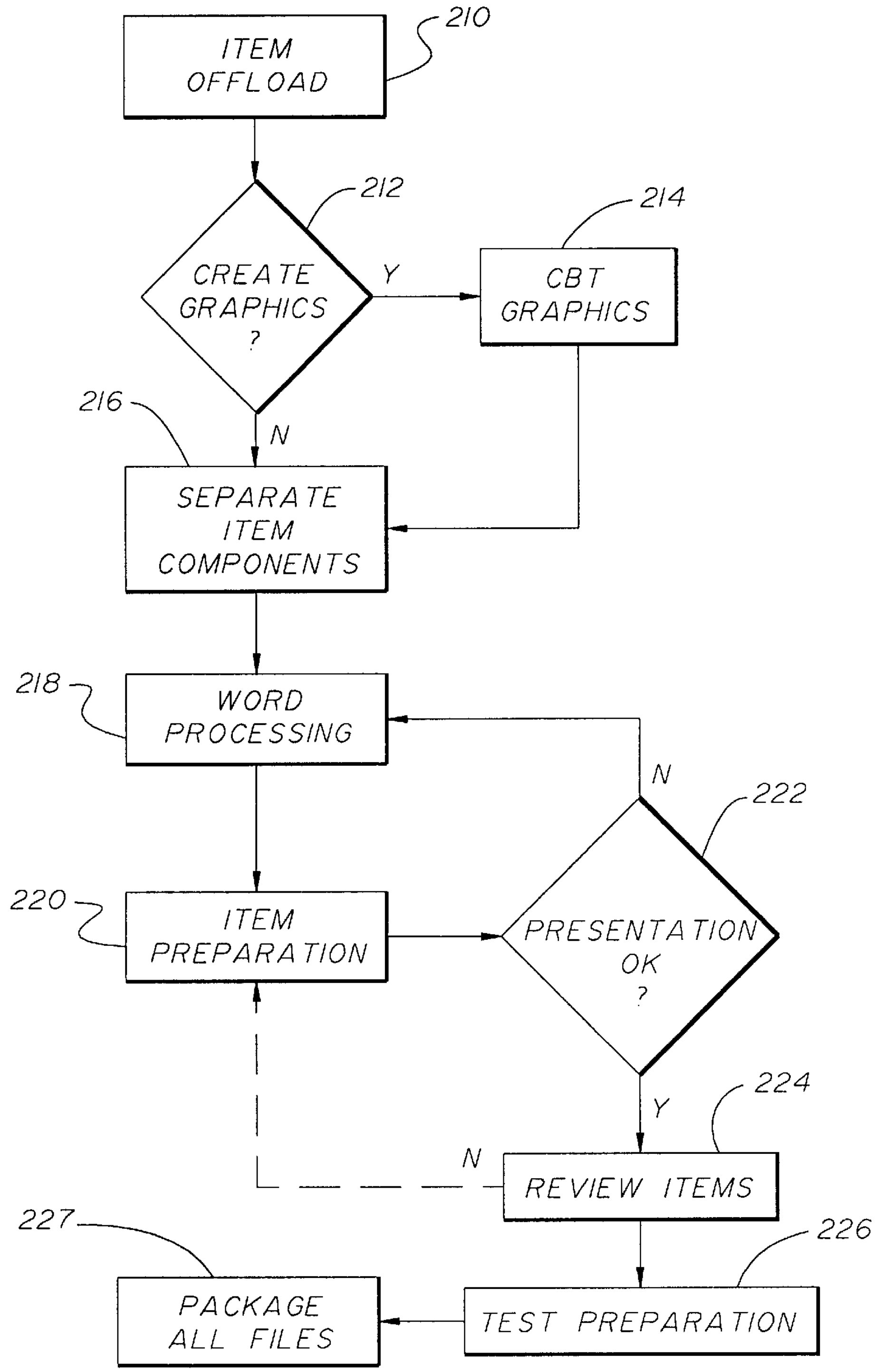
FIG. 9 is a functional flow diagram of test production according to the present invention.

A functional flow diagram of the Test Production Process is shown in FIG. 9. Assuming for purposes of description that the system used to create the test document is the "TD/DC" system, items are first offloaded at 210 by test developers using the item offload function of the "TD/DC" system and are stored on a diskette. The offloaded items and a corresponding workfolder are then transferred to the TPS. If graphics are to be shown with the item as determined at 212, a computerized image of the graphics are prepared at 214 by TPS. TPS reads the items from the diskette and separate them into component parts shown at 216 using the Item Element Generator (IEG). The text of the item components can then be edited using a word processor at 218 such as "WORD" for example. Information may be added to each component regarding, for instance, point size, font, leading, column arrangement, etc. during word processing 218. Then, the items may be prepared at 220 using the Item Preparation Tool (IPT) to arrange the components on the computer display and specify characteristics about each item (e.g., multiple choice, response type, etc.). Finally, an electronic "proofing" copy of the items is returned to the test developers for review at 224. The test developers may then provide corrections or final approval. The proofing copy is preferably reviewable by test developers via a modified form of the Item Preparation Tool known as the Item View Tool (IVT).

TPS may iterate between word processing 218 and item preparation at 220 until satisfied with the results. Likewise, the entire process from item offload 210 through item review 224 may be repeated. Simple corrections can be made by sending marked-up prints from the test developers to test production staff so that the most current version of the test can be called to the screen again and edited according to the comments produced by the test developers.

Once final approval has been received from the test developers, a test is prepared as shown at 226 by a test preparation tool based on information provided in the workfolder. Finally, TPAK packages all of the item files and test scripts into a computerized test at 227.

2. Item Preparation a. Item Offload Program

The Item Offload function 210 is executed by test developers on the "TD/DC" system using the item offload program. This function extracts data from the "TD/DC" system to be used as input for test production which ultimately results in the creation of a computerized test. In the "TD/DC" system, a file which is known as the Worksheet and described previously in Section II (A), lists the accession numbers of items. Each Worksheet has a unique name which is assigned by a test developer. Item offload 210 creates a single file with all of the offloadable information for all items in the Worksheet. The offload file's name is the same as the Worksheet name. Item offload 210 opens the Worksheet, reads each item pointed to by the accession number, and writes to an ASCII file the item's accession number, classification codes, rationale and item text.

Test production requires specific classification information. Thus, information contained in the Worksheet is preferably categorized by the test developers. One category may include item information. For instance, test developers should provide codes that indicate how each part of the item's text is used for production purposes, e.g., the code indicating that particular text is the stem, the response, or the directions associated with each item.

Another category of information which may be provided to test production is rationale information. Again, test developers may insert codes and text related to the key description, number of responses required to properly answer the question posed by the stem, a paraphrase summarizing the content of the item, and general remarks regarding the appearance of each item.

A third category of information which could be provided to test production is classification profiles of the items included in the Worksheet. The classification profiles may include codes identifying the item class, item type, item structure, and information describing how the item should be presented to an examinee. The item class refers to its response class and is indicative of whether a single response, multiple response, or free response is required by the item. The item type code specifies its response type and is indicative of the type of response required to answer the question posed by the item. For instance, the item type codes specifies selection of a value on a scale, selection of a response with an ellipse or a box, insert text, or select a choice from a table. These and many other item types will be described in detail below.

The item presentation code specifies a predefined screen template. The screen templates indicate how many panes the screen should be divided into for each item and the location of the panes. Additional codes are used to specify which item information, i.e., stem, response, directions or stimulus, is to be placed in each pane and its position within the pane. Similarly, the item presentation codes will be described in more detail below.

A fourth category of information which may be provided to test production is the stimulus formation for a set of items. The stimulus formation code specifies the beginning of a stimulus to be shared by a set of items and the presentation of the stimulus. When a stimulus is referenced by only a single item, the item is called a discrete item. In the case of a discrete item, the stimulus information codes are preferably provided with the item information codes rather than the stimulus information codes.

Prior to executing item offload 210, the test developer using the "TD/DC" system may insert tags in the item and rationale text which are used by the Item Element Generator (IEG) program to separate the text into smaller components. Tags in the item text are used to delineate the directions, stem and response components. Tags in the rationale text are used to supply information about the key, number of required responses and a paraphrase summarizing the item, as well as the rationale text.

b. Graphics

The work folder indicates whether graphics are required as shown at 212 in FIG. 9. TPS may generate the graphics using "PAINTBRUSH" as one example. The graphics files are named, for example, by adding an extension, .Gnn, to the accession number of the item which contains the graphic to be presented. The "nn" is representative of a number so that up to 99 graphics in this example may be associated with an item.

c. Item Element Generator (IEG)

The Item Element Generator (IEG) is a DOS program used by the TPS. The IEG is preferably written in Microsoft C version 5.1. The IEG separates the ASCII file created by the Item Offload program as shown at 216. The individual items in the Offload file are separated from each other, then the items themselves are broken into components and stored in files.

The component files are preferably named by tacking an extension onto an item accession number. The extension specifies which piece of the item (i.e., stem, stimulus, response, directions, etc.) the file contains. Since the accession number is used for the base name of a file, it is easy to locate all of an item components. Table 2 below lists each component file with a predetermined extension.

TABLE 2

| COMPONENT FILES EXTENSION CROSS REFERENCE | |
|---|---|
| File Name | Contents |
| acc.STE | Stem component |
| acc.REF | Stimulus component |
| acc.DIR | Directions component |
| acc.RSP | Response component |
| acc.CTL | Control component |

A control file is also generated by the IEG for each item. A control file is a master repository for an item's information. Specifically, the control file defines how these components are to appear as an item on a display during test delivery. Minimally, a control file and a stem file are generated for each item. A directions file and a response file may be generated if the item contains directions and response components. A reference file contains the stimulus material and is generated only for items which belong to a set. Additionally, the control files of set members contain the accession number of the stimulus material.

The IEG also creates two log files during its execution and records errors in an error file. The error file and log files are named by adding an extension to the base name of the input file, that is, the file generated during item offload 210. Thus, for example, if the input file is named TEST, log or error files are created by adding a unique extension to TEST.

One of the log files is the Item Accession List File, which contains the accession numbers of discrete items and members of sets (excluding stimulus material) for which component files were produced. This file is named using an input file name and .IAL extension such as inputfile.IAL. Accession numbers are preferably written to the file in ASCII format, one per line, in the order in which they were processed.

The second log file created by IEG is the Batch History File, which contains the accession numbers of all items in the offload file. This file is named using an input file name and .BHF extension such as inputfile.BHF. Accession numbers are preferably written to the file in ASCII format, one per line, in the order in which they were processed. Accession numbers of the set may be written to the file one after the other, starting with the stimulus material.

The Error Log file is an ASCII file that logs errors encountered during IEG execution. This file is named inputfile.ERR.

The .IAL and .BHF are preferably always generated. The .ERR file is generated if errors are reported. Individual component files are generated depending upon the item type and tags embedded in the item by test developers.

In a preferred embodiment, IEG uses a code conversion table to convert "TD/DC" classification codes to Item Preparation codes. By using a separate file for this table, the IEG does not have to be recompiled and linked if the codes are extended or altered in any way.

d. Item Preparation Tool

In a preferred embodiment, the Item Preparation Tool (IPT) is a WINDOWS-based application used by the TPS. The IPT is also preferably written in Microsoft C version 5.1 along with the WINDOWS Software Development Kit. It is the electronic analog of tools with which to prepare the item image. Using the Item Preparation Tool, TPS can process items received after the component parts are separated by the IEG.

After item preparation is started at 220, test production staff can scan a list of items available for processing from the item accession list file which is created by the IEG at the step 216. The list is generated by compiling all files with the .STE extension in the item accession list file.

Each item having a .STE file extension is then edited and processed by test production staff to create a computer deliverable form of the item which is developed by the test developers. In combination with the item preparation process 220, test production staff can edit any of the item text components by word processing 218. After editing the text of the desired component, test production staff may return to item preparation 220. The revised text may then be displayed by the IPT.

The IPT is preferably a menu-driven application. The lowest level menu options have dialog boxes. Dialog boxes are typically used in a WINDOWS environment for prompting a user to input the data. Most dialog boxes typically have two selectable buttons. One button labelled "OK" is selected by a user to exit the dialog box when he or she has finished entering the data. The second button "CANCEL" allows the user to exit the dialog box without entering the data.

Table 3 below describes each of the menu options and the content of the dialog box presented to a user, i.e. test production staff, after invoking the menu option in a preferred embodiment. It is well known in menu-driven applications to layer the menus. For instance, IPT provides eight main menu options in capital letters in Table 3 below, e.g. FILE, VIEW, PRESENTATION, etc. One or more lower level menus may be invoked when one of these main menu options is selected by the user. For instance, the menu selection listed in Table 3 such as "PRESENTATION/Components/Directions" indicates that the user had selected the main menu option PRESENTATION. A first lower level menu was then provided, and the user selected "Components." Subsequently, a second lower level menu was provided, and the user selected the "Directions" option.

TABLE 3

| MENU STRUCTURE AND DIALOG BOX CONTENT | |
|---|---|
| MENU OPTION | DIALOG BOX CONTENT |
| FILE/Open | This dialog box allows the user to either type in the accession number of an item or select the accession number from a list. The user may also be permitted to change drives and directories. When an item is opened, it is read into memory, formatted and then displayed. It is displayed using the current values found in the control file. If critical information is missing from the control file, default values may be used. If an item is currently being displayed when FILE/open on a new item is invoked, the current item may be visually checked for integrity and the user will be prompted whether or not to save the item. |
| FILE/Save | The currently displayed item is saved. Preferably no dialog box or buttons are displayed. |
| FILE/Integrity check | The currently displayed item is checked for integrity. If anything is wrong with the item, the user is informed. The user may then correct the problem(s). Preferably no dialog box is displayed unless a warning message is shown to the user. This warning box may contain an OK button. |
| FILE/Print Screen | The currentiy displayed screen "item" is printed. Preferably no dialog box or buttons are shown. |

TABLE 3-continued

MENU STRUCTURE AND DIALOG BOX CONTENT

| MENU OPTION | DIALOG BOX CONTENT |
|---|---|
| FILE/Exit | The application is terminated. The currently displayed item will be checked for integrity. If the currently displayed item has not been saved, the user will be prompted to save it. A confirmation box may be displayed. |
| FILE/About | Software ID, version number and copyright information about the IPT are displayed. An OK button is preferably displayed. |
| VIEW/Directions | The text of the directions associated with the currently displayed item is shown. An OK button is preferably displayed. |
| VIEW/Summary | A summary of the currently displayed item, including all component accession IDs, the item's presentation on the display, response information, etc. are shown. An OK button is preferably displayed. |
| PRESENTATION/ Template | The user is permitted to select a template with one or more presentation panes for the currently displayed item, including the pane in which each component will be displayed and the ordering of components within each pane. |
| PRESENTATION/ Components/ Directions | The user is permitted to associate a file name containing the text of the directions to the item. |
| PRESENTATION/ Components/ Stimulus | The user is permitted to associate a file name containing the text of the stimulus to the item. |
| PRESENTATION/ Paraphrase | The user is permitted to type the text of the paraphrase. The paraphrase is used on the review screen of the test delivery application. |
| PRESENTATION/ Positioning | The user is permitted to specify an area of a reading passage that will be centered and highlighted when an examinee is presented with the currently displayed item. The beginning and ending character positions to be centered and highlighted are specified in this dialog box. |
| RESPONSE | The user is permitted to select the response class and type. All additional response parameters that may be required to describe that response class and type can be specified by clicking on the parameters button. |
| Single-select Multiple Choice | A parameter is preferably available to permit the user to choose whether or not to display an indicator with each choice. |
| Multiple-select Multiple Choice | A parameter is preferably available to permit the user to choose whether or not to display an indicator with each choice. |
| Scale | The user specifies the shape of the scale, the width (or height or radius depending on the shape of the scale), label orientation, labels, and tic mark sizes. The defined scales may include, for example, horizontal and vertical time lines, circles and semi-circles. |
| KEYS | The user is permitted to specify the answer key(s). A list of possible keys may be displayed so that the user selects the choices for the key(s). |
| SCORE | The user is permitted to specify whether or not the item is scored. |
| REPRESS | It performs the same function as File Open using the accession number of the currently displayed item. This is available so that when changes are made to the item outside of the IPT (i.e. WORD), the user can easily reread and display it. Preferably no dialog box or buttons are displayed. |
| SELF | It provides help in using the IPT. The type of help available includes how to use the various dialog boxes, system menus, and general item preparation procedures. |

Detailed flowcharts and corresponding pseudo code of the IPT application is provided in Appendix A. However, the following example will be provided for a more complete understanding of the use of the item preparation tool.

Figure 10:
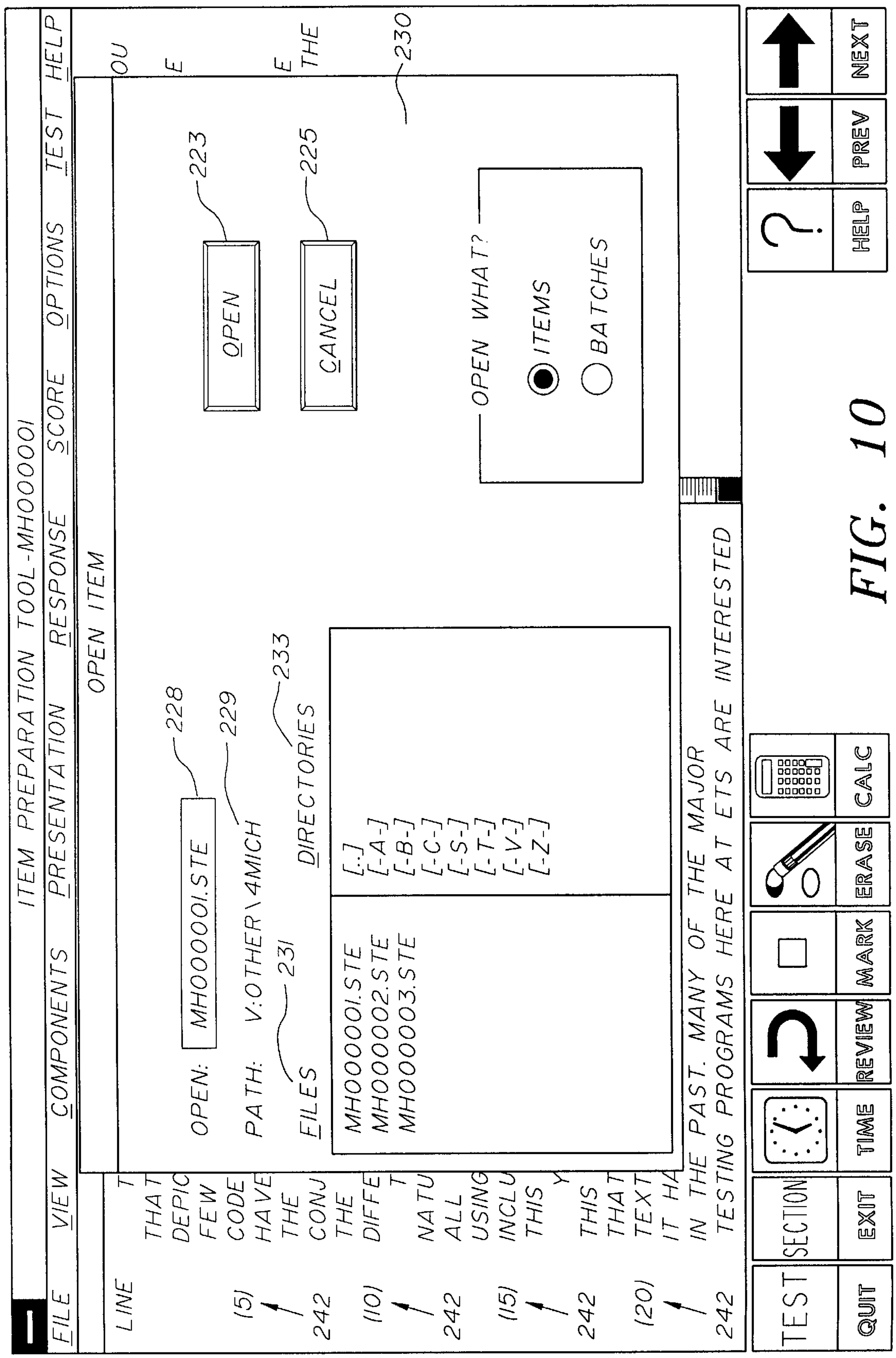
FIG. 10 shows an example of a dialog box presented by the IPT (Item Preparation Tool).

FIG. 10 shows a dialog box 230 generated by the Item Preparation Tool when a user selects by clicking the menu option FILE/Open. The FILE menu option then lists several other menu options including an "Open" option. The user then selects "Open" and the dialog box 230 as shown in FIG. 9 is opened and prompts for the opening of a particular item.

"Open:" 228 shows which item is selected to be opened. "Path:" 229 shows where on the hard drive these items are stored. "Files" 231 provide a selectable list of all the available items in that directory. "Directories" 233 provide a selectable list of file directories on the hard drive. The "Open" 223 and "Cancel" 225 buttons may be executed after the appropriate item is selected or to exit the "Open" option.

Figure 11:
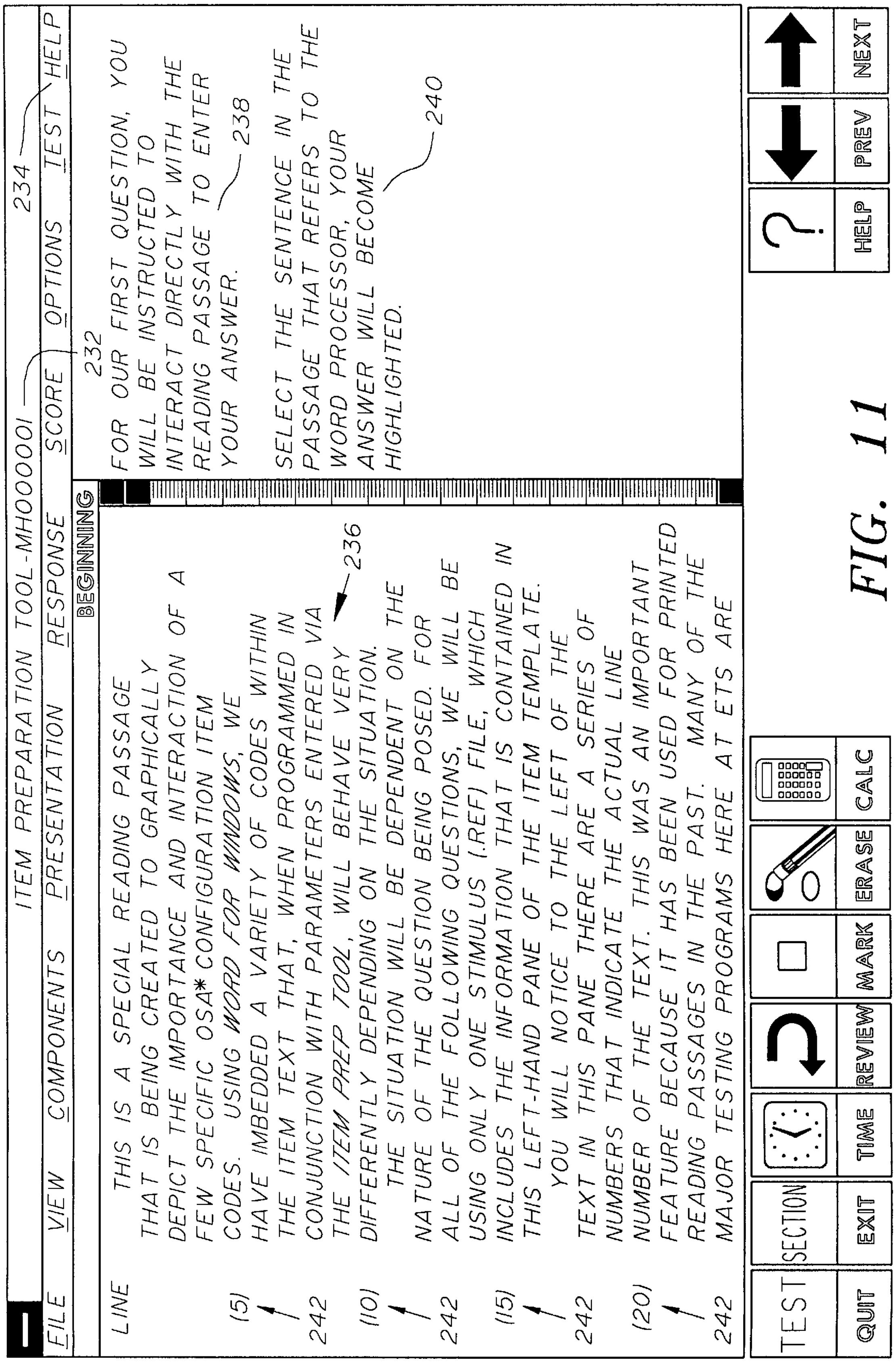
FIG. 11 shows an example of some item components as viewed from the item preparation tool.
Figure 12:
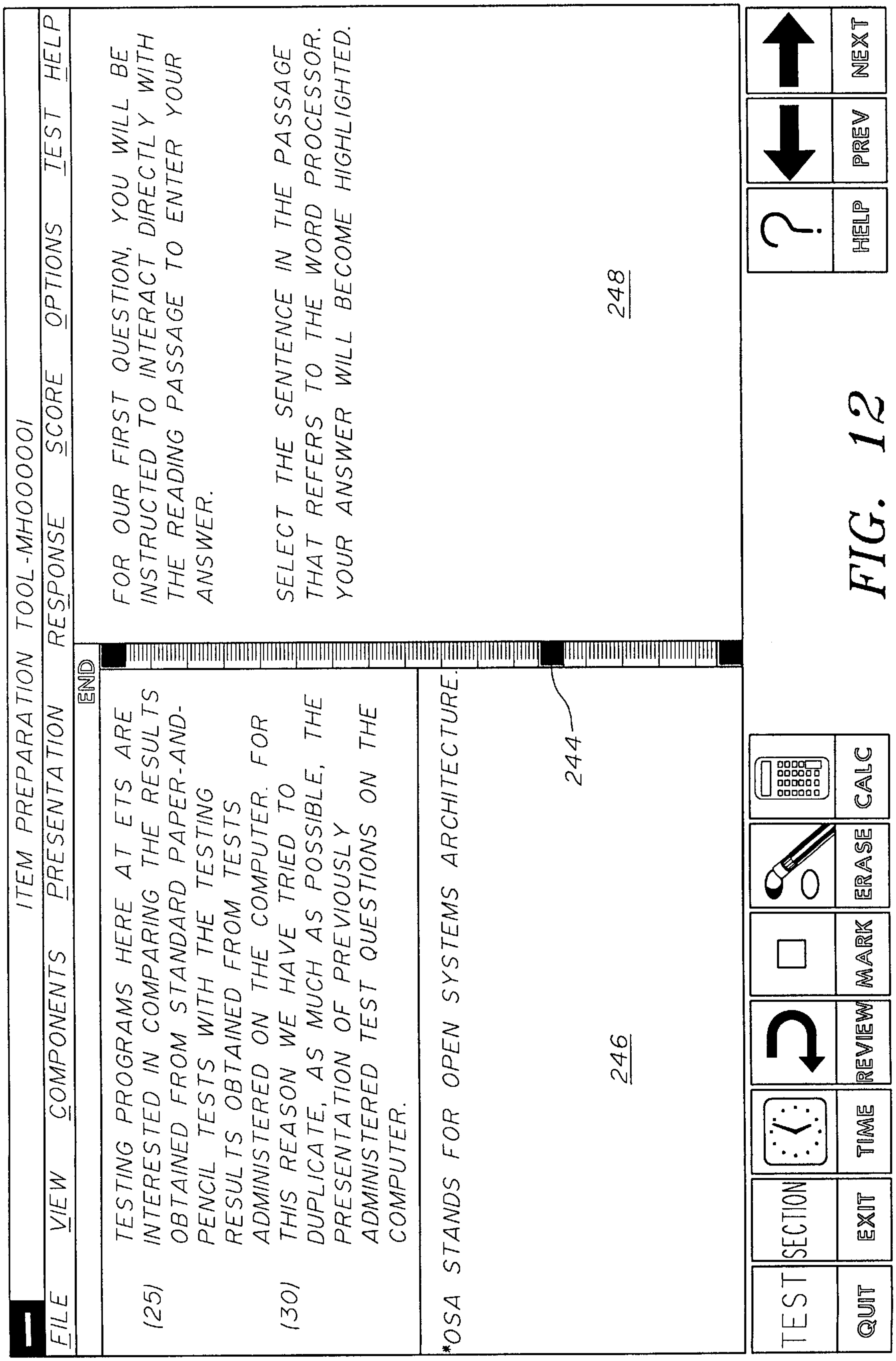
FIG. 12 shows the scrolling capability utilized by the item preparation tool.
Figure 13:
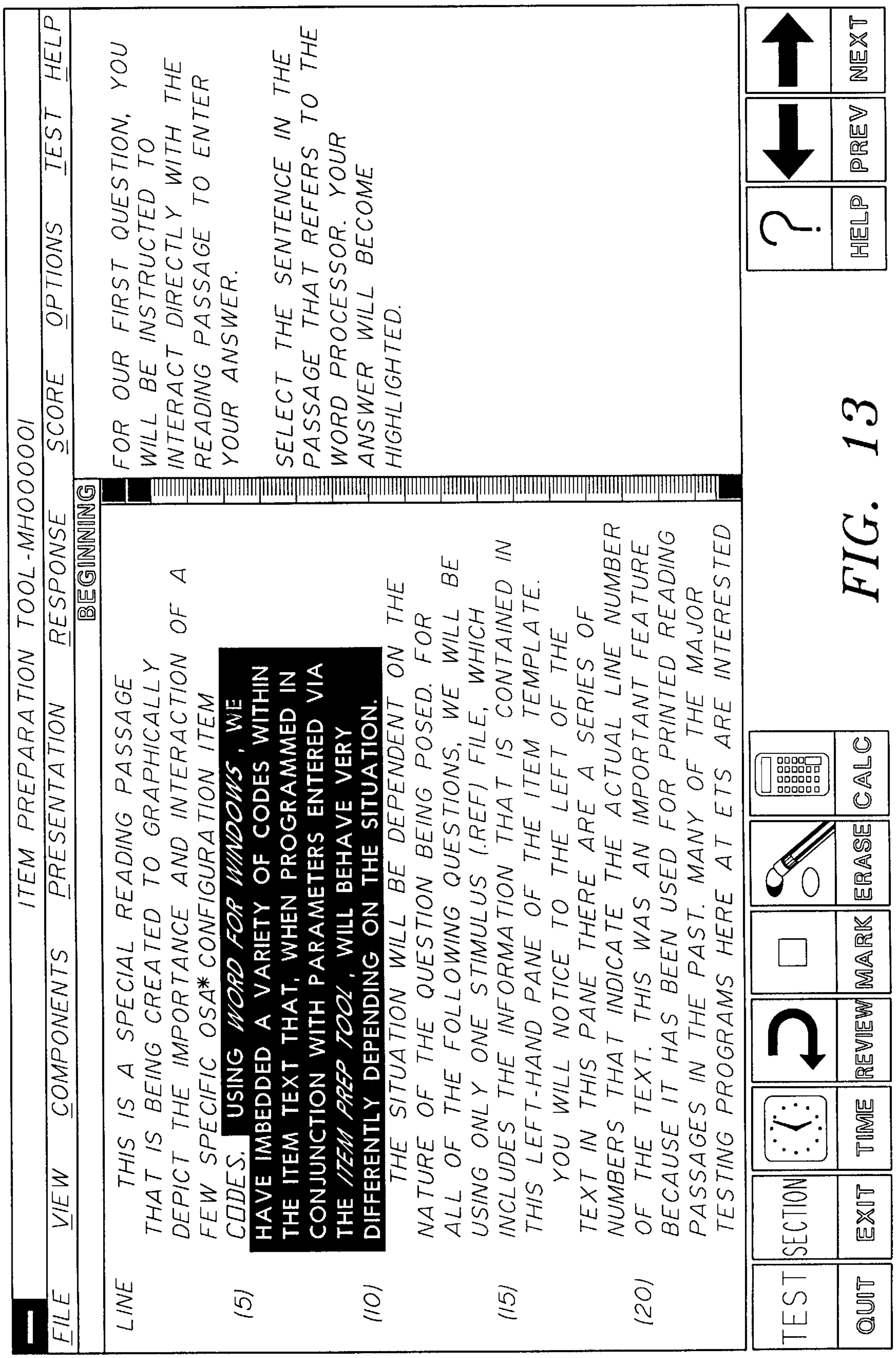
FIG. 13 provides an example of selecting text in a stimulus by reverse video.

Together FIGS. 11 and 12 present a screen-print of a simple reading passage. The top line 232 in FIG. 11 reveals the name of the item identified by the item accession number. The second line 234 is a menu bar from which item preparation functions can be initiated to construct the item identified in line 232. The left-hand box is a pane and contains the reading passage 236. The reading passage 236 is the stimulus and is contained in the reference file for the item, MH000001.REF. The right-hand pane contains the directions 238 and the stem 240 which are stored in separate files, but designed to be displayed in the same pane. The stem 240 in this instance indicates that the answer should be entered by interacting with the reference file or reading passage 236. By inserting specific types of custom codes referred to as interaction codes into the text of the reference file, an examinee can respond by selecting a sentence in the reference file. The sentence will become highlighted on the screen as shown in FIG. 13 after it has been selected. Line reference numbers 242 are found directly to the left of the text of the passage. They are preferably included in graphic files and are not actual text.

A reading passage is often longer than the screen size allows. FIG. 12 shows the scrolling feature of the Item Preparation tool that allows the user to move through the passage by using the scroll mechanism 244 lying between the panes 246 and 248. The use and implementation of a scrolling feature are well known.

Figure 14:
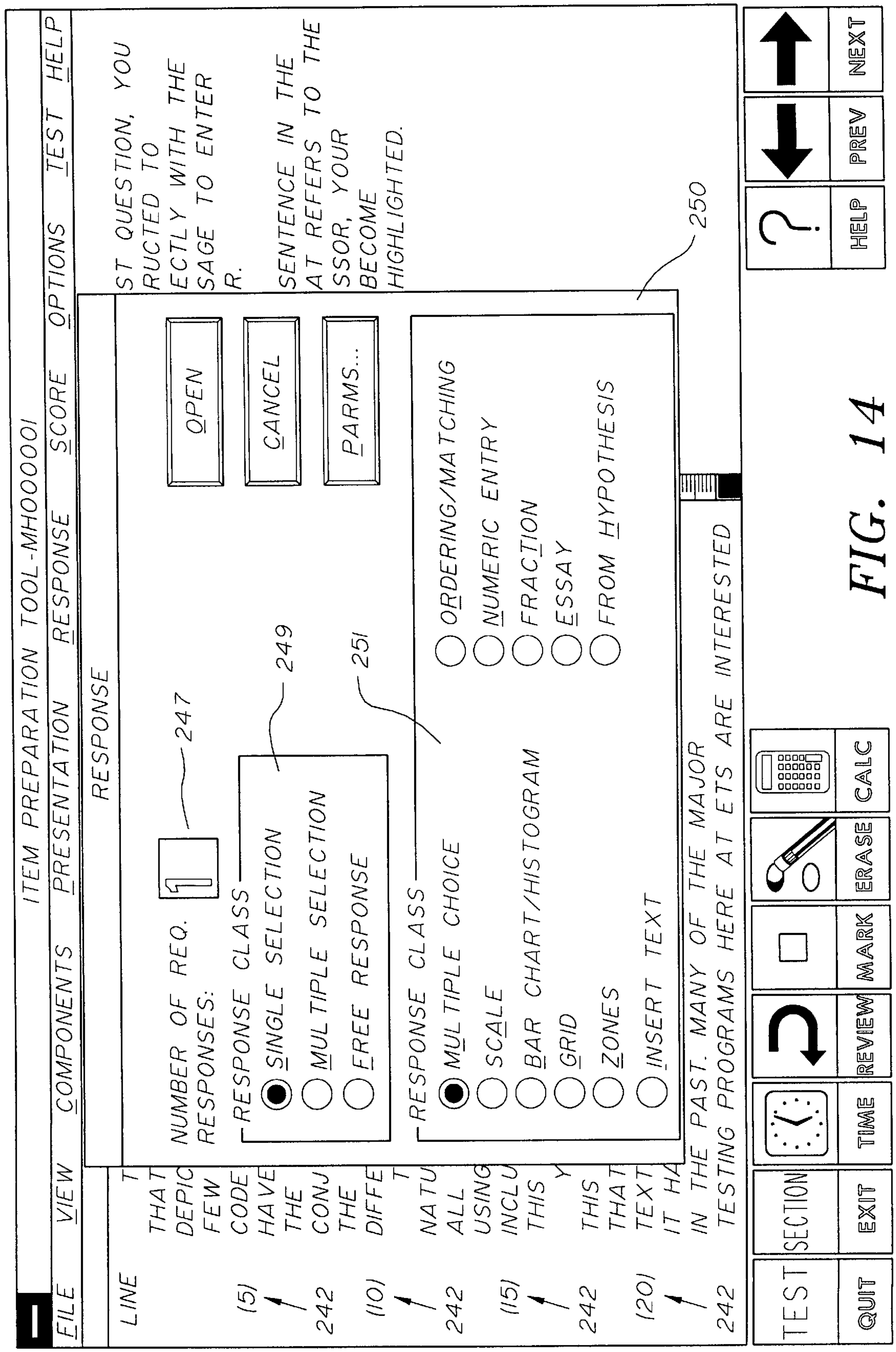
FIG. 14 shows dialog boxes presented by the IPT which prompt for response parameters.

FIG. 14 shows a dialog box 250 that prompts for response parameters after invoking the RESPONSE menu option. These parameters set up the nature and functions of the response area. The "Number of Req. Responses;" field 247 indicates how many responses are necessary in order to answer the item. The "Response Class" box 249 indicates the general category of the response, i.e., single choice, multiple choice, or free response. The "Response Type" box 251 indicates the specific form of the response. A description of the different response types is provided in Section III below.

Figure 15:
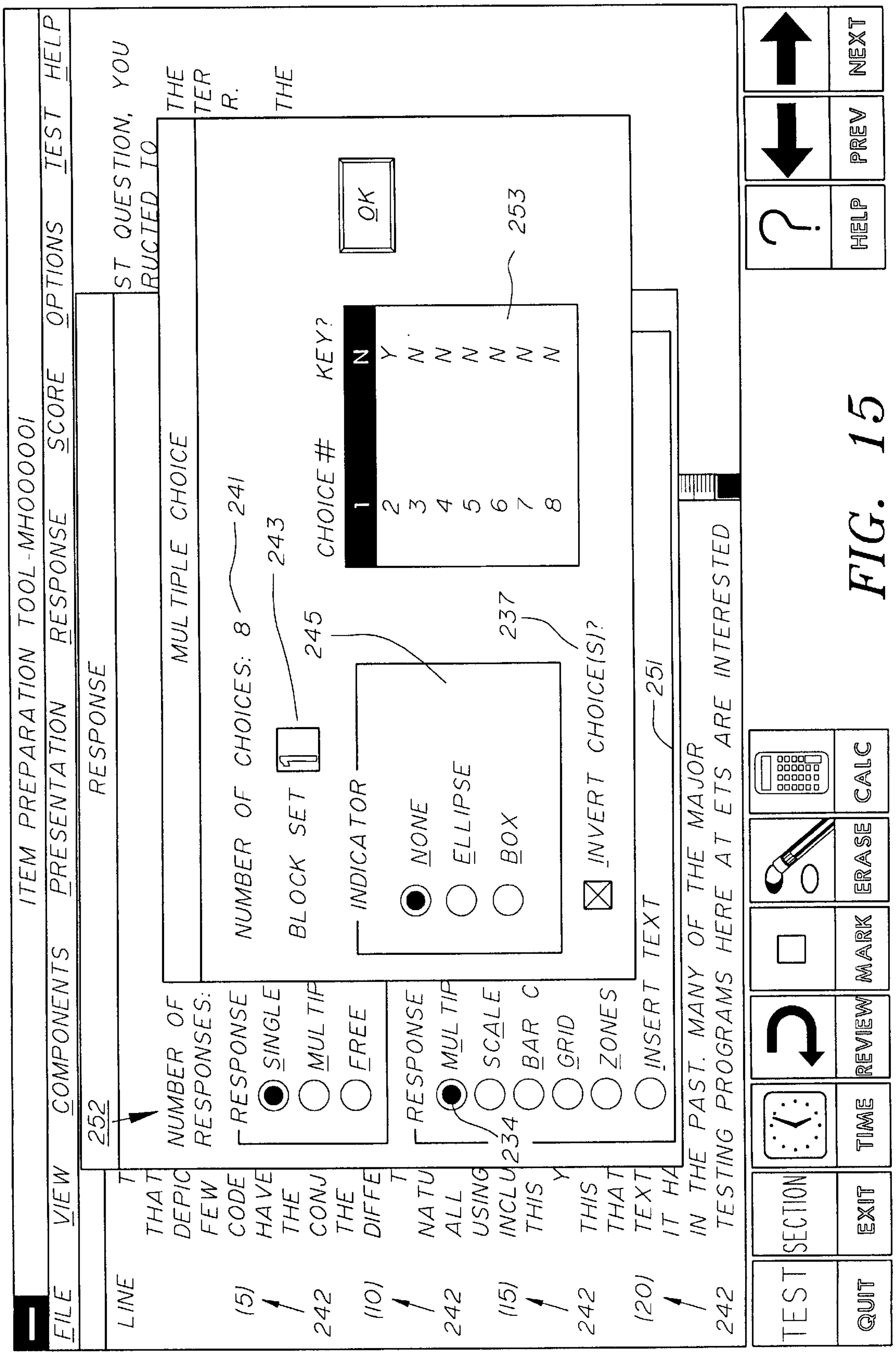
FIG. 15 shows a dialog box presented by the IPT which prompts for key information.

Further demarcation of the item is accomplished by entering information in a series of nested dialog boxes as shown in FIG. 15. For instance, if "Multiple Choice" box 239 is selected from the "Response Type" box 251, then a "Multiple Choice" box 252 is opened. The "Number of Choices" 241 may be computed by the Item Preparation Tool. For example, in FIG. 15, the "Number of Choices" 241 is set at eight. This number is based upon the amount of specific interaction codes included in the response area. This number is important in error checking for codes because it should reflect the exact number of available responses available, i.e., whether the number is less than the intended number of responses, The Item Preparation Tool may indicate an error in coding. "Block Set" 243 specifies which set of interaction codes are to be read by the software for a specific item. "Indicator" 245 prompts for different response designs. Examples of indicators are also described in Section III below. "Invert Choices" 237 indicates whether the response option should be highlighted by reverse video when selected. The component 253 permits test production staff to enter which of the options is the correct choice. It should be understood that different response types require different parameters than the example shown in FIGS. 12 and 13. The data entered by test production staff in the dialog boxes shown in FIGS. 14 and 15 are stored in the item control file.

Figure 16:
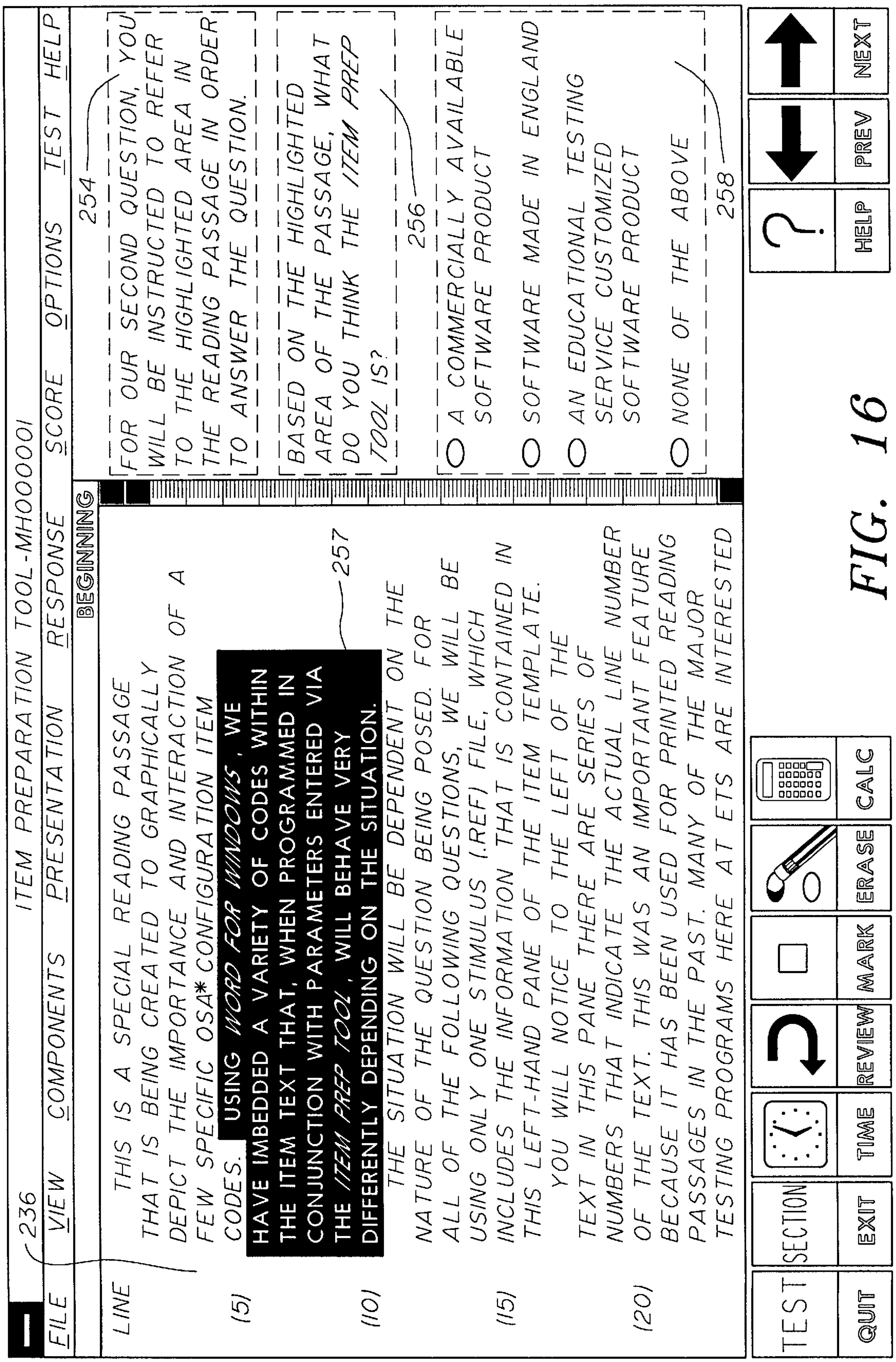
FIG. 16 shows an example of an item having a stem referencing a demarcated portion of a stimulus.
Figure 17:
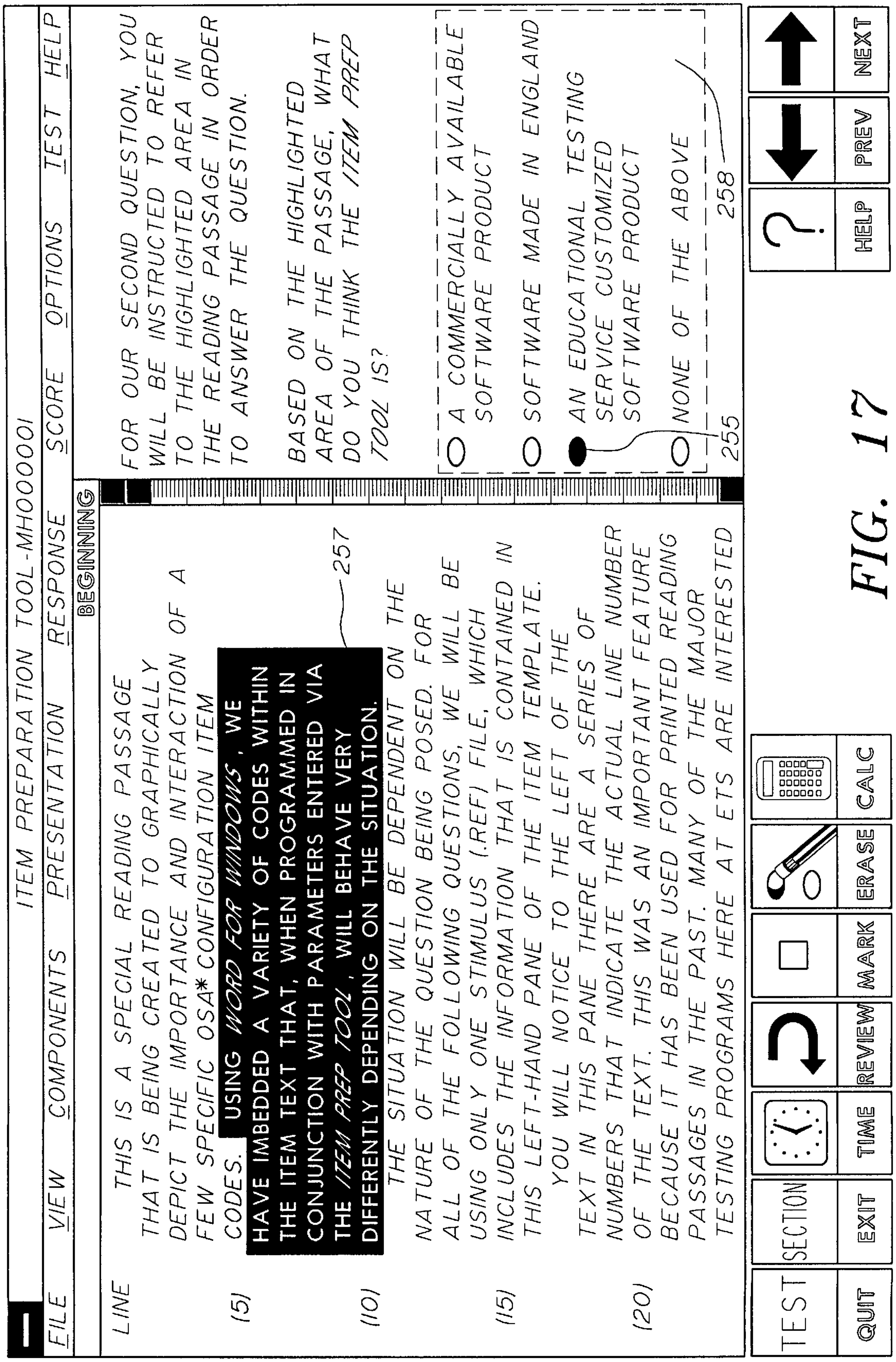
FIG. 17 depicts an appropriate response to the item presented and shown in FIG. 16.

A different item is shown in FIG. 16, although the same reading passage 236 in the reference file is used. In this instance, part of the reading passage 236 is highlighted in reverse video 257 when the item is presented. Note again the directions 254, stem 256, and response 258 are included in one pane. However, different response parameters have been set for this item, i.e., there are four options instead of eight. Interaction is set to the response file and not to the reference file, ellipses are included rather than invert choices. FIG. 17 shows the selection of a response option 255 from the responses 258.

Figure 18:
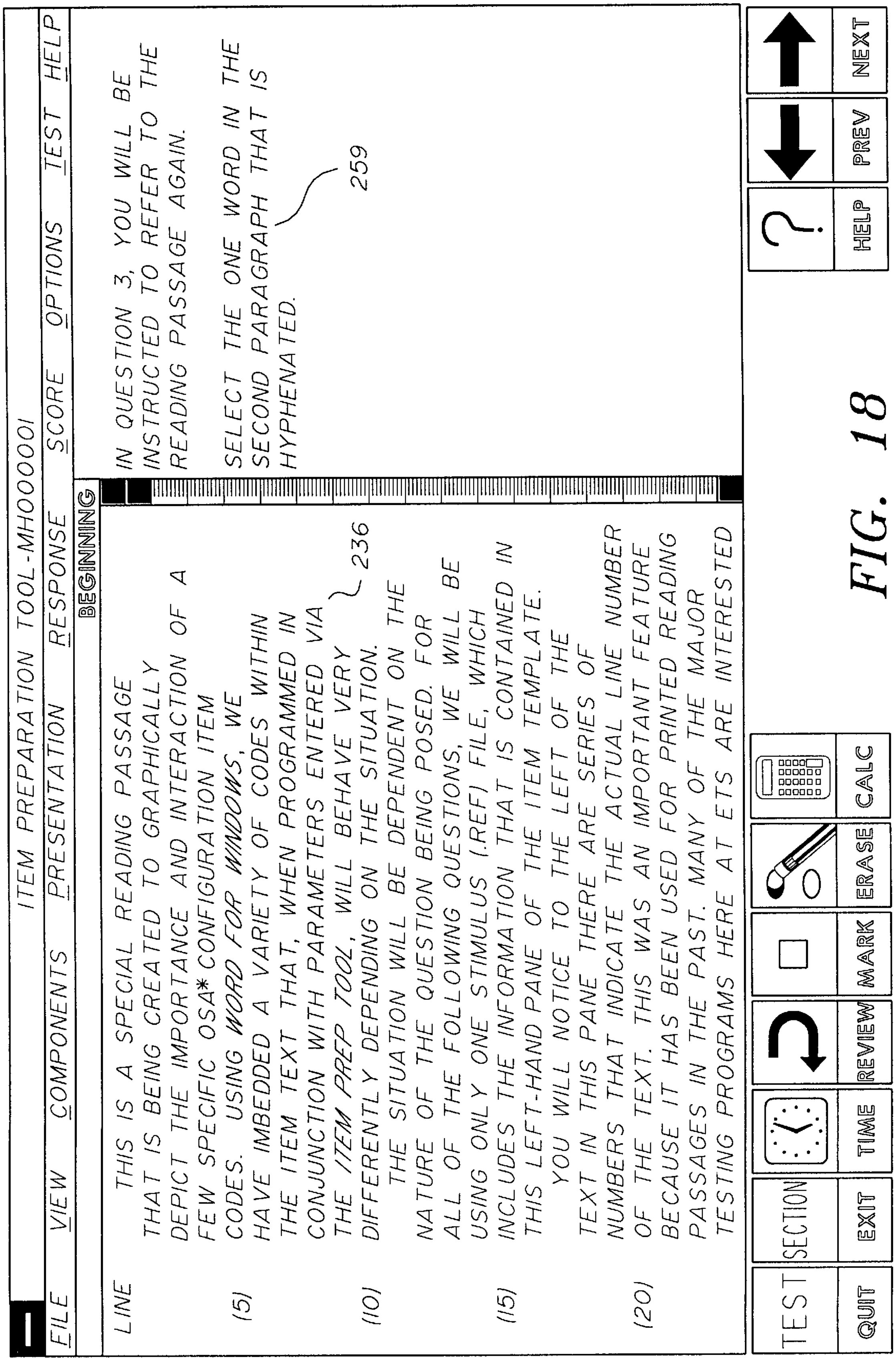
FIG. 18 shows a second example of an item having a stem referencing the item's stimulus.
Figure 19:
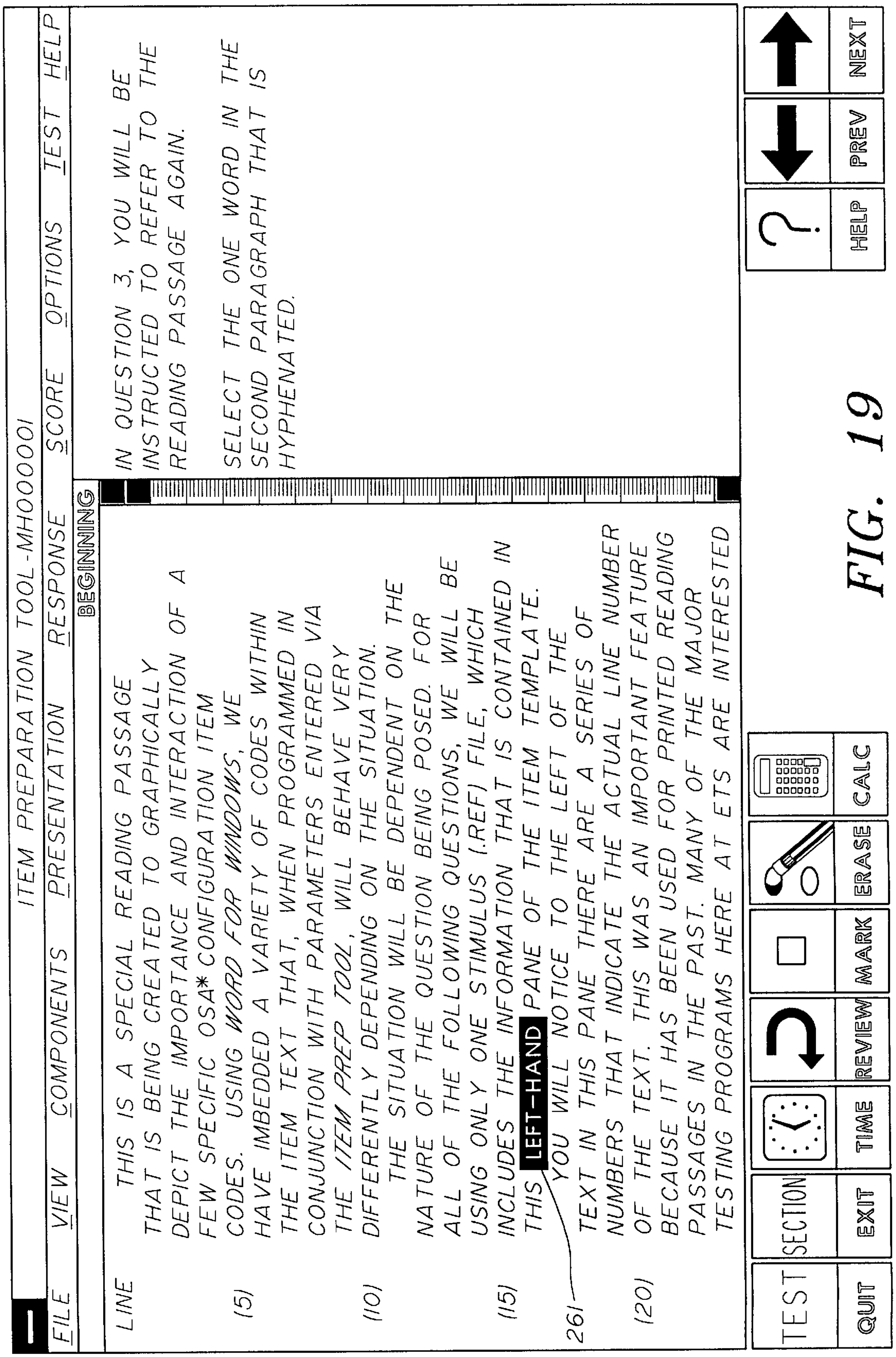
FIG. 19 depicts an appropriate response to the item presented and shown in FIG. 18.

FIG. 18 shows yet a third item which refers to the same reading passage 236. The stem 259 asks for a word to be selected in the second paragraph. Although the item parameter dialogue box is not shown, item parameters are set up in a third way so that there are 42 options (as many words as in the second paragraph). Interaction has been switched back to the reading passage 236 or reference file, and the choices selected by an examinee will be inverted. FIG. 19 shows the correct answer at 261 after being selected.

e. Word Processing

In a preferred embodiment, the word processor is "WORD FOR WINDOWS," which is available from Microsoft Corporation. It is used by test production staff to edit component files produced by the IEG or to create completely new items. Component files are edited for two purposes. The first purpose is to effect the appearance of the item text by adding fonts, point size, bolding, etc. The second purpose is to insert "Custom Codes" before and after sections of text.

Component files are initially stored in ASCII by the IEG as described above, but they are converted to Microsoft's RTF format when they are saved in "WORD FOR WINDOWS." Even though "WORD FOR WINDOWS" does the conversions, the test production staff is responsible for selecting the correct format. After editing, text is written in RTF format back to the component file from which it came. Thus, a component file may contain either ASCII or RTF formatted data, depending upon whether the file has been edited by "WORD FOR WINDOWS."

Now turning to the second reason for editing a component file, namely to add Custom Codes, literal strings are inserted into the text and thus allow computerized features to be added to the test. In a preferred embodiment, Custom Codes always start with a "¦."

Custom Codes belong to one of three classes: 1) codes that stand alone, 2) codes followed by a parameter, and 3) codes followed by additional data. "Stand alone" codes appear in the text by themselves. Their very presence is all the information conveyed by the code. "Parameterized" codes are distinguished from other classes of codes in that they are followed by a parameter enclosed in square brackets ("[" and "]"). The parameter immediately follows the code without any intervening characters or white space. "Data" codes are followed by other data. The data is arbitrary text. To prevent conflicts with parameterized codes, a single white space character is used to separate the code from the user-supplied data.

Table 4 below summarizes some examples of Custom Codes and their use. Optional elements of parameters are enclosed in curly braces ("{" and "}"). These codes are used to include a graphic in the component. The parameter "nn" is used to form part of the graphic file extension. Graphic files are named accession.Gnn, where accession is the same as the base name of the file in which the graphic code appears. Thus, for example, if the graphic appears in a stimulus component whose name is TD-00081.REF, the graphic file name may be TD00081.Gnn.

TABLE 4

CUSTOM CODES

| Long/Short Name | Use |
|---|---|
| ¦ACCESSION<br>¦ACC[nnnnnnnn] | Provides an accession number for the item. |
| ¦BLOCKSTART<br>¦BKS | Marks the beginning of the item's distractor for a multiple choice item. |
| ¦BLOCKEND<br>¦BKE | Marks the end of the distractor. |
| ¦COMMENTS<br>¦COM . . . | Adds a comment to the component to provide a way for TPS to annotate a component. |
| ¦END | This Code indicates the end of the accession component. |
| ¦GRAPHICRIGHT[nn]<br>¦GRR [nn] | This code indicates the graphic is to appear on the right side of the component text. Text will flow around the graphic. The graphic base line will be aligned to the text base line. |
| ¦GRAPHICLEFT[nn]<br>¦GRL[nn] | This code indicates the graphic is to appear on the left side of the component text. Text will flow around the graphic. The graphic base line will be aligned to the text base line. |
| ¦GRAPHICUP[nn]<br>¦GRU[nn] | This code indicates that the graphic is to appear in line with graphic base line aligned to the text base line. The graphic is positioned horizontally as though it were a giant character. |
| ¦GRAPHICDOWN[nn]<br>¦GRD[nn] | This code indicates that the graphic is to appear. in line with the graphic top aligned to the text base line. The graphic is positioned horizontally as though it were a giant character. |
| ¦GRAPHICPLACED[nn{-}h]<br>¦GRP[nn{0}h] | This code indicates that the graphic is to appear in line with the graphic base line displaced above or below the text base line according to the parameter "h," which specifies the displacement in pixels. |
| \HORZLINE<br>¦HOR | This code draws a horizontal line across the component window. The code should appear on a line by itself- -with hard returns preceding and following it. Otherwise, the line will appear to cut through the text that follows. |
| ¦PLACERESPONSE<br>¦PRS | This code marks the position within a component, generally the response component, to place the response object. |

Figure 20:
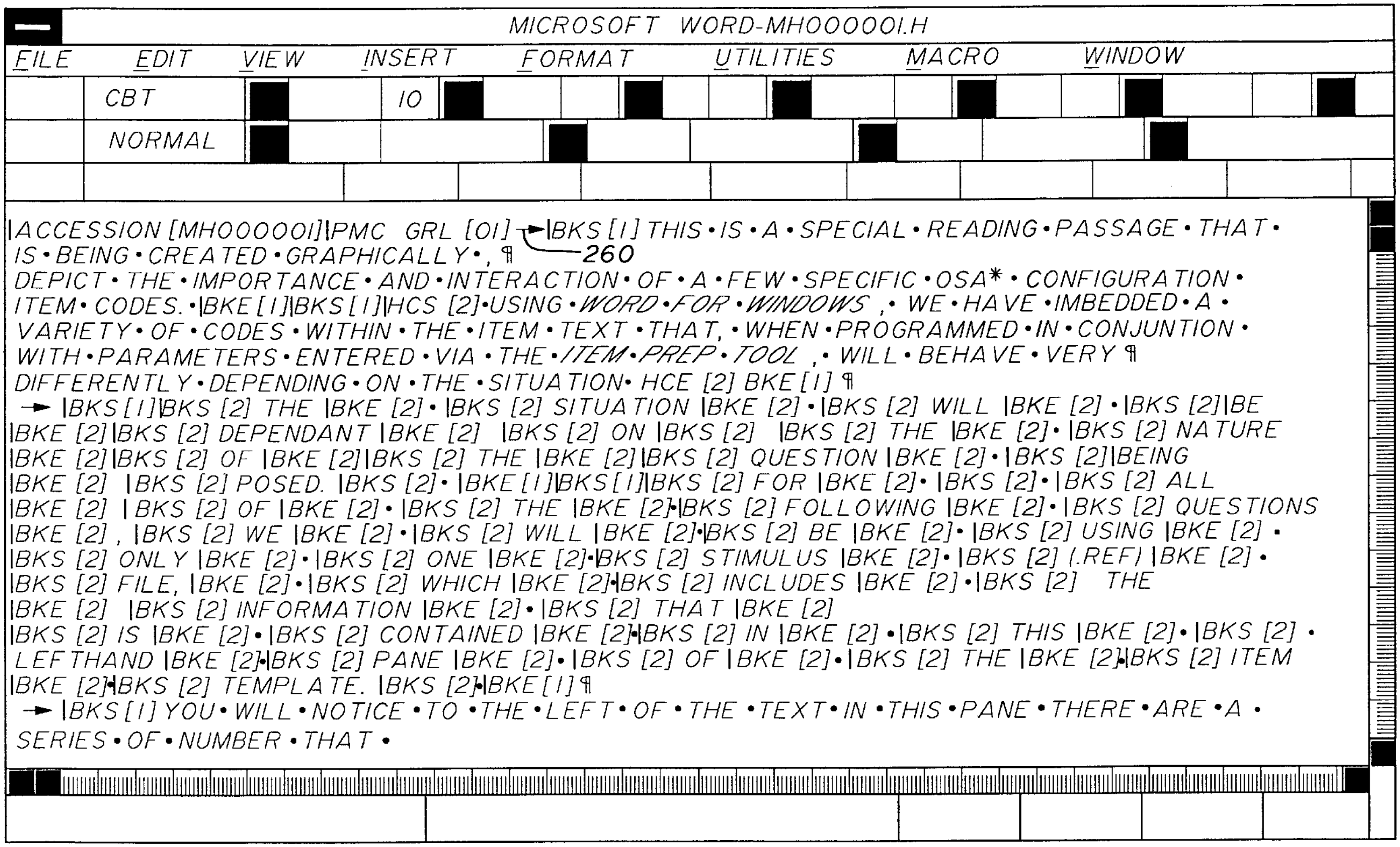
FIGS. 20 and 21 show an example of a reference file replete with custom and interaction codes according to the present invention.

FIG. 20 is an example of the actual reference file in "WORD FOR WINDOWS" where it is manipulated and replete with formatting and interaction codes. The control of the reference file shown in FIG. 20 is based on the sample items shown in FIGS. 10 through 17. The name of the file is included in the first line of text. In this instance, "¦ACCESSION[MH000001]" is the file name. The next custom code on the first line is an interaction code, "¦PMC" which is a response code and indicates a "Place Multiple Choice" to be included in the passage. Since this code is not item specific, it can be used once and be referenced by any number of items (in this instance, by items 1 and 3). The next element, "¦GRL[01]," is a code that calls in a graphical image which exists in a separate file. This code indicates that at this point in the file, a graphic should be placed to the left margin before any more text is included. The graphic in this instance is the line reference numbers 5 through 20. The graphical numbers 25 through 30 lay within a separate graphical file, included after the word "us" in the third paragraph of the text of the passage.

Figure 21:
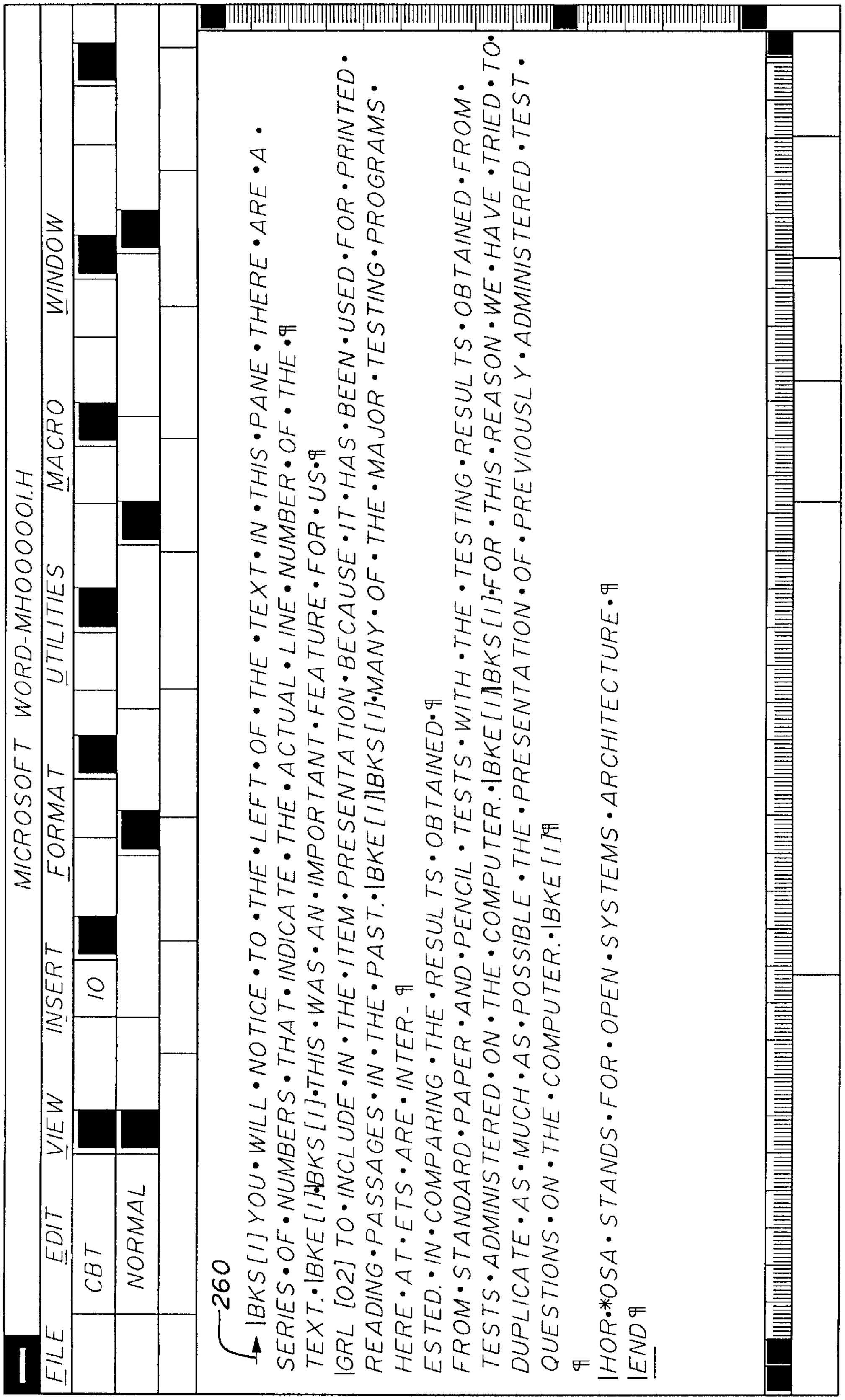

One can find the "¦GRL[02]" code in FIG. 21 in the fourth line of text. The small arrow 260 after the graphic code is a "WORD FOR WINDOWS" formatting command. It is a tab marker which specifies the paragraph indent.

The next interaction code, "¦BKS[1]," is a "Block Start" code; it will be followed by a "¦BKE[1]," "Block End" code. These codes set the boundary around a specified option for a specific item. At this point, it is helpful to refer back to FIG. 15 and note that a "Block Set" number is identified for each item. Where there is more than one item referring to the same area of text, separate Block codes may be included. In the passage there are also block codes "¦BKS[2]" and "¦BKE[2]" indicating option boundaries for selecting a response in the third example item as shown in FIG. 18 that uses the same area of text. Thus, only those portions of the reading passage 236 which are "blocked" by interaction codes which are related to a specified item will be active when that item is presented.

In the fourth and seventh lines of text in FIG. 18 there is a ¦HCS[2]-¦HCE[2] code set, indicating a highlight and center. This interaction code highlights the demarcated area of the reading passage 236 and centers it when the item is presented by the item preparation tool, as shown in FIG. 13.

Finally, in FIG. 21, there is a "¦HOR" code that produces a horizontal line at this point in the text when read by the item preparation tool and an "¦SEND" code, indicating the end of the field of custom codes.

f. Translation

XLATE is one of the item preparation programs listed in Table 1 and compiles RTF format documents created by "WORD" into a binary equivalent. Binary conversion speeds up the execution of the text display modules embedded in the Item Preparation Tool and also results in a storage savings (mostly memory savings).

XLATE is a system program which is generally not executed by test production staff from a command line, menu pick, icon, etc. The Item Preparation Tool runs XLATE whenever it is determined that a component file has been changed within "WORD FOR WINDOWS." This is detected by comparing the date/time stamp of the .STE, .RSP, and .DIR files of the item currently displayed by Item Preparation Tool with that of their binary equivalent the .STB, .RSB, and DIB files. The binary file name is created from the component file name extension by changing the last letter of the extension to "B." For example, if the stem component's name is accession.STE, the binary file outputted by XLATE will be accession.STB. If the binary file is older, its source equivalent must have been edited while the user was in the "WORD FOR WINDOWS". Thus, The Item Preparation Tool runs XLATE to update the binary file by translating the source code.

During conversion, errors are preferably written to an error log file in ASCII format. The error file name is created from the template XLATE???.ERR by substituting the component file extension for the question marks. Thus, for example, if the component file is named accession.STE, the error file name will be XLATESTE.ERR.

g. Data Interfaces and Flow between Test Development and Test Production

Figure 22:
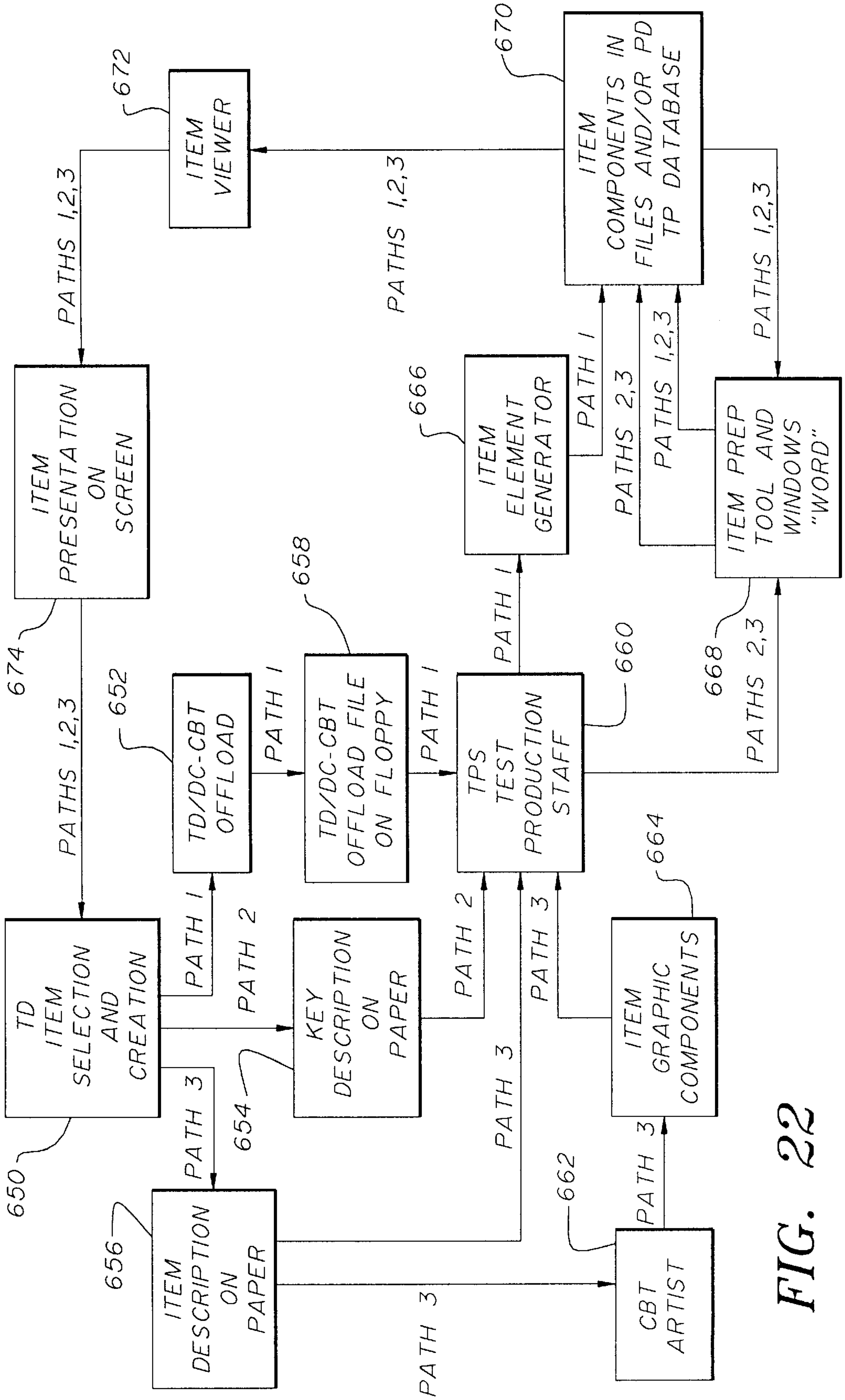
FIG. 22 shows the flow of items and keys from test development to test production services.

FIG. 22 presents a flow diagram of items and keys between TD 650 and TPS 660. As previously stated in Section II.B., the test developers create and select items for a particular test preferably using the "TD/DC" system. However, test items may be created and selected by any test document creation system or prepared by hand as long as TPS 660 is provided with the information described in section II.B.2.a. related to item offload. Three methods of providing the information to TPS 660 are shown in FIG. 22.

The three methods are enumerated in FIG. 22, by the numerals 1, 2 and 3 located along the path lines. The use of the "TD/DC" System 652 is enumerated as path 1. If the key descriptions are prepared by a method other than "TD/DC" 652, they may be written on paper and provided to TPS 660 via path 2. Additionally, the item text, presentation information and classification information which are collectively referred to as the item description, may also be determined by test developers who do not use the "TD/DC" system, but prepare this information on paper as shown by path 3.

Test developers create and select the items to be included in a test as shown at 650. If the test developers use the "TD/DC" system, they execute item Offload to produce a diskette having the files containing the item description and respective keys as shown at 652 and 658. The diskette is then sent to TPS as shown at 660. If the files containing the key information are not generated by the test developers using the "TD/DC" system, but rather by another method, the test developers may provide a written key description to TPS 660 as shown at 654. Similarly, test developers may prepare a written form of the item description shown at 656 and provide the written description to TPS at 660. If graphics are included in the written description at 656, a CBT artist will prepare computerized graphics files at 662 and 664. These item graphics component files are also provided to TPS as shown at 660.

If the item and key description are provided to TPS 660 via diskette created during item offload, TPS invokes the item element generator at 666. The component files are separated as described above and filed in the an Item Preparation (IP) database at 670. If the item description or key description is presented to TPS 660 on paper, TPS must manually enter the information using the IPT and word processing at 668. Then, the component files created by TPS 660 are stored in the IP database 670. Once all of the necessary component files are stored in the IP database 670, TPS uses the IPT (Item Preparation Tool) and word processing to prepare the computerized version of each item at 668. Component files may be replaced in the IP database after being edited as shown at 670 and further processed at 668 using IPT or word processing.

When TPS is satisfied with the computerized version of the item, the test developers may view the items as they will be presented to an examinee as shown at 672 and 674 using the IVT. If the test developers desire changes to the items as presented, they can provide revision information to TPS Staff via paths 2 or 3 and the whole cycle may be repeated until items are completed.

3. Test Preparation a. Overview

Figure 23A:
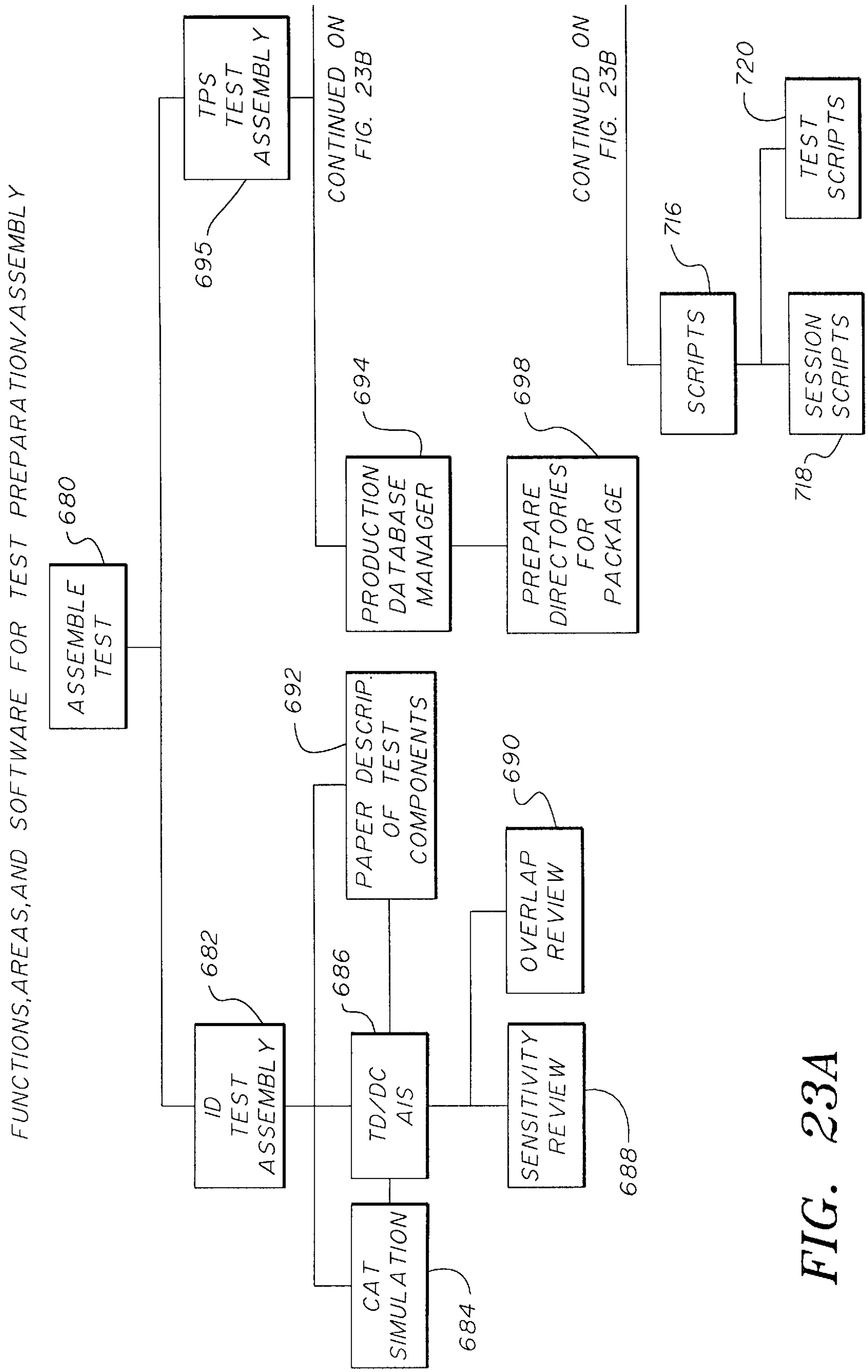
FIG. 23 shows a functional block diagram of the test preparation process according to the present invention.
Figure 23B:
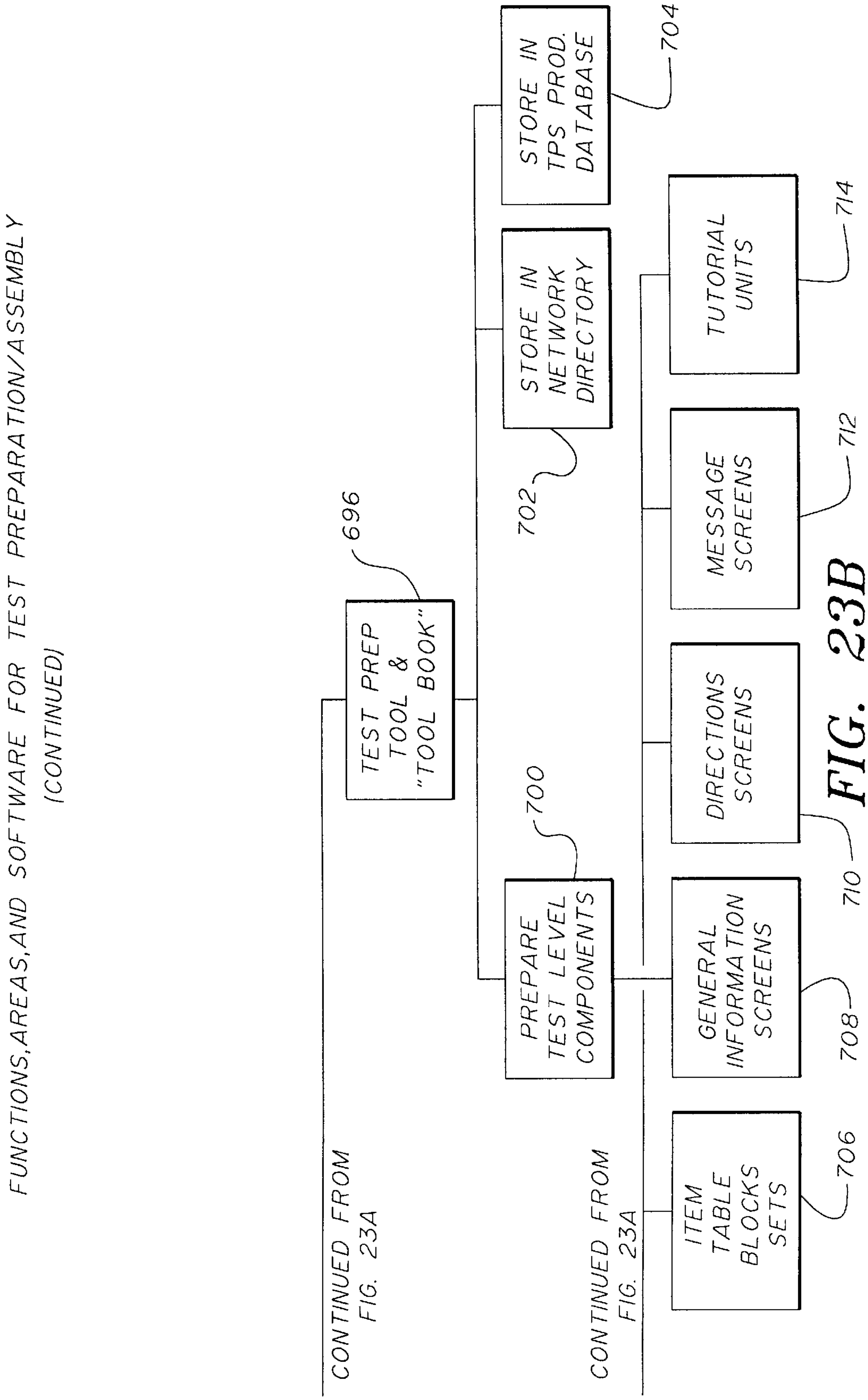

FIG. 23 shows the functions performed by TD and TPS and the software which is used to perform these functions for preparing a computerized test. Test developers assemble the test as shown at 682. As shown at 686, item selection is preferably automated (AIS) using the "TD/DC" system or an equivalent test document creation system. Using "TD/DC", test developers enter the test specifications into the "TD/DC" system. Based on these specifications, "TD/DC" searches its central database for items which satisfy the test specification, e.g., 50 math questions, 25 of which are algebra problems and 25 which are geometry problems. Then, the test developers review the items selected by "TD/DC" for sensitivity and overlap constraints described in the background section. If the test developer decides that the sensitivity or overlap constraints are not satisfied by the current selection of items, certain items may be designated to be replaced by another item from the database. In addition, test developers provide a test description specifying the directions, messages, timing of sections, number of sections of the test, etc. as shown at 692. If a computer adaptive test (CAT) is to be run, test developers may run a computer adaptive test simulation at 684 which are known to skilled test developers.

Using the Test Preparation Tool (TPT) and TOOLBOOK 696, TPS prepares the test level components as shown at 700. TOOLBOOK is commercially available from Asymetrix Corporation. The test level components include scripts 716, item table block sets 706, general information screens 708, direction screens 710, message screens 712, and tutorial units 714. Each of the test components will be described in detail below.

As the components are prepared, the TPT stores them in a TPS network directory 702. Then, the components are entered into the TPS Production database 704. The components stored in the TPS Production database 704 will be retrieved during test packaging which is described below.

A script consists of a series of files and further specifies the option settings and configuration data which the Test Delivery Application (TDA) needs for operation. Option settings are specified for the Test Delivery System to determine whether a certain feature is enabled for the test.

Most option settings are simple yes/no declarations, but some offer a limited set of choices (e.g., mouse speed: slow, medium, fast). Configuration data is highly variable information such as the section name to be displayed in the Title Line during a test session or the list of items to be displayed.

b. Scripts

Figure 24:
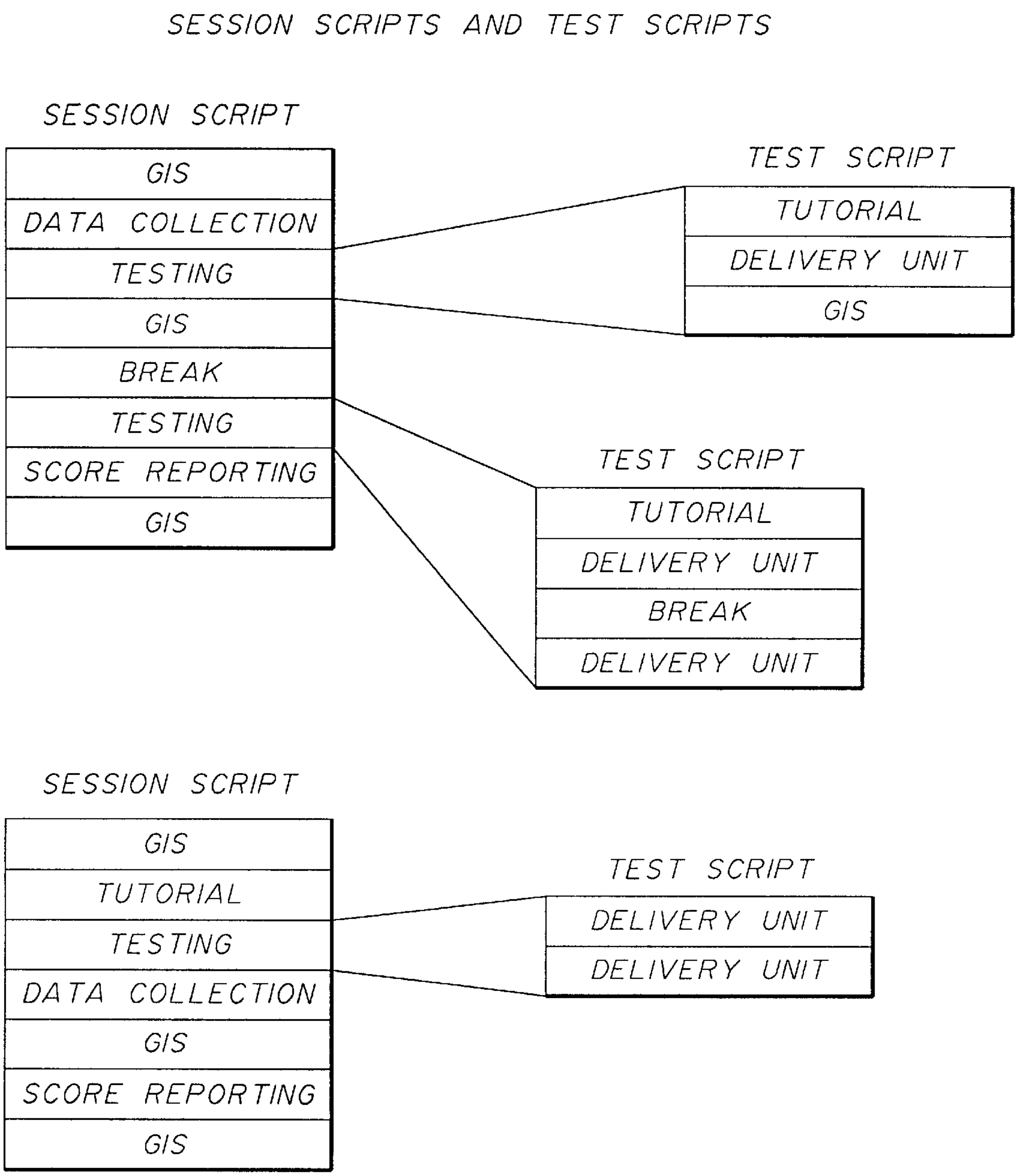
FIG. 24 shows the relationship between the session script, test scripts, and units.

During test preparation, scripts 716 are prepared and combined with the items prepared during item preparation. Scripts control the sequence of events during a testing session. Two types of scripts 716 are preferably used: the session script 718 and one or more test scripts 720. The session script 718 controls the order in which units within the testing session are presented. Units provide specific services to the examinee, such as delivering a test or presenting a score report. Just as the session script controls the session, the test script controls what is presented to the examinee during the testing unit. Each testing unit may include one or more delivery units, which are separately timed and scored subdivisions of a test. The system can dynamically select, or spiral, scripts and other test components so that examinees are given what appear to be different tests. FIG. 24 shows the relationship among session scripts 718, test scripts 720, and units.

Some examples of units supported by the system are described in Table 5 below:

TABLE 5

| Unit | Description |
|---|---|
| General Information Screen (GIS) Unit | The general information screen unit allows the incorporation of a single screen of information in the session. The screen is used to display information that the examinee does not interact with, such as copyright notices, rules of conduct, or pauses. Multiple GIS units can occur within a session. |
| Tutorial Unit | The tutorial unit presents test familiarization materials to the examinee. Multiple tutorial units can occur within a session. |
| Break Unit | The break unit is used to implement a scheduled break within a session. Multiple break units can occur within the session. |
| Testing Unit | The testing unit presents a test. It is controlled by a test script. any of the other units, except a scoring & reporting unit or another testing unit, can be embedded within the test script. This permits a testing program to organize a test as several sections, with tutorials, breaks, and general information screens between them. In addition, a special type of unit, a delivery unit, can appear only within a test script. The delivery unit is equivalent to a test or section of a test and presents items to examinees. Multiple testing units can occur within a session. |
| Examinee Data Collection Unit | The data collection unit is used to obtain additional information from the examinee, such as demographic or debriefing information. This unit is basically a special type of testing unit which is not scored. Multiple data collection units can occur within a session. |
| Scoring & Reporting Unit | The scoring & reporting unit provides for field scoring of one or more testing units delivered in a session. It must follow all testing units that are to be scored. Only one scoring & reporting unit can be included in a session, although it can be omitted if field scoring is not required. |

Testing programs control the behavior and appearance of their tests through options that are enforced by the Test Delivery Application. Table 6 below indicates the options that are available and the levels at which a testing program can specify each option. The options, which are explained in the text following the table, are selectable at one or more of the following levels:

test package (i.e., all instances of a particular test, such as GRE General), session, testing unit,
delivery unit (section).

TABLE 6

| Program Option | Test Package | Session | Testing Unit | Deliv. Unit |
|---|---|---|---|---|
| Primary Controls | Y | Y | Y | Y |
| Explicit Prompting | Y | Y | Y | Y |
| Must Answer | Y | Y | Y | Y |
| Timing | Y | Y | Y | Y |
| Threshold Interval | Y | Y | Y | Y |
| Last Threshold | Y | Y | Y | Y |
| Disable Time | Y | Y | Y | Y |
| Count During/After Directions | Y | Y | Y | Y |
| Delivery Mode | Y | Y | Y | Y |
| Score Unit | Y | Y | Y | Y |
| Examinee Quit Restart | Y | Y | Y | Y |
| Display Scores | Y | Y | Y | Y |
| Cancel Scores | Y | Y | Y | Y |

At the package level, options that are in effect for the entire package are defined in a Package Profile file. Some examples include the program name, which may appear on the title line of the test. Another option may indicate whether the program permits administrators to restart sessions after an examiner terminates the test. Additionally, options may list the session scripts to deliver the test.

The session script is the second-level component of the testing package. It performs two primary functions: First, it specifies the Session Control Information, which defines the default options that are in effect for the entire examinee testing session. Second, it controls the order in which units within the testing session are presented and the options used to present them. The units that can be presented within a session script are: General information screen units, Tutorial units, Break units, Data collection units, Scoring and reporting units, and Testing units.

The session control information contains the default options in effect for the entire session. Control information can be provided at multiple levels within the testing session. Thus, the control information provided at the session level can be overridden by information that occurs later in the session. The information provided at the session level would generally include the following: Name—the session script name to be used by administrators in selecting a specific session script from Administrative Application menus; Input device—the input device to be used during the session (e.g., mouse or keyboard); Color—the colors to be used during the session; Messages—program-specific messages to override default messages during the session; Demo Script—indicates whether the script presents a demonstration or operational test; Research Indicator—indicates whether the script presents a research pilot test; Special Timing—indicates whether the script is standard or specially timed version.

The GIS unit allows the incorporation of a single screen of information in the session. It may contain, for example, the following information: reference to the actual text and graphics that will be presented on the examinee's screen; the type of dismissal: automatic or manual; the time after which dismissal should occur.

The tutorial unit presents test familiarization materials to the examinee. It may contain, for example, the following information: reference to a tutorial, which is the familiarization information that will be presented on the examinee's screen, e.g., "How to Use a Mouse", "How to-Scroll", "How to Use the Testing Tools", "How to Answer"; information that controls the content of the tutorial—the information varies depending on the tutorial selected. For example, for the "How to Use the Testing Tools" and "How to Answer" tutorials, the specific tools and item types to be covered must be defined. The mouse and scrolling tutorials are generic—no content information is required when those tutorials are selected; an indicator for first occurrence—this indicator applies only to the Testing Tools and How to Answer tutorials. Introductory information is presented during the first occurrence of these tutorials and is omitted if they occur again later in the session.

The break unit is used to implement a scheduled break within a session. It contains the following information: reference to a break procedure, which is the actual text and graphics that will be presented on the examinee's screen during a break, along with the program that controls their presentation. It should be understood that multiple procedures could be supported; the length of the break.

The data collection unit is used to obtain additional information from the examinee, such as demographic or debriefing information. It is preferably implemented as a special instance of the testing unit, in which no scoring is done. Like the testing unit, a data collection unit references a test script, which control as the sequence and options of the unit.

The scoring and reporting unit provides for scoring, and optionally reporting, the results of one or more testing units delivered in a session. If the testing program selects a Display Scores option, it preferably displays all traditional score types including raw, percent correct, converted and composite scores. If testing programs select the Cancel Scores option, the examinee will be given the option of cancelling the scores.

The scoring and reporting unit preferably invokes the Educational Testing Services SKM (Scoring and Key Management) routines to return the following information: the score name for insertion into the score report, such as "Reading" or "Antonyms"; the score type for insertion into the score report, such as "number right," "percentile," or "converted score"; the score value, such as "650" or "passed". It should be understood that any automated scoring system which provides this information can be used or the information may be provided directly by a user.

The information needed to display a score report is preferably identical to that required for a message screen: reference to the actual text and graphics to be presented on the examinee's screen.

The testing unit presents a test, based on the contents of a test script that may have been selected at runtime. The following units can be included within a testing unit: general information screen unit; tutorial unit; break unit; delivery unit, which delivers items to the examinee.

This permits testing programs to interleave general information screens, tutorials, and breaks with sections of a test. The testing unit contains the following information: script selection mode indicates whether dynamic runtime selection is to be used to select the test script; reference to a test script which controls the sequence of events and options used during the testing unit. If dynamic runtime selection is to be used, the reference is to a set of test scripts.

Like the session script, the test script performs two primary functions. First, it specifies the test and delivery unit control information. Test control information defines the options that are in effect for the testing unit. Delivery unit control information defines the options that are in effect for a particular delivery unit within a testing unit. It controls the order in which units are presented within the testing unit and the options used to present them. The rules for presentation of units are the same as those for the session script, except that an additional unit, the delivery unit, can be included within a test script.

At least three delivery modes are preferably supported within one or more testing units: linear, adaptive, and essay. The test script references different components depending on the delivery mode of the test, but in all cases the end result is a reference to a specific item or essay topic to present to the examinee. Multiple delivery units can be used to organize the testing unit into sections, and each delivery unit can present a different mode of test.

The test control information includes the following information, which is in effect for the testing unit: Logical Name—the name used to associate the testing unit with a scoring specification provided by the SKM system or an equivalent thereof; Directions—a reference to the text and/or graphics to be presented as general directions; Sections—the number of sections within the test; create score data—whether scoring data for online scoring is to be created for this testing unit; Message Overrides—any program-specific messages that are to replace the default messages within the testing unit. The test control information can temporarily override the options specified in the session control information.

In addition to the test control information, a test script can also contain delivery unit control information. The delivery unit control information can be specified to change the options in effect for the duration of the section. The following information is preferably included in the delivery unit control information:

- Type Indicator—whether this delivery unit delivers a test or a section; Directions—if the delivery unit is a section, reference to the test and graphics of the section directions; Title Line Test—defines the name that will be used in the title line;
- Mode—the delivery mode of the test or section, e.g., linear, adaptive, or essay;
- Timing—timing options in effect for the test or section, including whether the test is untimed, timed in its entirety, or timed by section, and whether timing begins when directions for the test or section are displayed or when the first screen after the directions is displayed;
- Scoring—whether scoring data for online scoring is to be created for the delivery unit;
- Messages—program-specific messages to be used to replace the defaults during the test or section; Item Information—specifies how the times in the test are organized and where to find them. The contents of the item information varies with the mode of the test being offered. For example, the item information for linear tests is generally a reference to an item-by-item listing of the items to be presented, called an item table. Essay tests may reference an essay procedure and a topic pool if more than one essay topic is provided for selection by the examinee. Whether more than one essay is to be stored or only one is chosen for scoring is also defined. For adaptive tests, reference to an adaptive algorithm and an item pool should be specified.
- Testing Tools—the testing tools available during the test or section. Examples of testing tools are described in detail in Section III(E);
- Explicit Prompting—whether or not explicit prompting is to be used to make sure the examinee supplies exactly the required number of responses;
- Must Answer—whether or not examinees should be allowed to move off an item without providing a response.

Detailed flowcharts and corresponding pseudo code for the TPT application are provided in Appendix B.

4. Test Packaging

After all of the items have been constructed for computer delivery by the test production staff and approved by test developers and the scripts and tutorials have been created, the test production staff packages all of the relevant files together using the Test Packaging Tool (TPAK) and the Score Key Management (SKM) system. In a preferred embodiment, this process requires three steps. First, the test components are combined into a draft test package so that the flow and presentation of the test may be reviewed. After the draft test package has been reviewed, the test components are formed into a blue-line test package. After the blue-line test package undergoes successful quality assurance tests, locks are applied so that data cannot be altered in the approved test packages. The final tests are then distributed to test centers.

Figure 25:
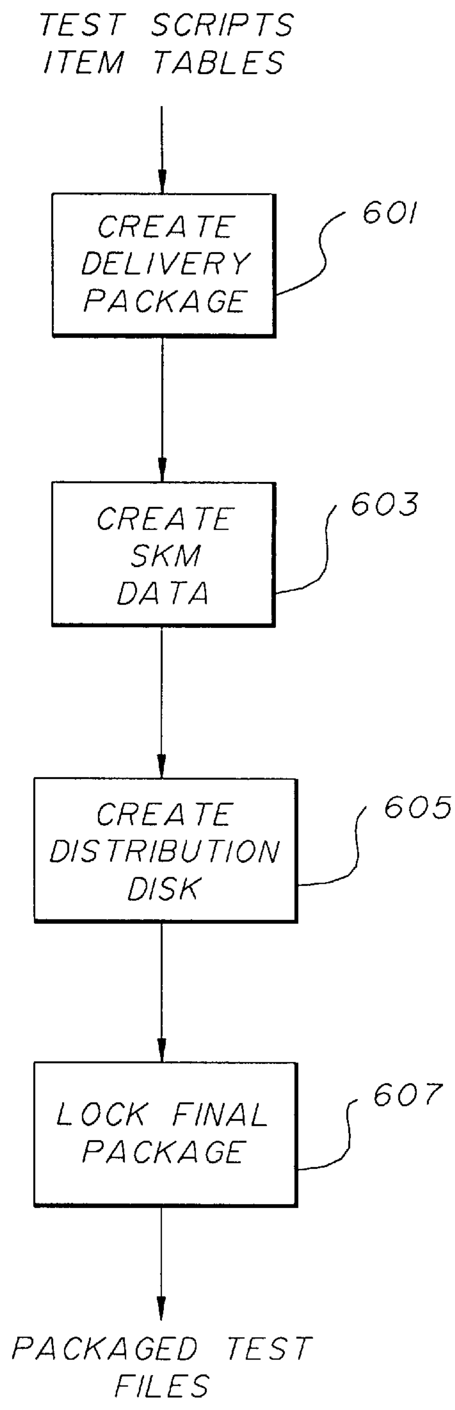
FIG. 25 provides a functional flow diagram of the test packaging process according to the present invention.

A flowchart depicting the steps executed by TPAK and SKM to package a computerized test is shown in FIG. 25. First, TPAK is used to create a delivery package at 601. This step involves creating a presentation database which incorporates the presentation information from the test scripts, creating a presentation parts lists which lists an ID for each component used to create the presentation database and creating other files subsequently used by SKM. An SKM database is created at 603 from the files generated by TPAK. These files preferably contain the item table described above and item scoring information. The SKM database and the presentation database are then combined by TPAK at 605 to produce installation files for distribution. After all quality assurance procedures have been performed and satisfied, TPAK preferably applies a lock on all of the installation files as depicted at 607. After this lock is applied a new test version should be created if changes to the test package are required.

Figure 26A:
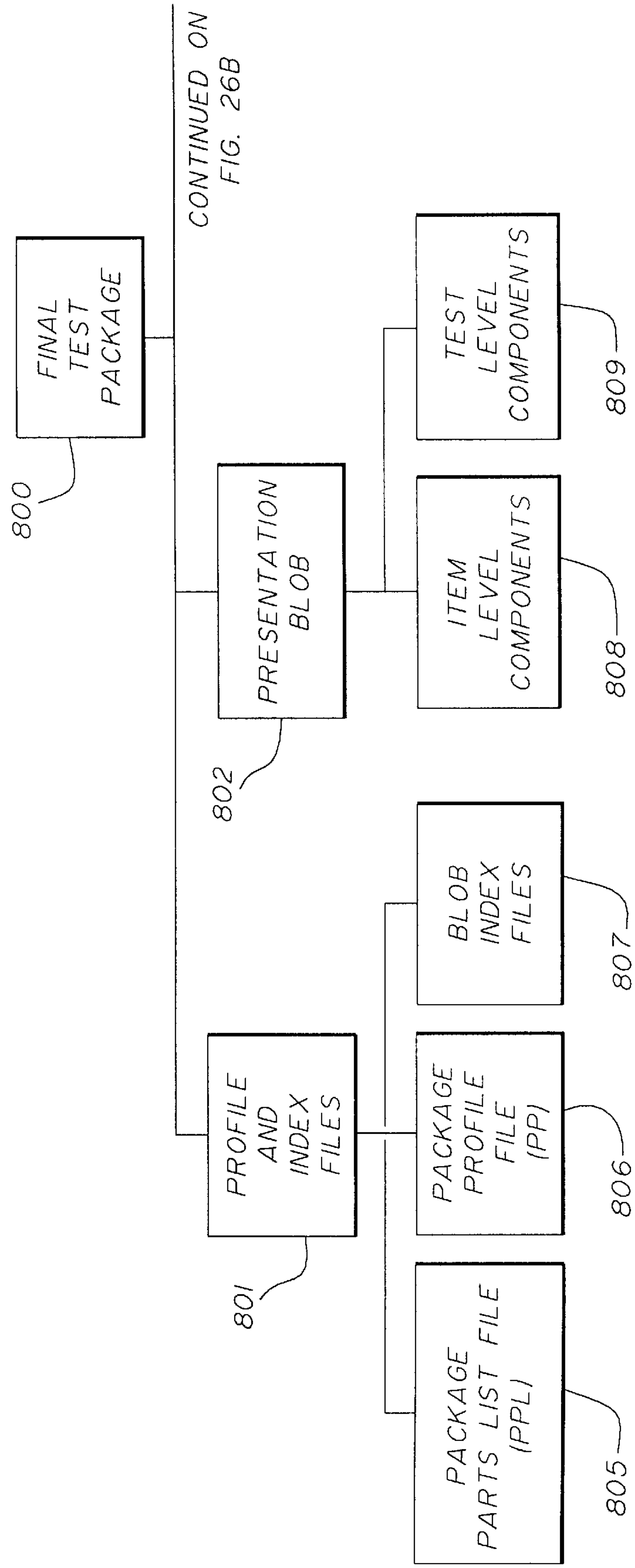
FIG. 26 is a block diagram showing the components of a test package.
Figure 26B:
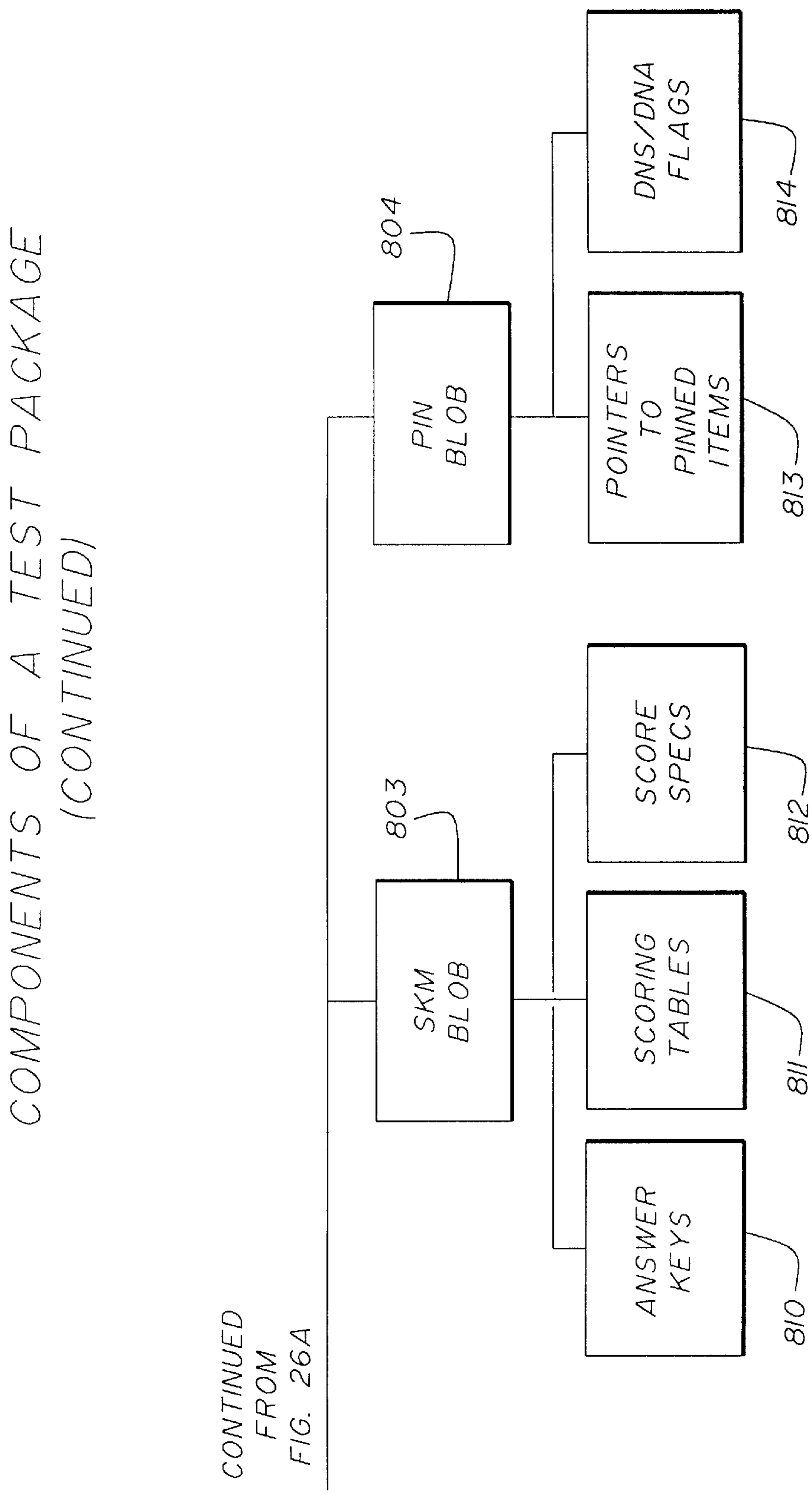

FIG. 26 shows the components of a final test package. Four primary groups of files are packaged together to form the final test package. These four groups of files are the Profile and Index files 801, the Presentation Binary Large Object (BLOB) 802, the SKM BLOB 803, and the Problem Item Notification (PIN BLOB) 804.

Although the SKM BLOB 803 and PIN BLOB 804 are shown in FIG. 26, they are not necessary components of the test package. However, they are preferably included in the test package. The SKM BLOB 803 should be included if the examinee responses are to be scored at the testing center after the examinee has completed the test. If the SKM BLOB 803 is not included in the test package, the examinee responses are scored at the central processing site by a program specific (e.g., SAT, GRE) postprocessing system. The PIN BLOB 804 is used to identify items which had been included in the test but which are later determined either not to be scored or administered to the examinee. Thus, although the PIN designations provide a preferable feature, its inclusion in the final test package is not necessary. The details of the SKM and PIN BLOBs will be described below.

The profile and index files 801 include the Package Parts List File (PPL) 805, the package profile file (PP) 806, and the BLOB Index Files 807. The PPL 805 contains a list of identification codes and version numbers, each ID code and version number being associated with a component in the test package. The PP file 806 contains an identification of each test included in the test package. Although only one test is actually included in a test package, multiple scripts may be provided for dynamic selection (spiralling) or for special conditions (e.g., untimed versions for examinees with disabilities). Spiralling is a technique in which test components (e.g., item substitution) are varied so that examinees taking the same test appear to be taking different tests. Spiralling inhibits cheating among examinees whose workstations are in close physical proximity because it increases the likelihood that each examinee will be interacting with a visibly different test. The BLOB index files 807 provide an index for the Presentation BLOB 802, SKM BLOB 803, and PIN BLOB 804 which are packaged into the computerized test. These indices function as a guide for locating specific data within each of these BLOBS.

Figure 27:
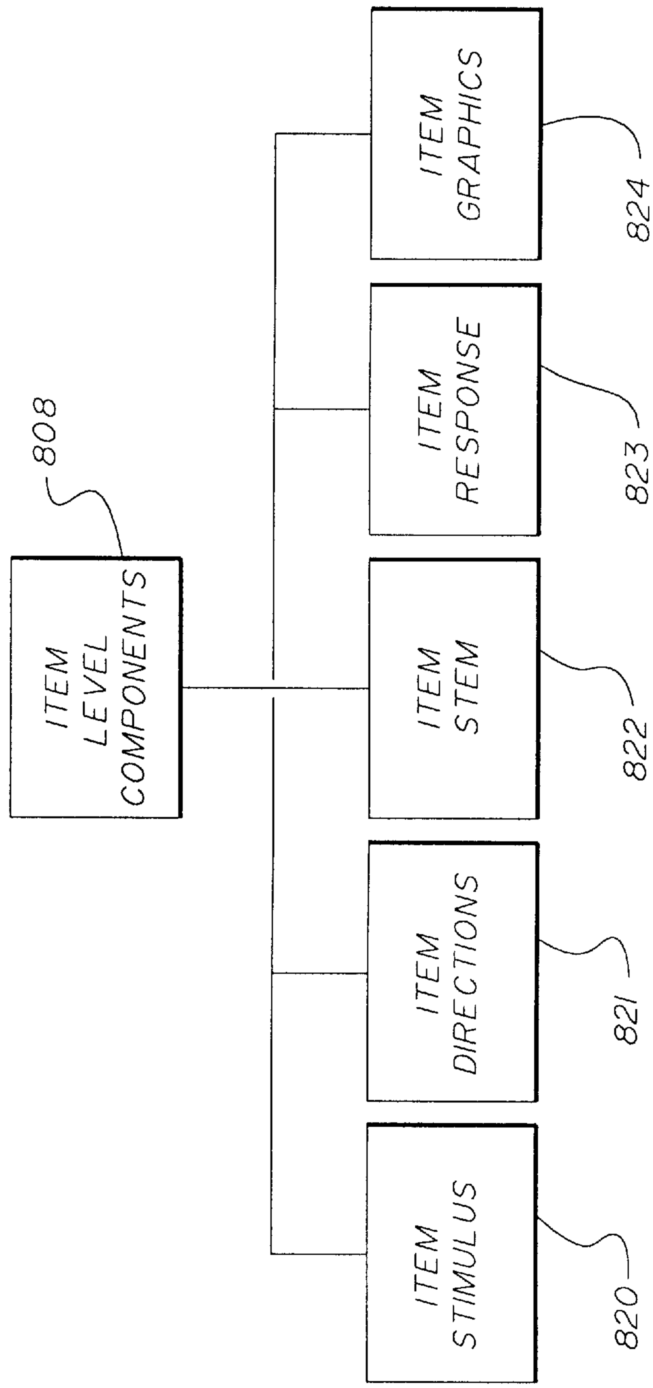
FIG. 27 is a block diagram showing some item level components included in the presentation BLOB (Binary Large Object).
Figure 28:
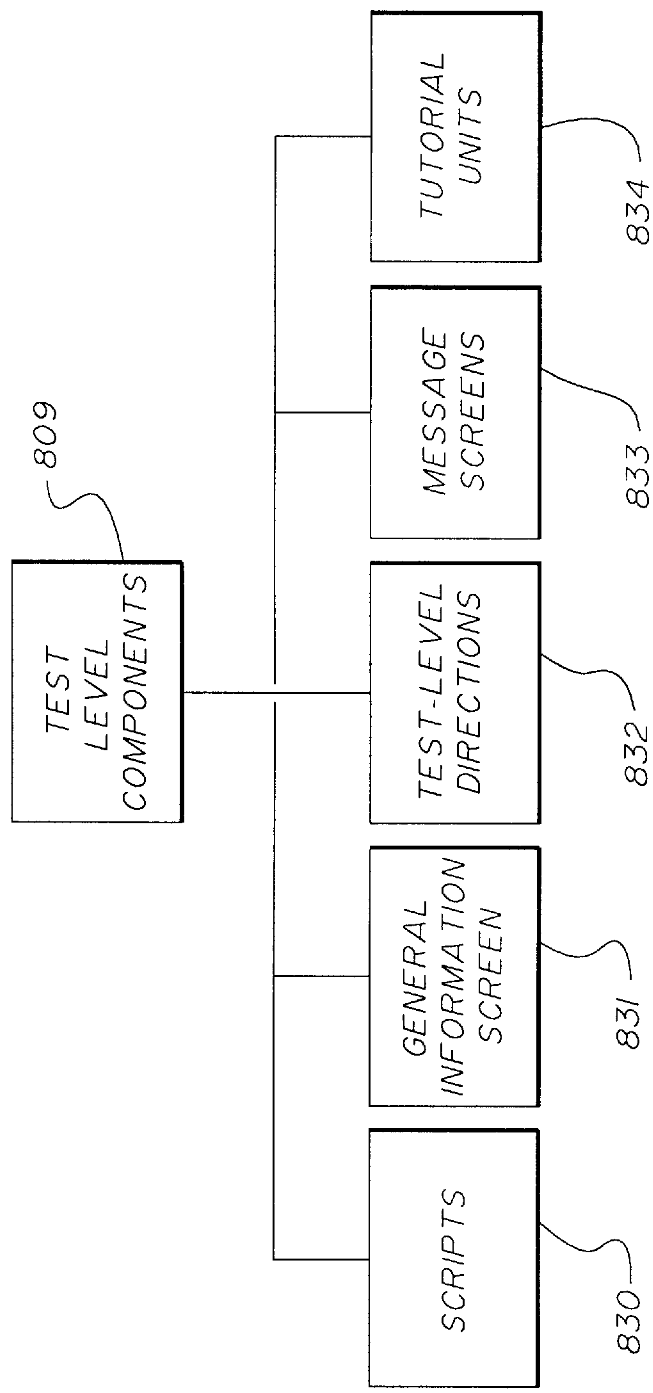
FIG. 28 is a block diagram showing some test level components included in the presentation BLOB.

The presentation BLOB 802 includes item level components 808 and test level components 809. Examples of the item level components 808 are shown in FIG. 27 while examples of the test level components are shown in FIG. 27. Referring to FIG. 26, the item level components 808 may include the item stimulus 820, the item directions 821, the item stem 822, the item response 823, and the item graphics 824. Each of these item level components has been described in detail in conjunction with item preparation in Section II.B.

Referring to FIG. 27, examples of the test level components 809 are the test scripts 830, general information screens 831, test level directions 832, message screens 833, and tutorial units 834. Each of the test level components 809 has been described in detail in conjunction with test preparation or will be described in detail in conjunction with test delivery in Section III.

Returning to FIG. 27, The SKM BLOB 803 is preferably created by the scoring and key management application and incorporated into the final test package. The SKM BLOB 803 preferably includes the Answer Keys 810, scoring tables 811, and scoring specifications 812. The answer keys 810 provide the correct response or responses to each item included in the test form. The scoring specification 812 provides information relating to how each item is to be scored.

Figure 29:
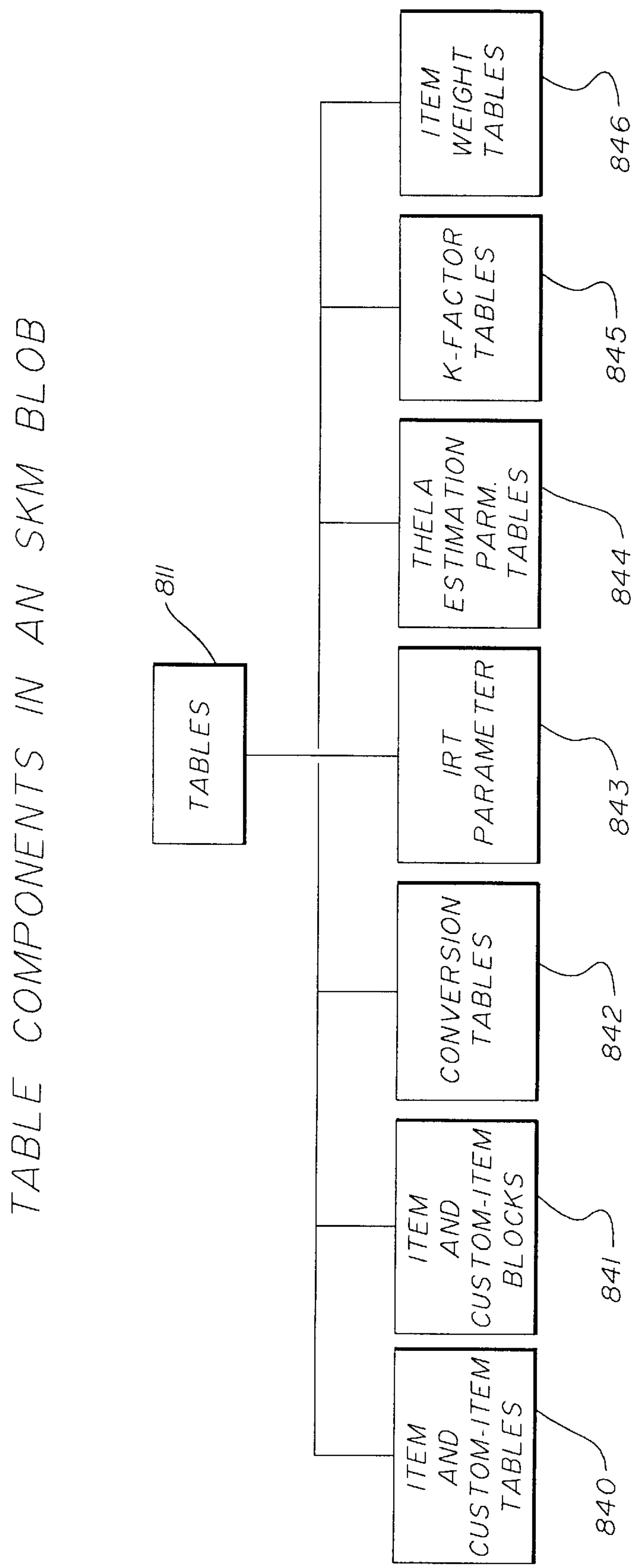
FIG. 29 is a block diagram showing some table components included in a SKM BLOB (Scoring Key Management).

FIG. 29 shows some examples of scoring tables which may be included in the SKM BLOB 803. The item and custom item tables 840, the item and custom item blocks 841, conversion tables 842, Item Response Theory (IRT) parameters 843, Theta estimation parameter tables 844, K-factor tables 845, and Item weight tables 846 are preferably included in the SKM BLOB 803. Since all of these tables are well known to those in the testing industry, a description of these tables will not be provided here.

Returning again to FIG. 26, the PIN BLOB 804 includes pointers to pinned items 813 and the Do Not Score (DNS) and Do Not Administer (DNA) flags 814. Some time after the computerized test has been prepared by TPS, it may be determined that one or more items included in the test do not perform as intended, e.g., more than one response would be correct although only one was intended. Thus, TD may designate these items and indicate whether the item should not be scored or not be administered. SKM then creates the PIN BLOB 804 with pointers and flags for each of the items that has been found to misperform. When the test delivery system delivers the computerized test, it will not present items flagged with a DNA and those items flagged with a DNS will not be scored.

Figure 30A:
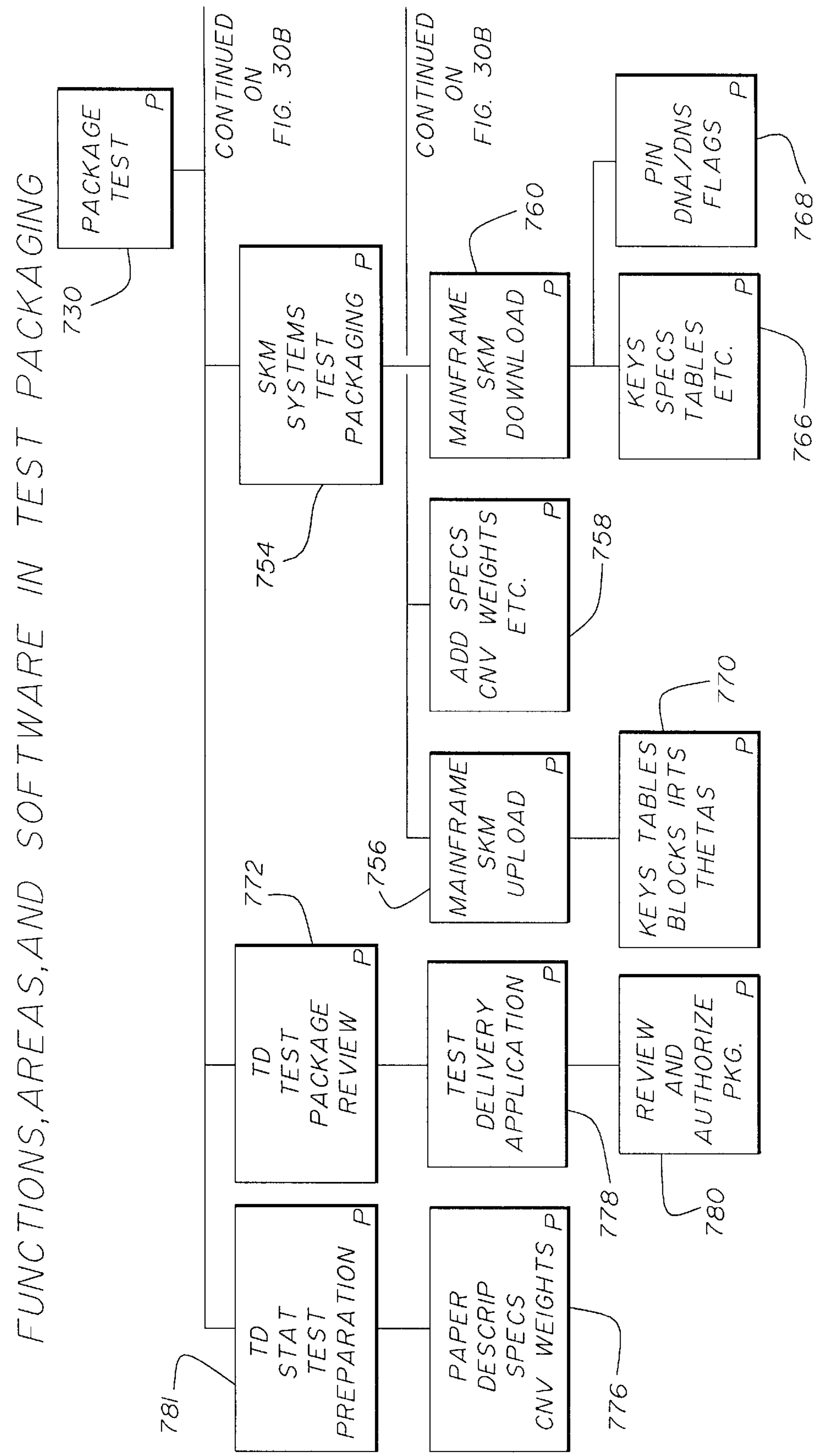
FIG. 30 provides a functional block diagram of the test packaging process.
Figure 30B:
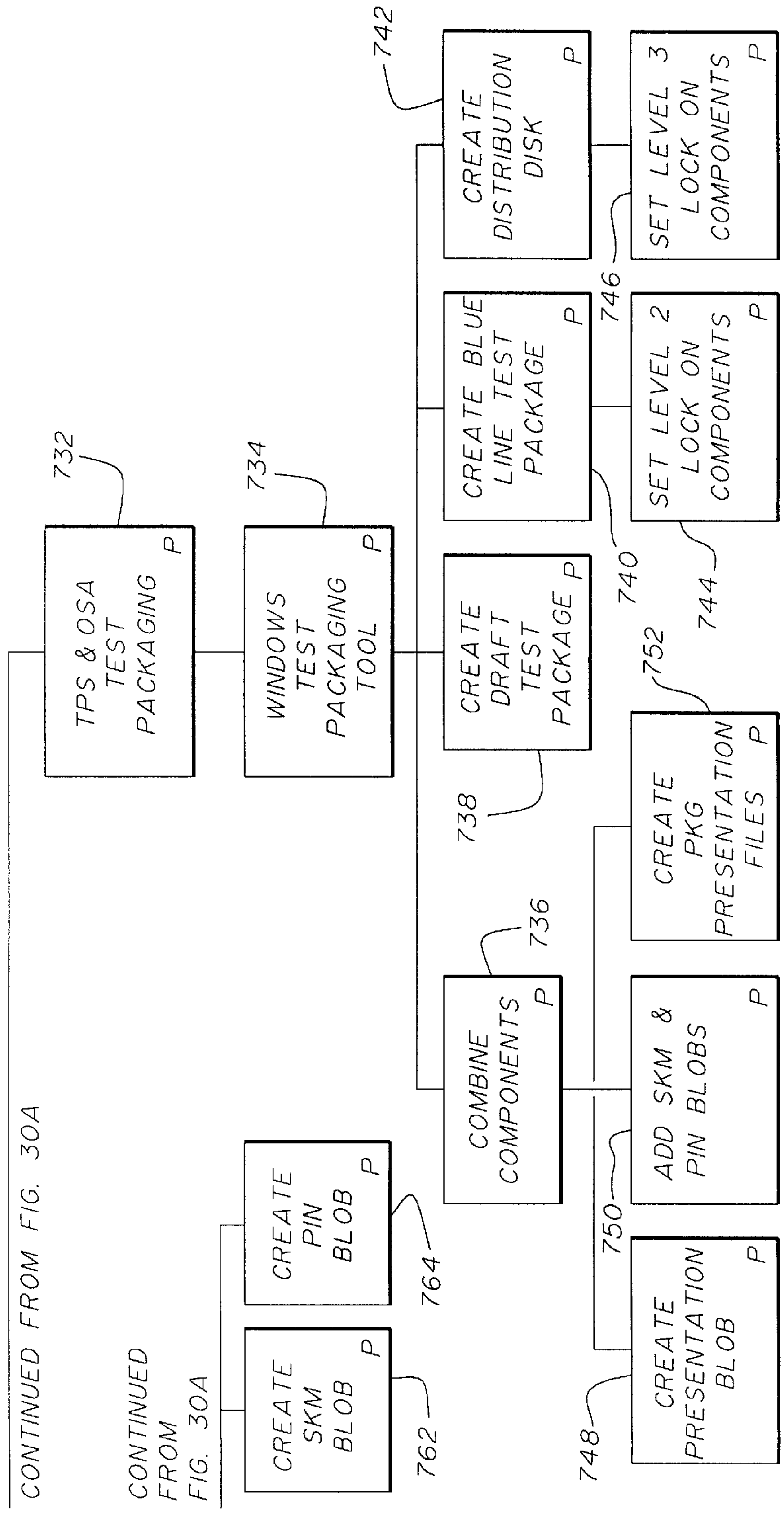

FIG. 30 shows the functions performed by TD, TPS, and SKM staff to implement the steps described above with reference to FIG. 25. Turning now to FIG. 30, as a part of test preparation, TD specifies the scoring specifications and conversion tables at 776. In a preferred embodiment, SKM staff utilizes the automated SKM system developed by Educational Testing Service as shown in FIG. 30. For instance, if the ETS SKM system or an equivalent automated SKM system is utilized, the answer keys and tables may be retrieved from an SKM database at 770 and 756. The scoring specifications and conversion tables are added to the data retrieved from the SKM database as shown at 758, and an SKM BLOB 762 can then be created. TPS combines the test components, item components and BLOBs to create a draft test package at 736 and 738 respectively. TD reviews the draft test package at 772 as it is delivered by the Test Delivery Application at 778. If certain items do not perform as they should, TD identifies those items for the SKM staff to create a PIN BLOB 764 based on the information provided by TD. TPS adds the PIN BLOB to the test package and makes any other revisions the TD identified after reviewing the draft test package. When TD has authorized the test package at 780, TPS prepares a blue line test package 740 and sets a level 2 lock on the test and item level components. A level 2 lock prevents modification to the locked components by unauthorized persons. After the blue line test has been finally authorized by TD at 780, TPS creates a set of data distribution disks at 742 and applies a level 3 lock at 748. A level 3 lock virtually eliminates the potential for any changes to be made to the computerized test.

Like the IPT and the TPT, TPAK is preferably a menu-driven application. Detailed flowcharts and corresponding pseudo code of the TPAK application are provided in Appendix C.

In a preferred embodiment, a modified version of TPAK called ETPAK (Encrypted TPAK) is executed. In addition to verifying the presence of each of the required test files, ETPAK encrypts at least the item files (e.g., .STE, .REF, .RSP, and .CTL). After the required files have been packaged together, they may be transferred to a test center at which the computerized test is administered and delivered to an examinee.

III. The Test Delivery System

A. Overview

Figure 31:
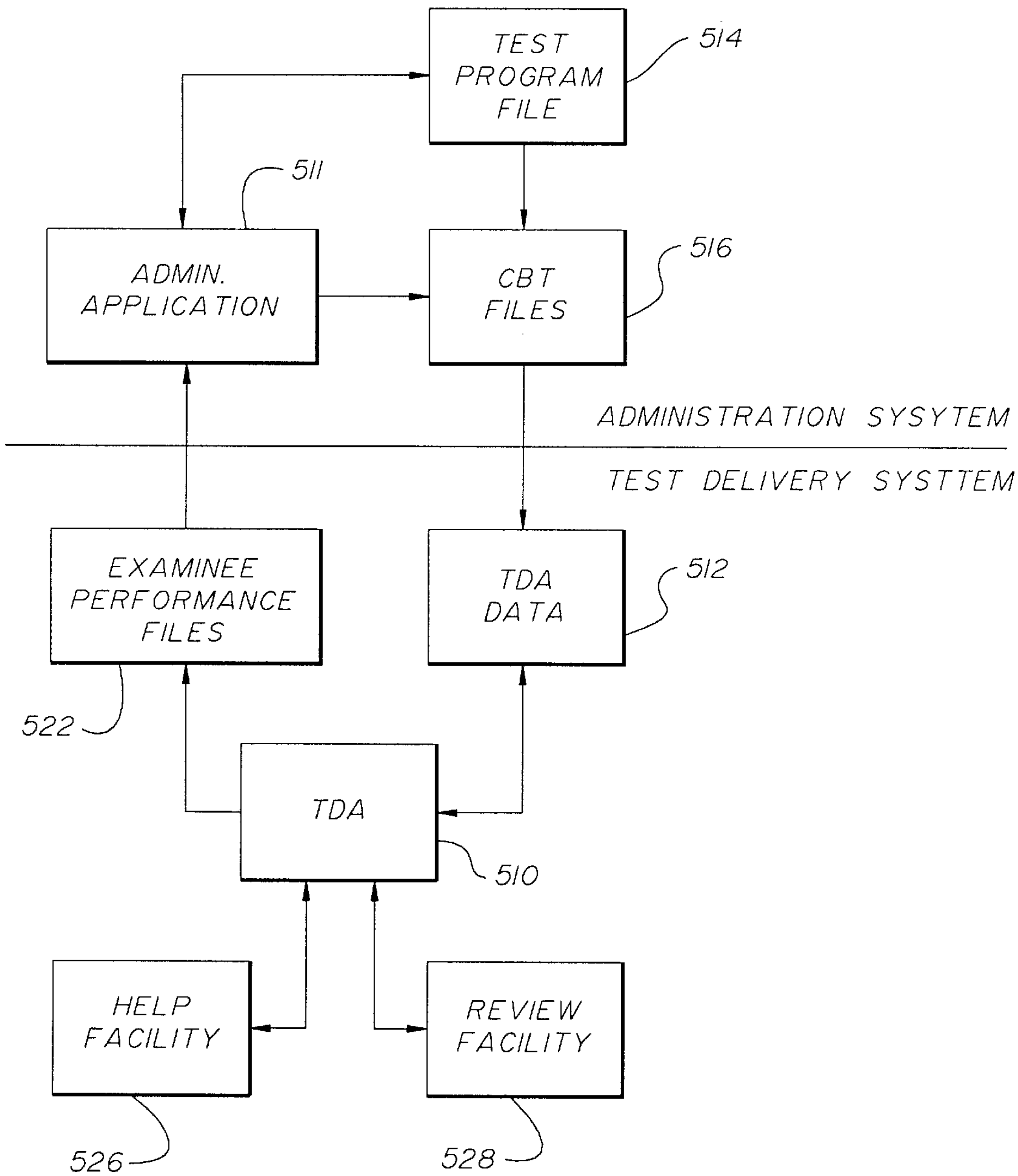
FIG. 31 shows a functional block diagram of the test delivery system according to present invention.

A block diagram of the Test Delivery System 12 is shown in FIG. 31. A test delivery application (TDA) 510 controls the test session, as directed by the test program 514, CBT files 516, and test delivery application data (TDA data) 512. The test program 514 and CBT files 516 are administration system files and are preferably stored on the work station or server (if workstations are networked via local area network) hard disk prior to delivery of a computerized test to an examinee. Other files and applications such as the HELP facility 526 and the REVIEW facility 528 are also preferably stored on the hard disk in advance. An examinee performance file 522 is created during each test session to record an examinee's responses and other activity during the test session.

Although the Administration system will be described in detail below, a brief description is provided here as it is relevant to the implementation of the Test Delivery system.

The center administrator uses a combination of manual and computer procedures to control operations and deliver tests to examinees at the testing center. All of the files and applications shown in FIG. 31 are sent to the testing center in electronic form. All of these files can be loaded, on the workstations using standard set up procedures. The administrative application 511 of the Administrative system permits the administrator to initialize each workstation at the start of the day, to sign an examinee onto a workstation, to start a testing session, and to close each station at the end of the day. The center administrator is also responsible for performing backup procedures and transmitting the examinee performance files 522 to the central processing site for scoring and evaluation.

Figure 32:
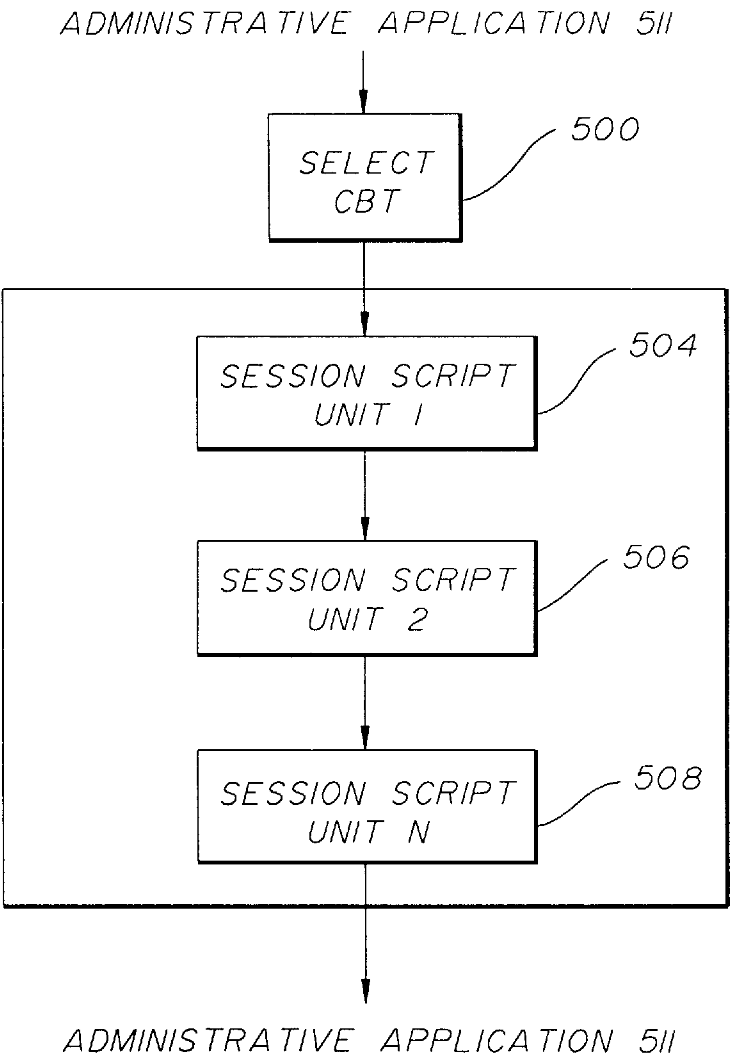
FIG. 32 is a functional flow diagram of the test delivery process according to the present invention.

FIG. 32 provides a high level flow diagram of the test delivery procedure. In a preferred embodiment, when the administrator completes the procedure to sign an examinee onto a workstation and selects a test at 500, the Test Delivery Application is invoked. The Test Delivery Application reads the session script and executes the units it prescribes. When the end of the session script is reached, the Test Delivery Application returns control to the Administrative Application.

B. Test Delivery Application Data Flow

Scripts define the sequence of tasks to be performed by the TDA 510 as well as the information necessary to complete each task. The scripts define option settings, files containing program-specific text, and the items to be displayed.

Although the following section provides a detailed description of the operation and use of the Test Delivery System and the presentation of various screens by the Test Delivery system, detailed flowcharts and corresponding pseudo code of the TDA are provided in Appendix D.

C. Title Line

Figure 33:
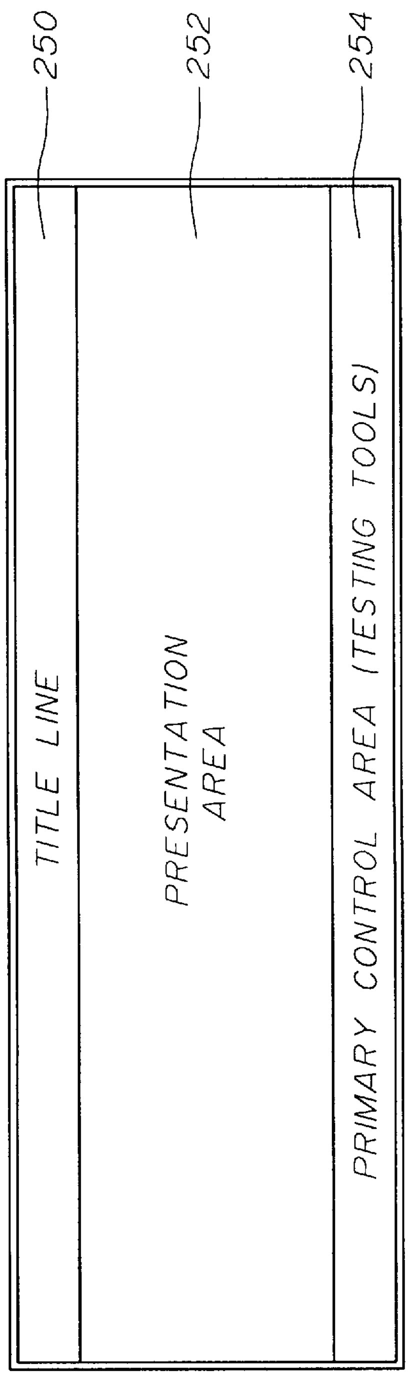
FIG. 33 shows some primary screen components of each screen presented during the test delivery.
Figure 34A:
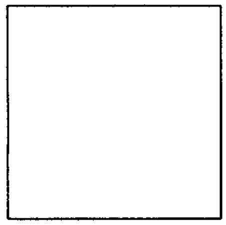
FIGS. 34(*a*)–(*g*) show examples of pane arrangements supported by the present invention.
Figure 34E:
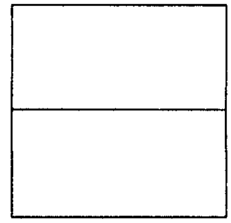
Figure 34B:
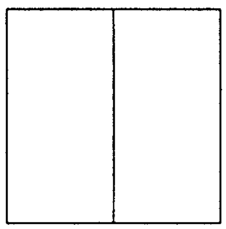
Figure 34F:
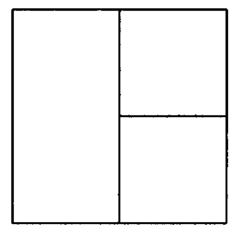
Figure 34C:
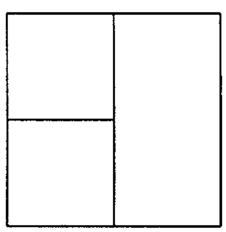
Figure 34G:
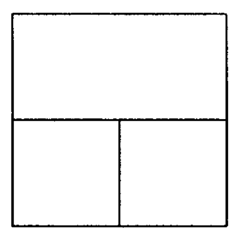
Figure 34D:
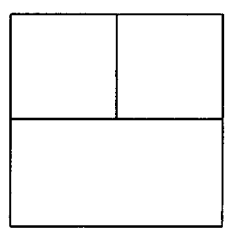

The screen format during a delivery unit is preferably divided into three main sections; a title line 2250, an item presentation area 2252, and a primary control area 2254 as illustrated in FIG. 33. The title line 2250 is preferably presented as one solid gray bar at the top of the screen. It should be understood that numerous other color combinations are possible. The title line 2250 is capable of displaying various information relating to the test or taking the test. For instance, the title line 2250 may include the time remaining in the test or test section. Preferably, time is displayed automatically although an examinee may optionally turn it off. In a preferred embodiment, remaining time is displayed left justified on the title line 2250 in HH:MM format until the last few minutes of the test. At that point, the display format changes to MM:SS and flashes for three seconds so that the examinee is alerted that the time remaining for taking the test is nearly over.

Other information in the title line 2250 may include the name of the computerized test and program-specified text pertinent to what is being presented (e.g., section name). Information to help orient the examinee is also preferably displayed in title line 2250. For instance, when an item or tutorial screen is displayed in the presentation area 2252, the notation "xx of yy" or "xx" appears in title line 2250. The "xx" refers to the item number within the test or section, or the screen within the tutorial. The "yy" indicates the total number of items in the test or section, or screens within the tutorial. Additional orientation information to be provided to the examinee in the title line 2250 may include the descriptive word such as "HELP" "REVIEW" and "DIRECTION" to indicate a currently displayed screen. The "HELP," "REVIEW" and "DIRECTIONS" screens will be described below.

D. Presentation Area

The presentation area 2252 of the screen is used to display items screen such as the text and graphics and non-item screens such as direction screens, message screens, HELP screens and REVIEW screens. Direction screens are used to display directions for the test, section, and others. Message screens display information and examinee options at transition points during the test session to control the flow of the test. Transition points indicate where a new section or new item is to be displayed or when the test delivery application moves from an item screen to a non-item screen. HELP screens and REVIEW screens respectively enable an examinee to interact with the HELP and REVIEW facilities. These non-item screens will be described in more detail below.

1. Screens a. Item Screens

Item screens are used to display items. Items can be mapped into the presentation area using one of a predetermined number of standard templates. (See Table 3, Presentation/Template Menu in the description of the Item Preparation System). In a preferred embodiment, the templates provide different combinations of one-, two-, or three-pane arrangements resulting in seven possible templates such as those shown in FIGS. 34(*a*)–(*g*). The panes are placed in the presentation area 252 like tiles which butt against each other but do not overlap. These arrangements provide test developers with some flexibility in designing item layouts.

In preferred embodiments, the text/graphics within a pane automatically becomes vertically scrollable if the volume of information is larger than the pane size. Horizontal scrolling can also be supported although it is not required for operation of the invention. A scrolling pane has a vertical (industry standard) scroll bar on the pane's right side. In addition, a status bar may be placed at the top of the pane. The phrase "Beginning," "More Available," or "End" is placed in the status bar and indicates the position of the currently displayed text within the pane as the examinee interacts with the scroll bar. "Beginning" is displayed if the topmost information is visible in the pane. "End" is displayed if the bottommost information is visible. "More Available" is displayed if neither the topmost nor bottommost information is visible.

In preferred embodiments, the default size of a pane is 50% of the presentation area. Thus, a two pane arrangement cuts the presentation area into two equally sized panes—either horizontally or vertically (see templates shown in 34(*b*) and 34(*e*)). A three-pane arrangement is produced by simply cutting one of the panes that result from a two-pane cut into two equally sized panes (see templates shown in FIGS. 34(*c*), (*d*), (*f*) and (*g*)). It should be understood that the default size and ratios can be adjusted to create templates having panes of substantial size.

The components of an item can be mapped into any pane of a template, but preferably panes are not empty. Additionally, components can share panes and can be placed in any order. Thus, for example, the stem and response can be assigned to the same pane.

If a stimulus component exists, the test developer can elect to have a stimulus status bar placed at the top of the pane containing the stimulus component. The status bar displays the status as the stimulus pane scrolls. The stimulus status bar contains the phrase "Questions xx to yy" flushed left, where "xx" is the item number of the first item to which the stimulus applies and "yy" is the last item to which it applies.

b. Direction Screens

Directions screens are typically used to display test, section, group and set directions. The directions may contain text and/or graphics which are specified by the test script (i.e., declarations in test, section, group or set configuration files). Scrolling is used to navigate through directions.

There are a number of ways to map the item directions component, i.e., accession.DIR, into the item's presentation area 252. For example, directions may be embedded above or below another component pane which may contain stem, response, or stimulus. Alternatively, directions may be placed in a special directions pane that is inserted below the title line 250 and above the template. Preferably, the directions pane fills the entire width of the presentation area 252, and the vertical height of the directions pane is adjustable to fit in the presentation area along with any of the template arrangements of FIGS. 34(*a*)–(*g*). Vertical scrolling is preferably supported if there are more directions than the pane can display. In a preferred embodiment, the size of the directions pane is specified and devoted to the template. Template sizing rules are then applied as described above. Still further, item directions can be displayed immediately before the item is displayed for the first time in a standard directions screen. Generally, test and section directions will only be displayed in a single directions screen.

Figure 35:
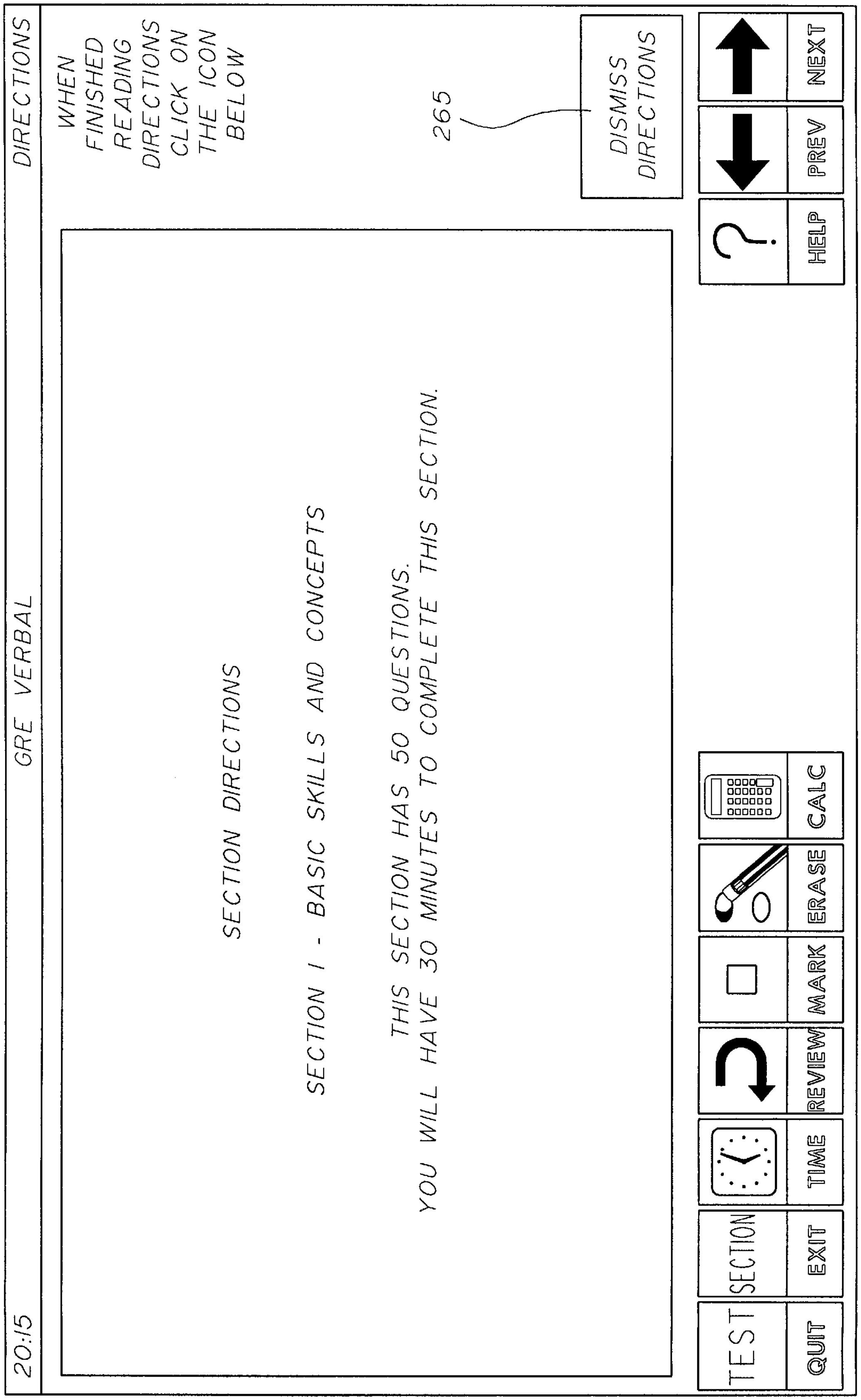
FIG. 35 is an example of a directions screen.

FIG. 35 is an example of a section directions screen. A single button, DISMISS DIRECTIONS 265 dismisses the directions screen when the examinee selects it. Once the examinee dismisses the directions, they are preferably accessible through the HELP facility. If an examinee tries to dismiss the directions before scrolling to the end, a warning message is preferably displayed. The message as shown in FIG. 36(*a*) notifies the examinee that the directions should be read completely and that they can later be retrieved through HELP.

In preferred embodiments, test directions are displayed as the first screen of the delivery unit. Test directions notify the examinee, for example, the number of sections, misconduct notification, test administration instructions, and break policy during the test session.

If the test contains sections, one set of section directions should be provided for each section. Section directions are preferably delivered at the start of each section. They include the number of items in the section, the time allowed for answering the questions presented in each section, and the reference aids that will be required throughout the section.

Group directions are used to introduce items of a like type; for example, analogies or antonyms. Group directions are automatically displayed in a preferred embodiment upon displaying the first item of the group by the test delivery application. Group directions are typically displayed once and eliminated thereafter. An optional paraphrase may be associated with the group directions. The paraphrase is used to emphasize items on the REVIEW screen as will be described below.

Set directions are used to introduce a set of items that share the same stimulus material, e.g., an illustration or reading passage. Set directions are also tied to specific items sharing the same stimulus material. Set directions are preferably displayed when the first item of the set is to be displayed. Set directions are typically displayed once and eliminated thereafter. An optional paraphrase may also be associated with the set directions. The paraphrase is used to emphasize items on the REVIEW screen as described below.

c. Message Screens

Message screens appear automatically in preferred embodiments at transition points and contain one or more option boxes. The examinee should not continue interacting with the test until dismissing the message box by choosing one of the options. When a message screen is displayed, clicking in any other location on the screen should be ignored.

Message screens consist of at least the message title line, text/graphics, and button icons. The title and icons are fixed, but message files may specify the text and/or graphics that appear on message screens. Two types of message screens are provided. One type pops up and overlays the center of the current screen. The second type covers the entire display monitor. Examples of some possible message screens are shown in FIGS. 36(*a*)–(*l*) and described in Table 7 below.

TABLE 7

MESSAGE SCREENS

| Message | Description | Type |
|---|---|---|
| "More Directions" FIG. 36 (a) | Appears when examinee has not scrolled to the end of the directions screen. | Pop-Up |
| "Time Expired" FIG. 36 (b) | Indicates that time has expired for answering an item or completing the test or test section. | Screen |
| "End of Section" FIG. 36 (c) | When examinee attempts to move from the last item screen in a test section. | Screen |
| "End of Questions" FIG. 36 (d) | When examinee attempts to move from the last item screen in a test and the examinee is permitted to return to the previous item for review. | Screen |
| "Exit Section" FIG. 36 (e) | When examinee attempts to exit the section. | Screen |
| "Quit Test" FIG. 36 (f) | When examinee attempts to quit the test. | Screen |
| "Confirm Answer" FIG. 36 (g) | When examinee attempts to leave a question for which the test program specifies the confirm answer option. | Pop-up |
| "Must Answer" FIG. 36 (h) | When examinee attempts to leave an item without responding to the question, the test script requires an answer for the item. | Pop-up |
| "Must Answer With Correct Number of Choices" FIG. 36 (i) | When examinee attempts to leave an item without answering the correct number of required answers according to the item control file. | Pop-up |
| "Use a Choice Only Once" FIG. 36 (j) | When examinee attempts to use a response more than once in an item. | Pop-up |
| "Select Correct Number of Choices or Leave Blank" FIG. 36 (k) | When examinee responds with an incorrect number of responses and attempts to leave an item which is not required to be answered. | Pop-up |
| "Pause" FIG. 36 (l) | When the test program specifies a pause at the end of a section. | Screen |

d. HELP Screens

Figure 37:
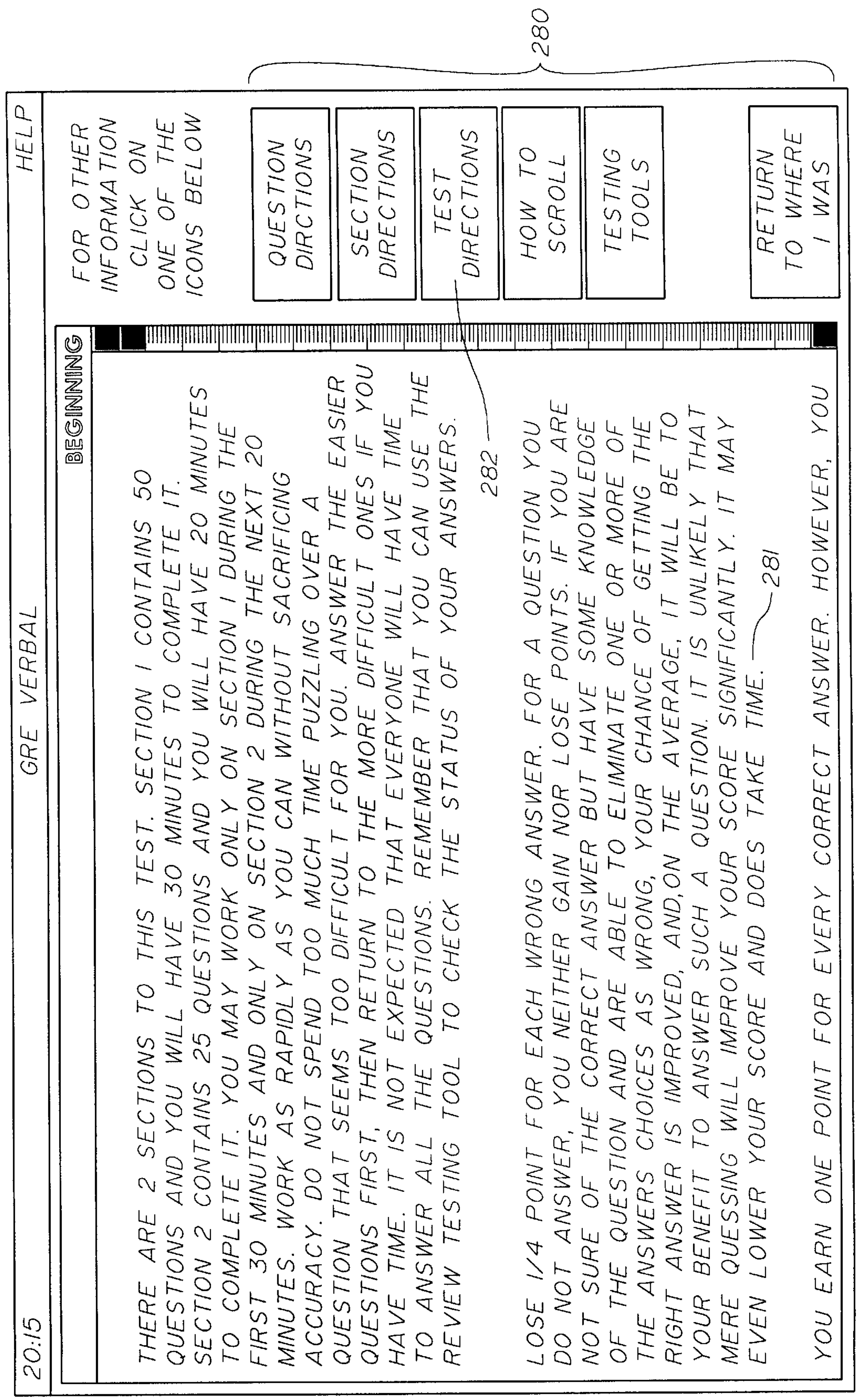
FIGS. 37–39 provide some examples of Help Screens.

The HELP screen is mapped into the item presentation area whenever the examinee selects the HELP facility. FIG. 37 shows the format of a HELP Screen. Help buttons 280 are available from the HELP screen. The examinee can display directions, scrolling instructions, etc. in the pane 281 by clicking on one of the buttons. The directions include test, section, group, set, and item directions. Examinees use scrolling to navigate through HELP screens. For Example, when the examinee selects the TEST DIRECTIONS button 282, information will appear in pane 281 as shown in FIG. 37 and the selected TEST DIRECTIONS button 282 will be grayed to indicate the current selection. The selection of the grayed button will have no effect.

Figure 38:
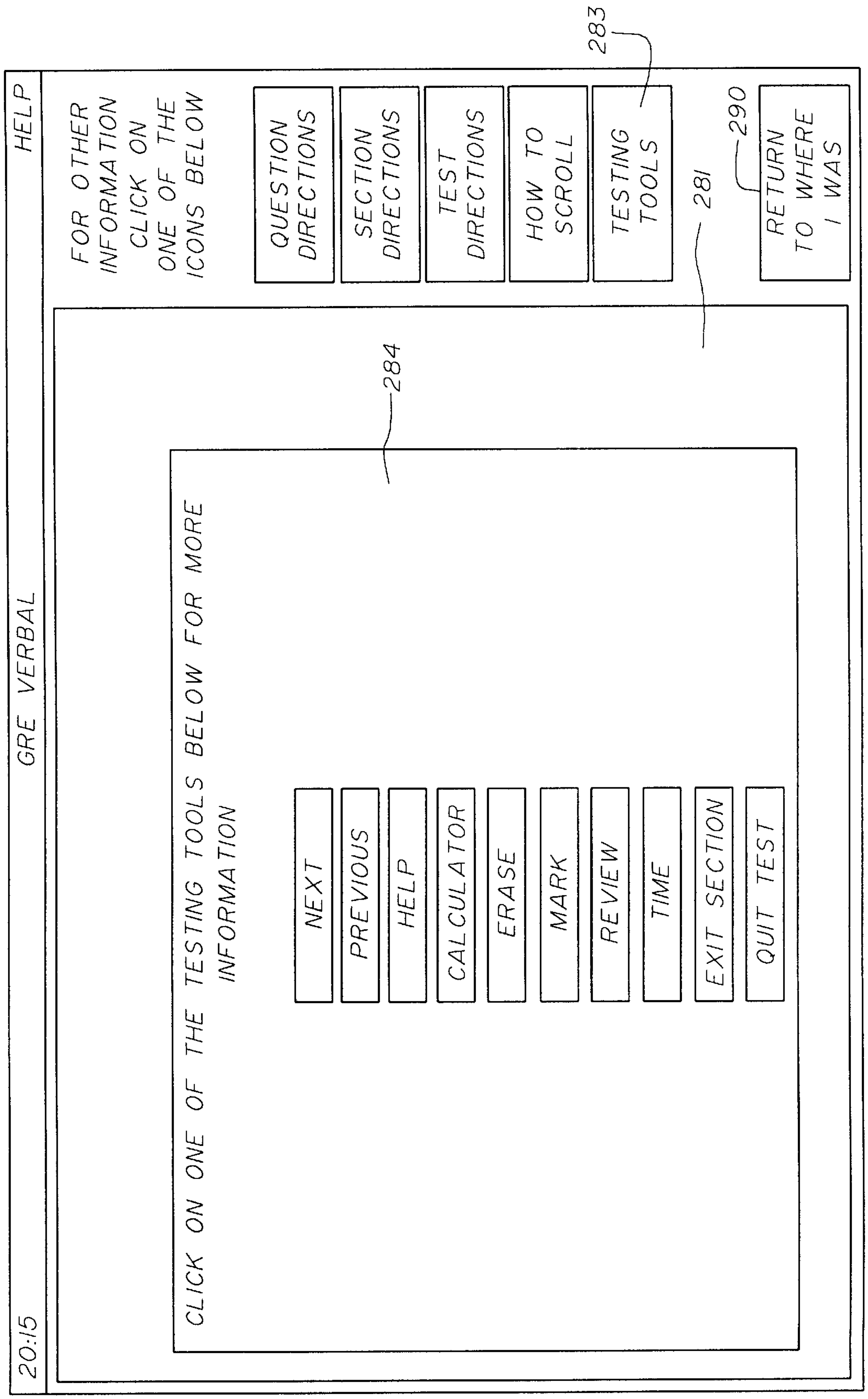

Referring to FIG. 38, when the examinee selects the "TESTING TOOLS" button 283, a menu screen displays all available testing tools for that particular section which are defined by the section configuration file of the test script. When the examinee selects one of the tools, information about that tool is presented in pane 281. For instance, FIG. 39 shows a sample screen which appears when an examinee requests help on the calculator testing tool.

In a preferred embodiment, the Help facility is context sensitive. If an examinee invokes HELP from a directions screen, a message is displayed to further instruct the examinee as to how to proceed. If HELP is invoked from an item screen and the following display items exist, the Help pane 281 will first display the group directions for that item, then the set directions, and lastly the pop-up directions. If no directions exist for the item, a message informing the examinee that the item screen includes all the necessary information will be displayed.

Figure 39:
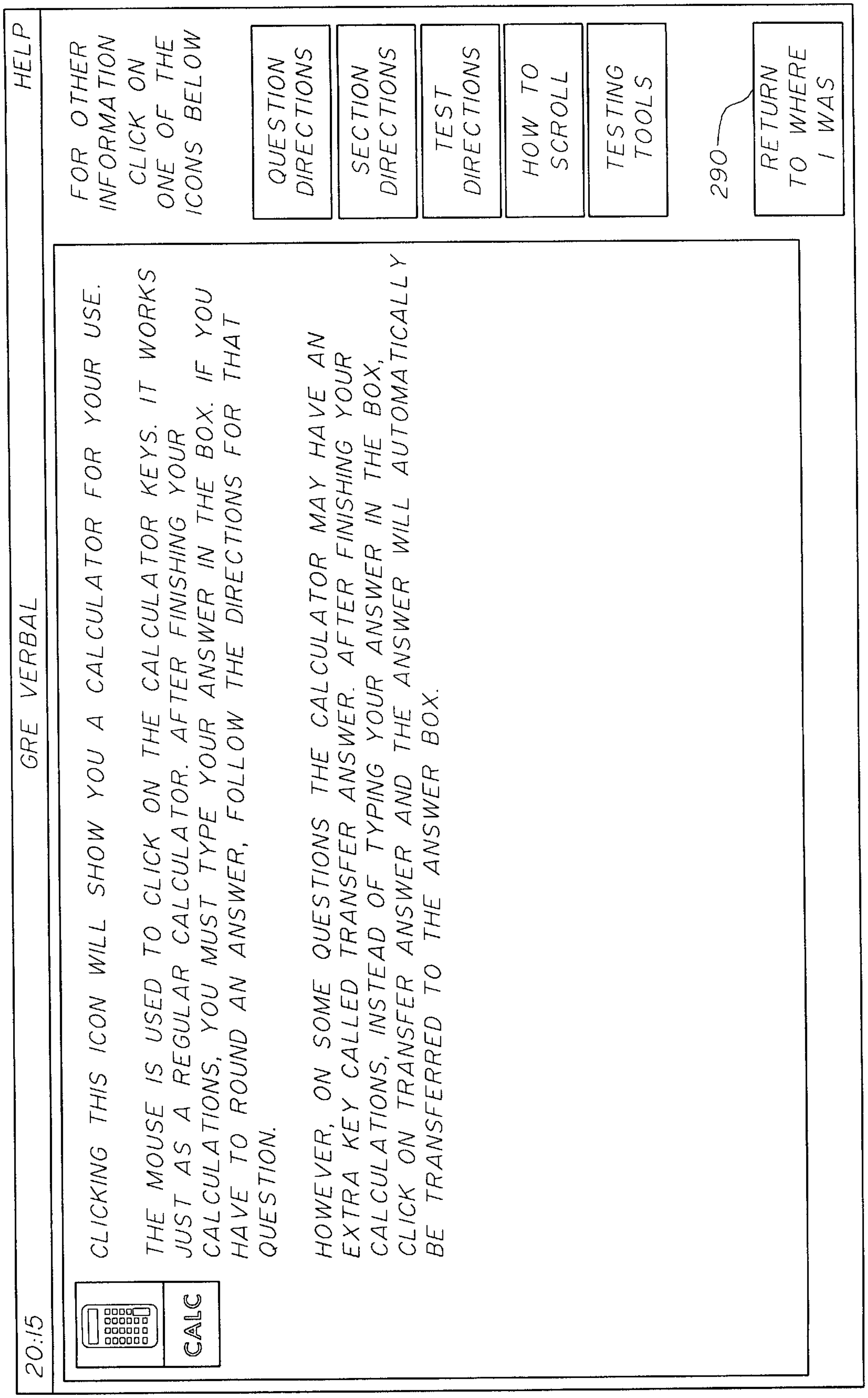

To exit the Help facility, an examinee selects the "RETURN TO WHERE I WAS" button 285 shown in FIG. 39.

e. REVIEW Screens

Figure 40:
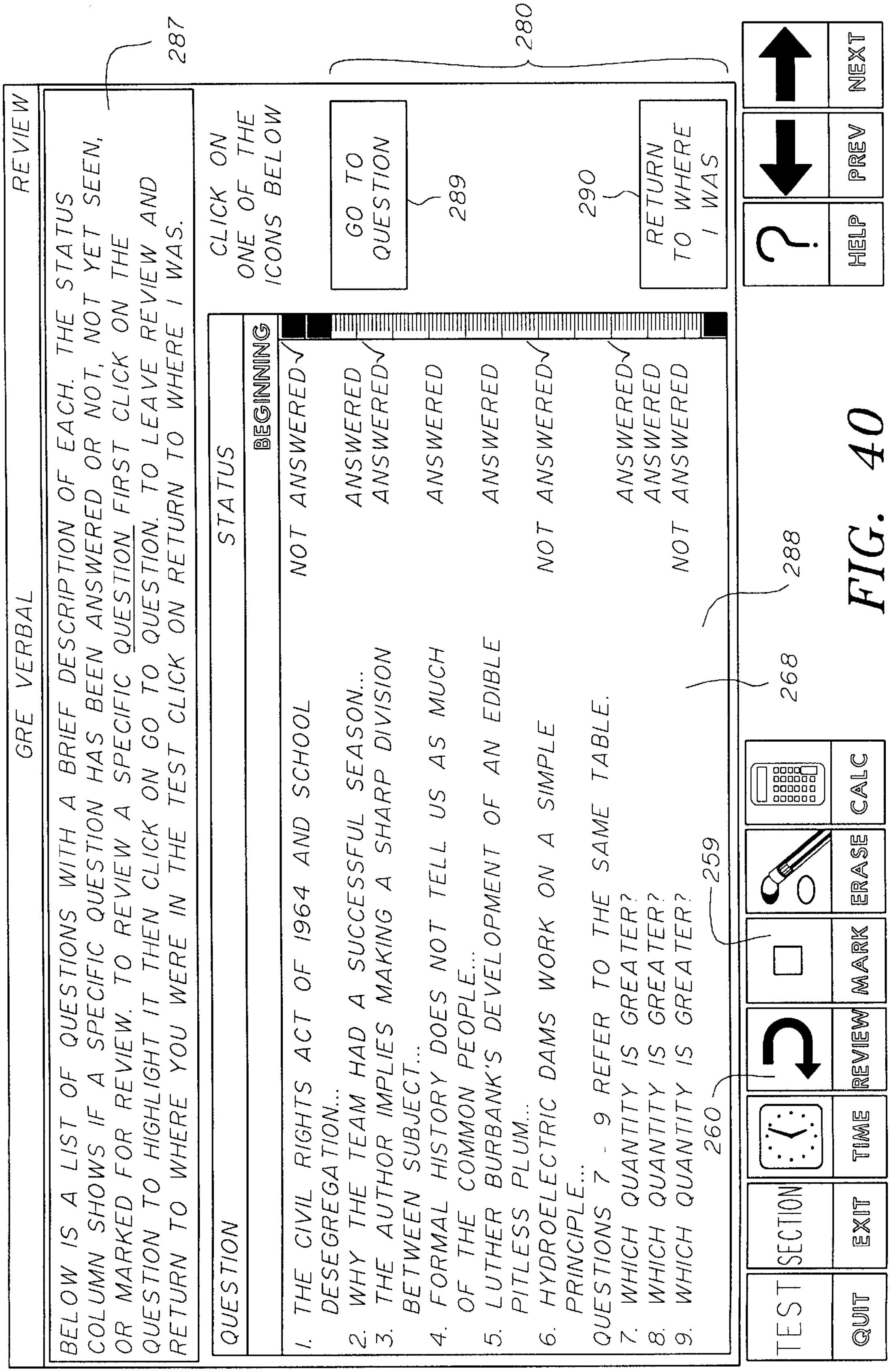
FIG. 40 provides an example of a review screen.

The Review screen is mapped into the presentation area whenever the examinee selects the REVIEW facility. FIG. 40 shows that the screen presentation REVIEW buttons 286 are available to the examinee from each Review screen. The top pane 287 contains directions on how to conduct the review. The Review pane 288 is used to display group, set, and item paraphrases (if provided), plus item status. Item status consists of a phrase and possibly a check mark. In a preferred embodiment, the status phrase can specify "Not Answered," "Answered," or "Not Seen." The check mark indicates whether the item was marked for review by the examinee during the test session.

Scrolling is preferably supported in the Review pane 288 if the information cannot be presented on a single screen. Upon invoking the Review facility, the item from which REVIEW was invoked is highlighted. The examinee can highlight a different item and then select the "GO TO QUESTION" button 289 to review that item. At any point, the examinee can select the "RETURN TO WHERE I WAS" button 290 to return to the point from which the REVIEW function was invoked.

In a further preferred embodiment, when the examinee clicks on one of the paraphrases and if the examinee has not previously seen the group or set directions, they are displayed. Thereafter, or if the examinee has already seen the group or set directions, clicking on the paraphrase brings up the first item of the group or set. If the REVIEW function is invoked from a directions screen, the examinee is returned to the directions screen by selecting the "RETURN TO WHERE I WAS" button 290. However, when the examinee moves to an item, the directions screen from which REVIEW is invoked is considered to have been dismissed. Once directions are dismissed, they are still preferably accessible through the HELP facility.

E. Control Area

The primary control area 2254 preferably provides testing tools for giving the examinee a degree of control over the testing session. In a preferred embodiment, there are ten testing tools (also referred to as "primary controls"). Each tool has its own icon. Icons are pictorial representation of a function available to a user which can be activated by selecting that icon. The icons for each of these testing tools are shown in FIG. 41.

Figure 41:
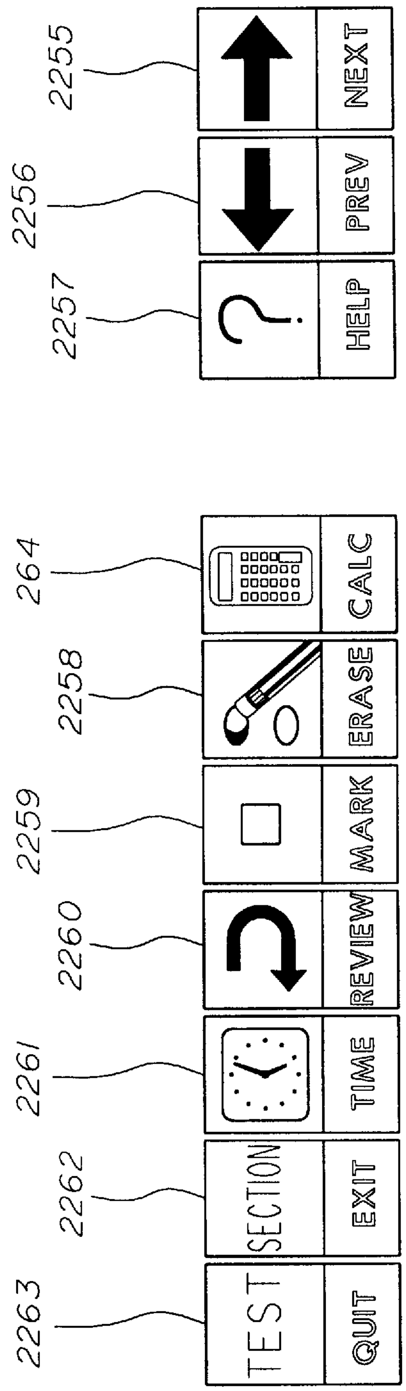
FIG. 41 provides a few examples of selectable testing controls supported by the present invention.

Referring to FIG. 41, the NEXT icon 2255, the PREV icon 2256, the REVIEW icon 2260 and HELP icon 2257 can be used by the examinee to move from one screen to another screen. When the NEXT icon 2255 is selected, the examinee can move on to the next screen. Selecting the PREV icon 2256 enables the examinee to move back to the previous screen. The HELP icon 2257 can be selected by the examinee to invoke the HELP facility. When HELP is invoked, the examinee moves to a HELP screen to retrieve previously presented direction and information about topics covered in the tutorials. The examinee is returned to the screen from which HELP was invoked when the Help screen is exited.

The MARK icon 2259 enables the examinee to mark an item for review. In a preferred embodiment, both answered and unanswered items can be marked. A marked item is indicated on an item screen by displaying a checkmark in the MARK icon 2259. The checkmark may also appear next to the marked item in the Review screen when the REVIEW facility is invoked after an item has been marked. The examinee can unmark an item by clicking on the MARK icon 2259 a second time. However, preferably the examinee need not unmark items in order to leave a section.

The REVIEW icon 2260, when selected, presents the review screen to the examinee listing the items in the section in the order they were presented to the examinee, along with any group or set paraphrase associated with item and an indication of whether the item has been marked by the examinee from the item screen. The examinee then has the ability to go directly to any item in a test section by clicking, as described above.

Preferably, the examinee can invoke the REVIEW facility from any item screen, and the REVIEW screen will display the status of all the items in the section regardless of whether all of the items had been presented. In a further preferred embodiment, the examinee may skip some items by advancing to a subsequent item.

The ERASE icon 2258 enables the examinee to reset all selected choices for the current item to their original state. The TIME icon 2261 allows the examinee to turn on and off the remaining time display in the title line 2250. The EXIT icon 2262 allows the examinee to leave the current section of the test. The QUIT icon 2263 allows the examinee to quit the test. The CALC icon 2264 allows the examinee to use on-screen calculator.

A testing tool is said to exist if it appears on every screen. The existence of each of the depicted icons; PREV, CALC, QUIT, EXIT, TIME, REVIEW, MARK and ERASE is specified by each test script or the section configuration file. The NEXT and HELP tools preferably exist in all tests. Testing tools that do not exist should not appear on the screen, and in a preferred embodiment, the location of the remaining tools is adjusted to close any gaps left by non-existent tools.

Test scripts can define the existence of tools to limit the ways in which examinees can navigate through the test. For example, a program can define a forward-progression-only test by eliminating the PREV and REVIEW tools.

A testing tool is said to be available if it exists and can be used. Preferably, a testing tool is displayed in black if available and in gray when it is not. For instance, in preferred embodiments, the NEXT icon 2255, the PREV icon 2256, ERASE icon 2258, MARK icon 2259, and the CALC icon 2264 are available only from item screens. However, the HELP icon 2257 is available from all screens. The REVIEW icon 2260 is available from item screens and group or set directions screens while the TIME icon 2261 may or may not be available from directions screens depending upon whether the section configuration file indicates timing is to start before or after the presentation of directions.

F. Examinee Interaction

An item response is defined by its class and type as provided by the test developers and implemented by the test production staff as described above with reference to FIGS. 13 and 15. The following will describe how an examinee can interact with the workstation to respond to each item according to its response class and type.

As described previously, there are three response classes; single selection, multiple selection and free response. Single selection requires that the examinee select only one answer. Multiple selection requires that the examinee select more than one answer, e.g., "select all that apply" or "select the two best." Free response requires the examinee to enter a numeric expression or value, or text via the keyboard coupled to the workstation.

Depending upon the selected response class, implicit or explicit prompting will be given by the test delivery application. Implicit prompting refers to a feature that will automatically de-select a first selected answer if an examinee subsequently selects another answer for the same item. For instance, if the examinee selects answer (a) and then changes his or her mind and selects answer (b), answer (a) will automatically be deselected by the implicit prompting feature. In preferred embodiments, implicit prompting will be used for those items having a single selection response class. However, other implicit prompting rules may be enforced for items having a free response class designation. For instance, if the response requires the examinee to enter a numeric value or a fraction, implicit prompting will cause the test delivery application to either ignore all alphabetic characters entered by the examinee.

Explicit prompting may be specified by the section configuration file. One purpose of explicit prompting is to ensure the examinee supplies exactly the required number of responses. Explicit prompting, if elected, only applies to items having a control file specifying the number of required responses, e.g., Multiple Selection. If explicit prompting is specified, preferably examinees can complete an item only if they have supplied all required responses. In such a preferred embodiment, the explicit prompting option will be enforced by the NEXT, PREV, REVIEW, and EXIT testing tools.

As described previously, test developers select a response type for each item, and test production staff implement this response type. The following will provide a few examples describing how an a examinee would interact with the workstation to respond to items having various response type.

Figure 42A:
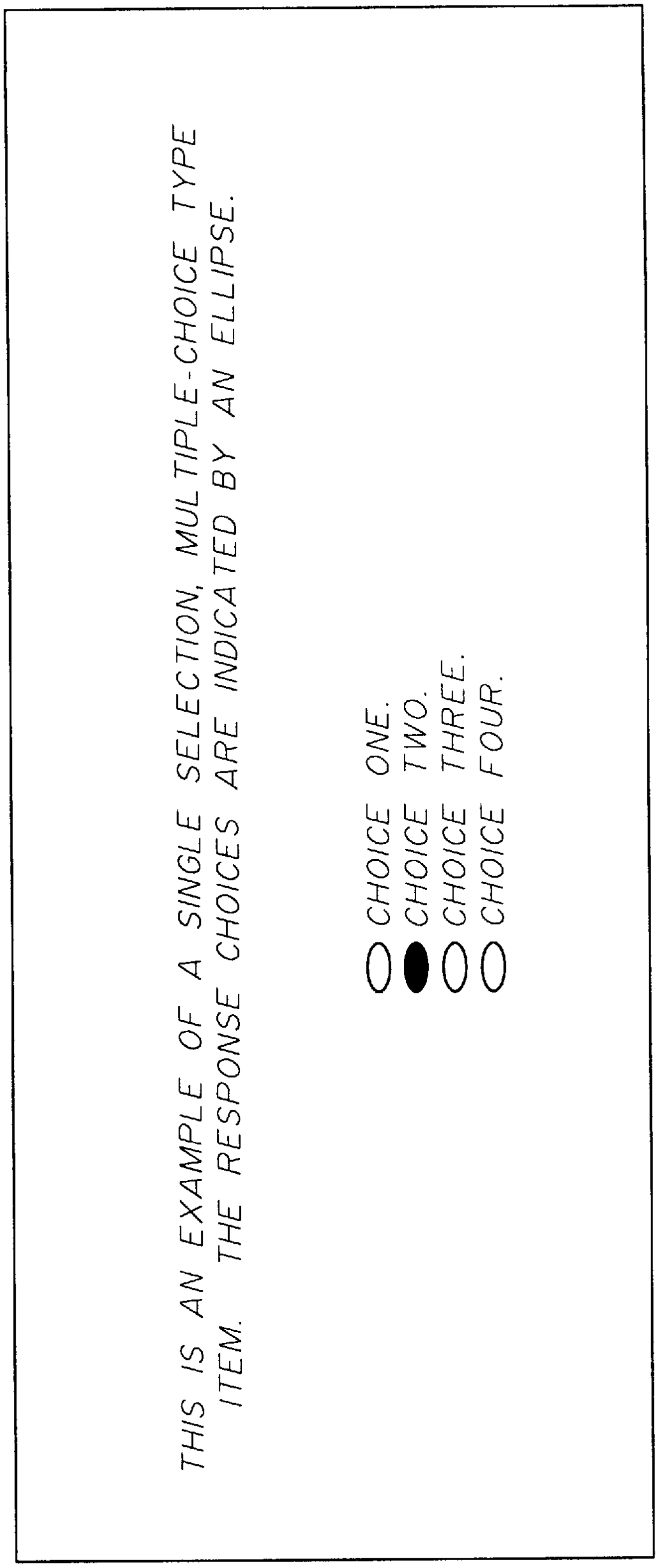
FIGS. 42(*a*)–(*b*), 43, 44(*a*)–(*c*), 45–47 provide some examples of examinee interaction with items having various response types.
Figure 42B:
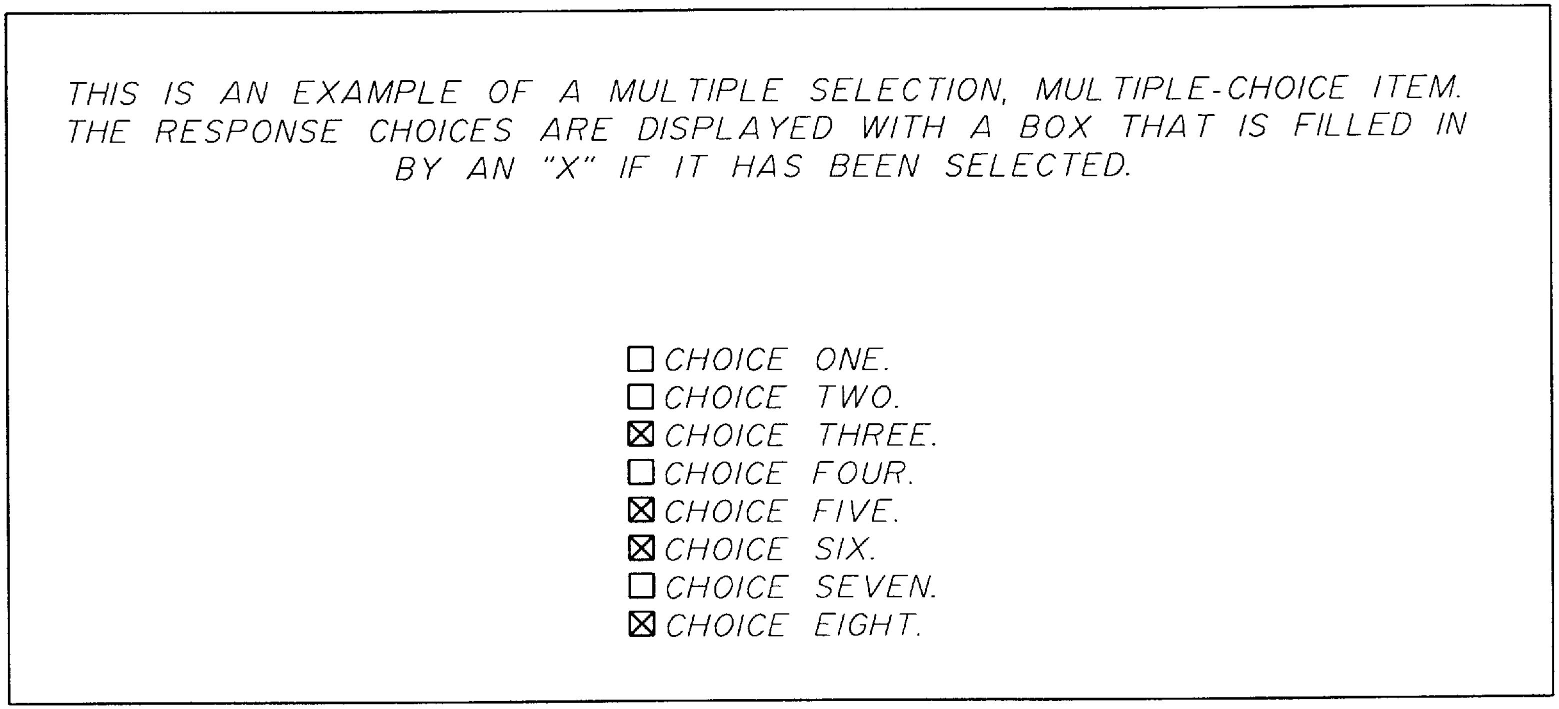

One of the most common response types is multiple choice. According to the present invention, multiple choice may be implemented by requesting that the examinee select one or more choices from a list of choices presented to the examinee or request that the examinee highlight one or more of the choices. If an indicator is presented along with each listed choice, the examinee is requested to select the indicator associated with the choice which the examinee desires to select. It should be understood that numerous variations of indicators are possible, e.g. ovals, ellipses, semi-circles, etc. To select the indicator using the workstation described above, the examinee moves the mouse until the cursor is positioned on the indicator that the examinee wishes to select. Then, the examinee depresses a button on the mouse causing the oval to be darkened. It also should be understood that the indicator could be marked by displaying an "X," check mark or any other appropriate designation. FIG. 42(*a*) is an example of the use of oval indicators in which "choice two" was selected by the examinee. FIG. 42(*b*) shows the choices that are selected by the examinee. The selected choices have an "x" placed in the indicator box which is located next to each corresponding response.

Figure 43:
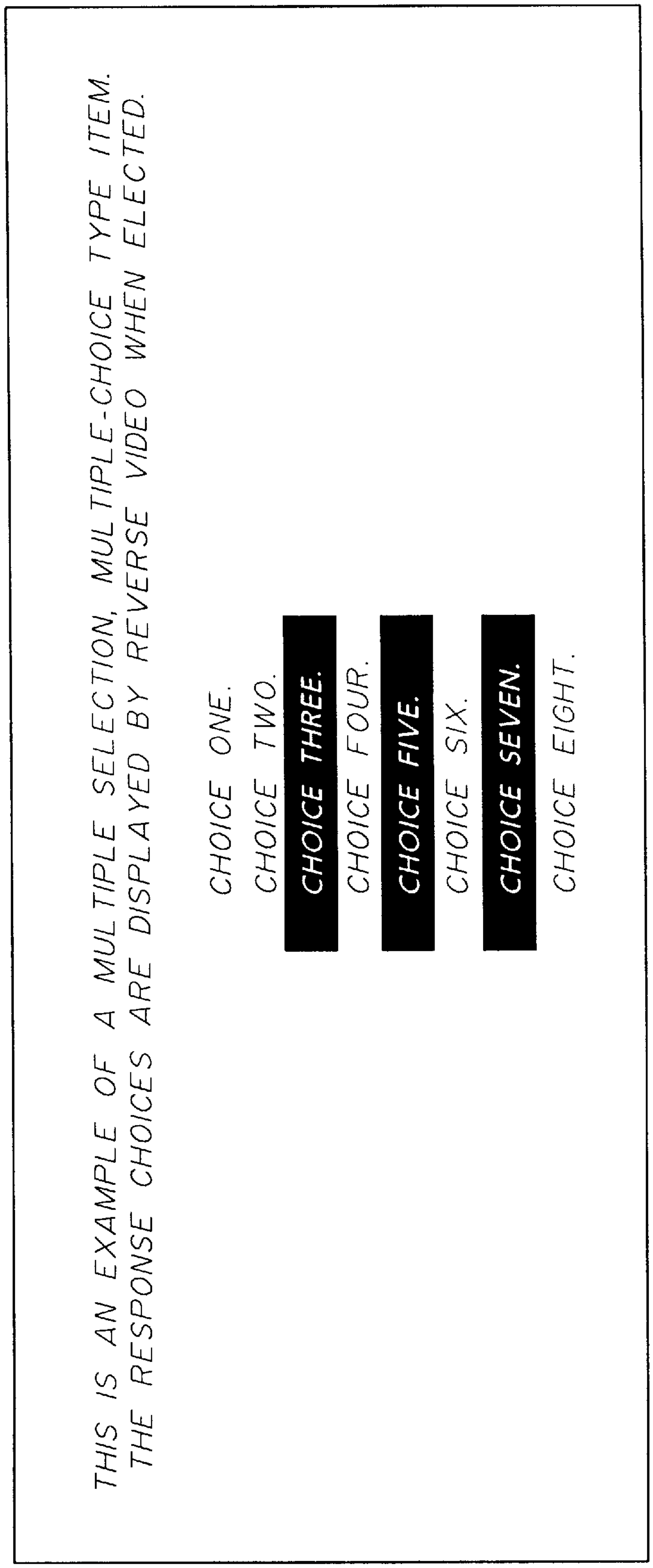

Alternatively, if the examinee is requested to select one or more choices by highlighting, the examinee places the cursor on each desired choice by moving the mouse accordingly, and then depressing a button on the mouse. The selected choices are then highlighted by reverse video as shown in FIG. 43.

Figure 44A:
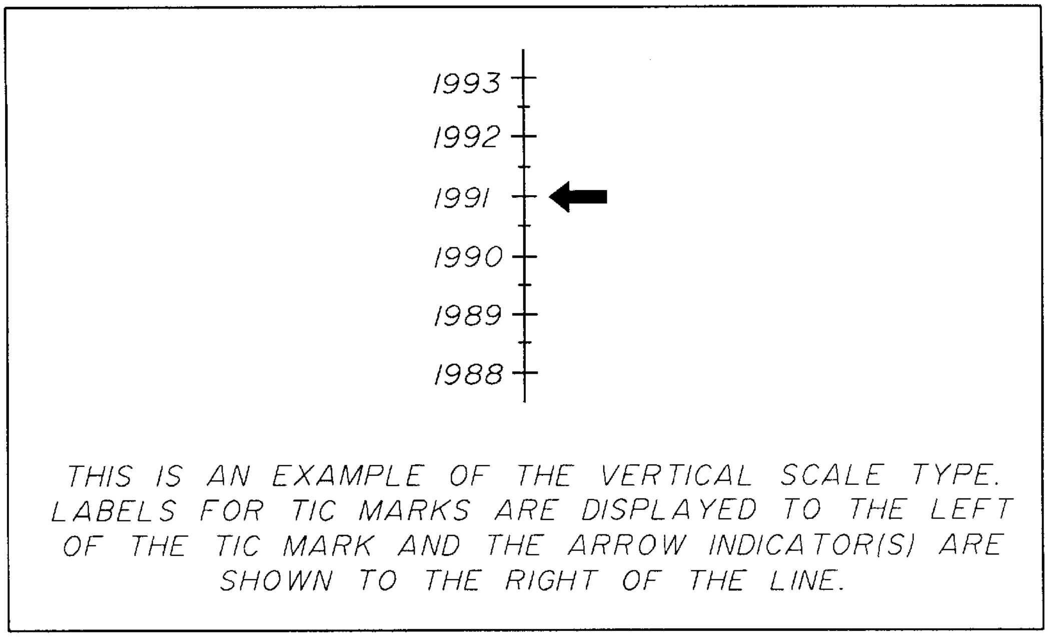
Figure 44B:
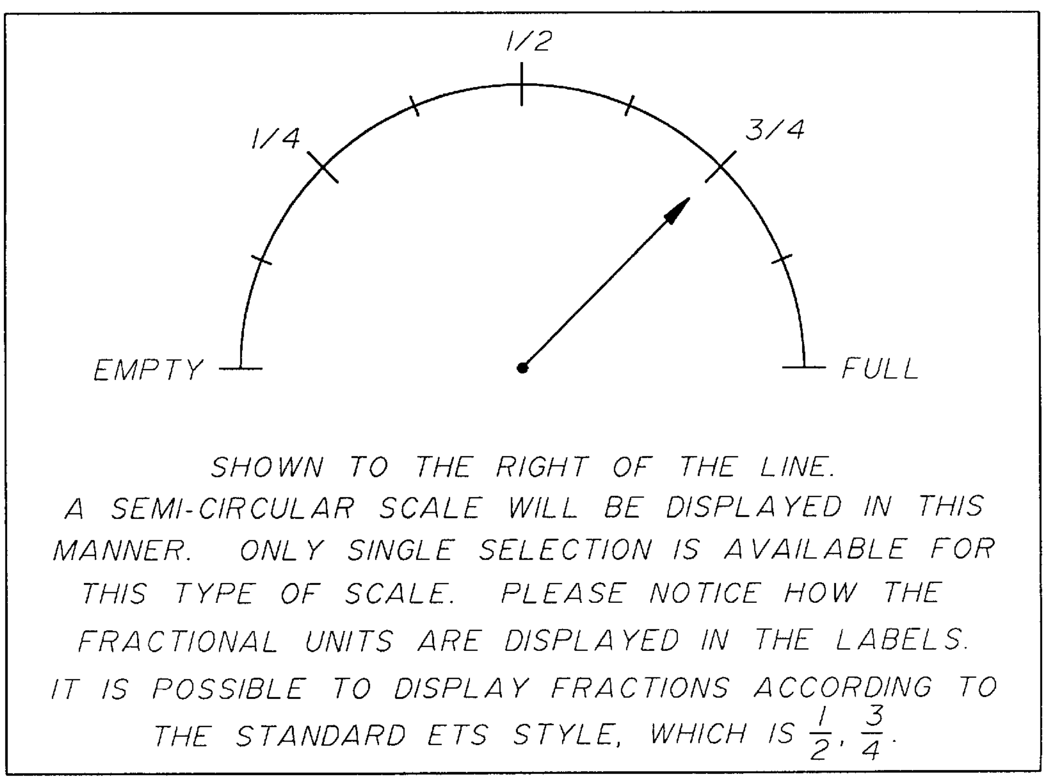
Figure 44C:
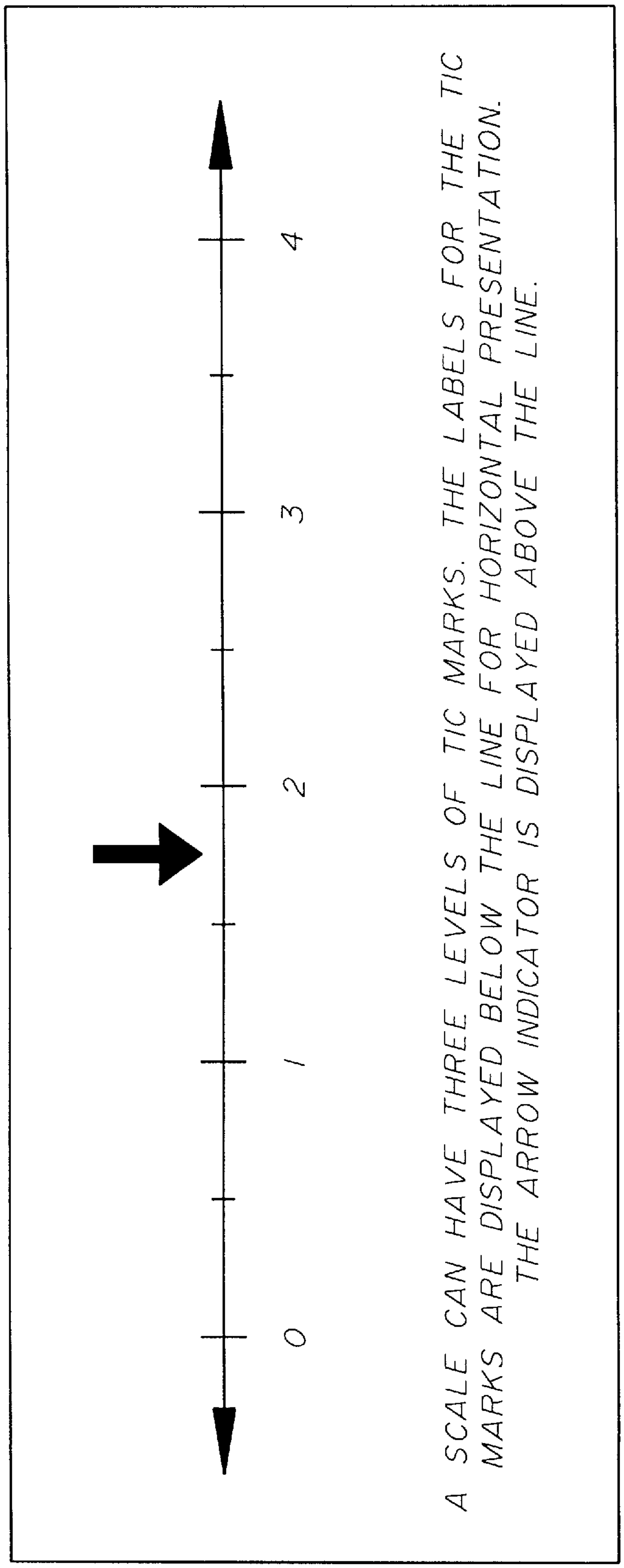
Figure 45:
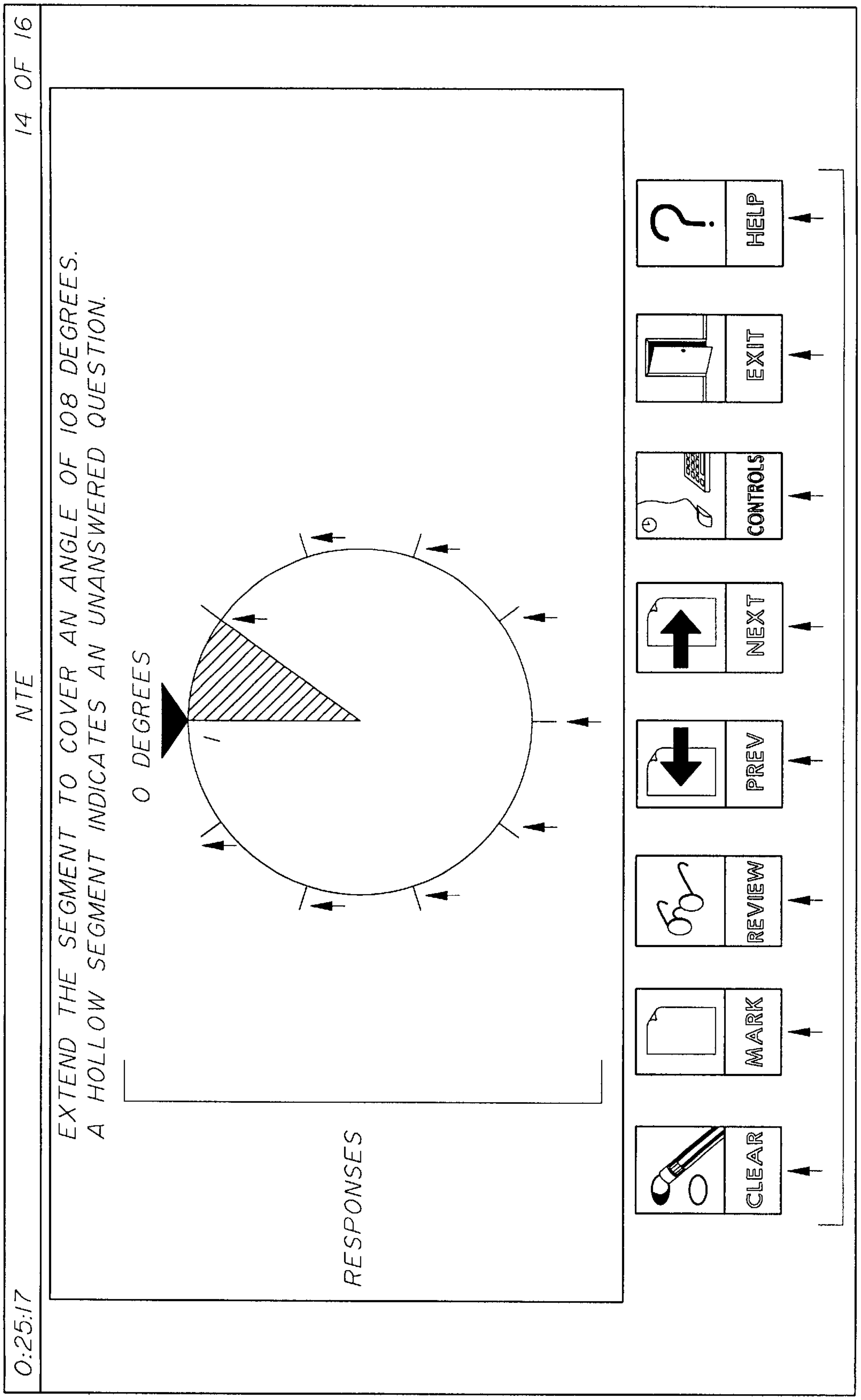

Another response type supported by the CBT system is the selection of a choice or choices on a scale presented to the examinee with an item. Examples of possible scales include horizontal, vertical, semi-circular and circular number lines. The number lines typically are accompanied by markings with a numeric value displayed adjacent to some of the markings. The examinee can respond to an item that references such a scale by placing an arrow at a location adjacent to the scale or by filling in a desired portion for a circular scale. For example, refer to FIGS. 44(*a*), (*b*), and (*c*) illustrating the placement of an arrow. To place the arrow at the desired location, the examinee moves the mouse until the cursor is on the desired location and then depresses a button on the mouse. If a circular scale such as the one shown in FIG. 45 is used, the examinee can move the cursor via mouse to the portion desired to be filled in and depresses a button on the mouse. The portion is then filled in by reverse video as shown in FIG. 45.

Figure 46:
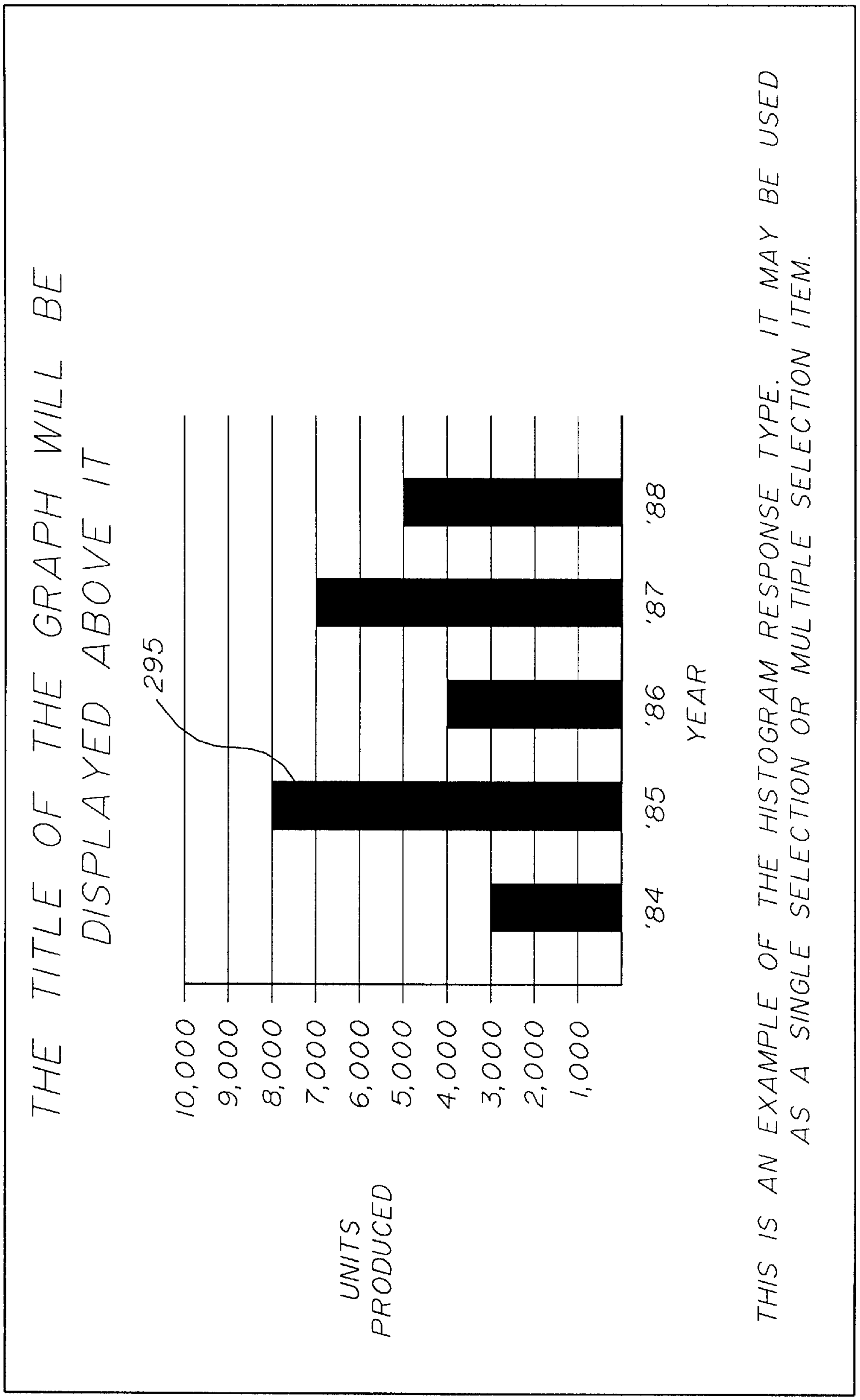

Another response type supported by the CBT system is a bar graph or histogram such as the one shown in FIG. 46. It should be understood that a bar graph is a grid formed by a horizontal axis and vertical axis with tic marks or reference lines demarcating cells. In preferred embodiments, examinees are asked to extend one or more of the bars on the bar graph in response to a question presented. To extend the bars, the examinee clicks on the mouse button after positioning the cursor at the desired location. For instance, assume the examinee is presented the bar graph shown in FIG. 46 without the bar shown for year '85. If the examinee is requested to fill in a bar showing the correct number of units produced in '85, assuming that 8,000 units was the correct answer, when the examinee clicks the mouse at the location indicated at 295, a bar is displayed from the base of the graph to the line corresponding to 8,000 units. Alternatively, one or more movable bars may be displayed. In such a case, the examinee may select one of the bars by clicking the mouse when the cursor is positioned on the bar, moving the cursor to the location where the examinee intends to move the selected bar and then releasing the button.

As described previously, the test developers determine what information should be provided with the bar graph and specify all related parameters. For instance, test developers may specify a title and its placement; the number of bars to be presented or added by the examinee; the size, shape and orientation of the bars; whether the bar is to be movable; the size and orientation of tic marks and reference lines defining the grid; and any grid labels. The test production staff implement these parameters by creating the required graphics and inserting the appropriate custom codes as described in Section II herein. Additionally, test production staff inserts interaction codes in each cell of the grid which specifies whether or not the cell will be selectable by the examinee.

Another response type requires the examinee to order a list of choices into response fields or to match two or more choices to possible response fields. This response type requires a two-step process to respond. First, the examinee must select a choice for placement by pointing and clicking on a choice; the area containing the choices is called the source. Next, the examinee must point and click on the response field in which it should be placed; the area for placement of the selected choice is called the target. Placement will be indicated by copying the selected choice's text/graphics into the target area. Clicking on a target area that has already been used erases that selection.

The test developers specify whether a choice can be used more than once in the item. If the option to prevent multiple use is elected and the test script also elects the explicit prompting option, the examinee will be informed that he or she used a choice more than once and will not be permitted to move off the item until he or she responds as directed.

An insert text response type may also be supported by the CBT system. This response type applies to items in which the examinee is required to insert a block of text (word, sentence, etc.) into a reading passage. In a preferred embodiment, the possible placement positions in the reading passage are indicated with black boxes. Examinees click on the box where they wish to insert the text. When this occurs, the text is duplicated at the selected position in the reading passage on a black background. The test developers specify the possible insertion point, and the test production staff implements such specifications by inserting custom codes into the reference file.

Figure 47:
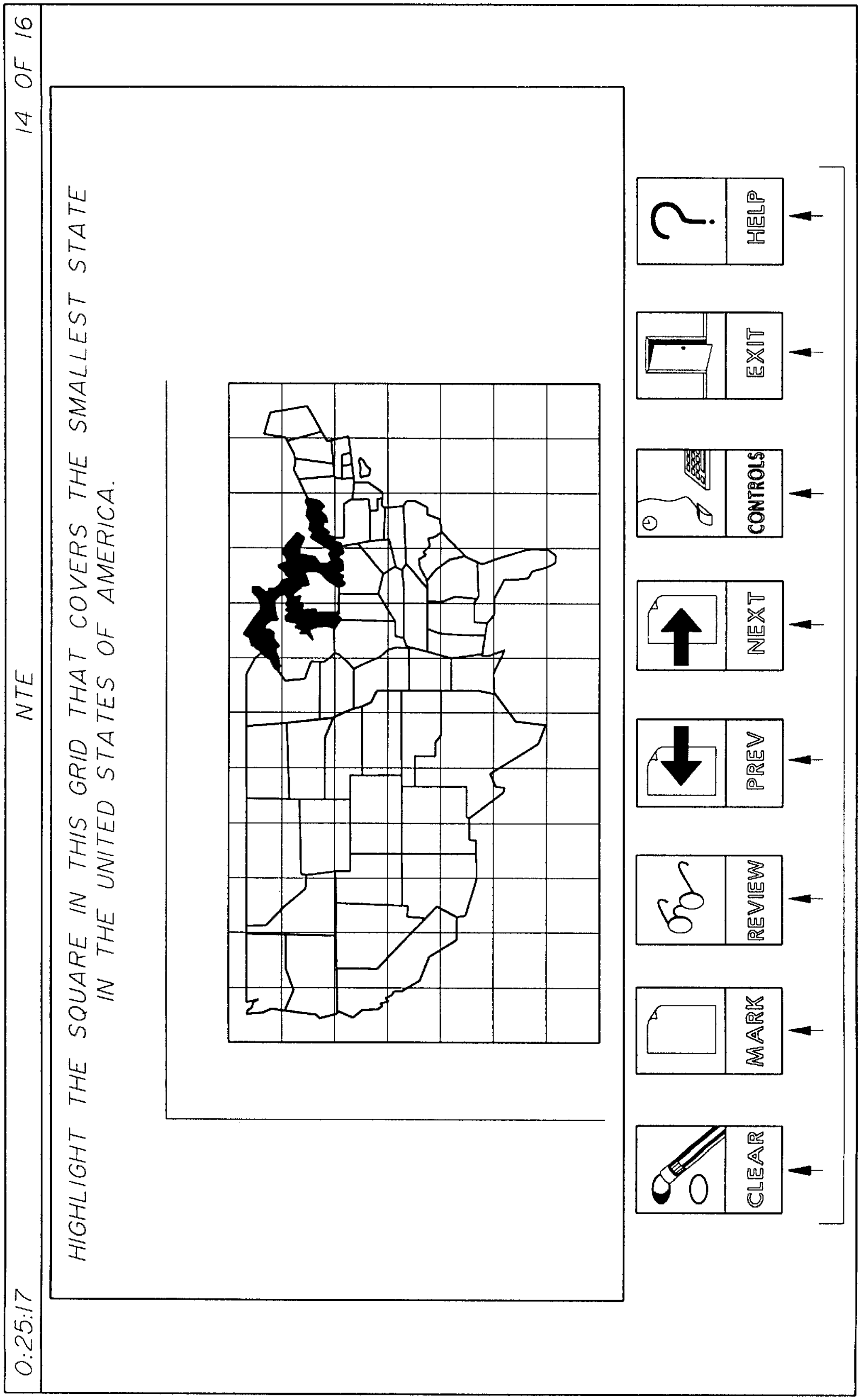

A zone response type may also be supported by the CBT system. In zone response type items, the examinee is required to select choices that are placed at various locations (referred to as zones) on the screen. This response type is most effective when the test developer wants an examinee to select choices such as cities on a map or objects of an illustration. An example is shown in FIG. 47. A map of the United States is displayed with all possible choices. Possible choices may be identifiable by being presented with a rectangular box centered around each selectable choice. A selected choice may be displayed by darkening the entire box by reverse video.

In a numeric entry item, examinees must enter a number to answer the question. Preferably, a box will be provided for the examinee to enter a response. Examinees may enter their answer via the keyboard or by transferring a result from the calculator display if the CALC testing tool is available for the item.

A fraction response type item is one in which the examinee must enter one or two numbers numerator/ denominator). In a preferred embodiment, boxes are provided for the response(s). Examinees preferably first click in one of the two boxes to select it and then enter their answer via the keyboard. Their answer appears in the selected box.

Essay items are also supported by the CBT system. Examinees enter free-form text as if they were using a word processor. Thus, the examinee enters the text via the keyboard.

G. The Examinee Performance File

During the testing session, the test delivery application generates log records which are recorded in an examinee performance file. The examinee performance file is the outside world link to what happened during the examinee's testing session. One performance file is generated for each test session. The performance file is created when the administrative application initiates the examinee sign-on procedure. Each system event thereafter causes a log record to be created and written to the performance file.

Figure 48:
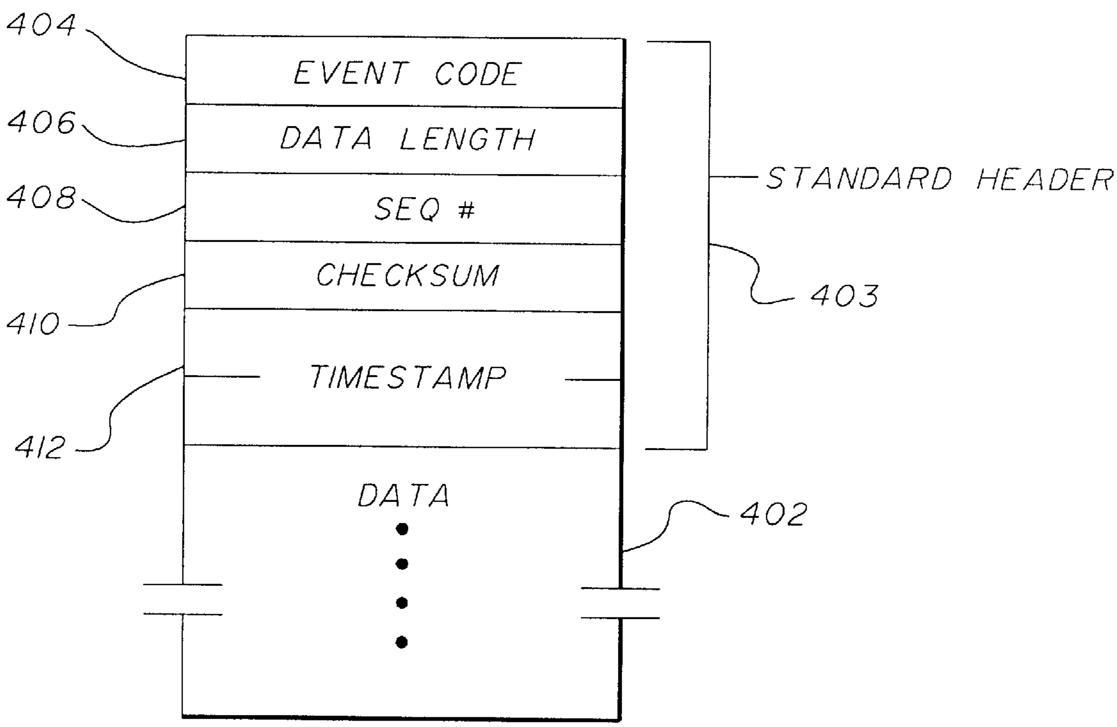
FIG. 48 shows the data format of an examinee performance file according to the present invention.

A preferred structure of the log record is shown in FIG. 48. In this preferred structure, each log record comprises a standard header 400 and a data area 402. The DATA LENGTH field 406 provides the number of bytes contained within the log record. The SEQ# field 408 preferably begins at "1" and increments each time a log record is written to the performance file. The CHECKSUM field 410 provides a checksum value resulting from executing a checksum routine on all of the data fields contained in the log file. The TIMESTAMP field 412 records the time when the log record is written to the performance file.

Examples of events recorded in the examinee performance file are listed in Table 8 below.

TABLE 8

EXAMINEE PERFORMANCE FILE EVENTS

| Event Name | When to Log |
|---|---|
| Start Session | Written after the Administration Application has collected examinee signon data and passed it to the Test Delivery Application to start a test. Must be matched to an End Session event for the log file to be valid. |
| End Session | Written when the last screen of the testing session has been presented or after the session is terminated by the administrator, the examinee or a system error. Must be matched to a Start Session event for the log file to be valid. |
| Restart Session | Written after the 'Restart Test' option has been selected by the administrator. May occur anytime after the Start Session event. |
| Start Tutorial | Written at the start of each tutorial. |
| End Tutorial | Written at the completion of each tutorial. |
| Start Section | Written at the start of a Delivery Unit in the test script. Must be matched to a corresponding End Section log record. |
| End Section | Written at the end of a Delivery Unit. Must be matched to a corresponding Start Section log record. |
| Start Item | Written when the system moves onto the item itself. Only valid when it lies between a Start and End Section record. |
| End Item | Written when the TDA determined that a different screen is to replace a currently displayed item screen. The examinee initiates this movement by selecting the PREV, NEXT, REVIEW, EXIT or QUIT icons. Additionally, an item screen will be exited from when time expires. Always paired with a Start Item record. The last log record in the file for an item contains the examinee's final response choices for that item. The count of log records for an item determines the number of times the item was visited. No log record means the item was not visited. |

TABLE 8-continued

| EXAMINEE PERFORMANCE FILE EVENTS | |
|---|---|
| Event Name | When to Log |
| Calculator | Written when the examinee toggles the calculator on via the CALC Testing Tool. |
| Start Help | Written when the examinee invokes Help. When this event appears between Start and End Item records, it means Help was entered from an item screen. When this event appears after a Start Section but before the first Start Item record of the section, Help was entered from a directions screen. |
| End Help | Written when the examinee exits from Help. |
| Start Break | Written when the TDA initiates a scheduled break. |
| End Break | Written when a break ends, which is defined as any of the following: 1) the examinee elects not to take a break, 2) examinee takes the break and returns either on time or over time, or 3) the break is terminated by the supervisor or a system error. |

Each event is preferably assigned an event code which is written in the EVENT CODE field 404 of the header 400. The data fields written in the data area 402 vary depending on the event being recorded. Thus, the event code is used to identify the data fields written in the data area 402 of the log record. Other events that can be recorded in the examinee performance file include Start/End General Information Screen, Start/End Review, Start/End Directions, or Start/End Scoring and Reporting Unit.

Center code is a code which uniquely identifies the test center where the examinee is taking the test.

Figure 49:
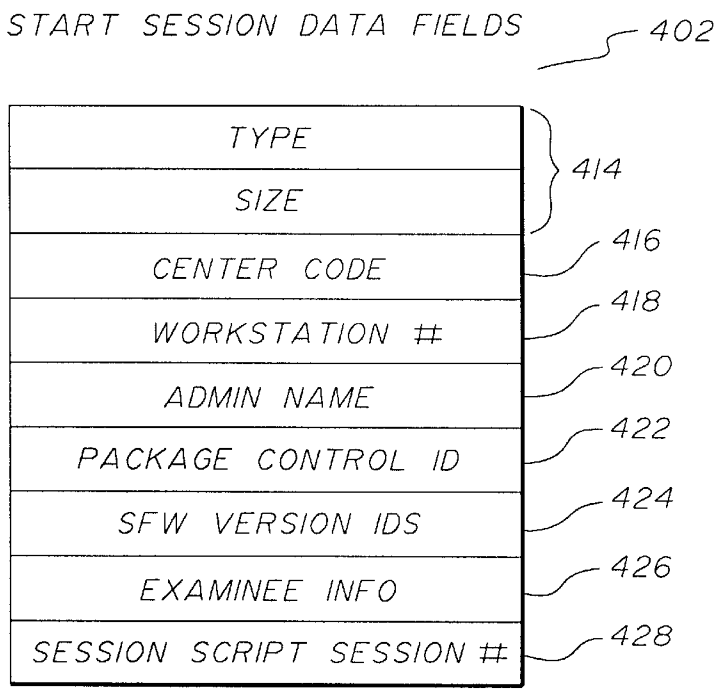
FIG. 49 shows possible data fields associated with the "Start Session" log event.

The data fields of the Start session event data area 402 are shown in FIG. 49. In a preferred embodiment, the data fields comprise two header field 414 and a number of data fields 416, 418, 420, 422, 424, 426 and 428. The Center Code field 416 identifies the test center. The Workstation # field 418 uniquely identifies a workstation at the test center on which the test is delivered to the examinee. The Administrator Name field 420 specifies the administrator who performs the sign-on procedure and initiates the test delivery application. The package control id 422 identifies the current version of the testing program's package, and the software versions 424 identify the versions of Score Key Management, Administrative, and Test Delivery software used for the testing session. This information is used in the event an examinee session must be duplicated, for example, to reproduce a system error. The examinee information 426 may vary for different testing programs. It typically includes a registration id, the examinee's name, date of birth, social security number, and indicators if the examinee walked into the center without scheduling an appointment or required special testing conditions, for example due to a physical disability. The session information 428 identifies the session script used for the test. This script may have been selected from a set of session scripts for the test via dynamic runtime selection. It also includes a session number indicative of the number of times a testing session is initiated for an examinee. It the testing session must be restarted, e.g., due to a loss of power, a session number field will be incremented.

The End Session event has one data field having information indicating how the session was ended. For instance, the session could be ended via QUIT icon selection, by test center administrator interaction, or by a system failure or restart.

Several events do not require any data fields. These events include the Restart Session event, the end tutorial event, the calculator events, the start and end HELP events, and the start break event. The timestamps recorded in the header 400 of a log record created upon one of these events is sufficient to convey all of the required information needed by the postprocessing system.

Figure 50:
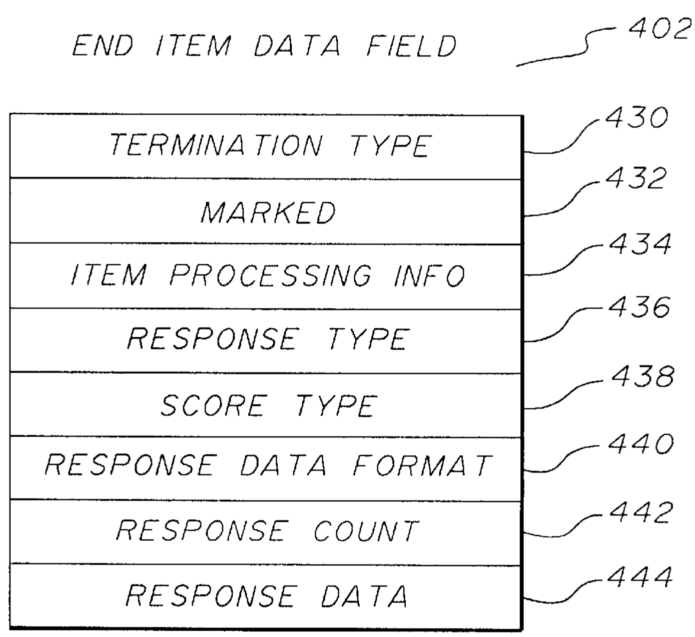
FIG. 50 shows possible data fields associated with the "End Item" log event.

The item number of each item as it is presented to the examinee is recorded in a log record upon each start item event. When the examinee responds to an item and moves to the next screen, data is written to an end item event log record. The data fields provided by a log record created upon the End Item event are shown in FIG. 50.

The termination type field 430 identifies how the end item event occurred. Some possible mechanisms for terminating delivery or presentation of an item include, moving to another screen via NEXT or PREV icons, moving to a different item via the REVIEW facility, or by any of the means used to terminate a testing session (e.g., EXIT, QUIT, etc.). The "Marked" field 432 provides information indicative of whether or not the examinee marked the item before moving to a different item or screen. The "item processing information" field 434 provides the number of times an examinee has clicked a mouse button during the item visit, the computer working time elapsed while the item was being displayed, and the seconds remaining in the test at the point of the End Item event. The "response type" field 436 provides a value indicative of the response type associated with the item. The "score type" field 438 provides a value indicating the scoring rule associated with the item.

The next three fields of the data area 402 of the end item log file relate to the examinees selected responses. In a preferred embodiment, two types of response data can be provided. The first type refers to response types for which the examinee is instructed to select at least one response or move or alter features presented to the examinee. The second type of response data relates to items having a free response type, such as a numeric response. The "response data format" field 440 indicates which response data type the response data is stored in the log record. This field may also indicate that no response data was provided. The "response count" field 442 provides a value indicating the number of times the response data is repeated. The "response data" field 444 provides the examinee's response or responses. Table 9 below explains a preferred format of the "response data" field 444 when the item has the first response data type. If an item has the second response data type then the examinee's entered response is stored in the "response data" field 444.

TABLE 9

| RESPONSE DATA FORMAT | |
|---|---|
| Response Type | Description of Data |
| Multiple Choice | The examinee's selections are stored as 0 through n-1 where n is the number of selections. For example, if the examinee selects the 3rd selection for his answer, the number 2 would be stored. If there is more than 1 selection, then an array of integers will be stored in the above format. |
| Scale | Data indicates a selection on the scale chosen by the examinee. The examinee's selections are stored as 0 through n-1 where n is the number |

TABLE 9-continued

RESPONSE DATA FORMAT

| Response Type | Description of Data |
|---|---|
| | of selections. For example, if the examinee selects the 5th tic mark on the scale for his answer, the number 4 would be stored. If there is more than 1 selection, then an array of integers will be stored in the above format. |
| Bar/Histogram | Identifies a selection on the bar scale selected by the examinee. The examinee's selections are stored as 1 through n where n is the number of selections. If the selection is 0, then the bar was not moved by the examinee. In multi-bar responses, the first value is the selection chosen for the first bar, the second is for the second bar, etc. |
| Grid/Table | Identifies a cell in a row/column matrix chosen by the examinee. Cells are numbered 0 through n-1. If there is more than 1 selection, then an array of integers can be stored in the above format. Some variations of Grid/Table consider only the number of selections made. For this type of item, use Response Count to obtain the number of cells that were selected. |
| Order/Match | For the examinee, Order/Match entails moving a rectangular area of the screen into an equal-size 'target' area. The 'source' areas are numbered 0, 1, ..., n-1 as in grid/table. This field contains an array of 'm' values, one for each 'target' area. Array elements 0, 1, ..., 'm' are associated with target areas 0, 1, ..., 'm'. A response is recorded by storing 'source' numbers in each of the array elements. Thus, for example, if array element 5 contains a 3, 'source' area 3 was moved to 'target' area 5. An element containing -1 indicates no 'source' area was moved into the 'target'. |
| Insert Text | Identifies the examinee's selection. The examinee's selection is stored as 0 through n-1 where n is the number of selections. |
| Zones | Each value identifies a rectangular area of the screen chosen by the examinee. The examinee's selections are stored as 0 through n-1. If there is more than 1 selection, then an array of integers will be stored in the above format. |

IV. The Test Administration System

A. Functional Overview

An administrative application and various administrative files manipulated by the administrative application make up the administrative system.

Figure 51:
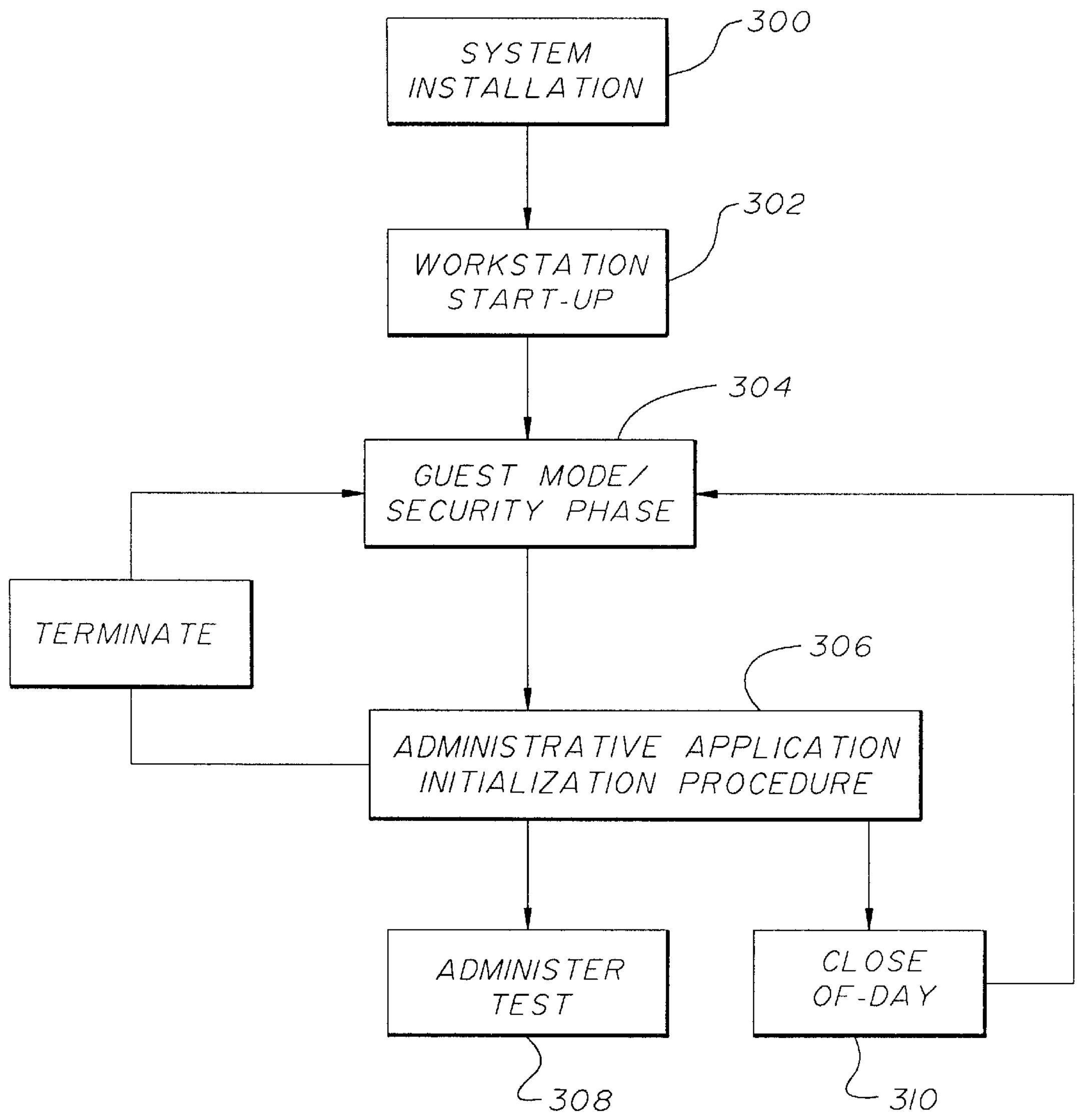
FIG. 51 shows a functional flow diagram of the administrative process according to the present invention.

A functional flow diagram of the functions implemented by the administrative system is shown in FIG. 51. System installation 300 is provided at each workstation on which a test is to be taken. In a preferred embodiment, the administrative application can be run in environments with local area networks of workstations and a server or standalone workstations with hard disk storage devices. In local area network environments, the workstations may have hard disk storage devices or be diskless workstations that store all information on the server. One station in each local area network center is designated the "master" station, from which all the stations in the network are started, closed, and maintained. The computerized tests are thus stored on the hard disk or the server in advance of a scheduled test by the system installation 300.

System installation 300 may be implemented in a number of ways. For instance, the computer test may be transported from the central processing site on floppy disks and loaded by the test administrators or test development staff on the appropriate workstations. Alternatively all or some of these files could be transmitted from the central processing site to the workstations electronically.

Figure 52:
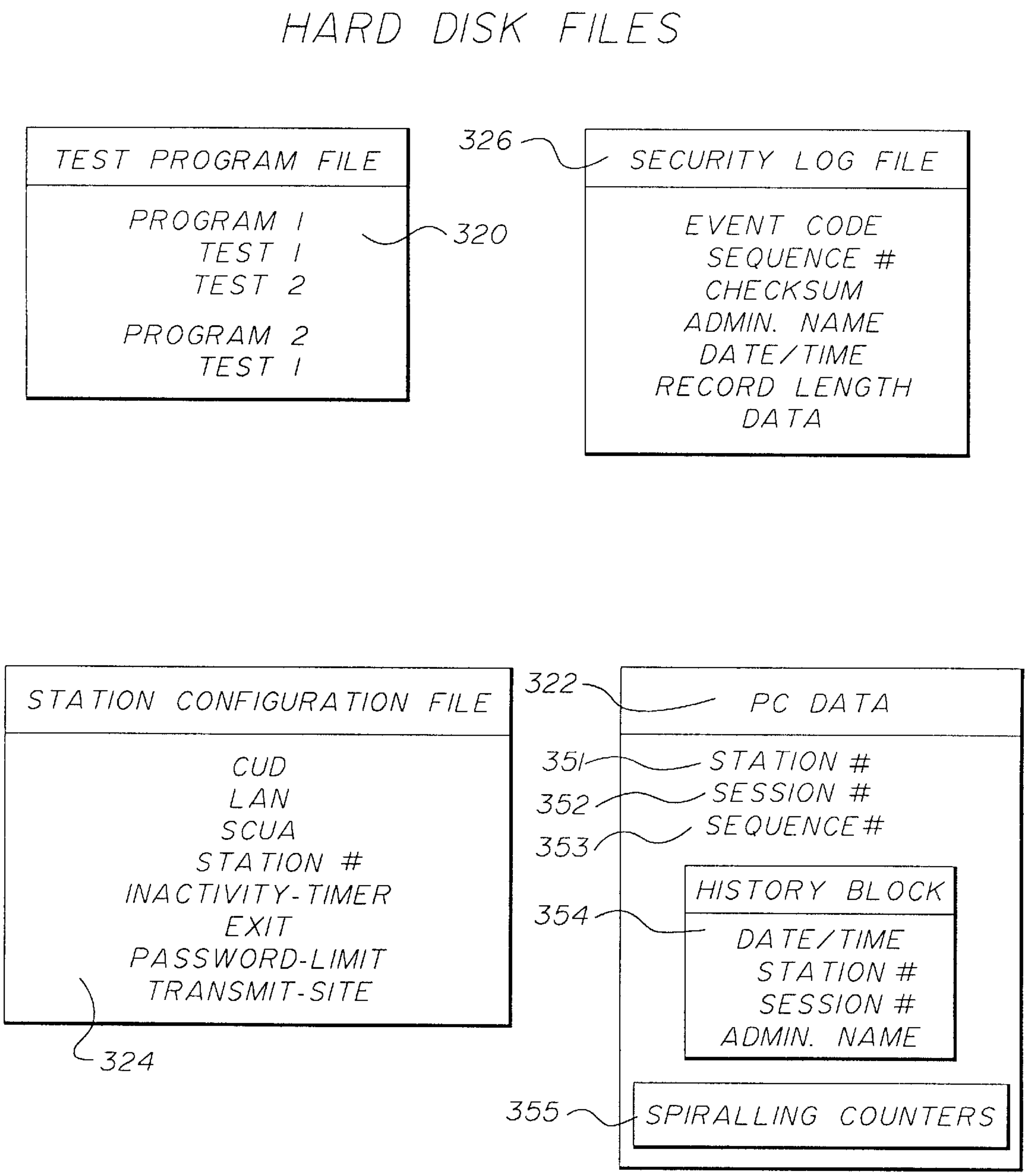
FIG. 52 shows some of the files on a workstation hard disk after it has been configured for computer based testing.

The hard disk of each workstation is preferably configured during installation with at least one test program directory and an administration directory. The files loaded onto the hard disk in the test program directory were described in Section III with reference to FIGS. 29 and 31. FIG. 52 depicts the administrative files which are loaded into each of these directories during installation.

A file for tracking the history of activity on the center's workstations is created at installation in the administrative directory and updated throughout each day the workstation is in use. It will be referred to as PCDATA 322. It is typically a binary formatted file. It includes a workstation number 351, a session number 352, a sequence number 353, a history block 354, and spiralling information counters 355.

The workstation number 351 in PCDATA 322 is a preassigned number given to each workstation, such that each workstation at one test center will have a unique workstation number. The session number 352, starts at zero when PCDATA 322 is created at the time of the installation and is incremented each time the workstation undergoes a cold start. The sequence number is also started at zero and is incremented each time a log record is written to the hard disk. The sequence number is reset each time the session number 352 is incremented. The history block 354 contains information about the last N times the workstation was started, where N can be any integer. Preferably, the history block 354 contains the workstation number 351, session number 352, with a corresponding date/time stamp and the name of the administrator who logged onto the workstation during that session, for each of the previous N sessions. The spiralling information counter 355 is a value used to select test components for a particular CBT when automatic selection, or spiralling, is to be used.

A station configuration file 324 is created at installation in the administrative directory. The stateion configuration file is typically a binary formatted file. Preferably, the station configuration file includes the data elements described below.

| | |
|---|---|
| CUD=Y/N | Declares whether a Center Unique Disc (CUD) is required in order to start this station. |
| LAN=Y/N | Declares whether this station operates in LAN or stand alone mode. 'Y' indicates LAN; 'N' indicates stand alone. |
| SCUA=Y/N | Declares whether the optional security shell is used on the station. |
| STATION#=Y/N | Declares whether the administrator is to be prompted for the external station number during a coldstart. |
| INACTIVITY-TIMER=n | Declares the number of seconds the administrator's screen may remain inactive before it reverts to the system at rest logon screen, the purpose being to prevent |

-continued

| | |
|---|---|
| | access to administrative screens by unauthorized persons. |
| EXIT=Y/N | Declares whether the menu option "Exit" can be invoked prior to invoking the closed of day menu option. If EXIT=Y, both the Exit and Close of Day options will be available at the same time. |
| PASSWORD-LIMIT=n | Declares the number of days a password can be used before the user is required to enter a new password. |
| TRANSMIT-SITE=Y/N | Declares a site to be transmitting site; that is, one that uses electronic transmission rather than disks to return data to ETS. This value is only meaningful if LAN=Y. |

The security log file 326 shown in FIG. 52 is not created or installed during system installation 300. A description of the security log file 326 will therefore, be deferred.

Workstation start-up 302 shown in FIG. 51 occurs when the computer's power is turned on or if someone reboots the computer (i.e., it is well known in DOS to hit CTRL+ALT+DEL). After performing its own software checks and loading procedures, collectively well known as BIOS routines, the computer loads DOS. After completing these tasks, the computer preferably loads and executes a CBT security application. An example of such security software is SCUA, commercially available from Mach II software.

The security phase 304 performs vital system checks of its own. In a preferred embodiment, these checks would include an integrity check and a virus scan. Commercially available software is also well known for providing these functions. If either check fails an error message may be provided on the computer's display monitor and the workstation is rendered inoperable to any user without an authorization code. If no errors are detected, i.e., no file tampering or viruses, the security application configures for "guest mode" operation. In its "guest mode", anyone can use the workstation normally, except the security application will block access to the test program and administrative directories.

The security software also provides three violation counters which are incremented during the security phase 304. The first counter records the number of times an unauthorized person attempts to change directories or drives to any of the directories or drives protected by the security software. The second violation counter records the number of partially successful matches to the secret administration code for initiating the administrative application which will be described in detail below. A third violation counter records any attempts made to access the CBT data from low-level BIOS commands during the workstation start-up procedure 302.

Before beginning the administration application initialization procedure 306, the test administrator preferably logs on to the CBT system. The administrator may be required to key in the secret administration code which is stored on the hard disk or server during system installation. In a preferred embodiment, the security software will request the administrator to also enter a password if the secret administration code was correctly keyed in. Then if both the secret administration code and password, if requested, were entered correctly, the security software starts the administration application initialization procedure 306.

Each test center is preferably supplied with three types of diskettes. Two Center Unique Disks (CUD) are provided to each test center for initiating the administrative application and for providing other necessary files for the operation of the CBT system. A set of data disks are also provided to each test center periodically for storing the examinee performance files, security log files and system error log files which are created by the test delivery and administrative systems and stored on the hard disk or server.

Additionally, backup disks are provided to each test center for backing up data accumulated over a predetermined period of time. The CUD is used in Initialization Administration Application Procedure 306, and the data disks and backup disks are used by the Close-of-Day Procedure 310.

The first step of the Administration Application Initialization Procedure 306 is to interface with the security software. In particular, the administrative application checks security software to determine if it is the proper version. The administrative application then enables or disables appropriate workstation resources such as drives or printers according the CBT files, and obtains the violation counts from the security software. After verifying that the proper version of security software had been installed, the administrative application displays a message to the administrator to insert the center unique disk.

The center unique disk contains three types of files; the key file, the logon file and the security file. The key file contains a unique code assigned to the test center and the test center name. The logon file contains the administrative application logon ID, password, authority level, and the names of each person at the test center authorized to use the CBT system. Authority levels are associated with menu options of the administrative application; preferably no administrator can execute options that require higher authority levels than that assigned his/her login ID in the logon file. The security file contains some portion of code, such as a Dynamic Link Library, that is used by the Test Delivery system. Optimally, the test delivery application cannot be started without the information in the security file on the Center Unique Disk, which prevents unauthorized access to the delivery system.

When the administrator correctly inserts the center unique disk, the key file and security file are copied from the center unique disk to the workstation's hard disk. Assuming these files are successfully copied, the administrator is then prompted to logon by the administration system 14. Then the administrator may enter his or her ID and password which should match the information contained in the logon file. To protect this logon information from being accessed on the center unique disk, the logon file may be hidden and encrypted as is well known.

Once the administrator correctly enters his or her ID and password, the Administration Application Initialization Procedure 306 displays a main menu. The menu provides the administrator with at least three choices; administer test procedure 308, initiate close-of-day procedure 310, or cancel which returns the administrator to the logon screen.

When the administrator selects the Administer a Test Procedure 308, a menu of tests available on the workstation is displayed. The list is provided by the test program file 320 as shown in FIG. 52. The administrator then selects the desired test to be delivered, and provides examinee information, such as name and registration number. The administration system 14 then checks the registration number for conflicts. Conflicts can occur, for example, if the registration number was already entered at the same workstation on the same day or if an Examinee Performance File having the same registration number exists on the workstation's hard disk. If there are no conflicts, a test staging screen is preferably displayed with the Examinee's name and registration number. When the Examinee arrives to take the test, the administrator then enters a code to bring up an examinee confirmation screen.

The examinee confirmation screen presents the name and test information to the examinee. If the examinee confirms that the information is correct, a record indicating that a test was administered is written to a security log file and the test begins as provided by the test delivery system.

If changes to the information are necessary because the information is incorrect, the administrator can enter the special key sequence to bring up an edit screen. Two options are available on this screen, "Proceed" and "Terminate". If the administrator selects "Terminate" the administrative application returns to the main menu. If the administrator selects "Proceed" he/she must enter a valid logon and password and is then presented with an edit screen. Preferably, any of the fields can be changed and a new test may be selected from the edit screen. For example, if the examinee's registration number is incorrect, the administrator can indicate that the number is incorrect and will be prompted to reenter it. The administrative confirmation screen then appears and processing continues as described above.

Figure 53:
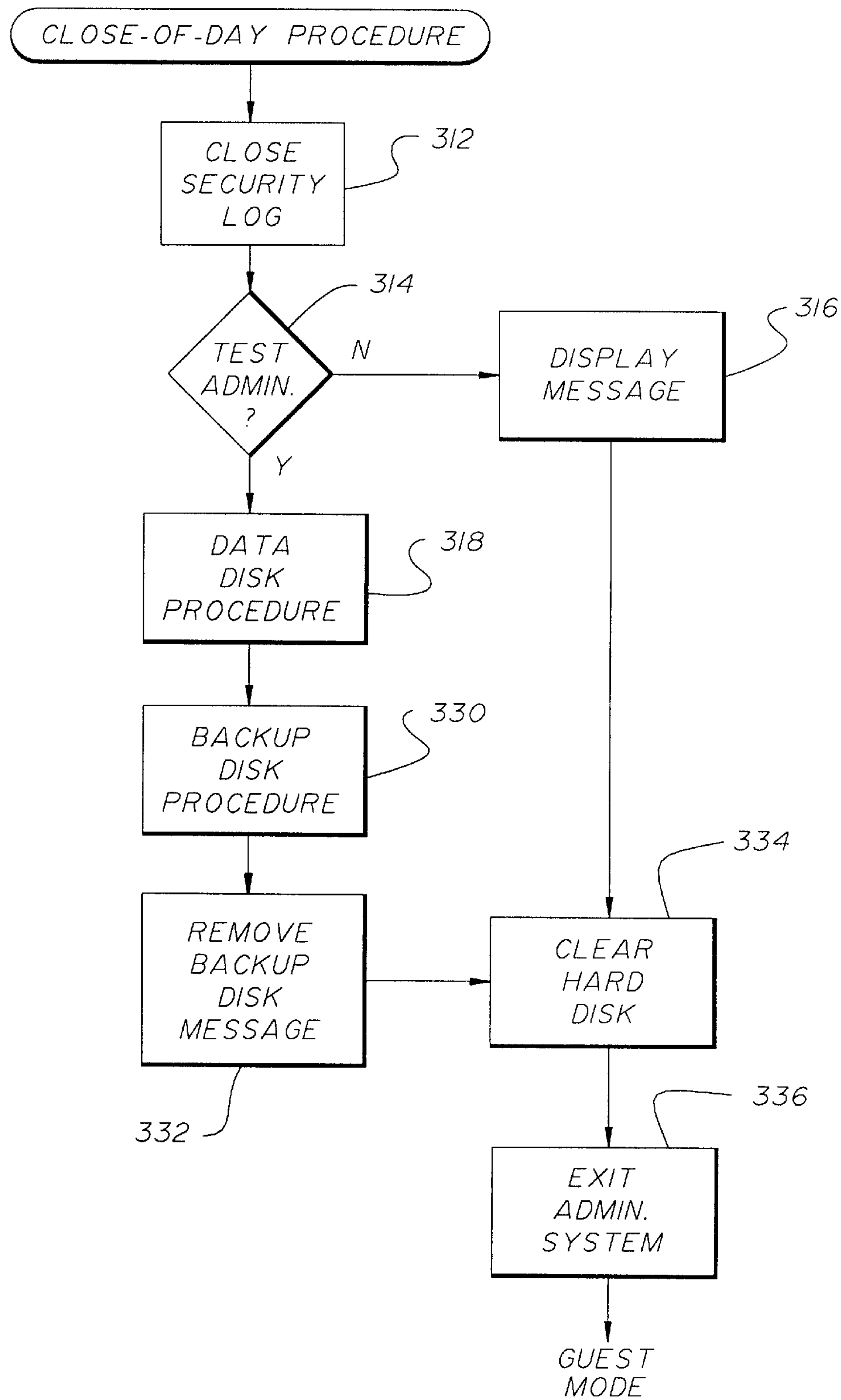
FIG. 53 is a functional flow diagram describing the Close-of-Day Procedure.

The close-the-day procedure 310 in FIG. 51 performs the necessary data transfer, backup and cleanup operations to shut a workstation down for the day. Referring now to FIG. 53, the close-the-day procedure first closes out the Security Log on the workstation's hard disk at 312. The administrative application checks whether tests were administered during the current session at 314. If no tests were administered, a message is displayed at 316 indicating that no copying is required. If tests were administered during the current session, the administrative application then executes the Data Disk Procedure at 318.

The Data Disk Procedure 318 first prompts for insertion of a Data Disk. It then verifies that the inserted diskette is a Data Disk. If an incorrect diskette is inserted, the administrator is again prompted for the Data Disk. This loop continues until the correct diskette is inserted or the workstation is powered down. When the correct diskette is inserted, the security log file, system error log file (if any) and any examinee performance files are copied to the Data Disk. The administrative application preferably checks whether the current Data Disk has enough space for each file before the copy is attempted. If adequate space is not available, the administrator is prompted to insert another Data Disk.

The administrative application then executes the Backup Disk procedure 330. It first prompts for insertion of a Backup Disk. It then verifies that the inserted diskette is a Backup Disk. If an incorrect diskette is inserted, the administrator is again prompted for the Backup Disk. Just like the Data Disk procedure described above, this loop continues until the correct diskette is inserted or the workstation is powered down. When the correct diskette is inserted, the security log file, system error log file (if any) and any examinee performance files are copied to the Backup Disk. Again, the administrative application preferably checks whether the current Backup Disk has enough space for each file before the copy is attempted. If adequate space is not available, the administrator is prompted to insert another Backup Disk.

After the files are copied, a message is displayed at 332 asking the administrator to remove the Backup Disk. Processing, preferably, will not proceed until the administrator removes the disk. The administrative application then deletes substantially all transferred files from the hard disk of the workstation at step 334. The administrative application displays a message informing the administrator that the workstation was successfully closed and can be safely powered down when the DOS prompt appears. To return to DOS, the administrator can, for instance, click on "OK" to dismiss the message and exit the administrative application or the administrative application may be exited automatically. When the administrative application terminates, the administrator is returned to the "guest mode" and the DOS prompt appears.

It should be understood that in addition to the checks made by the administration system described above, it would be well known to provide numerous other checks. Furthermore, any check made by the administration system 14 with an unfavorable result can cause the administration system to terminate and return the workstation to the guest mode. Likewise, it would be well known to provide the administrator with cancel options to return the administrator to the previous procedure or to the guest mode.

B. Security Log File

As stated above, the security log file 326 shown in FIG. 52 is not created or installed during system installation. Preferably, the security log file is created by the administrative system automatically each day and stored on the workstation's hard disk in the administrative directory. Major system events such as security violations detected by the security software, system start up/restart, rejected start up attempts, and initiation of main menu options (e.g. administer a test, close-of-day, or restart a test) are recorded in log records which form the security log file. In order to keep accurate log records of the initiation of system events, administrators preferably log in before executing any administrative menu options or performing other activities that result in log records being written to the security log.

Figure 54:
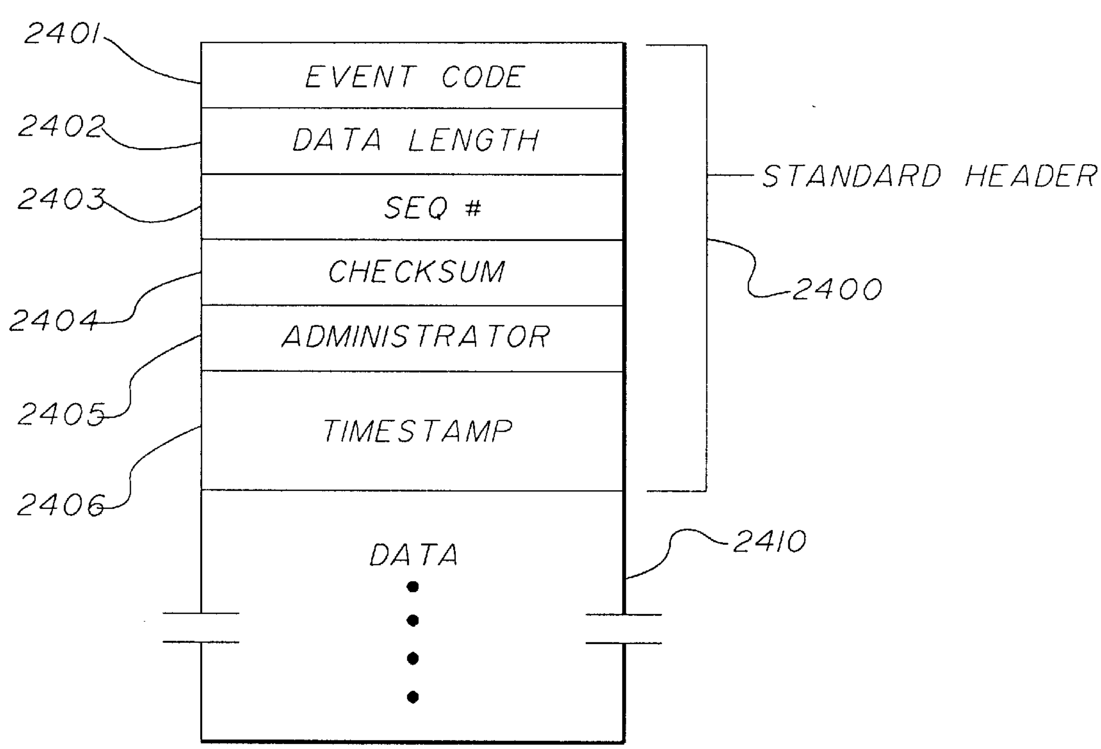
FIG. 54 shows the data format of a log record according to the present invention.

Referring to FIG. 54, one example of the structure of a log record is shown. Generally, each log record has a standard header 400 followed by variable data 410. Specifically, the header may contain the following fields: an EVENT code 401, DATA LENGTH 402, SEQUENCE NUMBER 403, CHECKSUM 404, ADMINISTRATOR 405 and a TIMESTAMP 406. The EVENT CODE field 401 may contain a predetermined code assigned to each event to be recorded in a log file. Table 10 below provides some examples of events which may be recorded by the administrative system in the security log file.

TABLE 10

THE SECURITY LOG FILE

| CODE | EVENT | DESCRIPTION | DATA SUBFIELDS |
|---|---|---|---|
| 1 | Start Log | Written when a new log file is created on the hard disk during a cold start of the system. This is usually the first record in the log file. If a default password was used when the administrator logged on, this fact is recorded. Any non-fatal security violations detected upon start up may also recorded. | Version # - Used to identify the version of the security log software which created the security log file. Station # - Workstation number. Session # - Sequential session number. PC History - Date/time stamp, station #, session # and administrator's name. |
| 2 | Start Accepted | Written after the administrator enters/confirms the station number | Session Start Type - Cold start, restart during Admin. application, |

TABLE 10-continued

THE SECURITY LOG FILE

| CODE | EVENT | DESCRIPTION | DATA SUBFIELDS |
|---|---|---|---|
| | | during system startup. | restart during close of day, restart during testing session. Security Violation Count 1 Security Violation Count 2 Security Violation Count 3 Default Password was used to start session. |
| 3 | Start Rejected | Written after system startup is aborted for any of the following reasons: failure to log on successfully in a fixed number of tries, failure to insert a Center Unique Disk in a fixed number of tries, cancellation of the logon, cancellation of insertion of the Center Unique Disk, cancellation at the point of station number entry/display. | Real Name - Name of Administrator whose password was changed. |
| 5 | Administer Test | Written when the 'Administer A Test' function has been selected from the Main Menu and an examinee has been signed on, just before the tutorials for the testing session are presented. | Package control id - identifies the version of the testing package administered Session script - the session script to be used for the test. |
| 6 | Stop Log | Written when the close-of-day procedure is invoked. | Tests Administered - Whether or not tests were administered during the session. |

The DATA LENGTH field 2402 provides the length of the data in bytes presented in the variable data portion 2410 of the log record. The SEQUENCE NUMBER 2403 begins at 1 and increments each time a log record is written to the hard disk. If the last sequence number does not correspond to a STOP log event, then the security log file may be considered corrupt. A checksum may performed on the data in the log record as is well known and the result stored in the CHECKSUM field 2404. The name of the test center administrator who initiated the event is written to the ADMINISTRATOR field 2405. The TIMESTAMP field 2406 records the time of day that the particular log record was added to the security log file.

The variable data portion 410 of the log record has one or more subfields depending on the event recorded in the log record. Table 10 above additionally lists some subfields recorded for those events listed in the Table.

C. Administrative Application Overview

Referring now to FIGS. 87 to 101F, a detailed description of the software will be described for implementing the administrative application functions as described above.

The administrative application functions are separated into states by the software according to the present invention. Functions are executed by respective state procedures. Each state procedure can preferably process two actions: Execute and End. Execute causes the state procedure to perform the functions associated with the state. End causes the state procedure to perform implementation-dependent activities such as freeing memory or resources or deleting temporary working files prior to transitioning to a new state.

In a preferred embodiment, the states defined for the administrative application and a brief description of each are as follows:

NULL STATE

The Administrative Application is initialized to this state when starting.

ADMIN STATE

This state is in effect during menu processing, the performance of menu functions not associated with system maintenance (MAINT state), close of day (CLOSE state), and the delivery of tests (TDS state).

MAINT STATE

This state is set when the administrator responds affirmatively to the "Do you want to perform maintenance?" query, which is displayed during start up in the NULL state. The state remains in effect, possibly for multiple maintenance updates, until the administrator indicates that maintenance is complete, at which time the system transits to the NULL state.

CLOSE STATE

This state is set when the administrator selects Close-of-Day from the menu. It remains in effect until close of day operations are complete, at which time the system transits to the EXIT state.

TDS STATE

The state is set from the ADMIN state when the Test Delivery Application is to be executed. It remains in effect until the testing session is complete, at which time the system transits to the ADMIN state.

EXIT STATE

This state is set from the ADMIN state, when the administrator selects the Exit menu option, or from the CLOSE state when close of day is complete. It remains in effect until the termination message is acknowledged or expires, at which time the system transitions to the EXITING state.

EXITING STATE

This state is set from the EXIT state. It remains in effect only as long as it takes the system to exit to the operating system.

Figure 55:
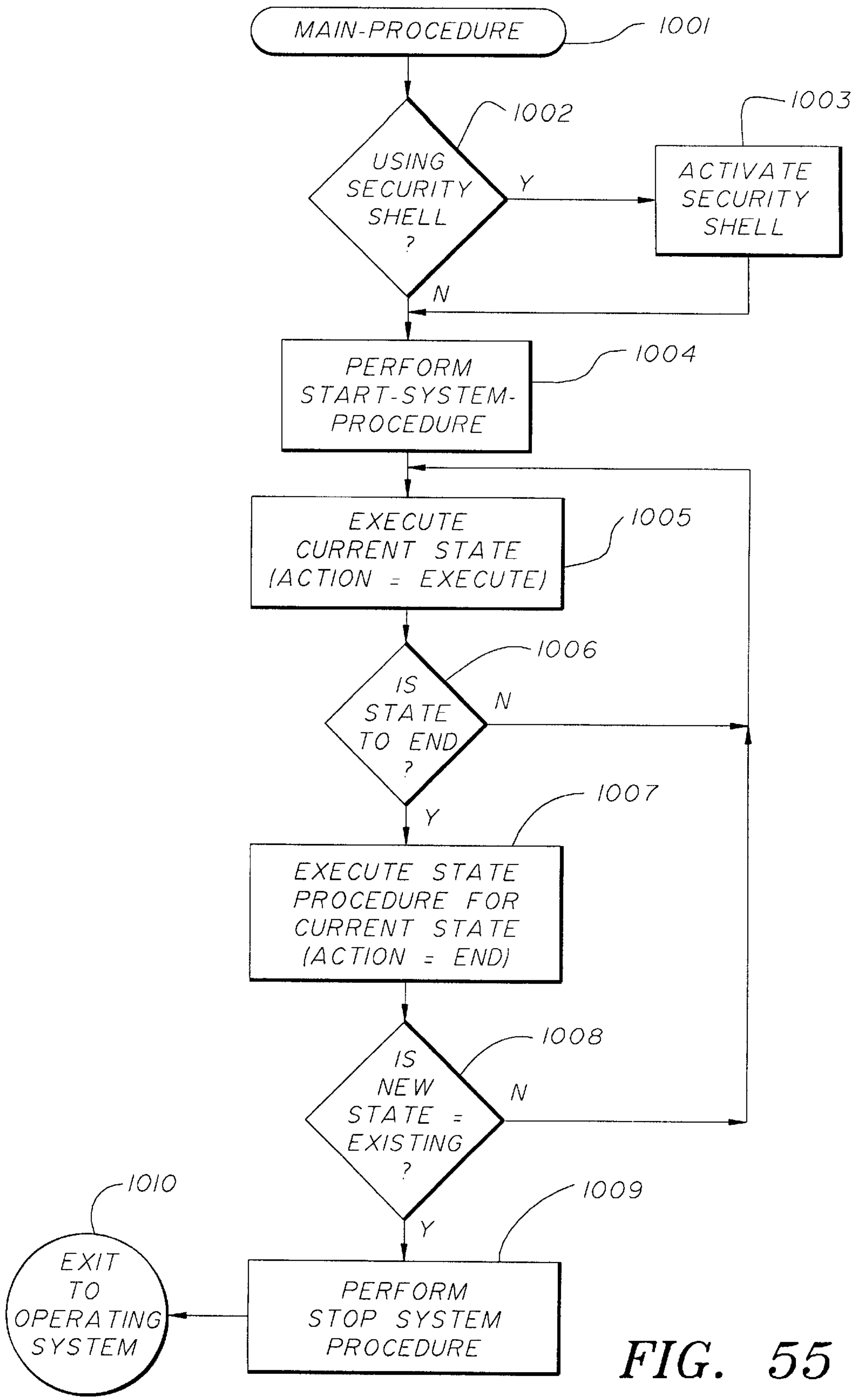
FIG. 55 is a flowchart of the Main_Procedure of the Administrative Application.

The flow of processing in the Administrative Application begins in the Main_Procedure. A flow diagram of the Main-Procedure is shown in FIG. 55. Referring to FIG. 55, the security software may be invoked at 1003, if it is determined by reading a flag in the station configuration file at 1002 that a security application is to be used. Then the Start_System_Procedure 1021 is invoked at 1004. The Start_System_Procedure 1021 will be described below in conjunction with FIGS. 56A and 55B. Generally, however, the Start_System_Procedure 1021 writes the start session record, updates the history file, and performs password processing. When the Start_System_Procedure is completed, the program returns to the Main_Procedure at 1005 invoking the next state procedure corresponding to the current state (i.e., Action is a variable, which defines the action to be taken next and here is set to execute).

After executing the current state procedure, the program returns to the Main_Procedure at 1006. Then it checks return codes or other implementation-dependent mechanisms to determine whether the state procedure has indicated that the state is to end at 1006. If the current state is to end, the state procedure for the current state is executed by setting Action=End. The return value is the next state retrieved from the current state procedure and it is returned by executing the current state procedure at 1007. If the new state is the EXITING state execute the Stop_System_Procedure at 1009 or execute the current state procedure at 1005. After the Stop_System_Procedure 1021 has been executed the application is exited to the operating system at 1010.

1. Start_System_Procedure

Figure 56A:
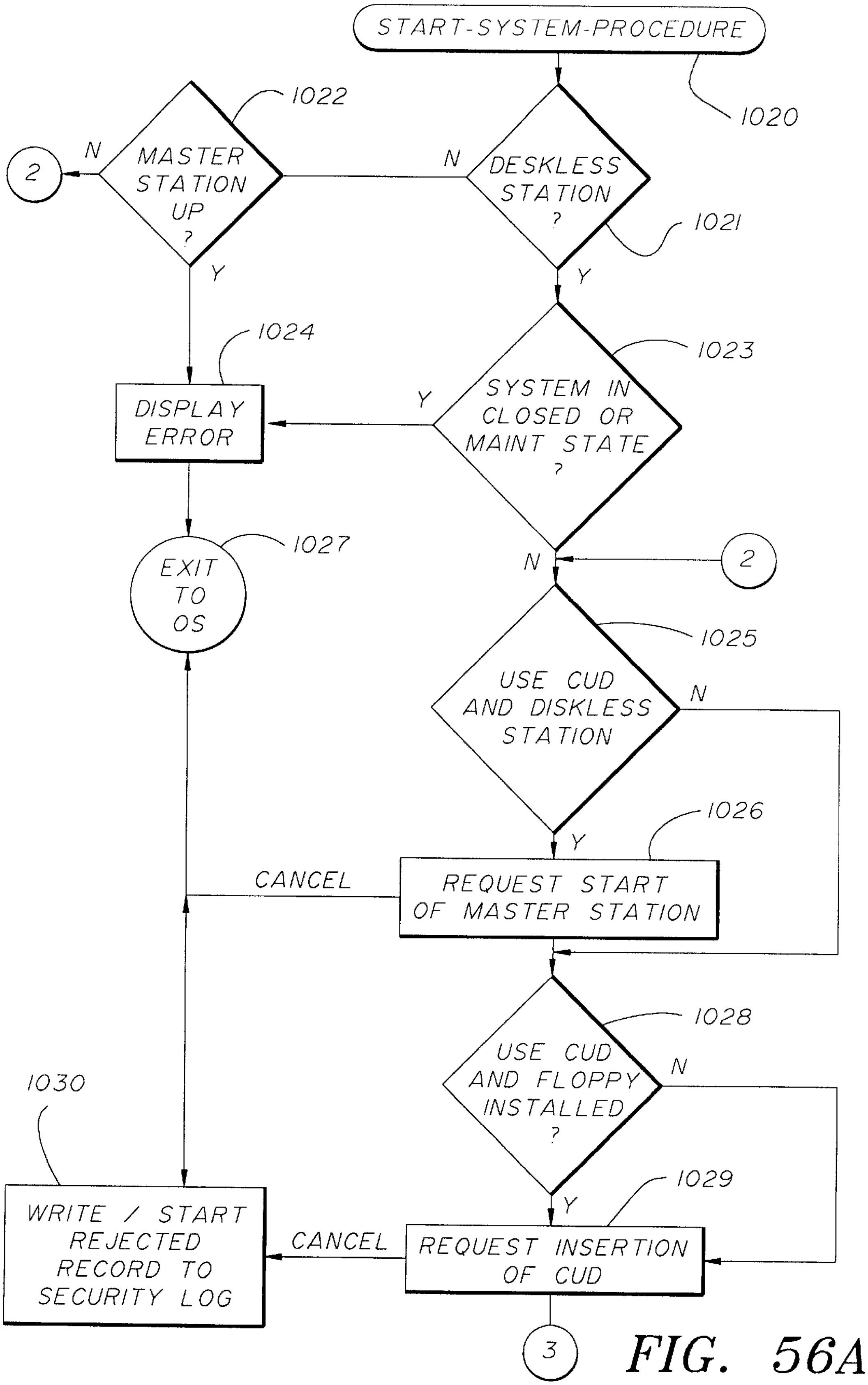
FIGS. 56A and 56B are flowcharts of the Start_System_Procedure of the Administrative Application.
Figure 56B:
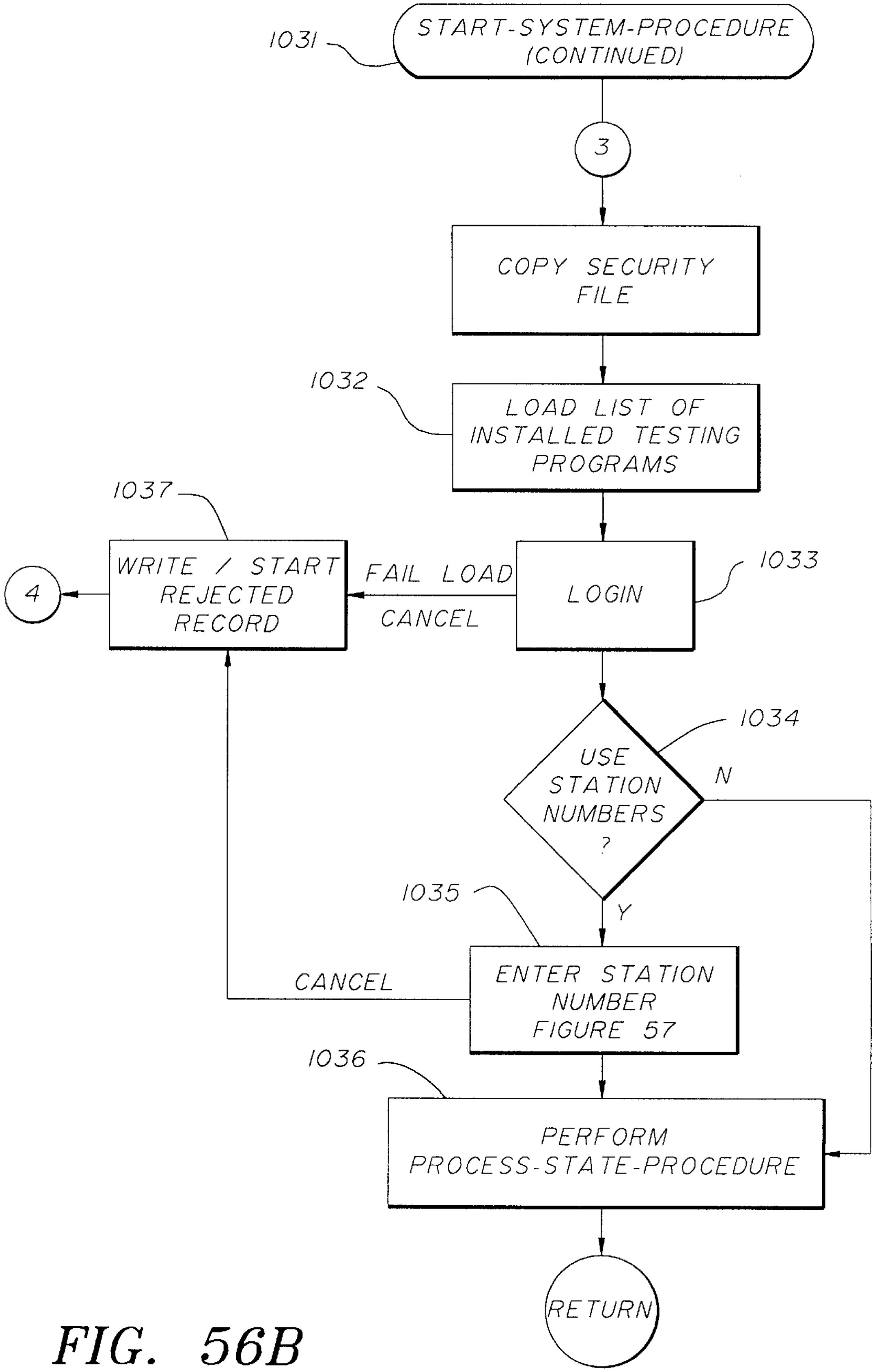

FIGS. 56A and 56B provide a flow diagram of the Start-System-Procedure. If the station is diskless, check whether the system state is CLOSE, XMIT, or MAINT as at 1023, starting the station will interrupt the close or maintenance operation that is in progress so an error message at 1024 is preferably displayed and the procedure exited to the operating system at 1027. Otherwise, the station has a floppy disk, so a check may be made to determine whether the master station is already operating at 1022. If so, this station does not need to be started, so an error message is preferably displayed at 1024 and the procedure is exited to the operating system at 1027.

Load the station configuration file. Check the element that declares whether the Center Unique Disk (CUD) is to be used, and whether this station is diskless. If so, display informative message requesting the start of the master station. Loop displaying the message until the master station is started. If the user cancels, exit to the operating system.

If the CUD is to be used, and this workstation is equipped with a floppy drive as shown at 1028, an instructional message requesting the administrator insert the CUD is displayed at 1029 until a valid CUD is inserted. If the administrator cancels, a Start Rejected record is written to the Security Log File at 1030 (reason =Canceled) and the program exits to the operating system.

If the workstation is a stand-alone system, copy the KEY file, LOGON file, and SECURITY file from the CUD disk to the station's hard disk. If the workstation is in network system, copy the SECURITY file to the server.

After the workstation has been properly configured according to FIG. 56A, the flow diagram of the Start_System_Procedure 1031 continues in FIG. 56B. Referring to FIG. 56B, the list of installed testing programs (see FIG. 52) is automatically loaded onto the workstation's hard disk at 1032. Then the Login_Procedure, which will be described below, may be executed at 1033. If the administrator cancels the Login_Procedure, a Start Rejected (reason=Canceled) record is written at 1037 to the Security Log file and the application exits to the operating system. If the user fails to login within a specified number of tries, a Start Rejected (reason=Login Failure) record is written at 1037 to the Security Log file and the application exits to the operating system.

Figure 57:
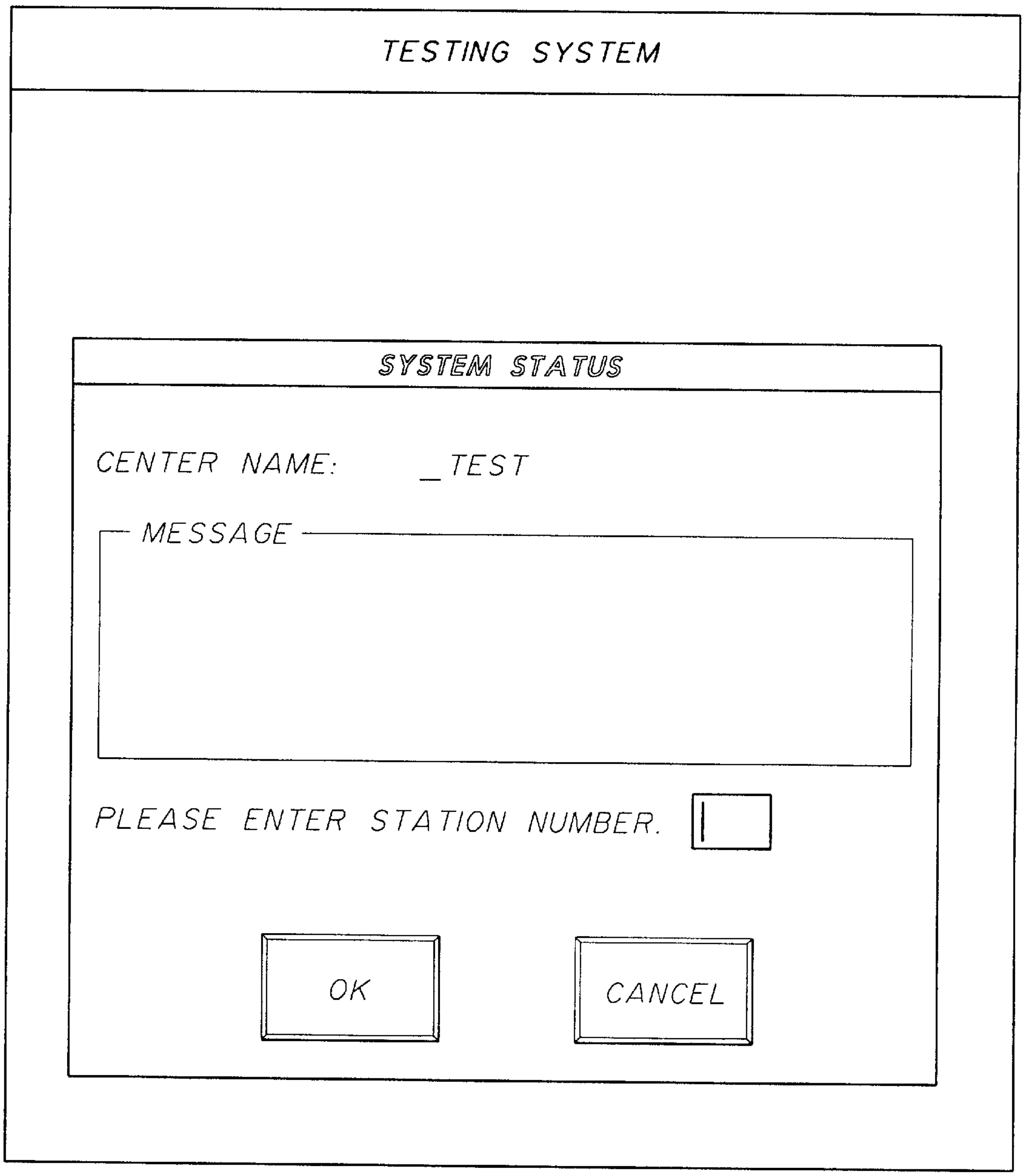
FIG. 57 is an example of a system status screen.

Next the element of the station configuration file that declares whether workstation numbers are to be used is checked at 1034. If workstation numbers are to be used, a screen is displayed requesting the entry of a valid station number at 1035. One example of such a screen is shown in FIG. 57. As shown in FIG. 57, it is preferable to permit the administrator to cancel at this point in the test administration process. If the administrator cancels, a Start Rejected record is written to the Security Log file (reason=Canceled) at 1037 and the application exits to the operating system. Alternatively, if the administrator has input a workstation number at 1035, the current station number is set to the number entered at 1035.

The Process_State_Procedure may then be executed at 1036. Although the Process_Start_Procedure will be described in more detail, it is generally responsible for checking on restart conditions and for allowing the administrator to perform maintenance functions.

2. Login_Procedure

Figure 58:
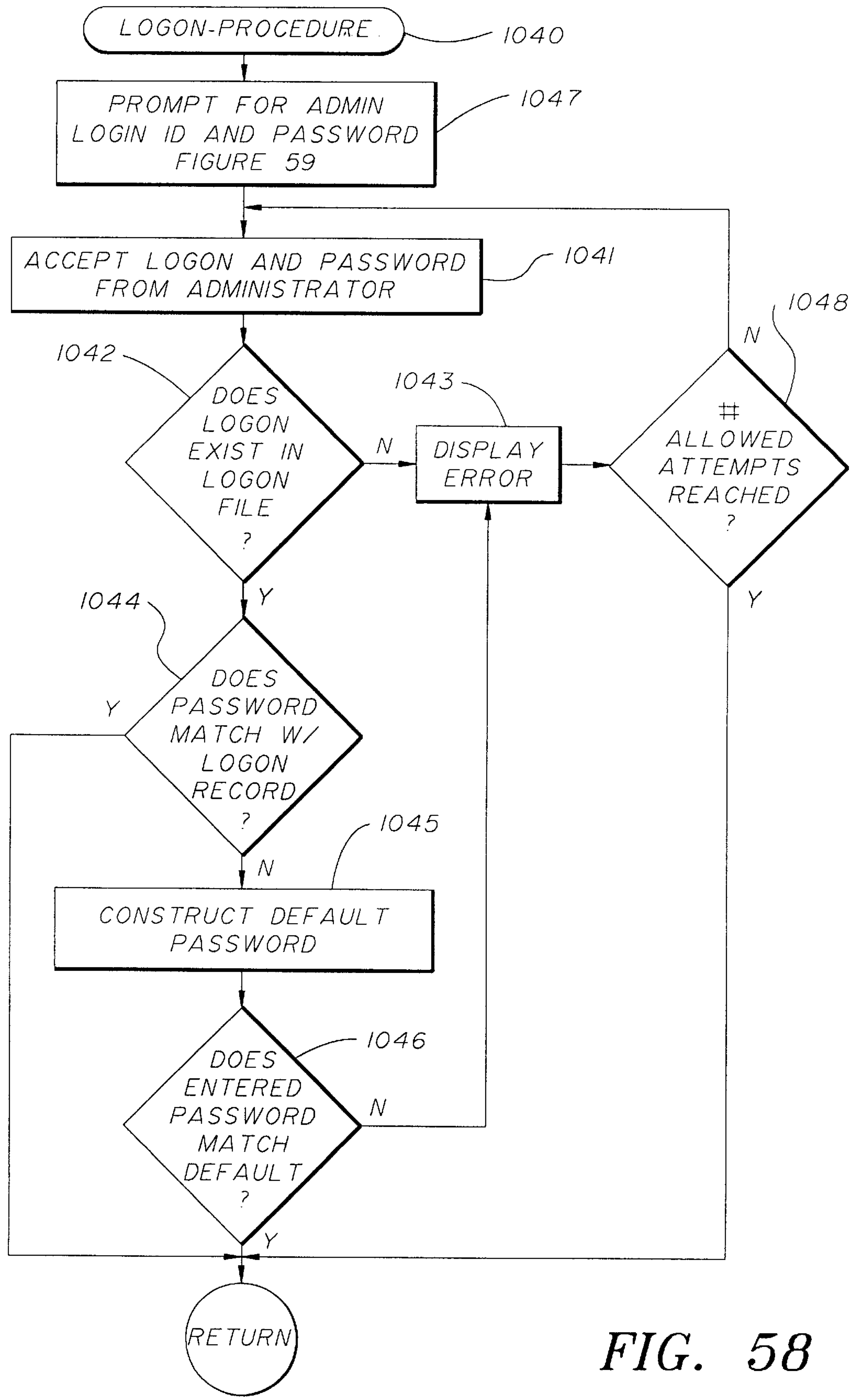
FIG. 58 is a flowchart of the Logon_Procedure of the Administrative Application.
Figure 59:
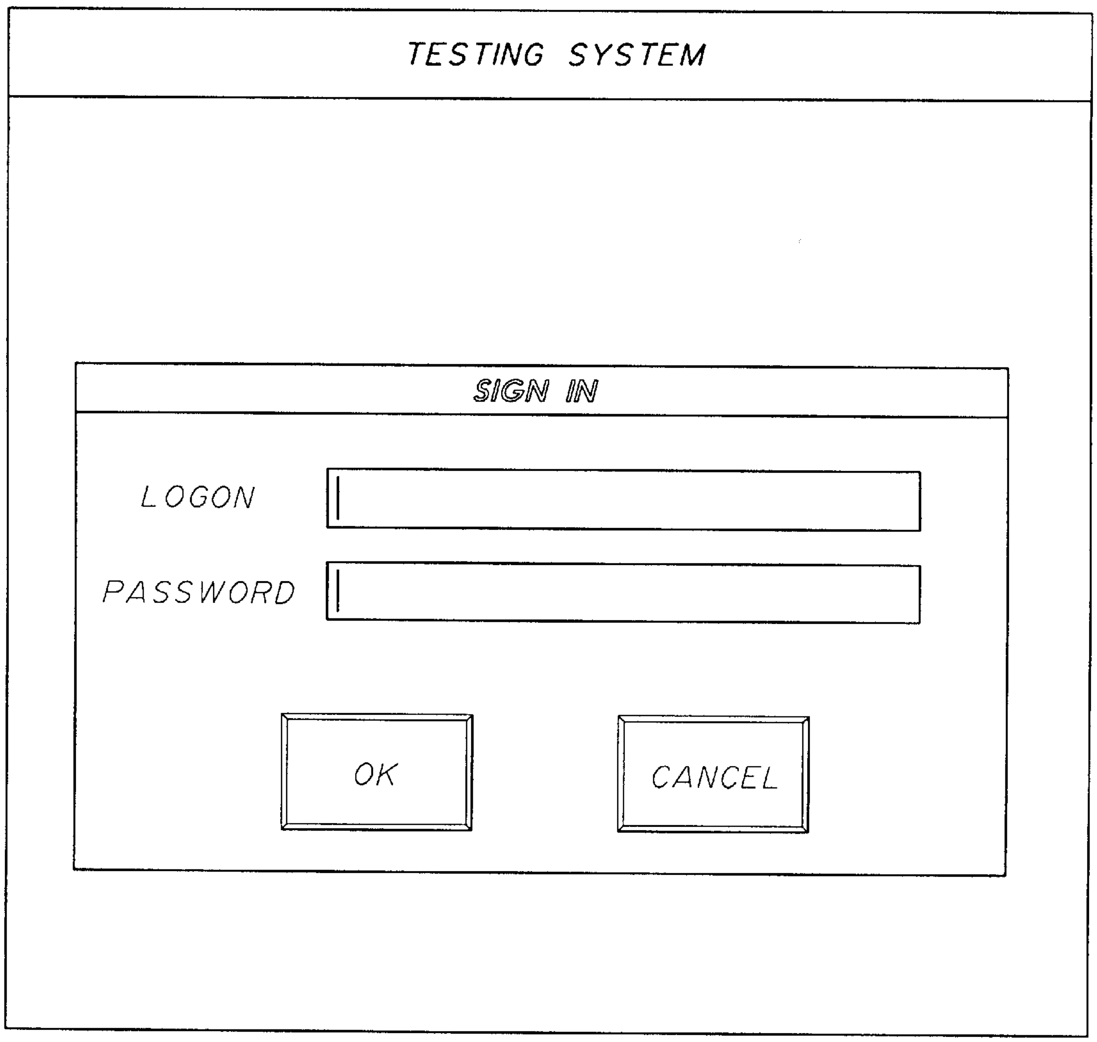
FIG. 59 is an example of a sign-in screen provided by the Administrative Application.
Figure 60:
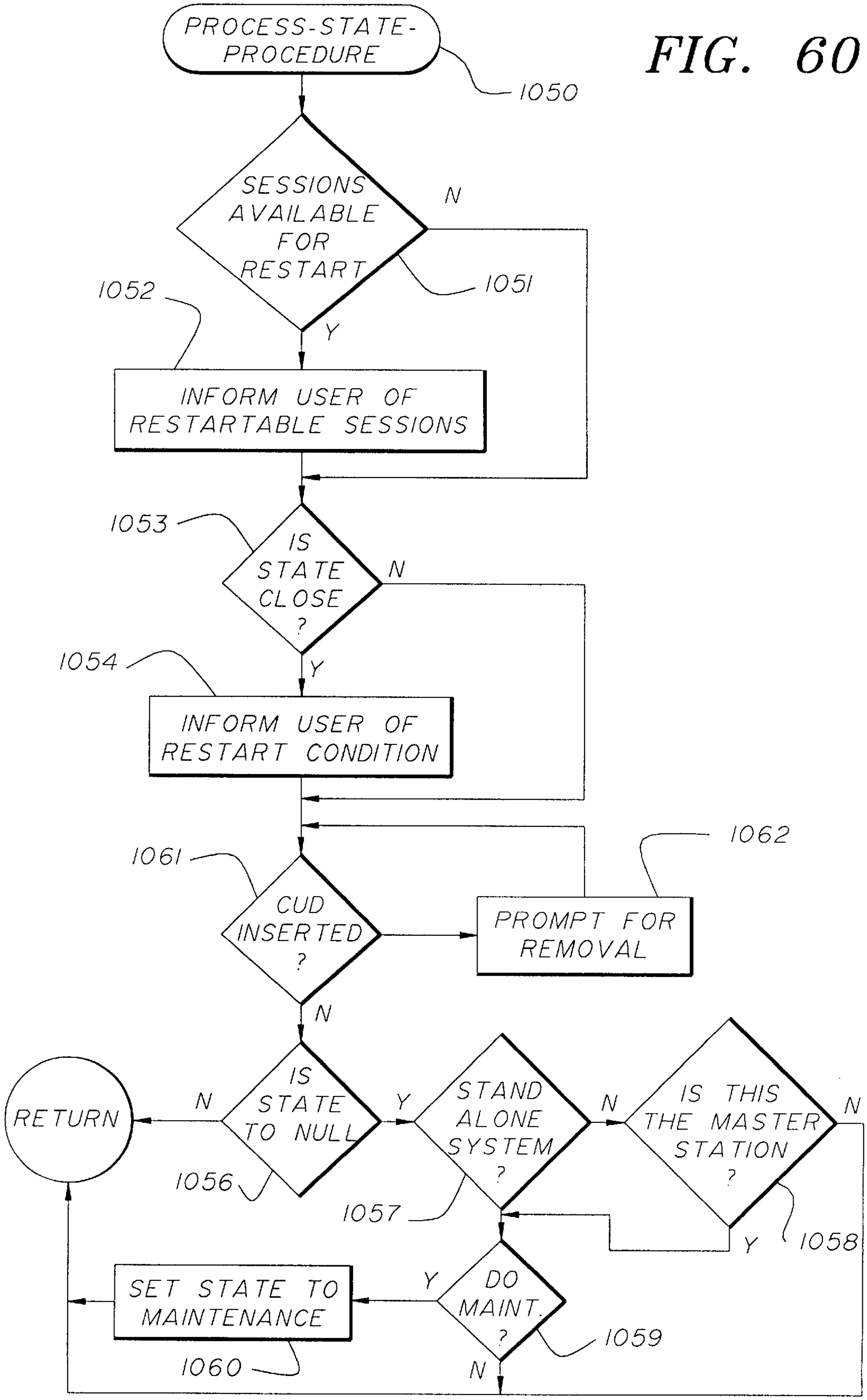
FIG. 60 is a flowchart of the Process_State_Procedure of the Administrative Application.

The Login_Procedure 1040 will now be described with reference to FIG. 58 which provides a flowchart of the steps executed by the Login_Procedure software. First a Login screen is preferably displayed on the workstation prompting the administrator to login with his or her Login ID and enter his or her password. An example of the Login screen is shown in FIG. 59. The login ID and password entered by the administrator are accepted at 1041. The login file is then searched at 1042 for a record matching the Login ID entered by the administrator at 1041. If no match is found, an error message is preferably displayed at 1043 and steps 1041 and 1042 are repeated until a caller-specified number of attempts is exhausted. If the specified number of attempts to login have been made without finding a Login ID match, the Login_Procedure 1040 is preferably exited with an indication of Login error.

Upon successful login at 1042, the password entered by administrator is compared at 1044 with one or more passwords stored in the login record. If a match exists, program control is returned to the Start_System_procedure indicating that the administrator has successfully logged on. However, if there is no password match at 1044, a default password is constructed at 1045. The default password is constructed by an algorithm in the software. The same algorithm may be used by predesignated Support Testing staff or other staff to create a new password that the system will recognize for an administrator who calls with a forgotten password. The default password is then compared at 1046 to the password entered by the administrator. If a match is found, program control is returned to the Start_System_Procedure indicating that the administrator has successfully logged on with the default password.

3. Process_State_Procedure

A flow diagram of the Process_State_Procedure 1050 is shown in FIG. 4. At 1051, a check is made to determine whether testing sessions are available for restart. These are sessions that ended abnormally due to, for instance, system failures; they are identified because the station status in the session status table is TDS Active (see State_TDS_Procedure, below). An informative message is preferably displayed indicating that testing sessions are available for restart, if any, at 1052.

The current system state is checked at 1053 and a message informing the administrator whether the current state is CLOSE is displayed at 1054. In this state, the close operation is preferably completed before other activities can be initiated on the workstation.

If a CUD was inserted, an instructional message is displayed at 1055 requesting that the administrator remove the diskette and store it properly. Preferably, the Process_State_Procedure 1050 will loop until the diskette is removed so that the CUD cannot be inadvertently or intentionally tampered with or accessed by unauthorized persons.

The current state is checked at 1056 to determine if it is the NULL state. If the current state is the NULL state, the administrator is queried to perform maintenance at 1059. However, if the workstations at the test center are networked, then it is preferable that only the master station be provided with the capability of invoking the maintenance procedure. Therefore, checks may be made at 1057 to determine whether or not the workstation is a stand alone system or part of a network of workstations and if it is networked a check is made at 1058 to determine whether the workstation is a master station. If maintenance is to be performed as indicated by the administrator at 1059, the current state is set to MAINT at 1060.

If the current state was not NULL at 1056 or the administrator did not wish to perform maintenance at 1059, program control is returned to the Start_System_Procedure 1021. Additionally, if the workstation is networked and it is not a master station, it is preferable to return to the Start_System_Procedure 1021 without providing an opportunity for the administrator to perform maintenance.

4. State Procedures a. Null_State_Procedure

Figure 61:
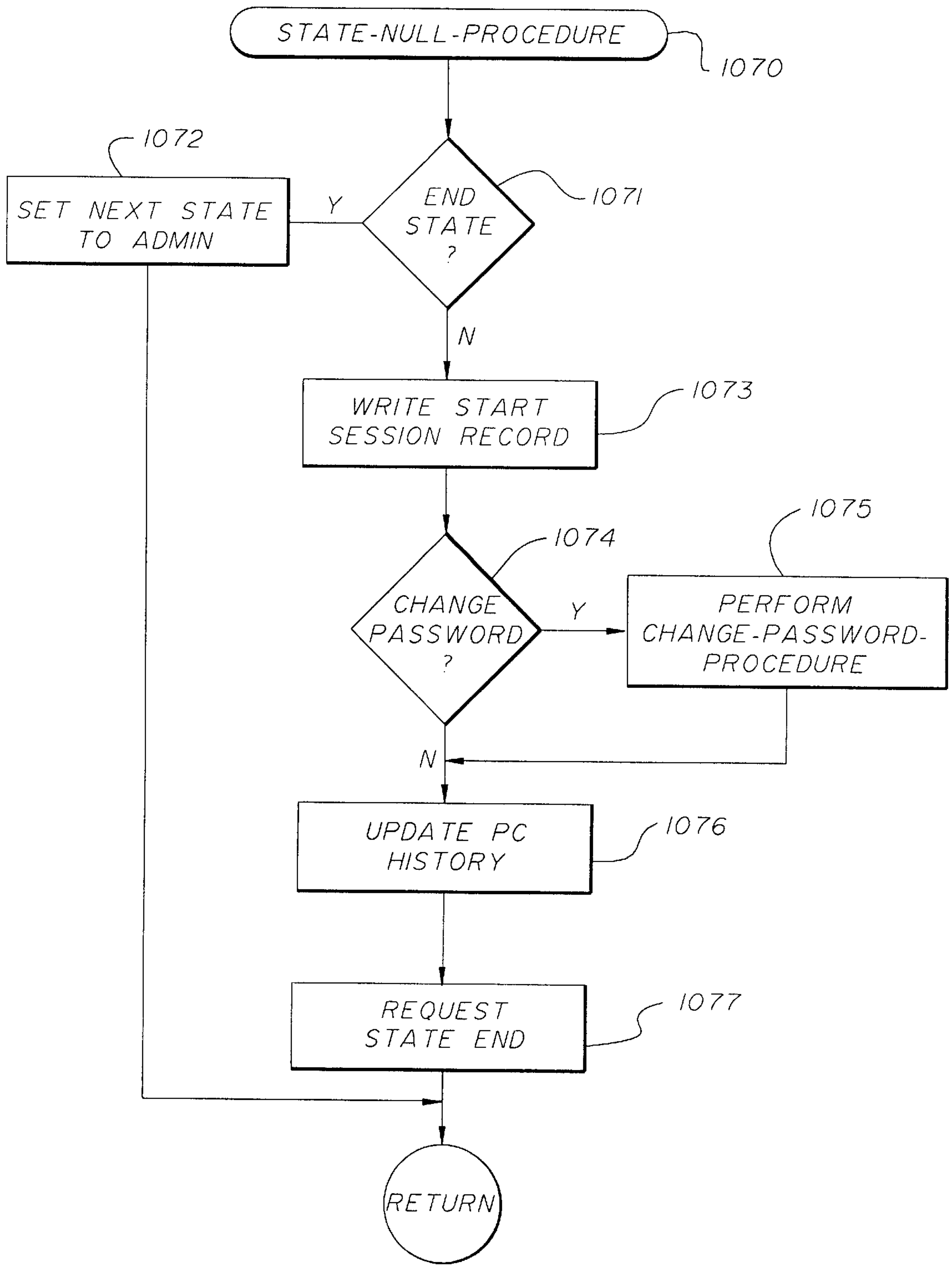
FIG. 61 is a flowchart of the State_Null_Procedure of the Administrative Application.

A flowchart of the State_Null_Procedure 1070 is shown in FIG. 61. Before executing this procedure, a check is preferably made at 1071 to determine if Action has been set to End. However, assuming Action has not been set to End at 1071, a Start Session record is written at 1073 to the Security Log file. The administrator is then prompted at 1074 as to whether he or she wishes to change the password. If the workstation is a stand alone station, and station numbers are in use, and this is station number 1, which is preferably the only station from which passwords can be changed in a center without a local area network in order to allow administrators to change passwords only once for every station in the center, display a query asking the administrator if he or she wants to change passwords. If the response is affirmative, the Change_Password_Procedure is invoked at 1075. The Change_Password_Procedure will be described in detail below.

If the workstation is a stand alone station, or the workstation is a master workstation in a networked system, then the PC History in the PCDATA file is updated at 1076. Then Action is set to End at 1077. Thus when the program returns to the Main_Procedure at 1006 in FIG. 1, the state is checked to determine whether Action is set to End at 1076 and the Null_State_Procedure is called again at 1077.

Referring back to FIG. 61, since the action state is set to End at step 1071 of the Null_State_Procedure, the next state procedure is set to ADMIN at 1072. Then the program returns to the Main_Procedure with the current state set to ADMIN.

i. Change_Password_Procedure

Figure 62:
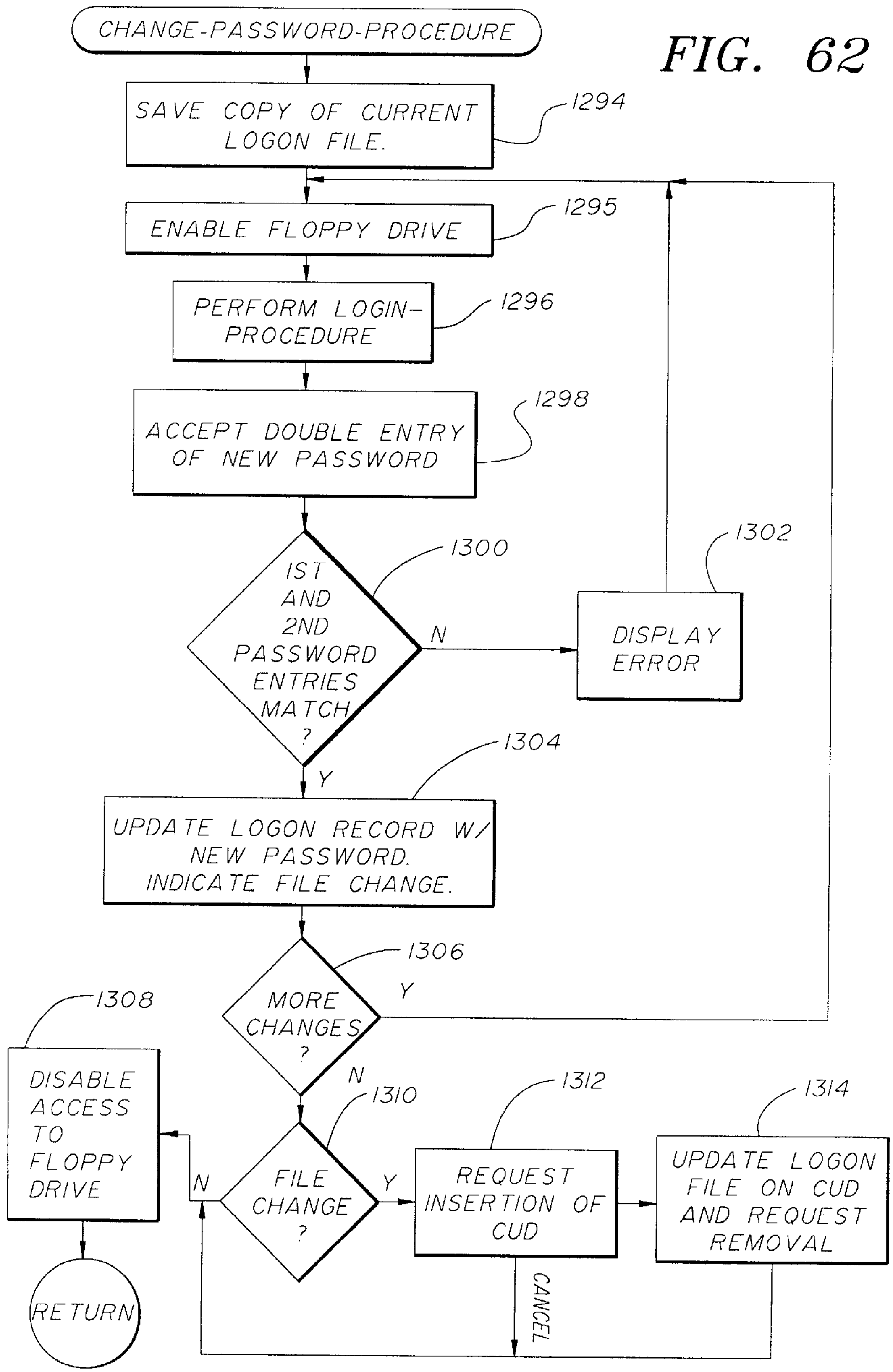
FIG. 62 is a flowchart of the Change_Password_Procedure of the Administrative Application.

If the administrator indicates that he or she desires to change his or her password, the State_Null_Procedure invokes the Change_Password_Procedure as described above. A flowchart of the Change_Password_Procedure is shown in FIG. 62. Before the password is changed it is preferable to save a copy of the current login file as shown at 1294. The workstation's floppy drive may then be enabled at 1295.

A screen requesting the administrator whose password is to be changed to login is displayed at 1296 and the Login_Procedure is called. If the administrator successfully logs in, a screen requesting entry of the new password is displayed at 1298 until the administrator enters the new password. In a preferred embodiment, a screen requesting a second entry of the new password is displayed at 1298 until the administrator enters the new password. In this preferred embodiment, each entry is stored separately as first and second password entries.

Then the first and second password entries are preferably compared at 1300. If they do not match, an error message may be displayed as shown at 1302 and the administrator may be given an opportunity to login again at 1296. If the password entries match, the login record for this administrator is updated in the login file at 1304 with the new password. In preferred embodiments, a flag is set to indicate a login record has been changed.

The administrator may then be queried at 1306 by displaying a message asking whether there are more logins records to change. If the administrator indicates he or she wishes to change more passwords, then the next administrator whose password is to be changed logs in at 1296.

When the administrator does not wish to change any more passwords and at least one login has been changed, an instructional message requesting the administrator to insert the CUD is preferably displayed at 1312 until the CUD is inserted. The login file stored on the CUD may then be overwritten with the login file written to the workstation's local memory at 1314. An instructional message requesting the administrator to remove the CUD is preferably displayed until the CUD is removed by the administrator at 1314. If none of the logins have been changed as determined at 1310, access to the workstation's floppy drive is disabled at 1308. The program then returns to the caller.

In a preferred embodiment, the administrator should be permitted to avoid overwriting the login file even when changes have been made by cancelling the procedure. If the administrator cancels, the CUD need not be inserted, but rather the floppy drive is disabled at 1308 and the program returns to the caller.

b. State_Admin Procedure

Figure 63:
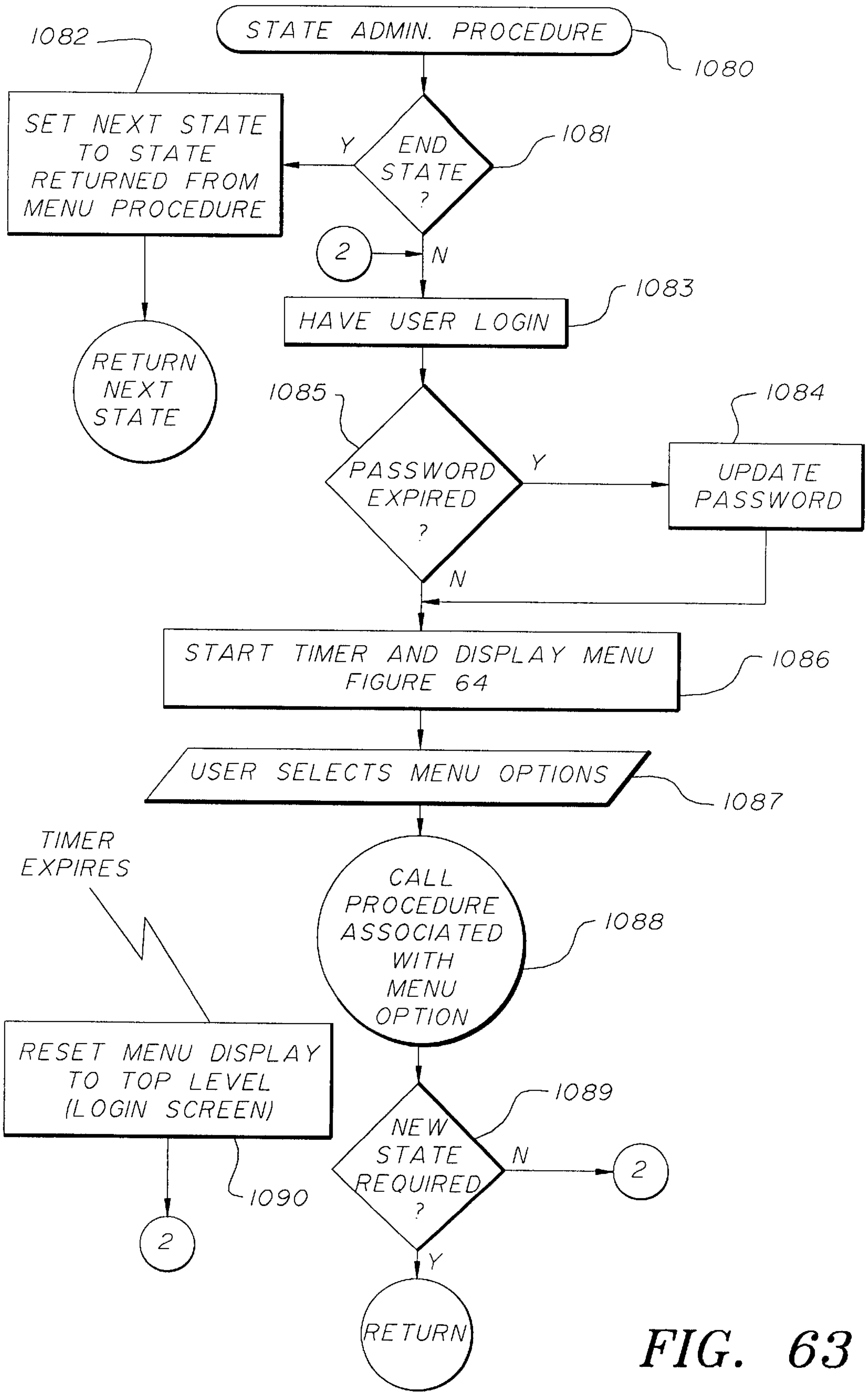
FIG. 63 is a flowchart of the State_Admin_Procedure of the Administrative Application.
Figure 64:
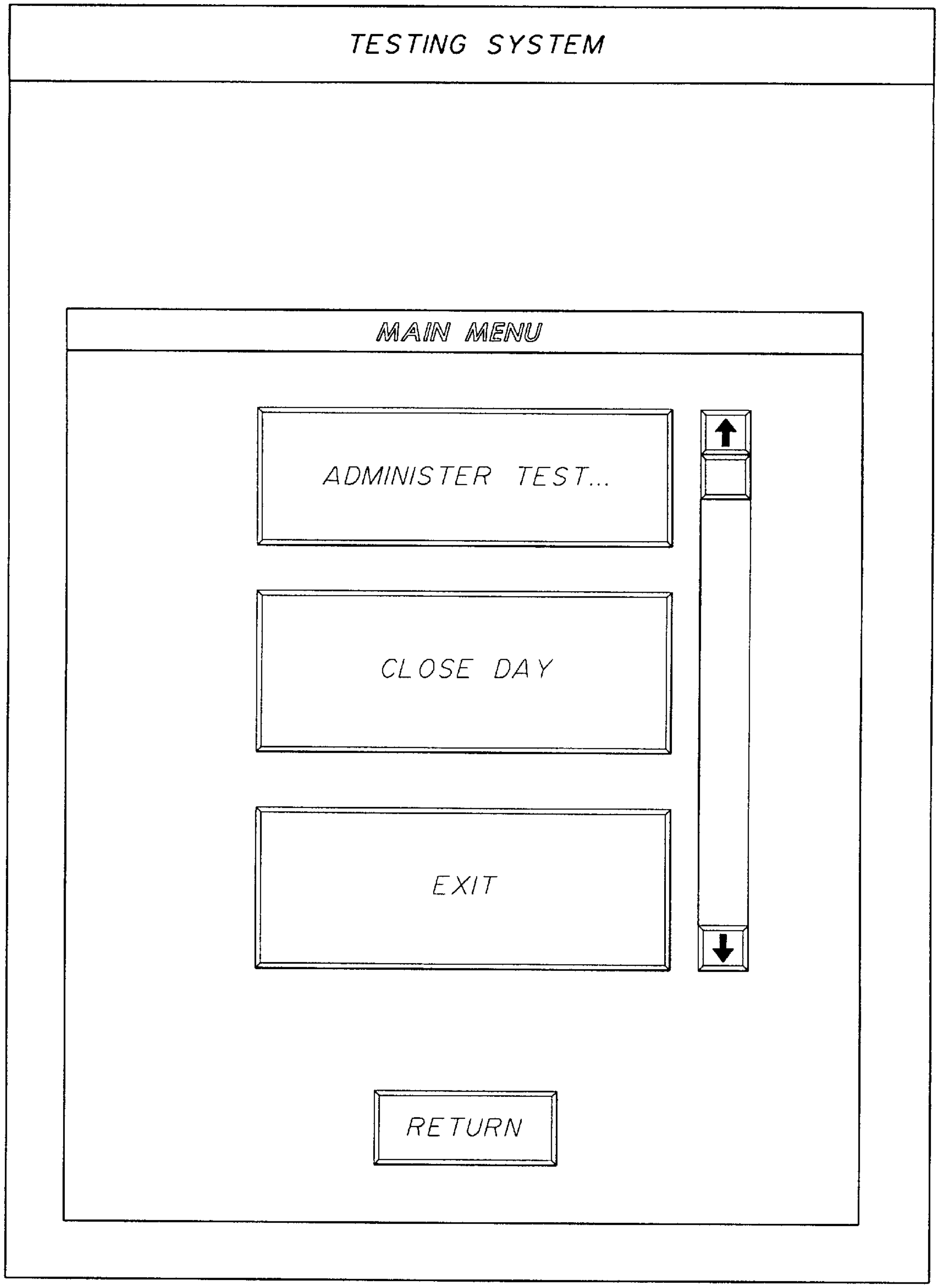
FIG. 64 is an example of a screen showing the main menu of the Administrative System.

A flow chart of the State_Admin_Procedure is shown in FIG. 63. When the procedure is first invoked Action is set to Execute. Therefore, when the state is checked at 1081, the state is not set to End and the procedure continues with step 1083. The administrator is requested to login according to Perform the Login_Procedure. As noted above, the administrator preferably logs in again before initiating any new activity so that the identity of the initiator can be logged accurately in the Security Log File.

The date and time of the last update of the administrator's password is checked at 1085. If the password is out of date as defined by the PASSWORD_LIMIT element of the station configuration file, the password can be updated using the Change_Password_Procedure. In a preferred embodiment, a screen will be displayed at 1084 for the administrator permitting the administrator to change his or her password.

A timer may then be started and the system or main menu is displayed at 1086. FIG. F3 shows a screen displaying the main menu in a preferred embodiment. Preferably, the authority level required for each option is checked against the administrator's authority level as defined in the login file while displaying the menu. Then, if the current administrator does not have sufficient authority for a menu option, the option is preferably disabled.

The administrator then selects a menu option as shown at 1087. The procedure address associated with the menu option is retrieved and executed at 1088. In a preferred embodiment, the supported menu options and associated procedures include:

Administer Operational Test (Menu_OpTest_Procedure)

Administer Demonstration Test (Menu_DemoTest_Procedure)

Restart a Test (Menu_RestartTest_Procedure)

Close Day (Menu_CloseDay_Procedure)

Exit (Menu_Exit_Procedure)

Logon Maintenance (Menu_LogonMaint_Procedure)

Change Password (Menu_ChgPassword_Procedure)

About (Menu_About_Procedure)

Each of the above listed Menu Procedures will be described in detail below.

If after the selected menu option is executed, the procedure indicates a new state is required at 1089, the program returns to the Main_Procedure and the State_Admin_Procedure state is set to end. If a new state is not indicated at 1089, the administrator is prompted to login at 1083. The flowchart for the Main_Procedure shown in FIG. 1 at steps 1005 and 1006, indicates that the State_Admin_Procedure will be called again. If a new state had been returned by the menu procedure, the State Admin_Procedure would indicate that the state was set to end at step 1081. The next state returned by the menu procedure executed at 1088 would then be returned to the Main_Procedure.

If the Inactivity Timer as defined in the station configuration file expires, the menu display is reset to the login screen at 1090. This prevents an unauthorized individual from starting a menu option, should the administrator be interrupted while initiating an activity.

C. State_Close_Procedure

Figure 65A:
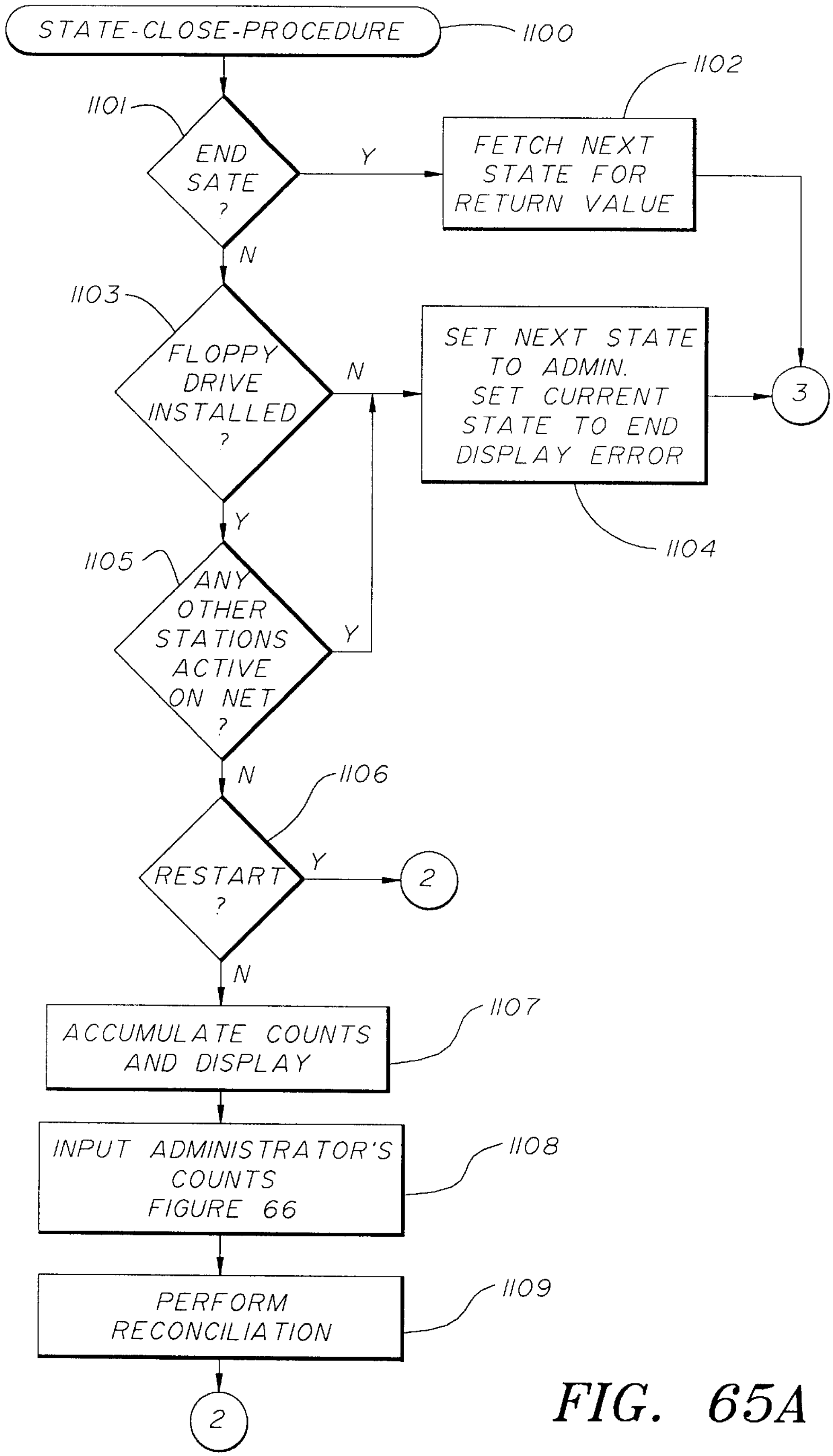
FIGS. 65A and 65B are flowcharts of the State_Close_Procedure of the Administrative Application.
Figure 65B:
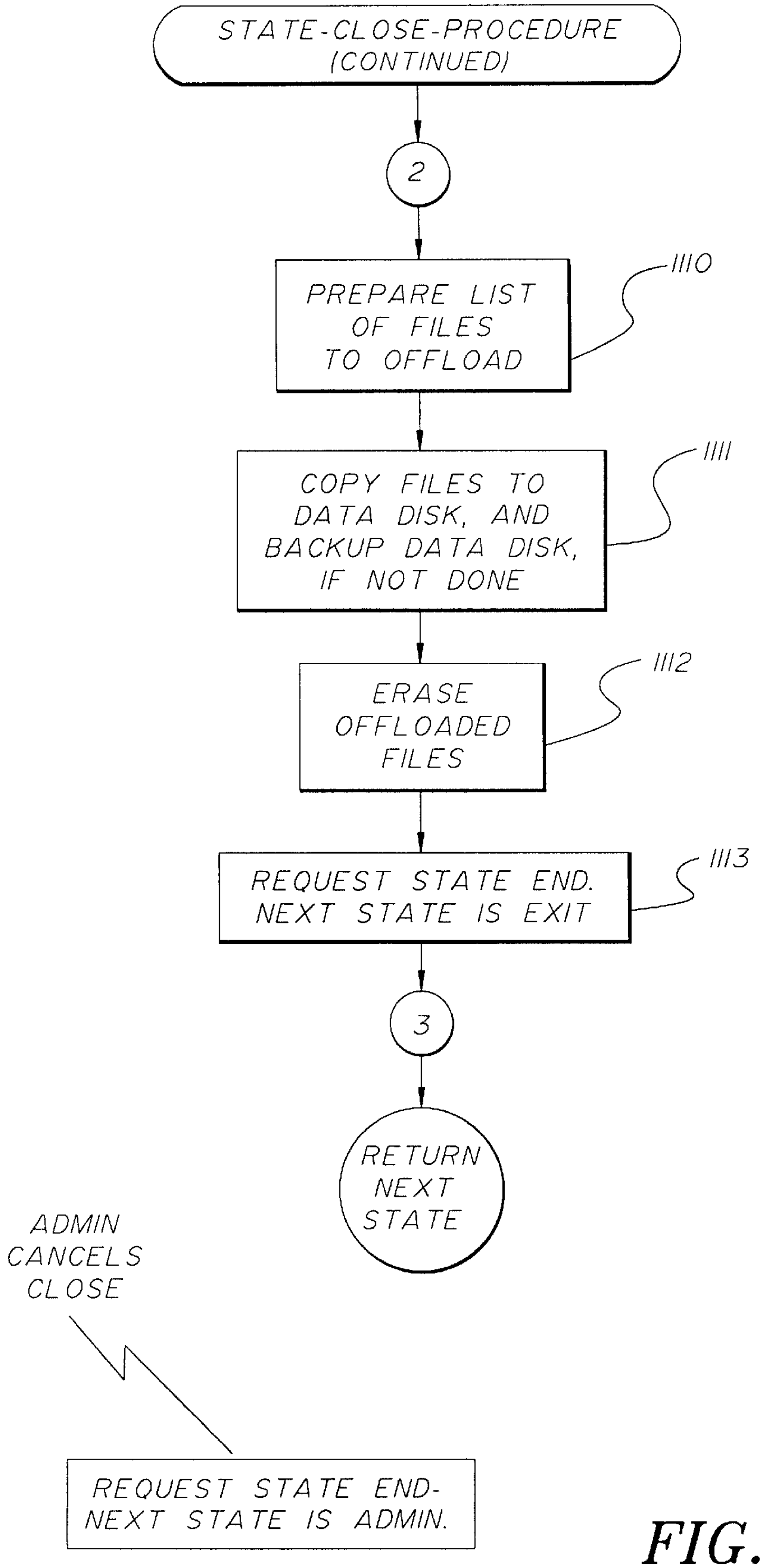
Figure 66:
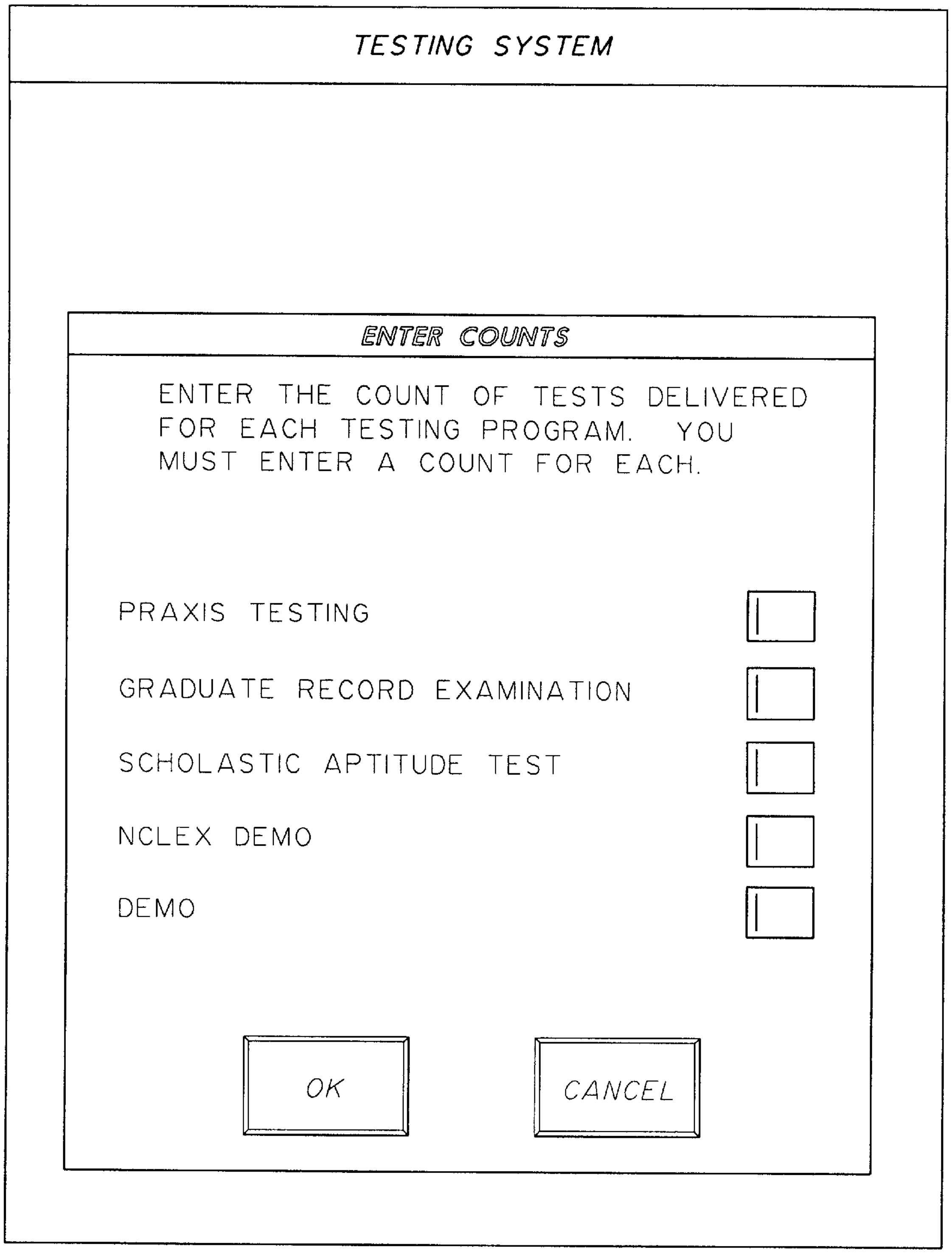
FIG. 66 is an example of a screen provided by the Administrative Application allowing an administrator to enter test counts.

A flowchart of the State_Close_Procedure is shown in FIGS. 65A and 65B. When the procedure is first invoked Action is set to Execute. Therefore, when the state is checked at 1081, the state is not set to End and the procedure continues with step at 1103.

Preferably, the procedure checks whether the workstation is equipped with a floppy drive at 1103. If it is not, an error message is preferably displayed; the next state is set to ADMIN and the State_Close_Procedure is set to End at 1104.

If the workstation is part of a networked system and other stations are active as determined at 1105, then an error message is preferably displayed at 1104.

A check is made at 1106 to determine whether the workstation has been restarted. If not, a reconciliation process occurs. The hard disk of the station in standalone systems or of the server in networked system is scanned at 1107 to count the number of sessions that have been administered for each testing program.

The list of testing programs and the corresponding count for each of the administered tests are then preferably displayed at 1107. In preferred embodiments, the list will contain space for the administrator to enter a count as derived from paper logs as shown at 1108.

Another list containing the name of each testing program, the counts generated automatically by the system and the counts generated manually by the administrator for each, and a place to indicate whether a paper report will be submitted may then be displayed. If the system and administrator counts of any element in the list differ, it is preferable to permit the administrator to change the manually prepared count and/or enter a note explaining the discrepancy.

A list of all examinee results, performance files, security log files, and system error files, which are to be returned for processing may then be generated at 1110. The system prepares this list by scanning the hard disk of the workstation in standalone environments or of the server in networked environments.

All of the files in the list produced in step 1110 may then be copied to the Data Disk(s) at 1111. Preferably, an indication that this step has been performed is made, i.e., set an appropriate flag in software, so that in the event the workstation is restarted after the offload has been performed the offload procedure is not necessarily repeated. Following the offload of files to the data disks at 1111, it is preferable to also copy all of the files in the list produced in step 1110 to the Backup Data Disk(s). Again it is preferable to provide some indication that this back up step has been performed.

All files named in the list produced in step 1110 should then be preferably erased from the workstation's hard disk at 1112. Providing an indication that the erasure has been performed is also preferable.

The next state should then be set to the EXIT state and the state of the State_Close_Procedure is set to End at 1113. The program then returns to the Main_Procedure, which will then reexecute the State_Close_Procedure to get the next state. Upon reexecuting the State_Close_Procedure, it will be determined at 1101 that the state has been set to End and the next state, i.e., EXIT, will be returned to the Main_Procedure from 1102.

In a preferred embodiment, the administrator is permitted to cancel the close-of-day procedure. If the administrator cancels, the next state should be set to ADMIN. Therefore, the next state retrieved at 1102 may be one of ADMIN or EXIT.

d. State_Maint_Procedure

Figure 67:
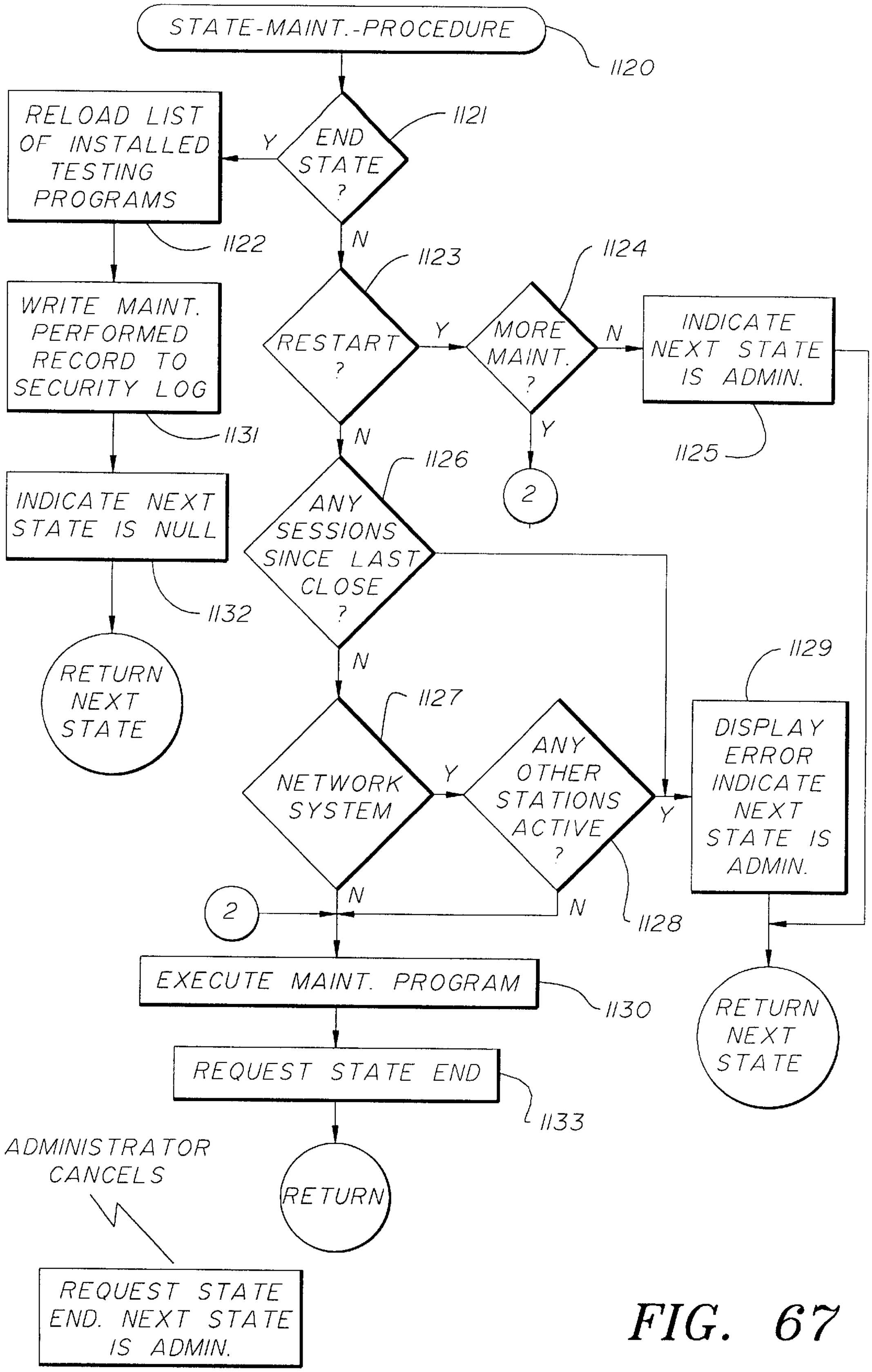
FIG. 67 is a flowchart of the State_Maint_Procedure of the Administrative Application.

A flowchart of the State_Maint_Procedure is shown in FIG. 67. Preferably, the procedure checks to determine whether the workstation has been restarted at 1123. If it has been restarted, the administrator is preferably prompted to determine whether he or she wishes to perform more maintenance at 1124. If no more maintenance is to be performed, the next state is set to ADMIN at 1125, and the program is returned to the Main_Procedure. If more maintenance is to be performed at 1124, the maintenance program is executed at 1130. A variety of maintenance programs could be used, such as that commercially available from Microsoft Corporation as part of the Windows Software Development Kit.

If the workstation has not been restarted as determined at 1123, the procedure preferably checks at 1126 whether any testing sessions have been performed since the last CLOSE state was executed. If so, an error message is preferably displayed and the next state is set to the ADMIN state at 1129.

If the workstation is part of a network as determined at 1127, the procedure then may check whether any workstations are still active at 1128. If there are active workstations in the network, an informational message is preferably displayed and the next state is set to ADMIN at 1129. This prevents that administrator from performing maintenance while a testing session is in progress.

If the workstation is not part of a network at 1127 or if there are no active workstations in the network at 1128, the maintenance program can then be executed at 1130. The state of the procedure is then set to End.

If the state of the State_Maint_Procedure is set to End as determined at step 1121, the list of installed testing programs are reloaded from the hard disk of the standalone station or server at 1122 and updated if testing programs have been added or removed. A record is then preferably written at 1131 to the Security Log File indicating that maintenance has been performed. In a preferred embodiment, the next state is set to the NULL state at 1132 and the program is returned to the Main__Procedure.

Preferably the administrator is permitted to cancel the maintenance procedure. If the administrator cancels, the next state should be set to ADMIN and the state of the State__Maint__Procedure is set to End. The program may then be returned to the Main__Procedure.

e. State__TDS__Procedure

Figure 68:
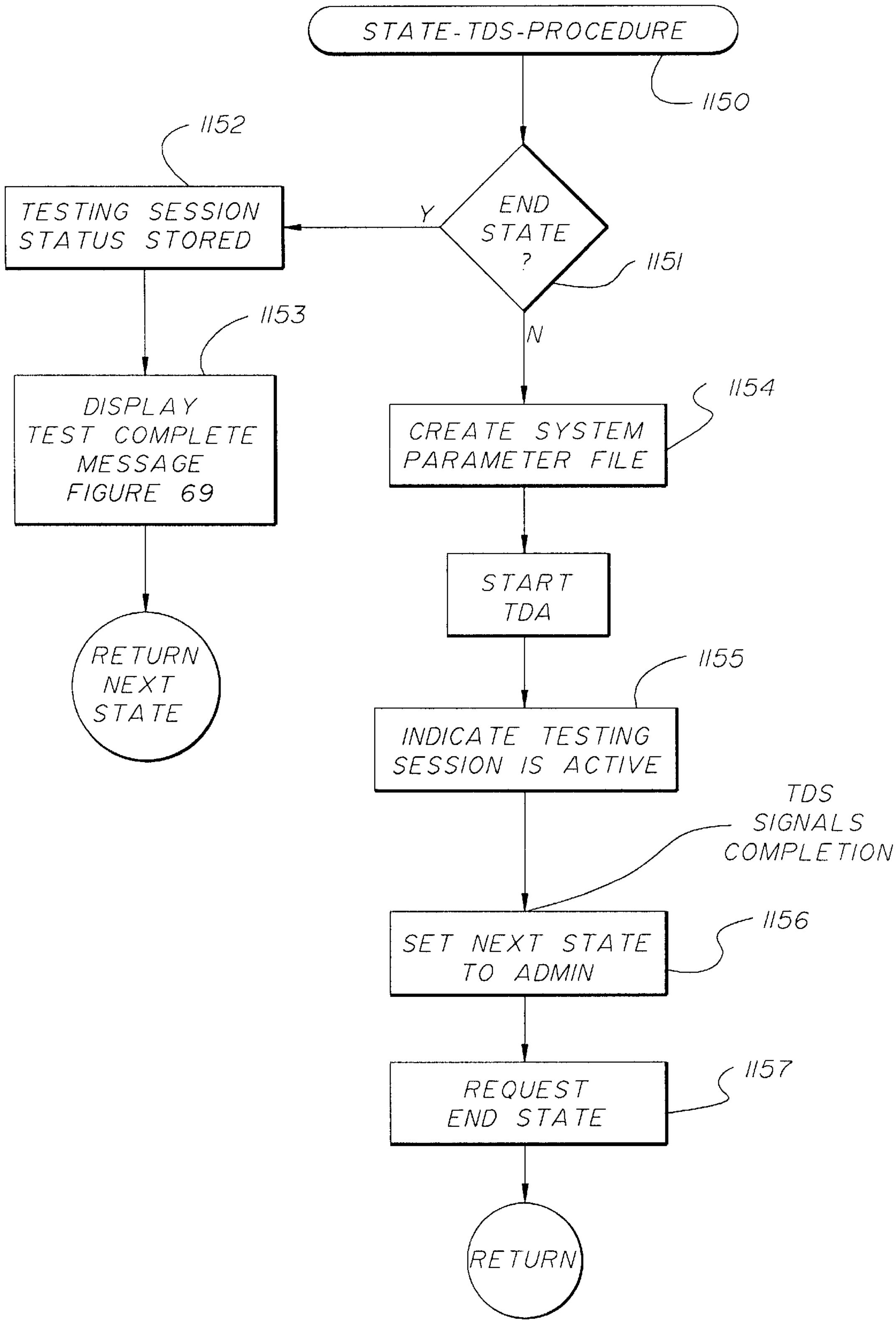
FIG. 68 is a flowchart of the State_TDS_Procedure of the Administrative Application.
Figure 69:
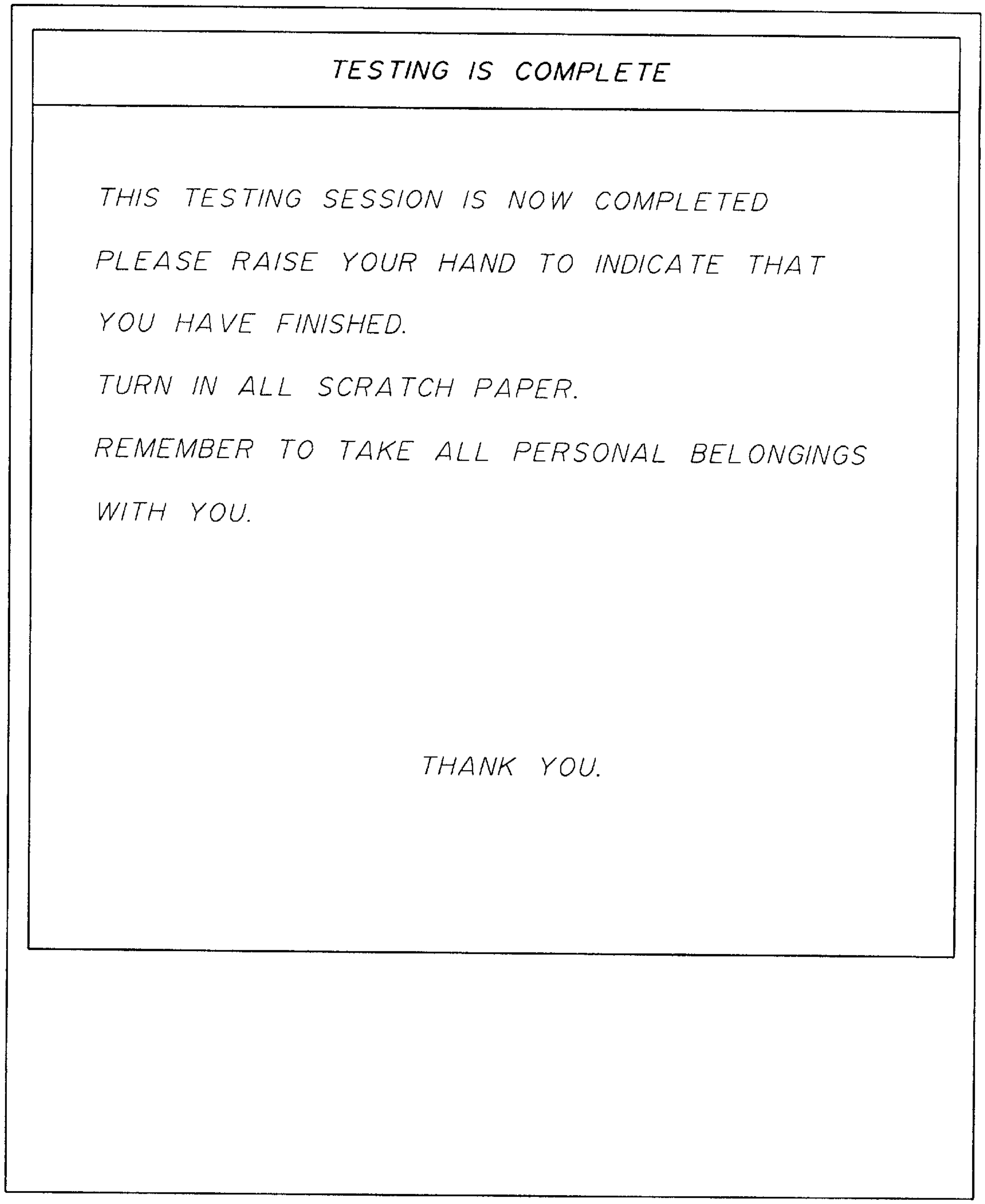
FIG. 69 is an example of a screen provided by the Administrative Application when the testing session is complete.

A flowchart of the State__TDS__Procedure is shown in FIG. 68. When the procedure is first invoked Action is set to Execute. Therefore, when the state is checked at 1151, the state is not set to End and the procedure continues with step 1154.

The administrative application prompts the administrator to enter information about the examinee and creates a System Parameter file containing this information at 1154. Preferably, the Start Session Record of the examinee performance file is appended to the System Parameter file.

The Test Delivery Application may then be executed. An indication that the testing session is open and active should then be provided at 1155, e.g. a TDS active flag may be set in a session status table maintained by the administrative application. When the testing session is complete, the Test Delivery Application will return program control to the State__TDS__Procedure at 1156. The next state is then set to ADMIN at 1156 and the state of the State__TDS__Procedure is set to End at 1157.

The program then returns to the Main__Procedure, which reexecutes State__TDS__Procedure with the state set to End. The TDS Active flag in the status table for the testing session can then be updated with returned status at 1152. An informational message indicating that the testing session is complete is preferably displayed at 1153 and the program returns to the Main__Procedure with the next state set to ADMIN.

f. State__Exit__Procedure

Figure 70:
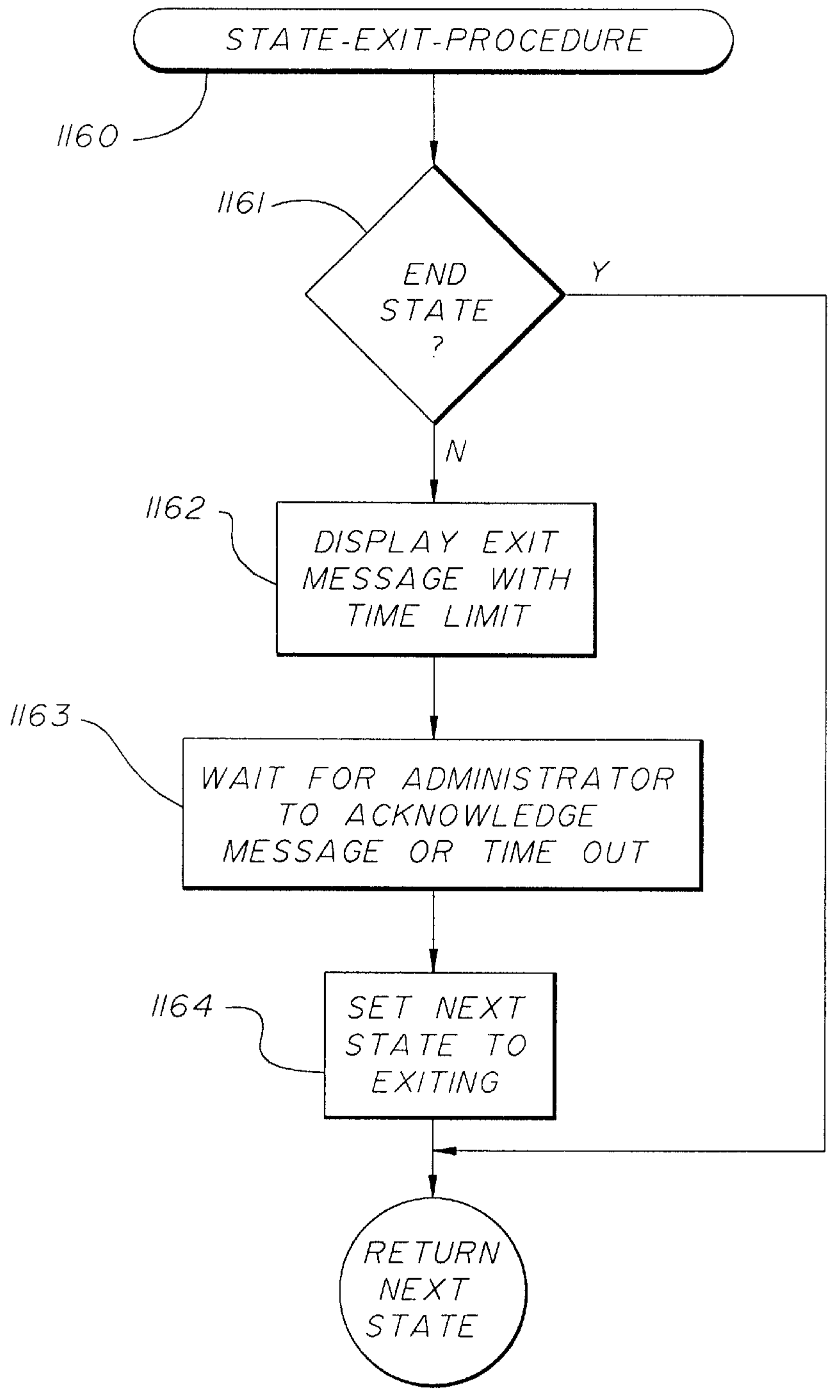
FIG. 70 is a flowchart of the State_Exit_Procedure of the Administrative Application.

A flowchart of the State__Exit__Procedure is shown in FIG. 70 at 1160. An exiting informational message is preferably displayed at 1162 when this procedure is executed. In a preferred embodiment, the exiting message is displayed until the administrator acknowledges the message or a predetermined time limit expires as shown at 1163.

The next state is set to EXITING at 1164 and the program returns to the Main__Procedure to invoke the stop procedure.

5. MENU PROCEDURES a. Menu__OpTest__Procedure

Figure 71:
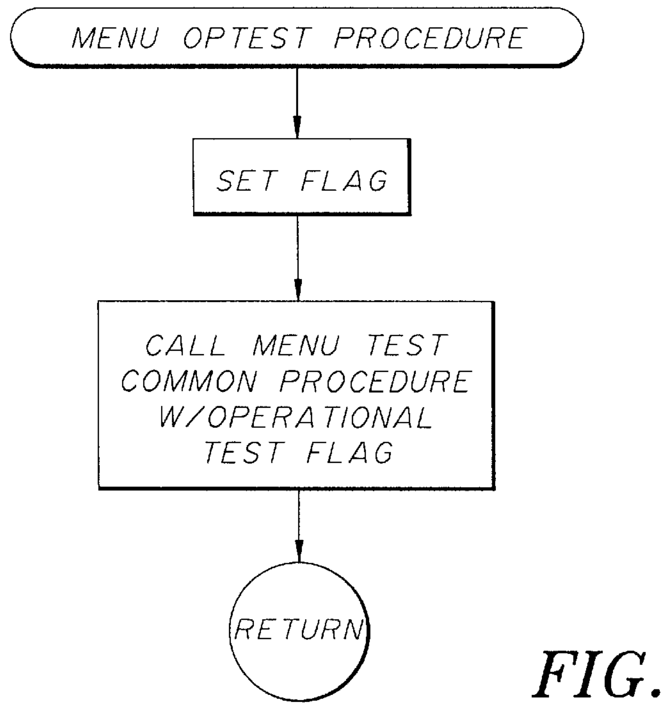
FIG. 71 is a flowchart of the Menu_OpTest_Procedure of the Administrative Application.

When the "Administer Operational Test" is selected from the main menu the State__Admin__Procedure invokes the Menu__OpTest__Procedure. A flow diagram of the Menu__OpTest__Procedure is shown in FIG. 71. The Menu__OpTest__Procedure at 1170 sets a test flag to indicate delivery of an operational test at 1171 and calls the Menu__TestCommon__Procedure at 1172. The Menu__TestCommon__Procedure will be described in detail below.

b. Menu DemoTest Procedure

Figure 72:
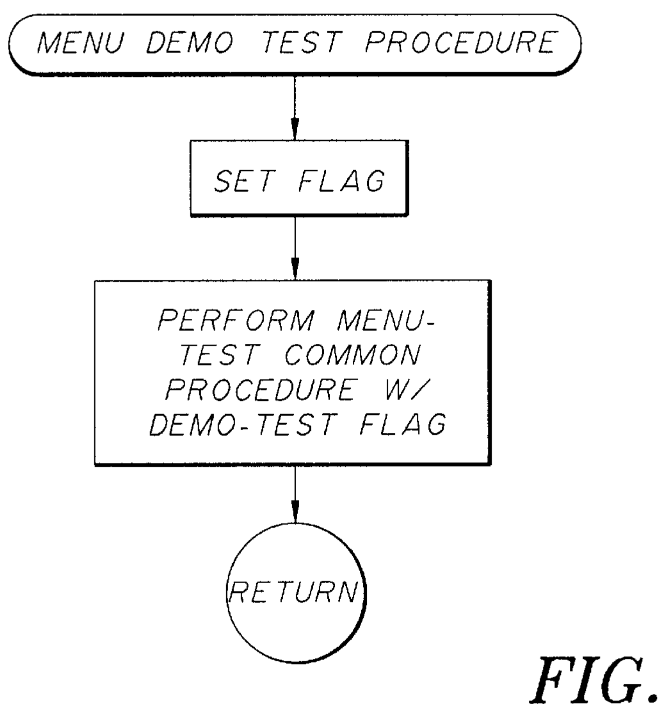
FIG. 72 is a flowchart of the Menu_DemoTest_Procedure of the Administrative Application.

When the "Administer Demonstration Test" is selected from the main menu the State__Admin__Procedure invokes the Menu__TestCommon__Procedure. A flow diagram of the Menu__DemoTest__Procedure is shown in FIG. 72. The Menu__DemoTest__Procedure sets a test flag to indicate delivery of demonstration test at 1175 and calls the Menu__TestCommon__Procedure at 1176. The Menu__TestCommon__Procedure will be described in detail below.

c. Menu__TestCommon__Procedure

Figure 73A:
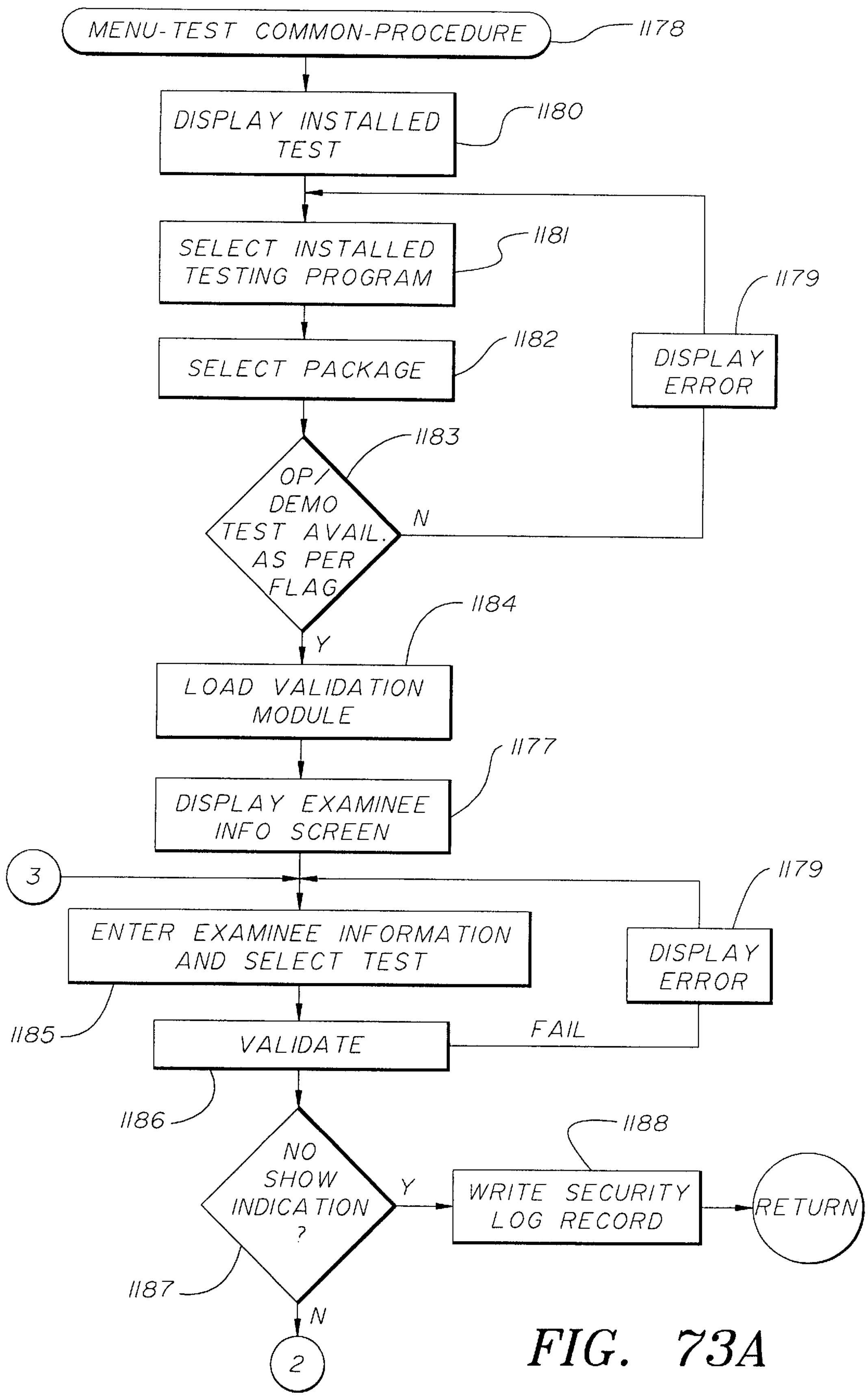
FIGS. 73A and 73B are a flowchart of the Menu_TestCommon_Procedure of the Administrative Application.
Figure 73B:
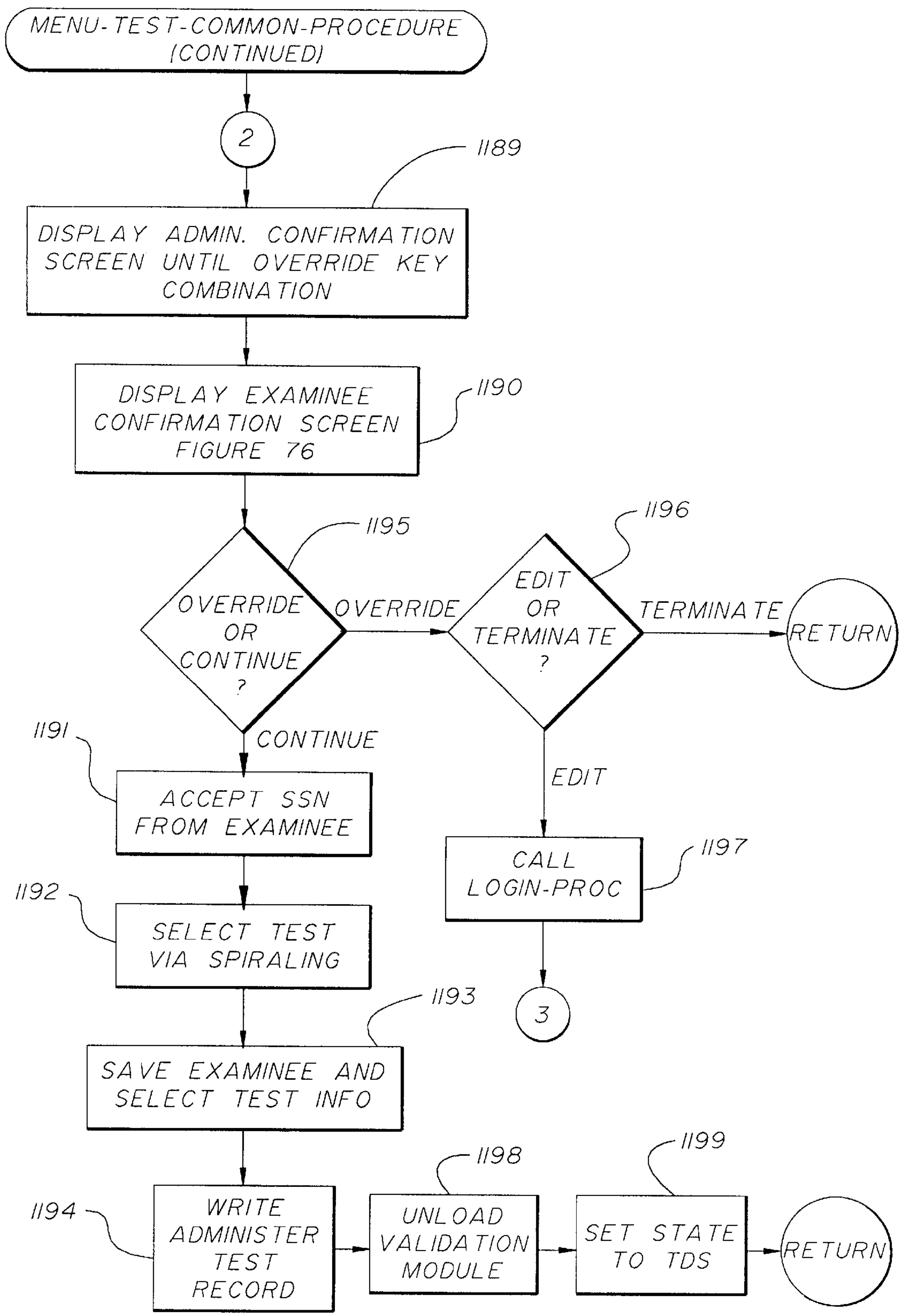

A flowchart of the Menu__TestCommon__Procedure is shown in FIGS. 73A and 73B. A screen is displayed at 1180 listing substantially all of the installed testing programs. From that list, the administrator may select a testing program at 1181. A screen listing the packages installed for the selected testing program is then preferably displayed at 1182. The administrator may then select the appropriate package from the list. A package contains all the information needed to deliver a test, and a testing program may offer several tests, for example, Praxis Reading, Writing, and Math.

The selected package may then be checked at 1183 to ensure that it includes an operational or demonstration test as indicated by the test flag. If there is a mismatch, an error message is preferably displayed at 1179.

Figure 74:
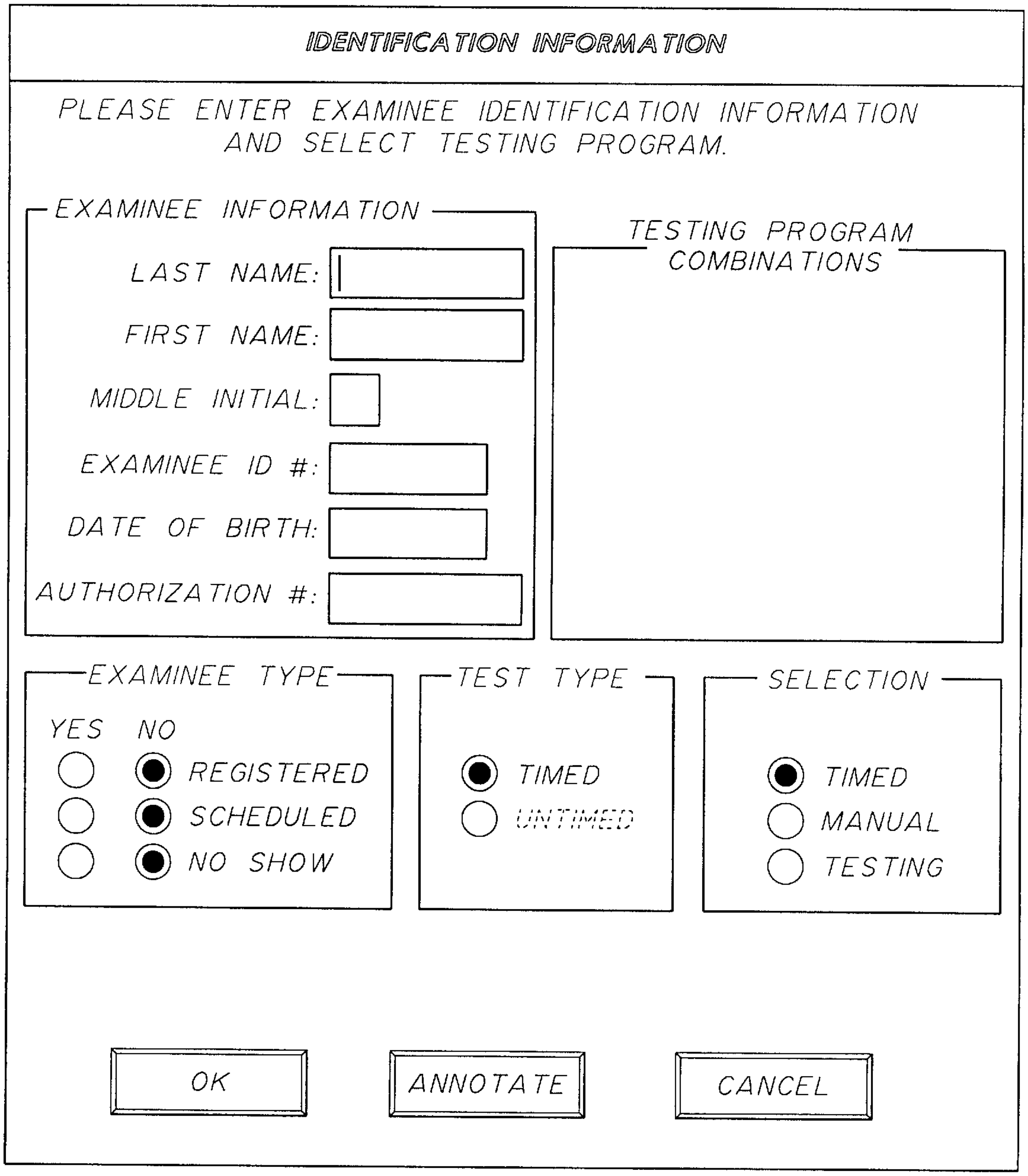
FIG. 74 is an example of a screen provided by the Administrative application allowing an administrator to enter examinee identification information.

If the selected package includes an operational test or demonstration test as indicated by the test flag, the validation module for the selected package is loaded at 1184. The validation module contains the edit and other rules in effect for the testing program's examinee information. It also contains spiralling rules that control selection of test components not selected by the administrator, such as the random selection from among multiple scripts. The Examinee Information screen is then displayed at 1177. An example of an Examinee Information Screen is shown in FIG. 74. Preferably, the administrator is permitted to enter examinee related information, specify the type of candidate, and select the type of test to be delivered. Additionally, the administrator preferably may enter an electronic note that will be attached to the examinee's performance file. Such information may be entered at 1185.

When the administrator indicates the Examinee Information screen is complete, the validation module is called at 1186 to validate the information. If the validation fails, an error message is preferably displayed at 1173.

If the examinee information was entered merely to record a 'no show' as determined at 1187, a 'No Show' record is written to the Security Log File at 1188 and return to the menu procedure from which the Menu__TestCommon__Procedure was called.

Figure 75:
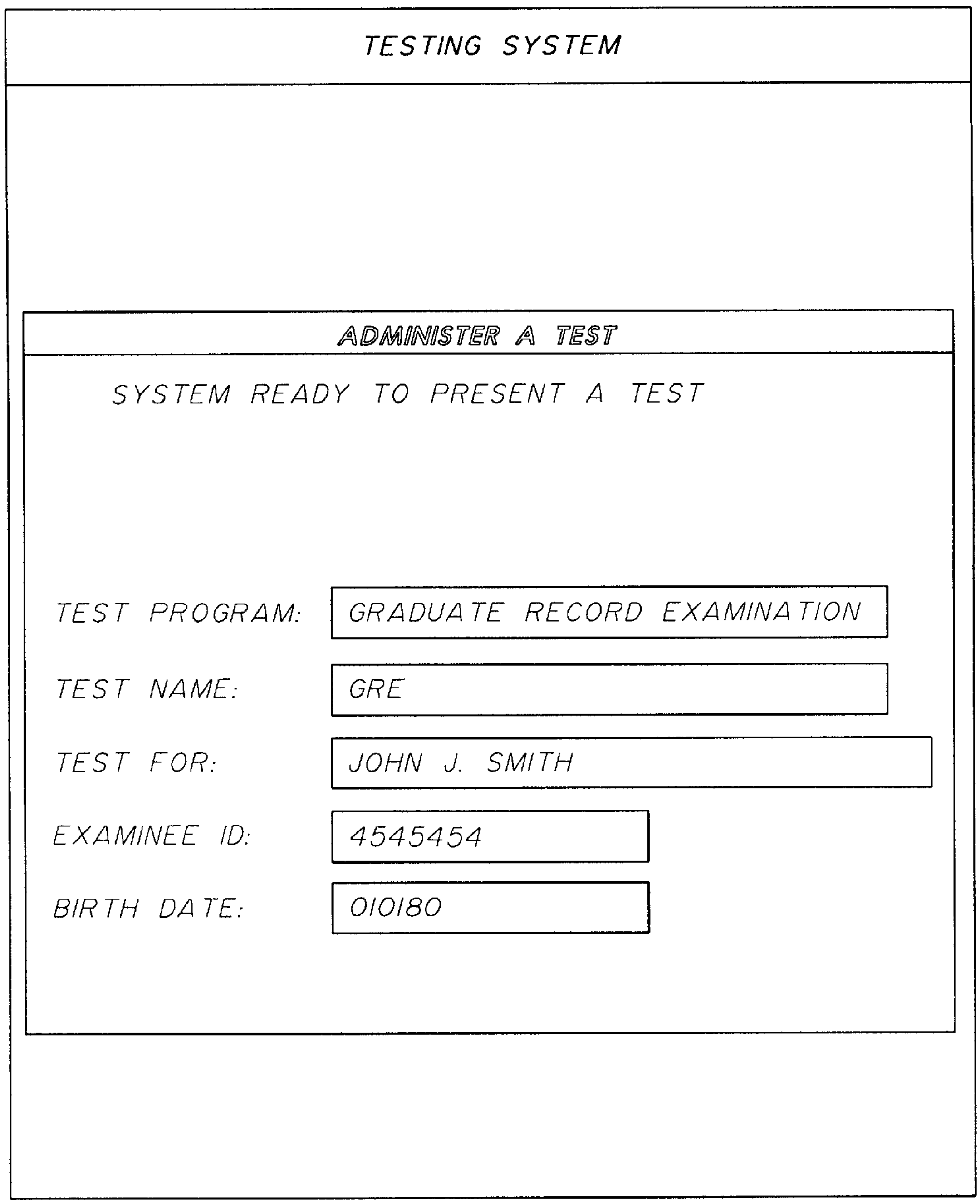
FIG. 75 is an example of a screen provided by the Administrative Application allowing an administrator to administer a test.

Turning now to FIG. 73, the Administrator's Confirmation screen is preferably displayed at 1189 assuming the Examinee has arrived to take the test. An example of the Administrator Confirmation screen is shown in FIG. 75. Substantially all key combinations are preferably locked out at 1189 except for a secret administrator's override key combination. The Administrator's Confirmation screen is displayed until the secret override key combination is entered at 1189.

Figure 76:
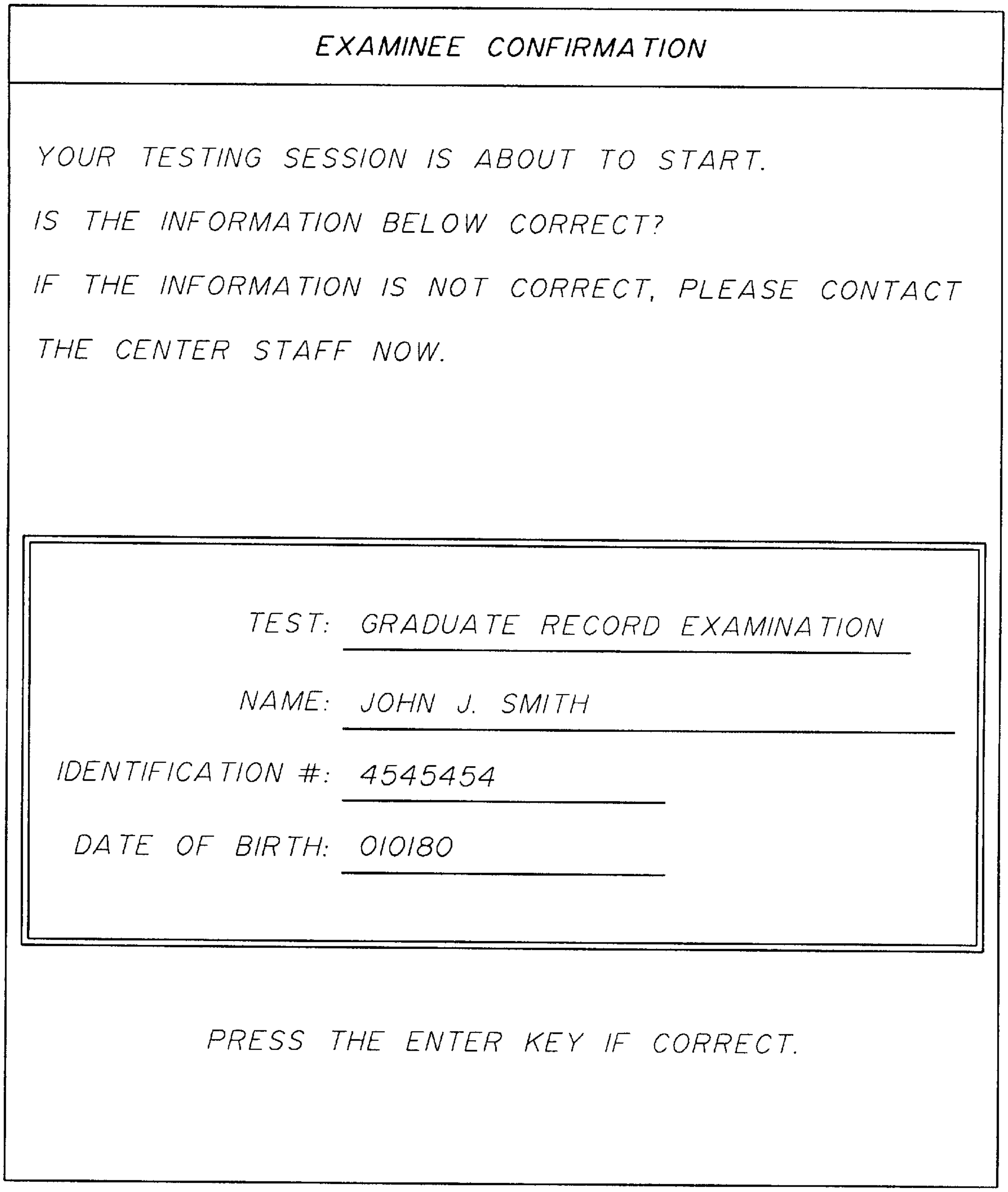
FIG. 76 is an example of an examinee confirmation screen.

The Examinee's Confirmation screen may then be displayed at 1190. An example of the Examinee Confirmation screen is shown in FIG. 76. Preferably, the procedure will provide at least two options at this point, an override from the administrator or a continue from the examinee as shown at 1195.

Figure 77:
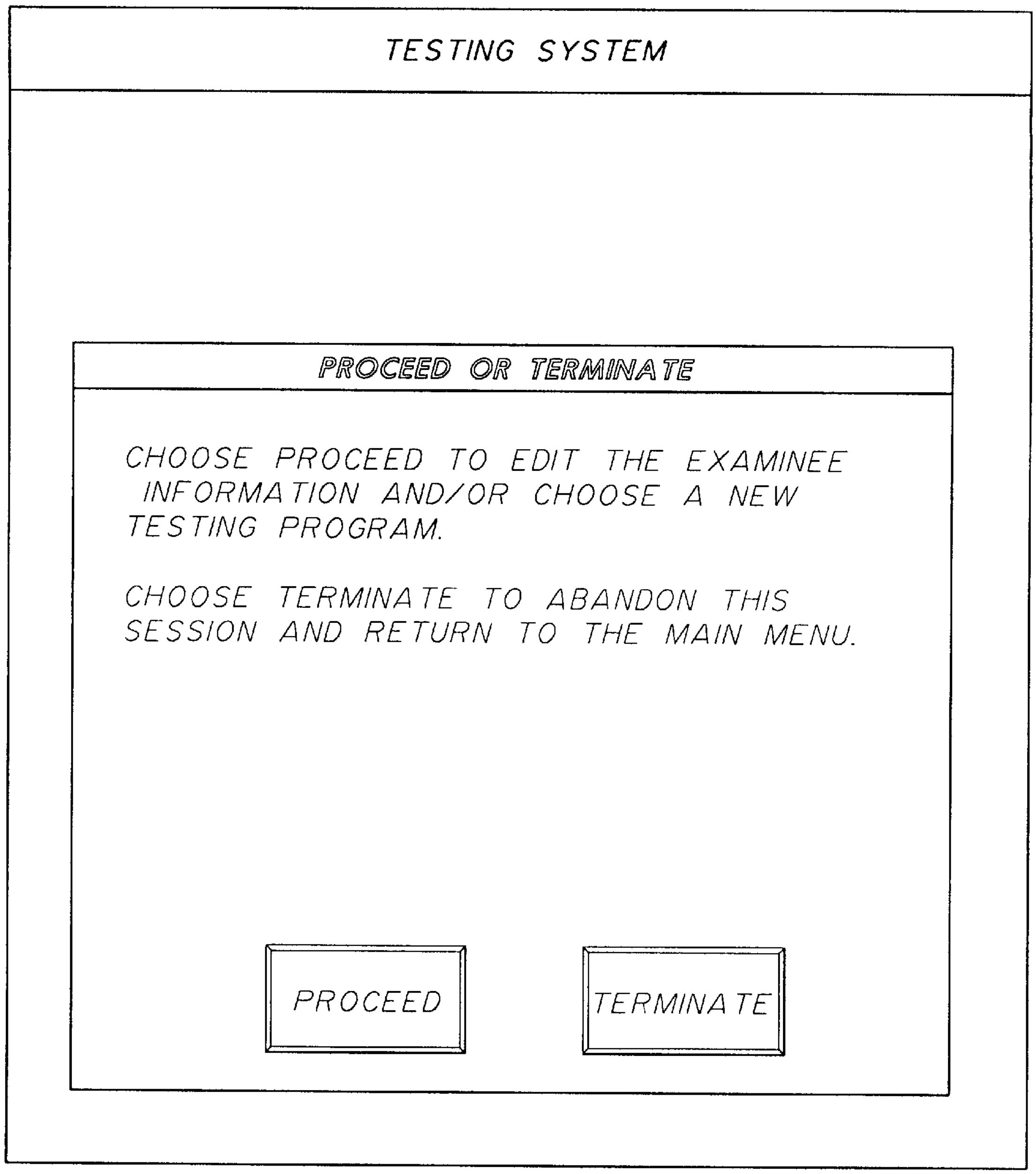
FIG. 77 is an example of a screen provided by the Administrative Application allowing an administrator to terminate the testing session or to edit the examinee information.

If an override key combination from the Administrator is received, the administrator will be queried by a screen such as that shown in FIG. 77 whether he or she wishes to edit the examinee information or terminate the session. If the administrator responds with 'terminate' at 1196, the examinee information is preferably discarded and the program returns to the caller. A Proceed or Terminate Screen will appear as shown in FIG. 77. If the administrator responds with 'edit' at 1196, the Login_Procedure is invoked at 1197. When the program returns to the Menu_TestCommon_Procedure from the Login_Procedure, the Examinee Information screen is again displayed at 1177 (referring back to FIG. 74) to permit editing of examinee information.

If the examinee responds with a 'Continue' at 1195, a screen is preferably displayed at 1191 through which the examinee can enter his or her Identification Number and/or other biographical information which identifies the examinee such as that shown in FIG. 76.

The spiraling procedures, which are program-specific rules-based procedures in the validation module, may then be invoked at 1192 to randomly select any test information not manually selected by the administrator.

The examinee information and test selection information is then preferably saved in this examinee's performance file at 1193. The 'Administer Test' record may then be written to the Security Log File at 1194. The validation module may then be unloaded at 1198. The state is preferably set to the TDS state at 1199 and the program is returned to the caller.

If the administrator cancels, which can occur at any point during this procedure when the administrator clicks on the CANCEL button on the screen, the procedure returns to the caller.

d. Menu_RestartTest_Procedure

Figure 78:
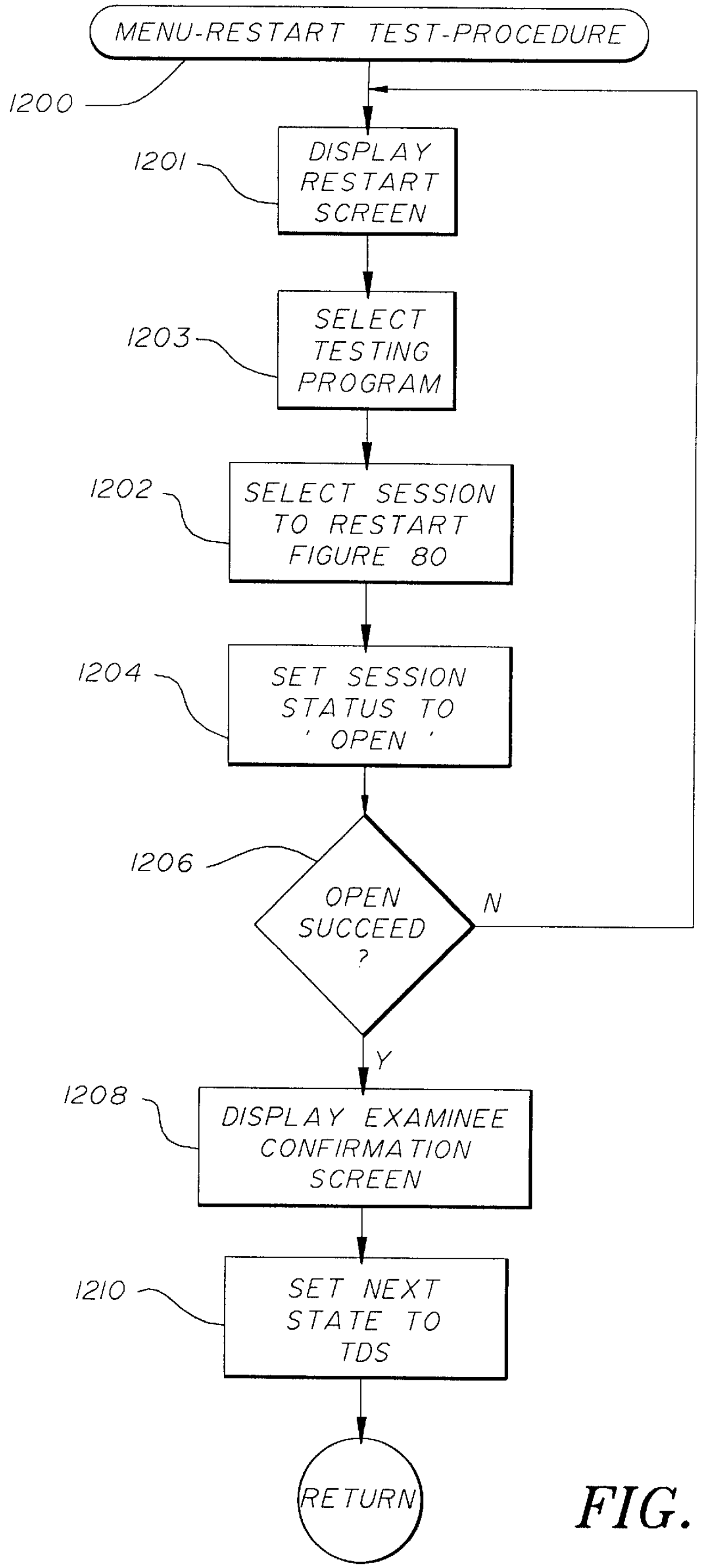
FIG. 78 is a flowchart of the Menu_RestartTest_Procedure of the Administrative Application.
Figure 79:
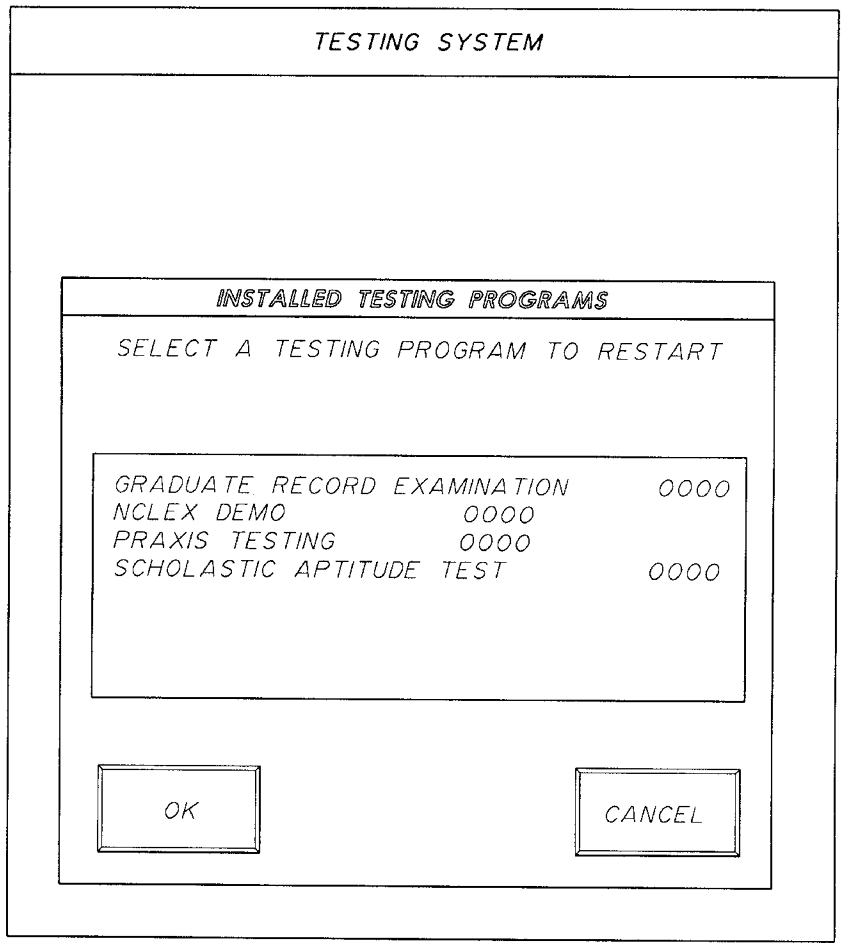
FIG. 79 is an example of a screen provided by the Administrative Application listing the available testing programs.
Figure 80:
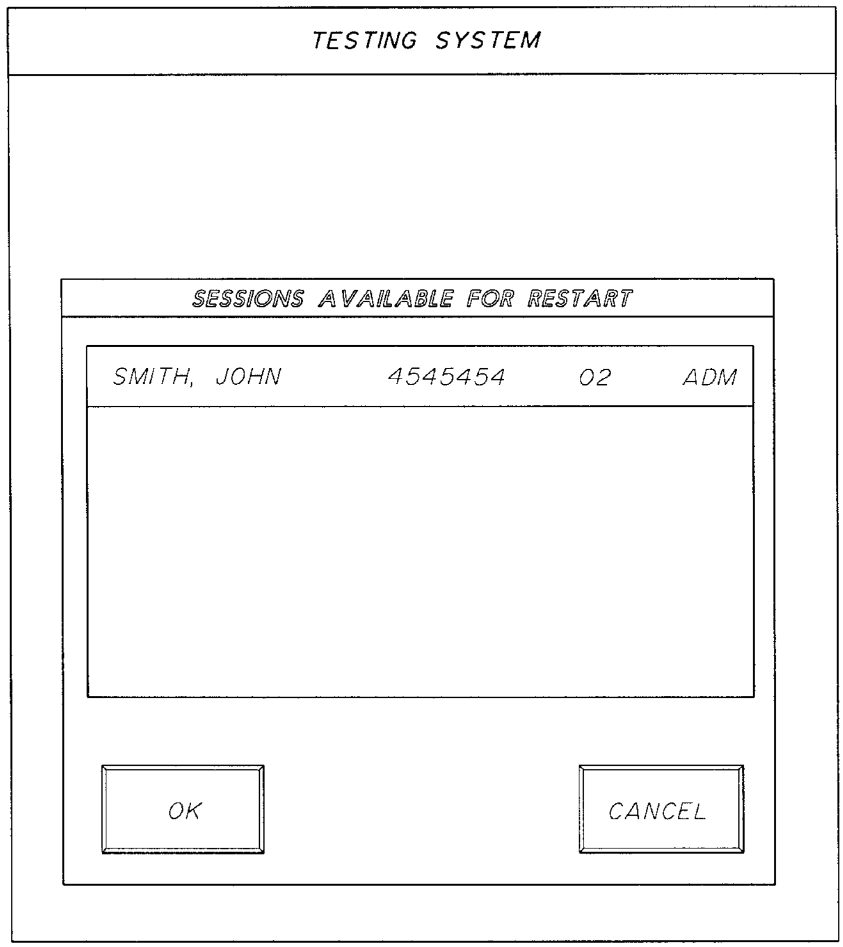
FIG. 80 is an example of a screen provided by the Administrative Application listing the sessions that are available for restart.

A flowchart of the Menu_RestartTest_Procedure is shown in FIG. 78. When the Restart a Test option is selected from the Main Menu, a restart test screen containing a list of installed testing programs may be displayed by the Menu_RestartTest_Procedure at 1201. An example of a restart test screen is shown in FIG. 79. Each line in the list contains both the name of the testing program and the number of restartable sessions found for each testing program. The system identifies the restartable sessions by scanning its status tables and retrieving information from the associated System Parameter files. The administrator selects one of the identified sessions to be restarted at 1202. FIG. 80 shows an example of a screen displaying the available session for restart from which the administrator can select.

The administrator may then choose a testing program at 1203. The administrator may also preferably choose to cancel. If the administrator cancels, the program returns to the caller. However, if the administrator has selected a testing program at 1203, the sessions available for the restart are preferably displayed. An example of such a screen is shown in FIG. 79. The administrator then preferably selects one of the listed sessions to restart at 1204. The administrative application then sets the session's status in the status table to indicate that it is now open. If in the intervening time the session was selected for re-activation at a different station, so that the status now indicates it is open, an error message is preferably displayed and continue at 1201.

When a session is reopened at 1206, the Examinee Confirmation screen may then be displayed at 1208 from the information stored in the Session file. In a preferred embodiment, the examinee is prompted to continue from the Examinee Confirmation screen displayed after restarting the session. When a signal to continue is received from the examinee, the next state is set to the TDS state at 1210. In a preferred embodiment, the session is cancelled if no continue is received within a predetermined period of time, e.g. 60 sec., and the program returns to the caller.

e. Menu_CloseDay_Procedure

Figure 81:
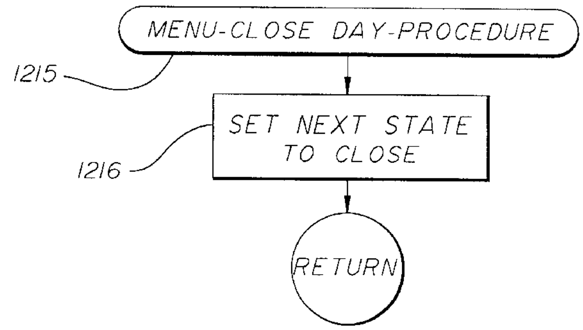
FIG. 81 is a flowchart of the Menu_CloseDay_Procedure of the Administrative Application.

Upon selection of the Close Day option from the main menu, the Menu_CloseDay_Procedure at 1213 sets the next state is to the CLOSE state at 1216 shown in the flowchart of FIG. 81 and the program returns to the caller.

f. Menu_Exit_Procedure

In standalone stations, the Exit option on the main menu is used to leave the administrative application without creating data and backup disks. This option will only be available if the Exit option in the station configuration file is set to Y. In LAN-based centers, the Exit menu option is used to leave every station but the last. The Close-of-Day option is then selected on the last station to shut the system down.

Figure 82:
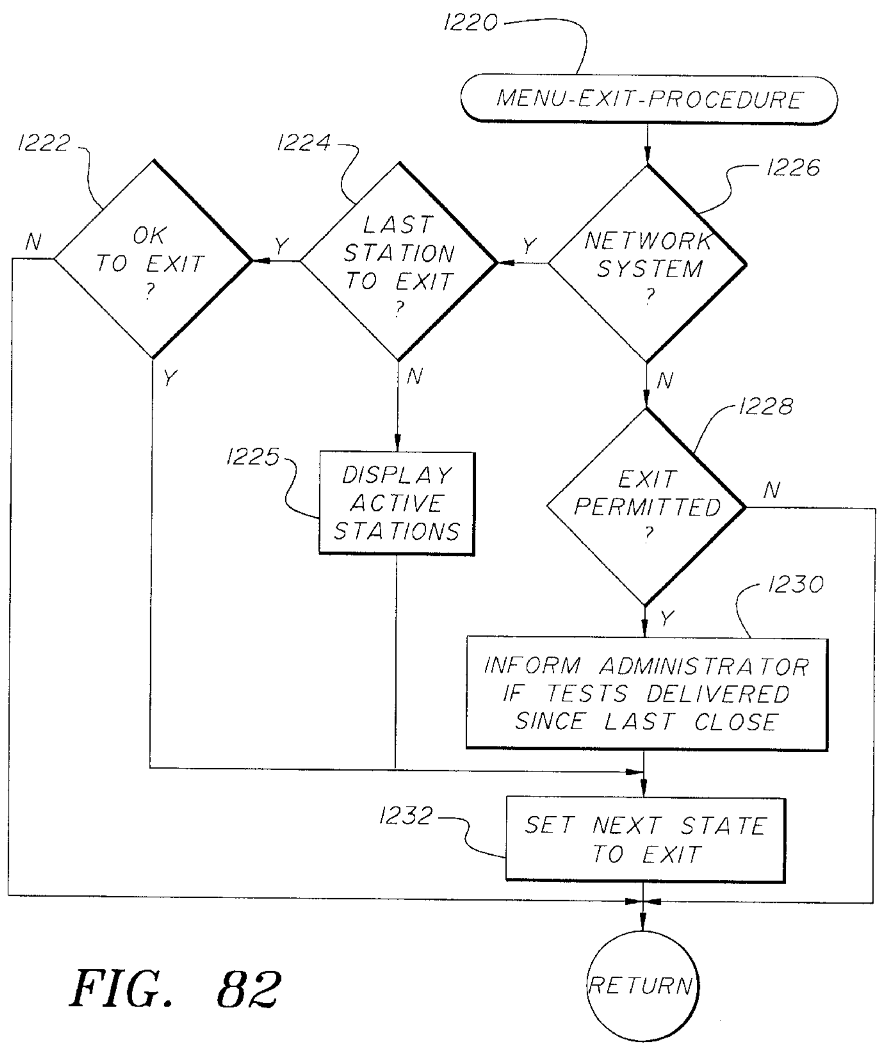
FIG. 82 is a flowchart of the Menu_Exit_Procedure of the Administrative Application.

A flowchart of the Menu_Exit_Procedure is shown in FIG. 82. After the Exit option has been selected by the administrator from the main menu, the Menu_Exit_Procedure is invoked. This procedure may first determine at 1226 whether the workstation is networked to other workstations or whether it is a stand alone workstation. If the workstation is networked, the procedure then may check at 1224 whether the workstation is the last active workstation in the network. If it is the last active workstation in the network, i.e., the last to exit the administrative application, an informational/query message is preferably displayed at 1222 informing the administrator of that fact and seeking confirmation. If the administrator affirms the exit option at 1222, the next state is set to the EXIT state at 1232 and the program returns to the caller.

If the administrator cancels the exit option from the informational/query message at 1222, the program returns directly to the caller without changing the state.

If it is determined at 1224, that other workstations are active, a message indicating that there are other active workstations is preferably displayed at 1225. Then the next state may be set to the EXIT state and then the program returns to the caller.

If it is determined at 1226, that the workstation is a standalone system, the workstation's configuration is checked at 1228 to determine if Exit is permitted. Where Exit is not permitted, the program returns directly to the caller without setting the next state to the EXIT state. However, when Exit is permitted, the procedure then may make a determination at 1230 whether any testing sessions have been administered since the last close of day. If one or more tests have been administered since the last close of day, an informational/query message to that effect is preferably displayed. If the administrator affirms his/her desire to continue the Exit, the next state is set to the EXIT state at 1232. The program is then returned to the caller.

g. Menu_LogonMaint_Procedure

Figure 83A:
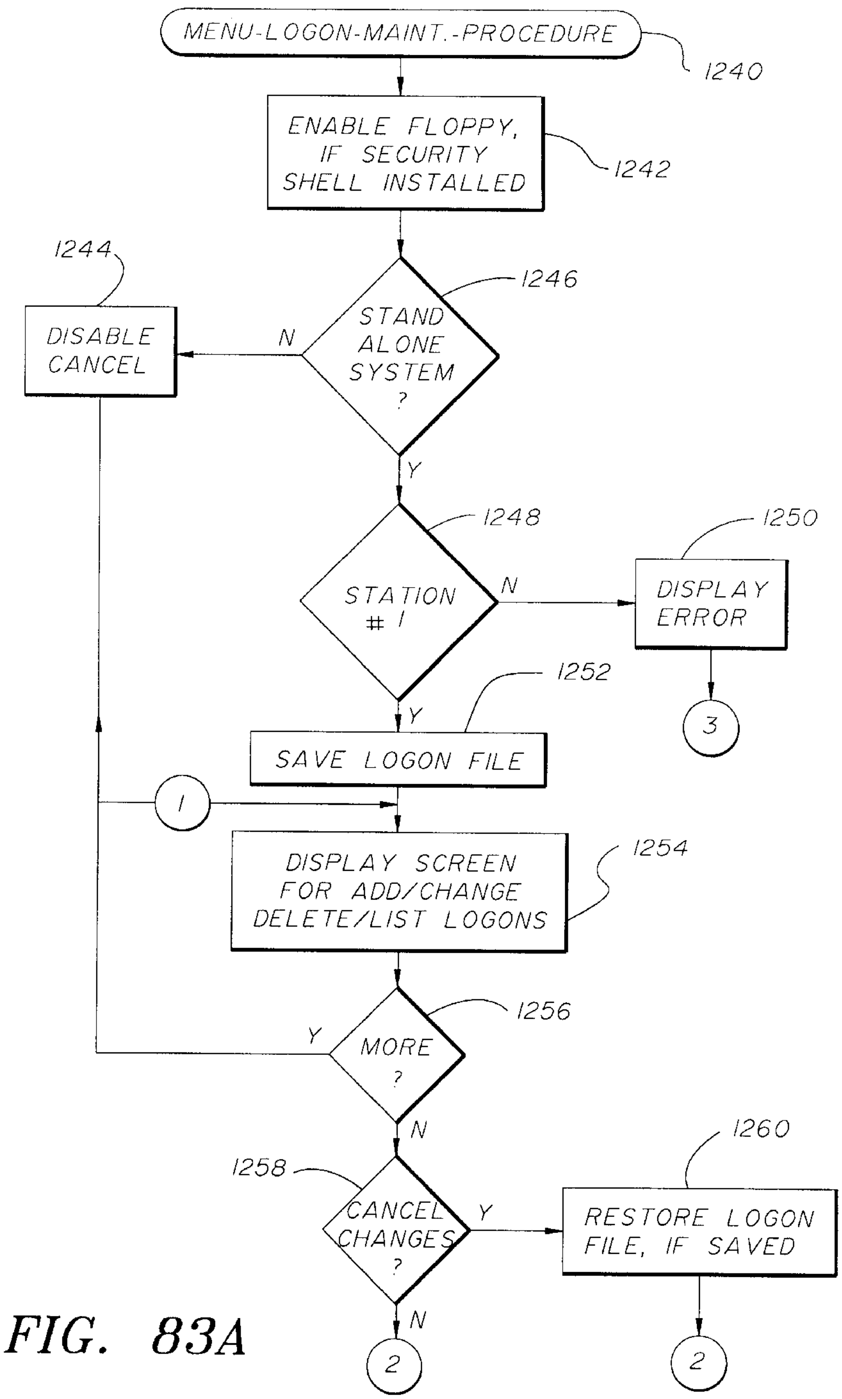
FIGS. 83A and 83B are flowcharts of the Menu_LogonMaint_Procedure of the Administrative Application.
Figure 83B:
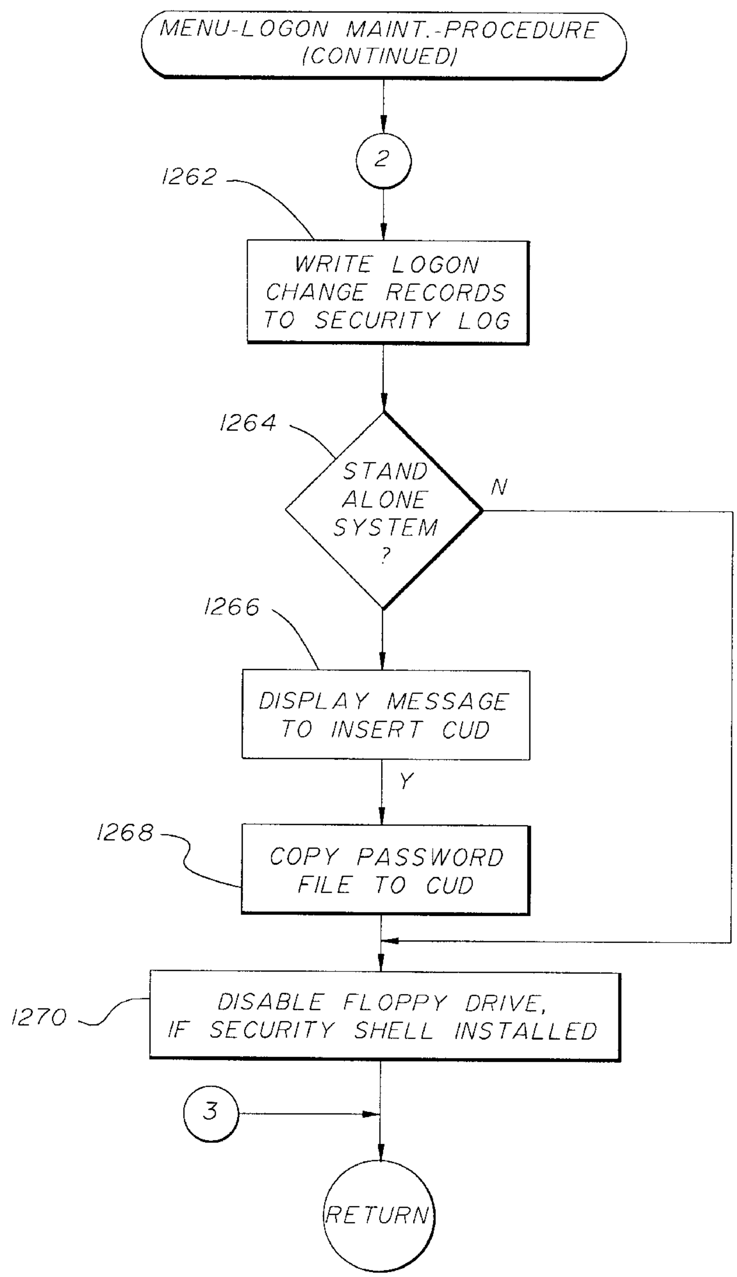
Figure 84:
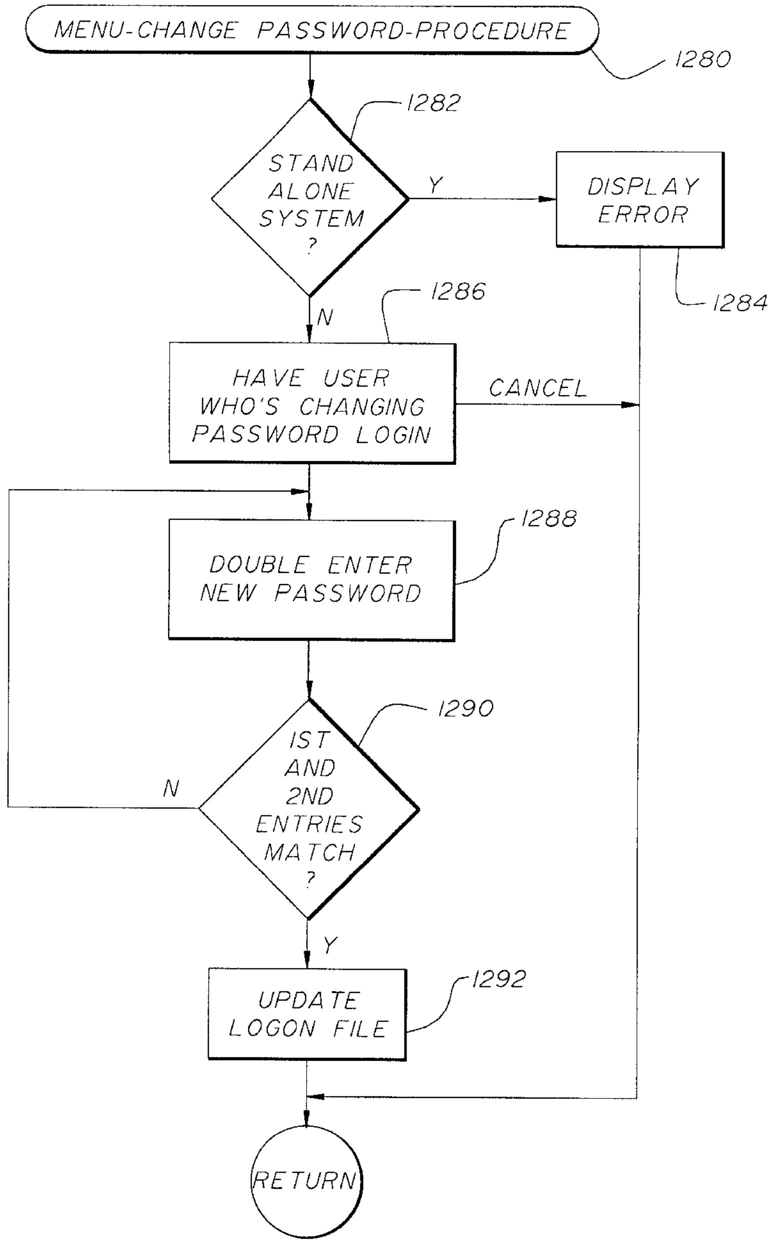
FIG. 84 is a flowchart of the Menu_CHGPassword_Procedure of the Administrative Application.

The Menu_LogonMaint_Procedure is called from the State_Admin_Procedure when the administrator selects the Logon maintenance option from the main menu. A flowchart of the Menu_LogonMaint_Procedure is shown in FIGS. 83A and 83B. If the security shell is installed, the workstation's floppy drive is preferably enabled at 1242. The procedure then may check whether the workstation is configured as a stand alone system or whether it is networked with other workstations at 1246.

If the workstation is a standalone system, but it is not designated as workstation number 1, the preferred station from which logon maintenance can be performed, an error message is preferably displayed at 1250 and the program returns to the caller. If the workstation is a stand alone system and it designated as workstation 1, the logon file may be saved at 1252 for restoration in the event the function is canceled.

If the workstation is determined to be in a networked system at 1246, the CANCEL function is preferably disabled at 1244. A screen containing the list of logon records in the logon file may then be displayed at 1254. In a preferred embodiment, the administrator should be permitted to add a new logon, as well as change or delete an existing logon. The screen listing the logons preferably provides a means by which the administrator can indicate that he or she has made all of the additions, changes, etc. that he or she desires. When the administrator indicates he or she is finished with logon maintenance at 1256, the administrator may preferably cancel the changes at 1258, and restore a local copy of login file from the back up copy. If the administrator does not cancel the changes at 1258, a 'Logon Change' record is written to the security log file at 1262.

In a preferred embodiment, when the workstation is configured as a stand alone system, an instructional message requesting the administrator to insert the CUD is displayed at 1266. After the CUD is properly inserted into the workstation's floppy drive, the updated copy of the logon file is copied to the CUD at 1268. After the logon file is copied, an instructional message requesting the administrator to remove the CUD may be displayed at 1266 until the CUD is removed.

If the security shell had been installed, the floppy drive is preferably disabled at 1270 and the program returns to the caller.

h. Menu_ChgPassword_Procedure

The State_Admin_Procedure invokes the Menu_ChgPassword_Procedure when the administrator selects the "Change Password" option from the main menu. If the workstation is a stand alone system as determined at 1282, an error message informing the administrator that this menu option is only supported on networked systems is preferably displayed at 1284 and the program returns to the caller. If the workstation is networked to other workstations, a logon informational screen is preferably displayed at 1286. Requesting the administrator to enter his or her login ID and password. The screen is preferably displayed at 1286 until the login ID and current password are entered by the administrator. If the administrator cancels, the program returns to the caller without effecting a password change.

After the logon ID and password have been entered at 1286, a screen prompting for the new password may displayed at 1188. In a preferred embodiment, the new password will be prompted for two times. The first and second entries are then compared at 1290. If the two entries do not match, the administrator is preferably prompted two more times to enter the new password.

If the two entries do match at 1290, the login file of the administrator is updated at 1292 with the new password and the program returns to the caller.

Menu_About_Procedure

Figure 86:
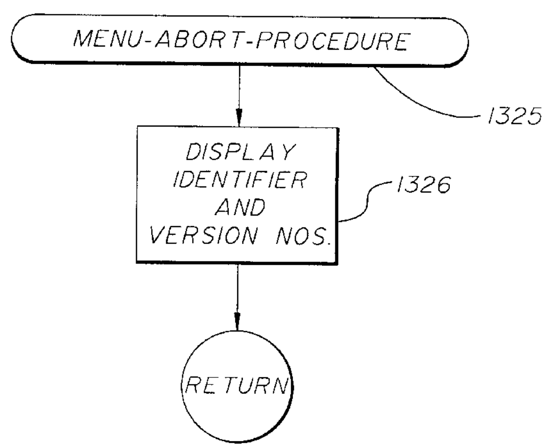
FIG. 86 is a flowchart of the Menu_About_Procedure of the Administrative Application.

FIG. 86 provides attachment of the Menu_About_Procedure. As shown at 1326, the Menu_About_Procedure displays a screen containing an identifier and the installed version number of each of the following:

Test Delivery System

Each installed package for each installed testing program It then returns to the caller.

5. Stop_System_Procedure

Figure 85:
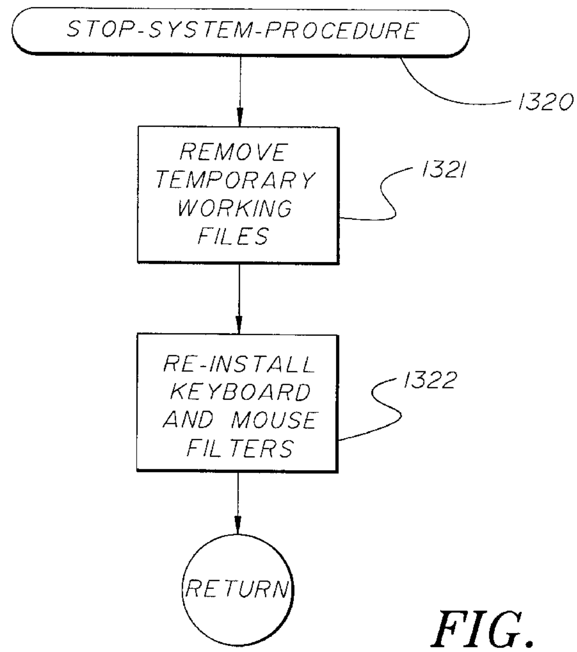
FIG. 85 is a flowchart of the Stop_System_Procedure of the Administrative Application.

When the next state has been set to EXITING, the Main_Procedure calls the Stop_System_Procedure. A flowchart of the Stop_System_Procedure is shown in FIG. 85. Any implementation dependent activities such as removal of temporary working files at 1321, freeing of memory or other resources should be completed. The keyboard and mouse filters are preferably de-installed at 1322 prior to exiting to the workstation's operating system. The program then returns to the Main_Procedure which exits to the workstation's operating system.

V. The Network Data Distribution System (NDDS)

A. Functional Overview

The overall function of the Network Data Distribution System (NDDS) is to process data returned to the central processing sites from the test centers and to distribute that data to the appropriate program specific production post-processing systems e.g. GRE, SAT, etc. Typically current postprocessing systems are designed to process only one record per examinee. Therefore, the NDDS serves as an interface between CBT and the various post processing systems by transforming numerous examinee performance records into only a single file per examinee. The NDDS functions are implemented by the NDDS application software. Preferably the NDDS software supports a multi-user menu based system. Although, it should be understood that substantially any computer system could be used, the NDDS application software is preferably run on a LAN located at the central processing site.

Figure 87:
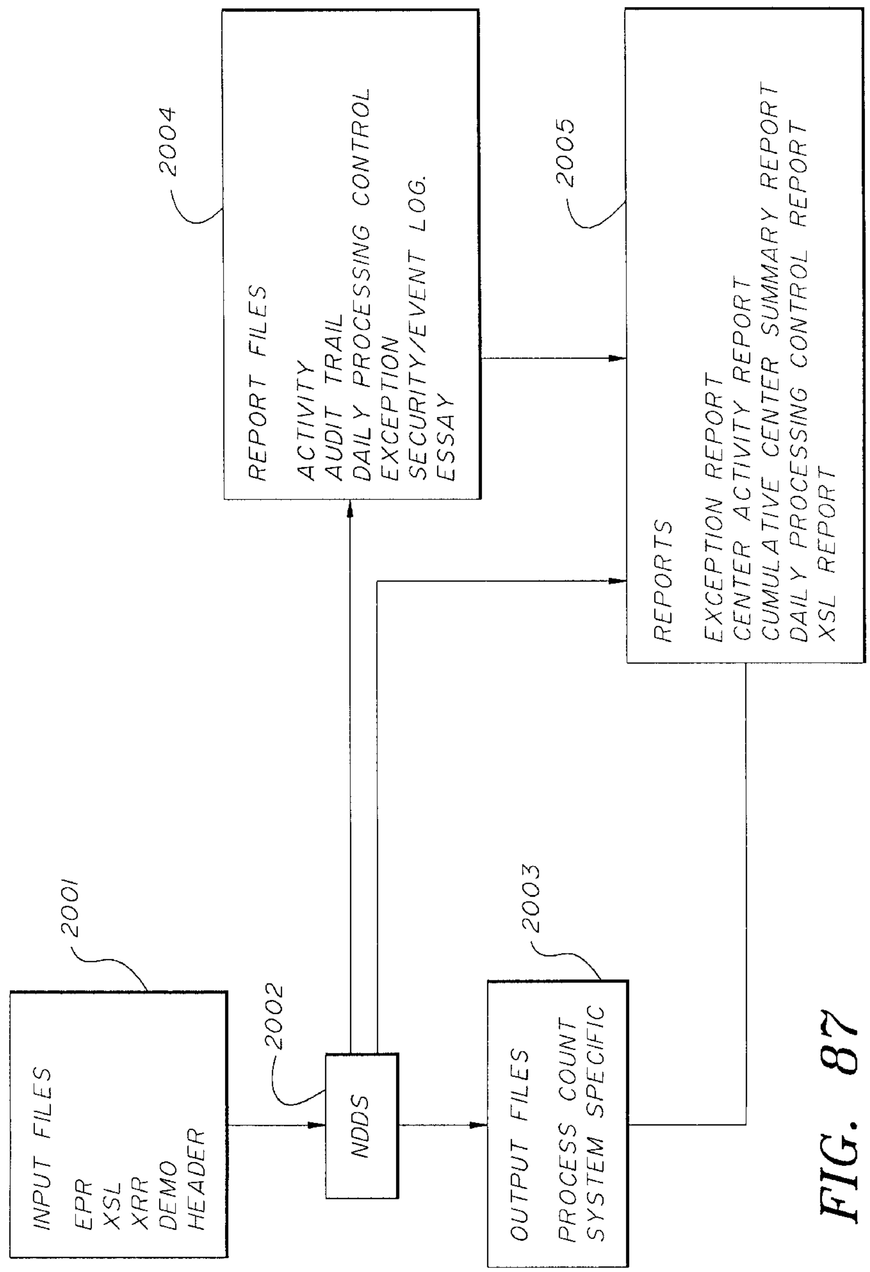
FIG. 87 is a block diagram showing the inputs and outputs of the Network Data Distribution System (NDDS) according to a preferred embodiment of the present invention.

One objective of the NDDS is to process returned examinee data as generically as possible in order to accommodate substantially all current and future test participants. In a preferred embodiment, the inputs and outputs of the NDDS are shown in FIG. 87. The examinee data processed by the NDDS 2002 is shown at 2001 and includes examinee performance files, security log files, error log files, and demo files which will collectively be referred to as transmission files. Additionally, a transmission header file is also preferably provided as an input 2001 to the NDDS. Table 11, below generally describes each of these input files.

TABLE 11

INPUT FILES

| File Name | Description |
|---|---|
| Examinee Performance Record (EPR) | Contains examinee testing data information. |
| Security Log (XSL) | Contains information related to major system events occurring during the administrative application initialization, the testing session, and the close-of day proceeding. |
| Error Log (XRR) | Contains errors that are logged by the TDA during test delivery. |
| Header | Contains a Test Center number, the number of each type of file (referred to as a record type count) and transmission or diskette date creation information. |

The input files 2001 are then processed by the NDDS 2002. The NDDS preferably consists of eight processing components: 1) file processing, 2) security/event log processing, 3) examinee performance record processing, 4) post/format processing, 5) report processing, 6) essay file processing 7) reject/resolution processing and 8) CBT information processing. A detailed description of these processes will be provided below.

Figure 1:
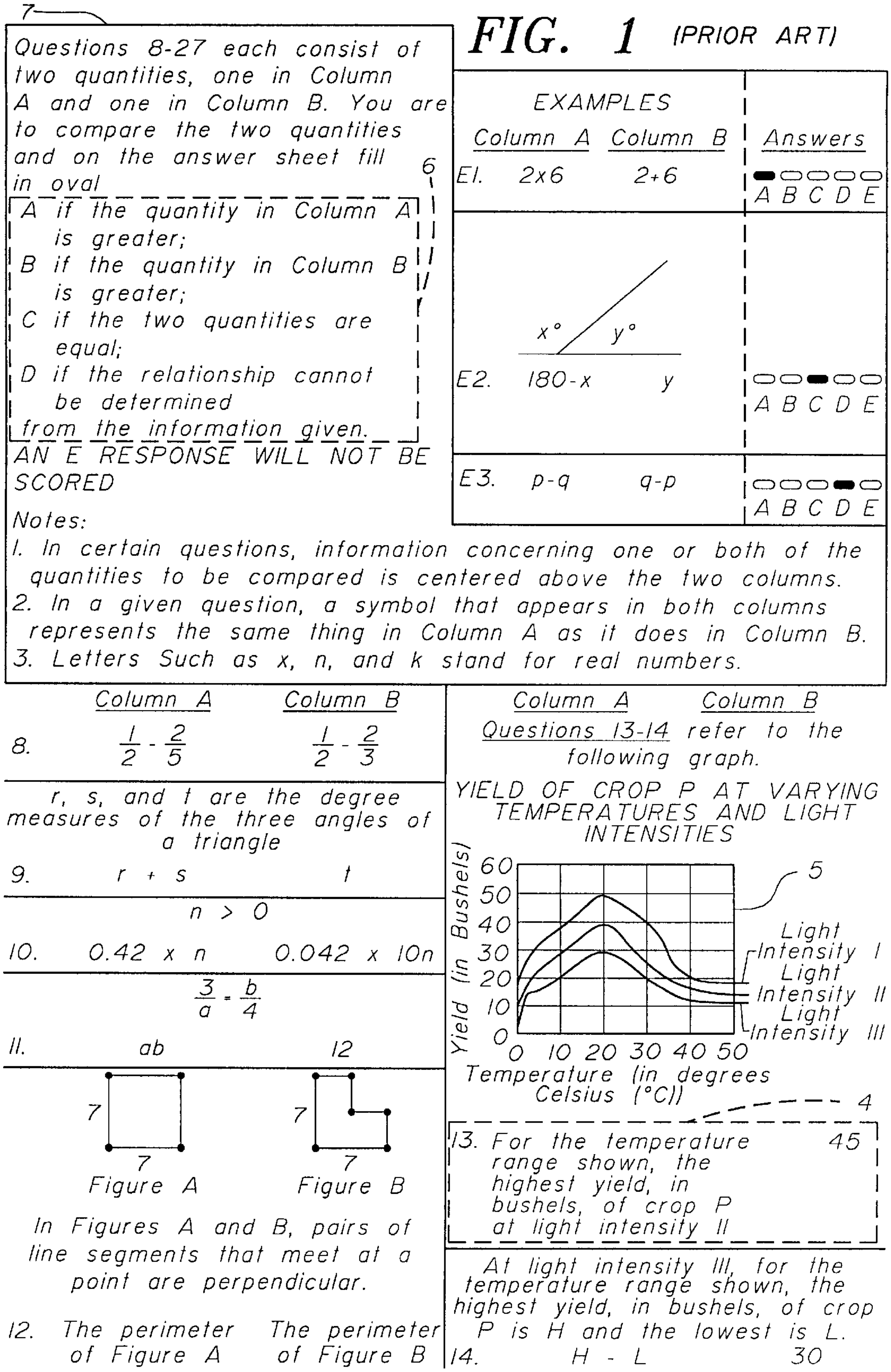
FIG. 1 is an example of written test questions and related directions.
Figure 2:
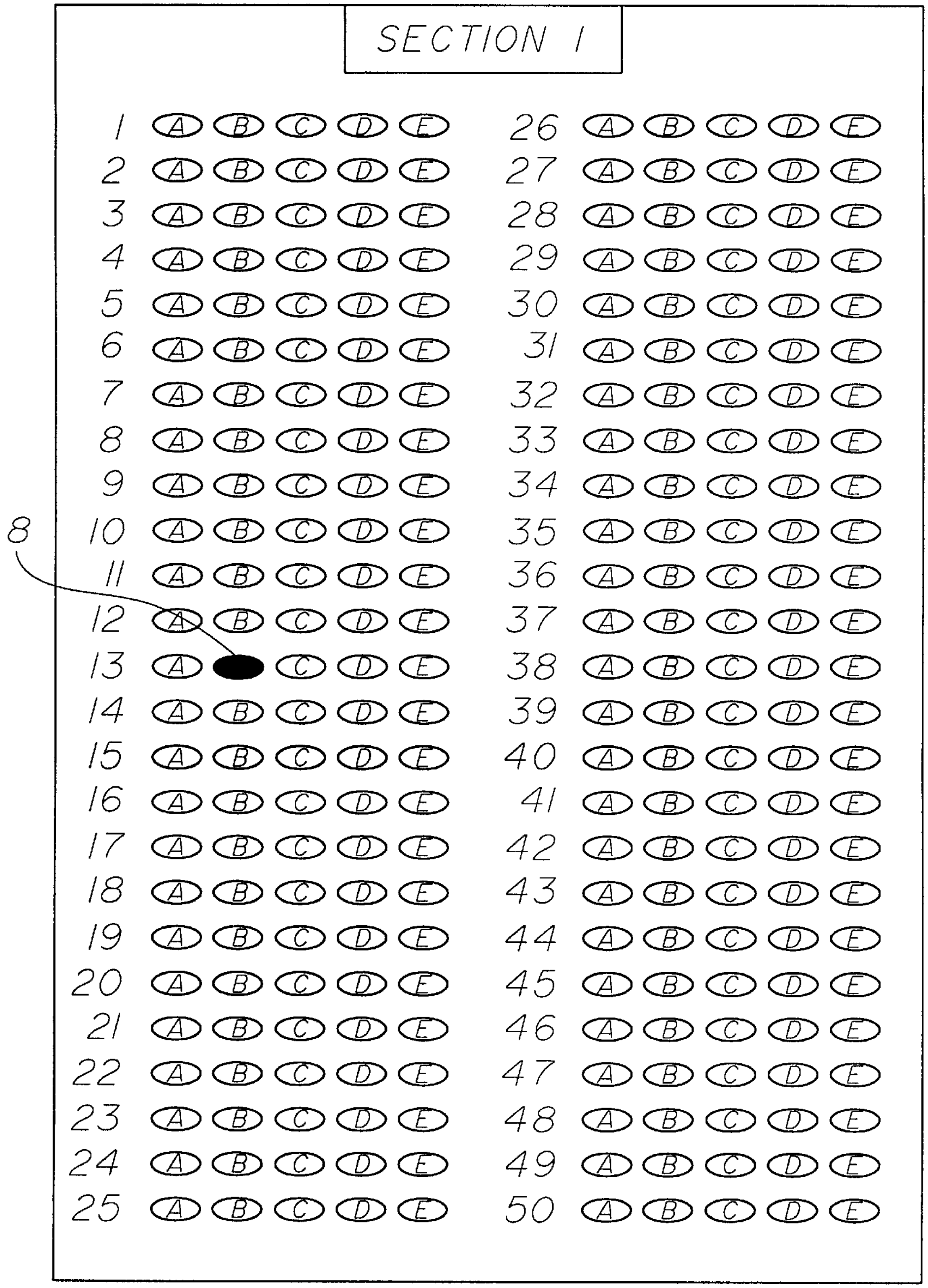
FIG. 2 is a sample answer sheet used for paper and pencil tests.

The processed files may then be used by the NDDS 2002 to provide a number of different reports 2003 as shown in FIG. 1. The NDDS 2002 further utilizes other information to process the input files 2001. This information is stored in NDDS files which may be categorized as either system files or application files. In preferred embodiments, the system files will include those files listed in Table 12, below, and the application files will include those files listed in Table 13, below.

TABLE 12

SYSTEM FILES

| File Name | Description |
|---|---|
| Examinee | Database containing data primarily extracted from EPR files. |
| Security/Event | Database includes Master, Event, and Reconciliation records containing data primarily extracted from XSL files. |
| Essay Topic | Contains essay topic number and associated text. |
| Version ID | Contains the NDDS version number and preferably is updated each time the NDDS installation is performed. |
| Program Control | Contains a configuration definition record from each output file created by the NDDS. |
| Process Tag Configuration | Contains substantially all field definitions for each output file created by the NDDS. |
| Essay Font Configuration | Contains configuration data used for formatting essay file records for printing. |
| Output Definition Tag | Contains a record for each output file describing each field definition. |
| Output Definition Configuration | Contains a record having field reference numbers that relate to the process tag file definitions for each output file created by the NDDS. |

TABLE 13

CBT Application Files

| File Name | Description |
|---|---|
| CBTN | Database containing master, testing program, administrator and comment files and is primarily used for test center control functions, CBT data transmission, and software version number tracking. |
| Authorization | Containing user ID and access codes of the users authorized to use the CBTN Database. |
| Program Code | Containing codes used to identify each CBT that will be or can be processed by the NDDS. |
| Problem | Contains a problem event code, e.g., fire at test center, power outage, category number indicative of severity, and a description of the problem. |

The NDDS generates both output files 2003, examples of which are listed in Table 14 below and report files 2004, listed in Table 15 below.

TABLE 14

Output Files

| File Name | Description |
|---|---|
| Process Count | Containing records of the total number of EPR, XSL, DEMO, and XRR files received from each test center, the number of these files processed by the NDDS and the number of these files that were rejected by the NDDS. |
| System Specific Outputs | The EPR, XSL, DEMO, and XRR files processed by the NDDS as well as any files rejected by the NDDS. |

TABLE 15

Report Files

| File Name | Description |
|---|---|
| Activity | Contains information related to events occurring at a test center, e.g., how many examinees were tested, which tests were delivered, how many examinees were registered, how many registered examinees did not show, etc. |
| Audit Trail | Contains information permitting an examinee to track his or her individual test results after taking a CBT. |
| Daily Processing Control | Contains record counts of the number of records input to the NDDS, processed by the NDDS, and rejected by the NDDS. |
| Exception | Contains NDDS error and warning messages resulting from events during NDDS processing. |
| Security/Event Log | Contains human readable form of the XSL file which tracks events at each workstation. |
| Essay | Contains either a Typed Essay Form which provides the essay text an examinee entered during a test |

TABLE 15-continued

| Report Files | |
|---|---|
| File Name | Description |
| | session or a Topic Sheet listing the essay topics given to an examinee who opted to write the essay text. |

These output files 2003 and report files 2004 contain data used to generate the reports 2005 shown in FIG. 87. The reports 2003 are used by a CBT test center operation group for operating and maintaining test centers.

A display of the NDDS Main Menu is shown in FIG. 88. The Version ID that appears on this screen will be taken from the Version ID file. The ID in that file is preferably updated each time a new release of the NDDS is installed. The details of each of the NDDS processing components used to perform the menu options shown in FIG. 88 are described below.

1. File Processing Component

This component receives the transmission data from the test centers from various media. Preferably, the data received is via one of two media. The first being 3.5 or 5.25 inch diskettes. Each diskette preferably contains a header record. The second media is via modem to modem transmission. To better accommodate the NDDS network, all files received from a test center, via data transmission, are preferably bundled in a single compressed file.

Therefore, the first file process is preferably to unbundle the transmitted data into their original file formats for processing. A number of programs are commercially available to compress data and may be used. It is also preferable that the product used to bundle or compress the data also provides a checksum facility to verify that the data sent from the test center was received by the NDDS in the same format.

As mentioned above, there should be at least three files returned from the test centers—the Examinee Performance Record (EPR) files, the Security Log (XSL) files and the System Error Log (ERR) files. In addition to these files a header file should also be returned on each diskette or with each CBT test center's transmitted files.

a. Process CBT Transmission Files

CBT Transmission files may be received via modem to modem communications or by Banyan network transfers from the test centers.

Figure 89:
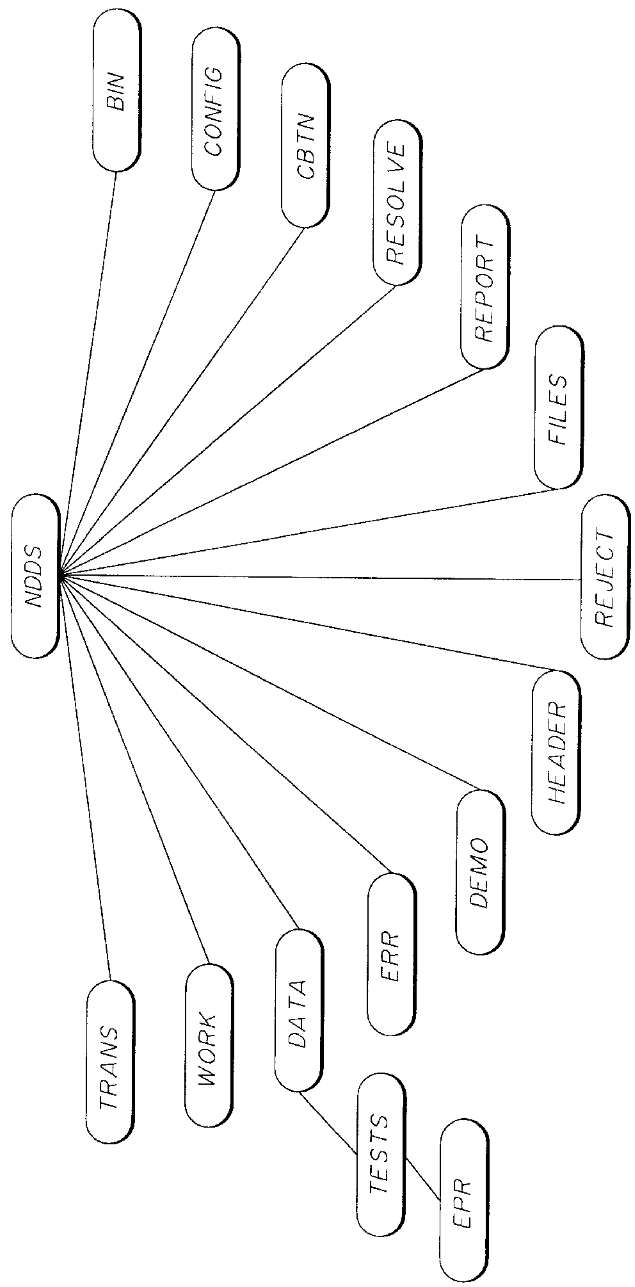
FIG. 89 is a preferred directory structure of the NDDS.

FIG. 89 shows a preferred directory structure of the NDDS. Based on this directory structure, the transmission files to be processed by this option will be stored in the NDDS/TRANS directory when they are received from the test center. These files are preferably in compressed format and are decompressed when they are moved to the NDDS/WORK directory. Upon decompression the transmission file may contain at least one XSL file and a transmission header file and may contain EPR and XRR files.

Figure 90A:
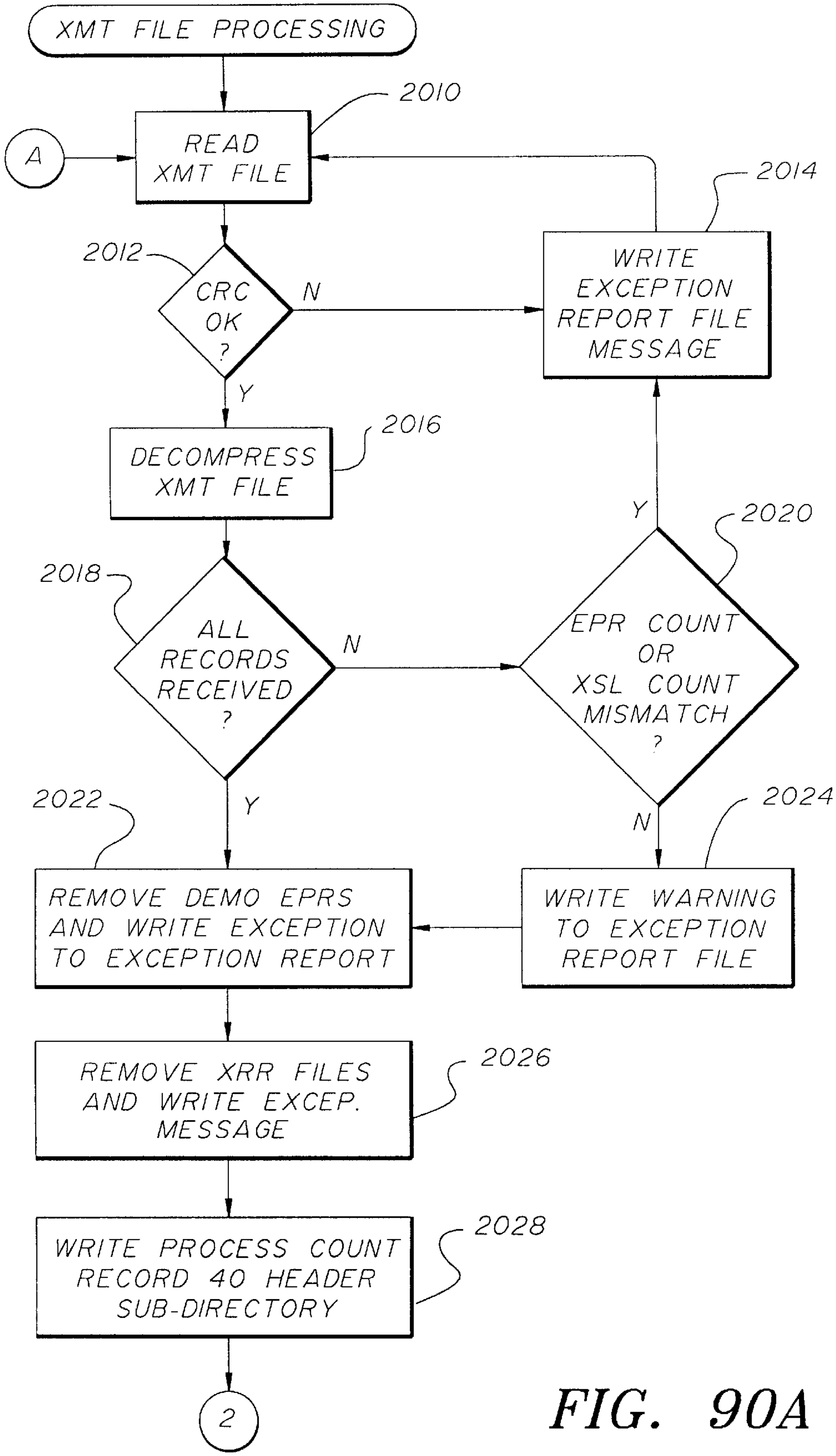
FIGS. 90A through 90C is a flowchart of a preferred procedure for processing CBT transmission files.
Figure 90B:
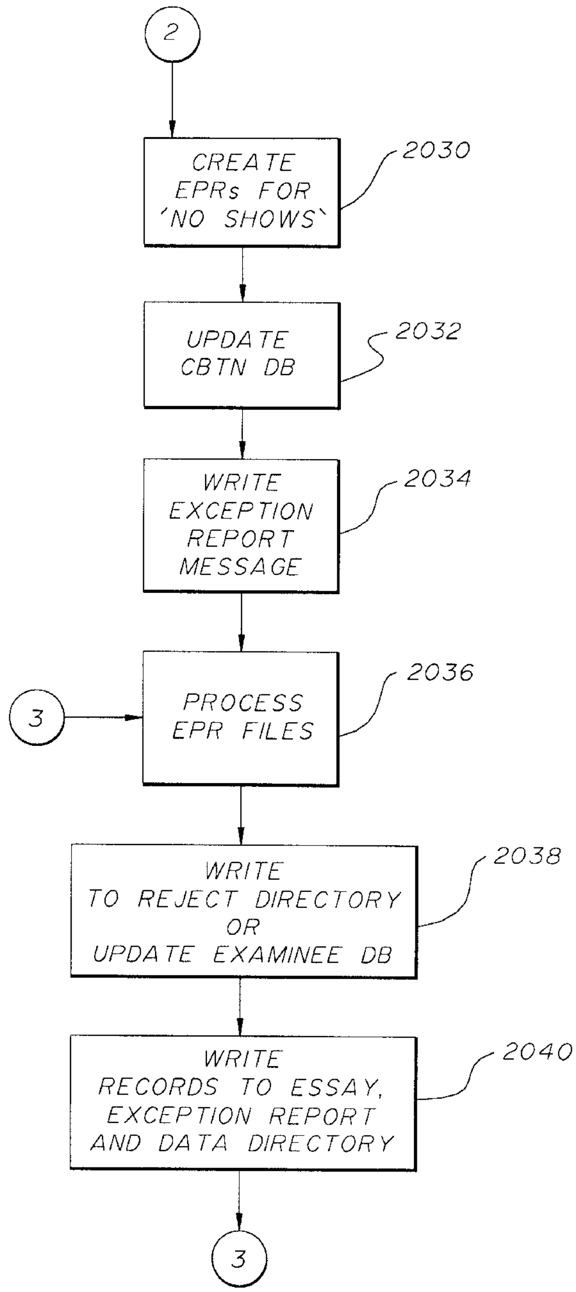
Figure 90C:
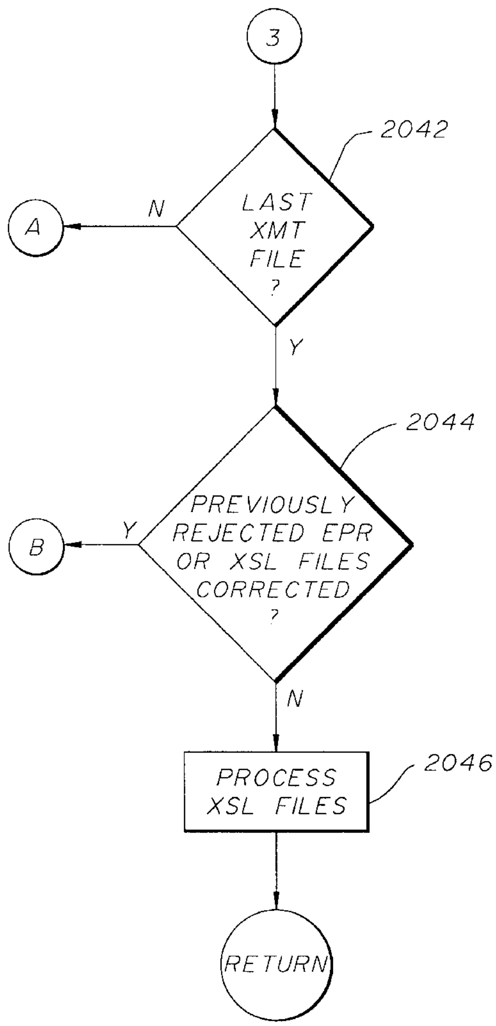

Transmission files are preferably read one at a time until all files in the NDDS/TRANS directory have been processed. A flowchart of this file processing procedure is shown in FIGS. 90A through 90C. The CRC of the compressed transmission file is checked at 2012. If the check fails an Exception report file message may be written at 2014 and processing will continue with the next transmission file at 2010. Table 16, below, lists possible error and warning messages which may be written to the Exception Report file during various NDDS processes and the action preferably taken when an error or warning condition occurs.

TABLE 16

| Exception Report Messages | Action Taken |
|---|---|
| Error Messages | |
| 1. Checksum Error on a compressed Test Center transmission file. | Display file name. |
| 2. Internal NDDS System Error. | Display brief text. (e.g., Out of Disk Space, Memory Allocation, Unable to Open File, etc.) |
| 3. Error Reading the File. | Display file name. |
| 4. EPR Start Session Missing. | Display Test Center no, Date/Time. |
| 5. Invalid EPR Event code. | Display Test Center no, Date/Time, Reg no, Full Name, Event Code and TDA Version ID. |
| 6. Critical EPR Data Error. (Invalid type code, ...) | Display Test Center no, Date/Time, Reg no, Full Name, invalid Field, file name and TDA Version ID. |
| 7. Critical EPR file Event Error. (Start File before previous EPR End File or Start Session before previous EPR End Session). | Display Test Center no, Date/Time, Reg no, Full Name of incomplete EPR file and TDA Version ID. |
| 8. Test, Sections, Items exceed expected limits. | Display Test Center no, Date/Time, reg no., Full Name, Event Code and TDA Version Id. |
| 9. The EPR file count and the count of actual EPR files received do not agree. | Display Test Center No, Date, Header EPR count and Actual EPR received count. |
| 10. The XSL file count and the count of actual XSL files received do not agree. | Display Test Center No, Date, Header XSL count and Actual XSL received count. |
| 11. Critical XSL Data Error. | Display Test Center no, Date/Time, Event Name, File Name and Admin Version ID. |
| Warning Messages | |
| 1. The File XRR file count and the count of actual XRR files received do not agree. | Display Text Center No, Date, Header ERR count and Actual ERR received count. |
| 2. Duplicate XSL record found. Test Center No. Workstation No. Session No and Date/Time matched a Security/Event log record already on the Security/Event Log database. | Display Test Center no, Date/Time, Workstation and Session Numbers. |
| 3. Record processed contained the same Examinee Reg. Number as an existing examinee but the Examinee Names are different. | Display Test Center, Date, Program code, Reg no and both Examinee Full Names. |
| 4. Record processed contained the same Examinee Reg Number and Full Name as an existing examinee but a different Time/Date. | Display Test Center, Date/Time, Program code, Reg no, Full Name, and both time/dates. |
| 5. Checksum error on an EPR file. | Display Test Center no, Date/Time, Event Name, Reg no, Full name and the EPR file name. |
| 6. EPR Event sequence error. EVENT NAME 1 followed by EVENT NAME 2 found in EPR file. | Display Test Center, Reg no, Full Name, Date/Time and TDA Version ID. |

TABLE 16-continued

| Exception Report Messages | Action Taken |
|---|---|
| 7. Version Number Discrepancy with CBTN Database. | Display Test Center no Reg no, Full Name, Date/Time, Version no type - CBTN database Version Number and EPR Version Number or XSL Version Number. |
| 8. EPR Event Header Sequence Number Error. | Display Test Center no, Reg no, Full Name, Date/Time, Event Name, previous and current Seq nos and TDA Version Id. |
| 9. Essay EPR contains invalid or missing data. | Display Test Center no Date/Time Reg no, Full Name, Topic no and TDA Version ID. |
| 10. EPR EVENT NAME (either Start Session or Restart Session) contains Administrator Text. | Display Test Center no, Date/Time, Reg No, Full Name and Annotated Text. |
| 11. A Demonstration Record was returned. | Display Test Center no, Date and file name. |
| 12. A System Error Log File (XRR) has been returned. | Display Test Center No, Date and file name. |
| 13. Checksum error on an XSL file. | Display Test Center No, Date/Time, Event Name and XSL file name. |
| 14. The XSL Start Accepted record contains SCUA violation(s). | Display Test Center, Date/Time, Station no, Session no, SCUA count(s) in violation and XSL file name. |
| 15. The XSL Start Rejected record reason code was non blank. | Display Test Center, Date/Time, Station no, Session no, Reason Code and XSL file name. |
| 16. The XSL Logon record timestamp indicates a Logon at an unauthorized time. | Display Test Center, Date/Time, Station no, Session no, administrator name and XSL file name. |
| 17. A testing workstation was open for more than 12 hours. | Display Test Center no, workstation number, workstation open date/time, the workstation close date/time and XSL file name. |
| 18. The PC history in a Start Log record reflects an entry for which no corresponding XSL Start Log record has been received. | Display Test Center no and the PC History data for the missing Start Log (Date/Time, Station no, Session no and Administrator Name). |
| 19. XSL Close Day reconciliation count information. | Display Test Center, Date, Station no and Session no. Display by program, test administration and demonstration session system generated and administrator entered counts with associated administrator paper report indicator and comments. |
| 20. Duplicate EPR record found. Reg no, Full Name, Test Center No and Date/Time matched and examinee already on the Examinee database. | Display Test Center no, Date/Time, Reg no and Full Name. |
| 21. The scheduled transmission for the following center was not received. | Display Test Center No, Date. |
| 22. The non-scheduled transmission for the following center was received. | Display Test Center No, Date. |
| 23. The scheduled data disk receipt for the following center was not received. | Display Test Center No, Date. |
| 24. The non-scheduled data disk was received for the following center. | Display Test Center No, Date. |
| 25. CBTN Center Number not found on CBTN Database Master file. | Display Test Center no, Date/Time, Reg no and Full Name. |

If the CRC check is OK, the transmission file is decompressed at 2016. The header file record counts are then compared to the actual number of EPR, XSL and XRR files received at 2018. If the counts for the EPR or XSL files do not agree as determined at 2020, an Exception report file message may be written at 2014 (Error Message No. 9 or 10). If the count for the XRR files received does not agree a warning message is preferably written to the Exception report file, but processing may continue with EPR and XSL file processing at 2022 (Warning Message No. 1).

Any DEMO EPR files are preferably moved to the NDDS/DEMO directory at 2022 and an appropriate exception message is written to the Exception Report file (Warning Message No. 11). The XRR records are then preferably moved to the NDDS/ERR directory and the appropriate exception message is written at 2026 to the Exception Report File (Warning Message No. 12). The Process Count record is preferably written to the NDDS/HEADER directory at 2028. Focusing now in FIG. 90*b*, the XSL files may then be processed at 2030 creating skeleton EPRs for "No Shows". The CBTN Database is then preferably updated at 2032 with record version number changes contained in XSL records so that the IPT, TPT, TPAK, TDA and administrative application version numbers being used at each test center may be tracked for maintenance purposes. An exception message (Warning Message No. 7) is preferably printed upon each update.

The EPR files are then processed by adding a record to the Examinee database or by adding the EPR file to the Rejection Directory at 2038. (EPR processing will be described in detail below.) Then records may be added to the Essay, Exception Report or Program Specific Data Files at 2040.

After the last transmission file is processed as determined at 2042 the NDDS/RESOLVE (Resolution directory) is checked at 2044 in FIG. 90*c* for any previously rejected EPR or XSL files that have been corrected. If there are any corrected files, then file processing continues by returning to step 2036. The XSL files are then preferably processed by adding records to the Security/Event Log database and the Exception Report file at 2046. Upon completion, the program returns to the main menu shown in FIG. 88.

b. Process CBT Data Disk(s)

The Data Disks are preferably received on 1.44 MB 3.5 inch or 1.2 MB 5.25 inch diskettes and there may be multiple disks received from a test center for a testing day. The diskettes preferably contain at least one XSL file and a header file and may contain EPR and XRR files. If multiple disks from the same test center for the same testing day are received the header file is preferably stored on the last disk. A secondary screen, shown in FIG. 91, may be displayed upon selection of the "Process CBT Data Disk(s)" option to prompt for initial and possible multiple test center data disks. If F2 or any other key designated to initiate processing is pressed before a disk containing a transmission header file for the center being processed is loaded, the message "HEADER FILE NOT FOUND. PLEASE LOAD NEXT DISK FOR THIS CENTER" is preferably displayed.

Figure 92A:
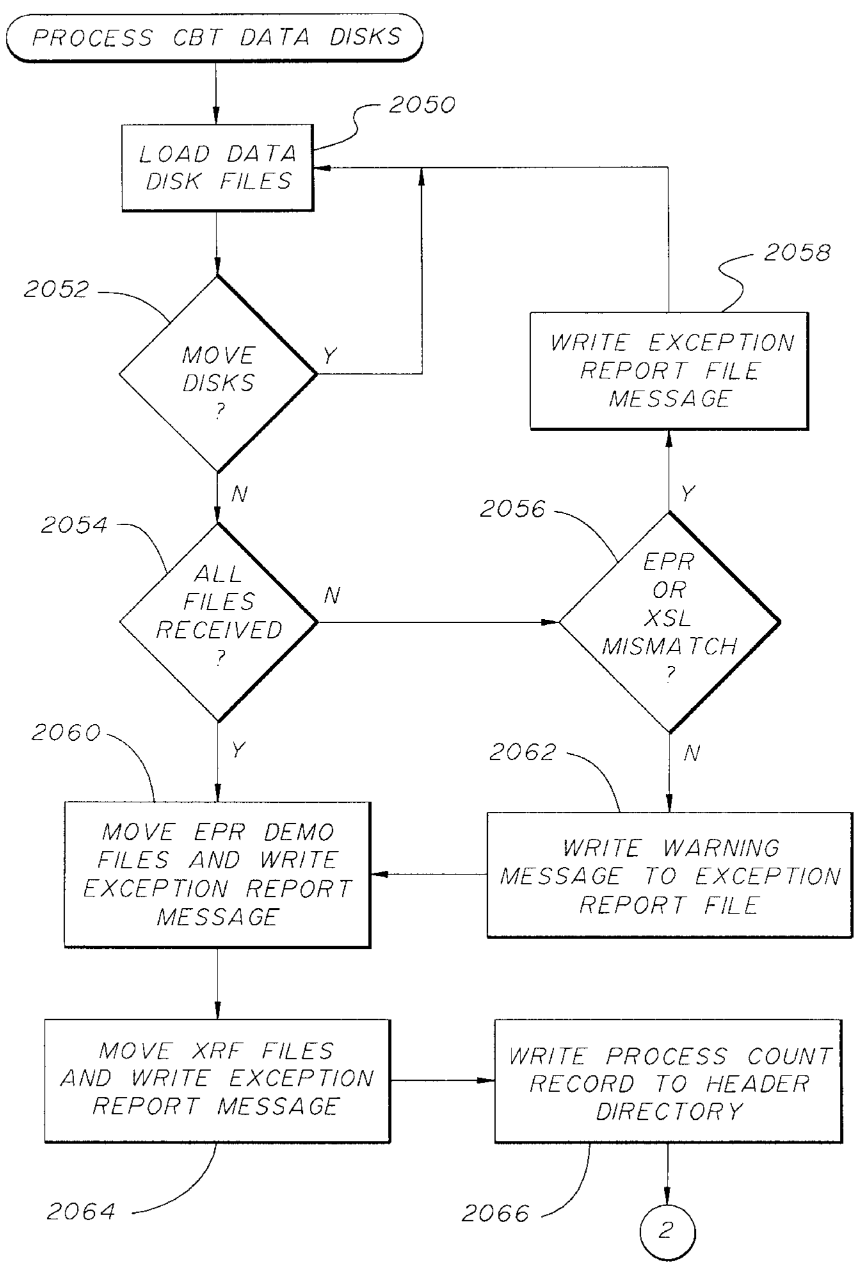
FIGS. 92A and 92B is a flowchart of a preferred procedure for processing the CBT Data Disks.
Figure 92B:
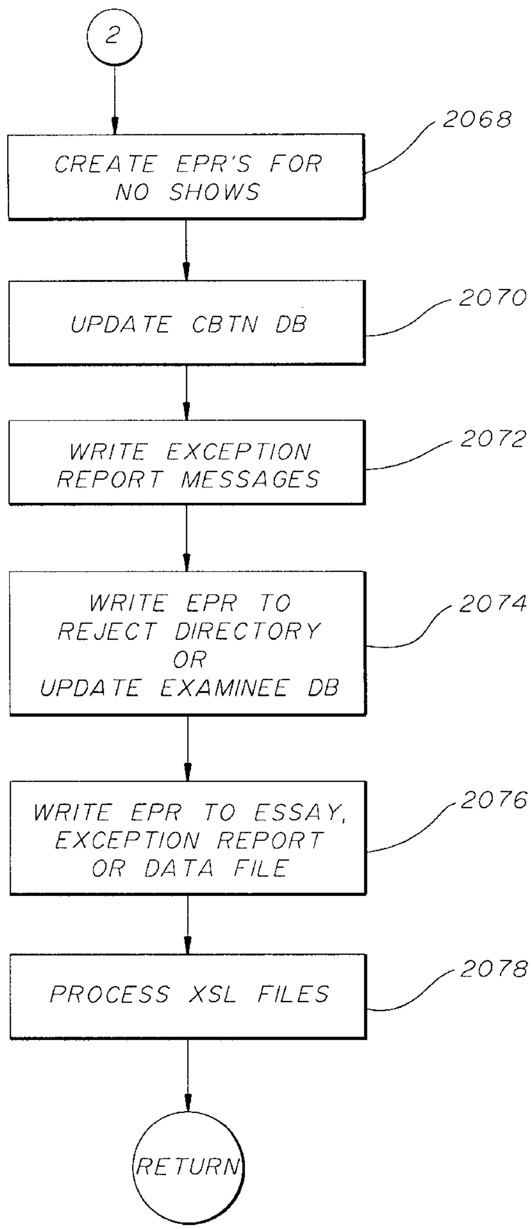

In a preferred embodiment, the data disks will also be processed one at a time. However, since multiple data disks from the same test center for the same testing days may have been received, the processing shown in the flowchart of FIGS. 92A and 92B are preferably implemented to process multiple disks. The files on the data disk are loaded to the NDDS/WORK directory at 2050. If there are additional data disks for that center, step 2050 is repeated until a data disk with a header file for that test center is found and the NDDS operator confirms that the last disk for that center has been loaded at 2052. The header file record counts are preferably compared with the actual number of EPR, XSL and XRR files received at 2054. If the counts for the EPR or XSL files do not agree an Exception report file message is written at 2058 and the next test center's disk(s) is loaded at 2050. If the count for the XRR files received does not agree a warning message is written at 2062 to the Exception Report file and the program preferably continues at 2060 processing the EPR and XSL files.

The DEMO EPR files are then moved to the NDDS/DEMO directory and an appropriate exception message is written to the Exception Report file at 2060. The XRR records may then be moved to the NDDS/ERR directory and an appropriate exception message is preferably written at 2064 to the Exception Report file. The Process Count record is then written at 2066 to the NDDS/HEADER directory.

The XSL files may then be processed to create skeleton EPR records for "No Shows" at 2068. The CBTN Database is then updated at 2070 with record version number changes contained in records in the XSL file. Appropriate Exception Report messages are written to the Exception Report File at 2072. The EPR files are then processed and records are added to the Examinee database or the EPR file is added to the Reject Directory at 2074. Records may then be added to the Essay, Exception Report, and/or data files at 2076. The XSL files are then processed at 2078 so that records are appended to the Security/Event Log database and the Exception Report file.

c. Process CBT Backup Disk(s)

The Backup Disks are preferably received on 1.44 MB 3.5 inch or 1.2 MB 5.25 inch diskettes and there may be multiple disks received from a test center. The diskettes preferably contain at least one XSL file and a header file and may contain EPR and XRR files. In preferred embodiments, the Backup disk(s) may contain up to a month of testing files. Therefore, if the "Process CBT Backup disk(s):" option is selected a secondary menu, shown in FIG. 94, for file selection is preferably displayed. If the backup files for a test center are contained on multiple disks the header file is preferably stored on the last disk.

To process CBT data files from a backup disk, the file(s) are preferably selected from the disk by date, date range and/or examinee registration ID. In a preferred embodiment, individual files may be selectively processed by using the Examinee Registration ID selection. The screen shown in FIG. 93 may be displayed in a preferred embodiment so that files on multiple backup disks may be processed. In a preferred embodiment, the "Process CBT Back Up Disk" option will be carried out according to the flowcharts shown in FIGS. 94A and 94B.

An NDDS operator will first be prompted to enter criteria upon which files to process can be selected at 2080. The selection criteria may include, for instance the date, date/range and/or examinee ID registration number. The file(s) are loaded at 2082, based on the selection criteria, from the backup disk to the NDDS/WORK directory. If there are additional backup disks for that center, step 2082 is repeated until a backup disk with a header file for that center is found and the NDDS operator confirms at 2084 that the last disk for that center has been loaded. The DEMO EPR files are then preferably moved to the NDDS/DEMO directory and an appropriate exception messages is written to the Exception Report file at 2086. The XRR records are preferably moved to the NDDS/ERR directory and an appropriate exception message is written to the Exception Report file at 2088. The Process Count record may then preferably be written to the NDDS/HEADER directory at 2090.

Figure 94A:
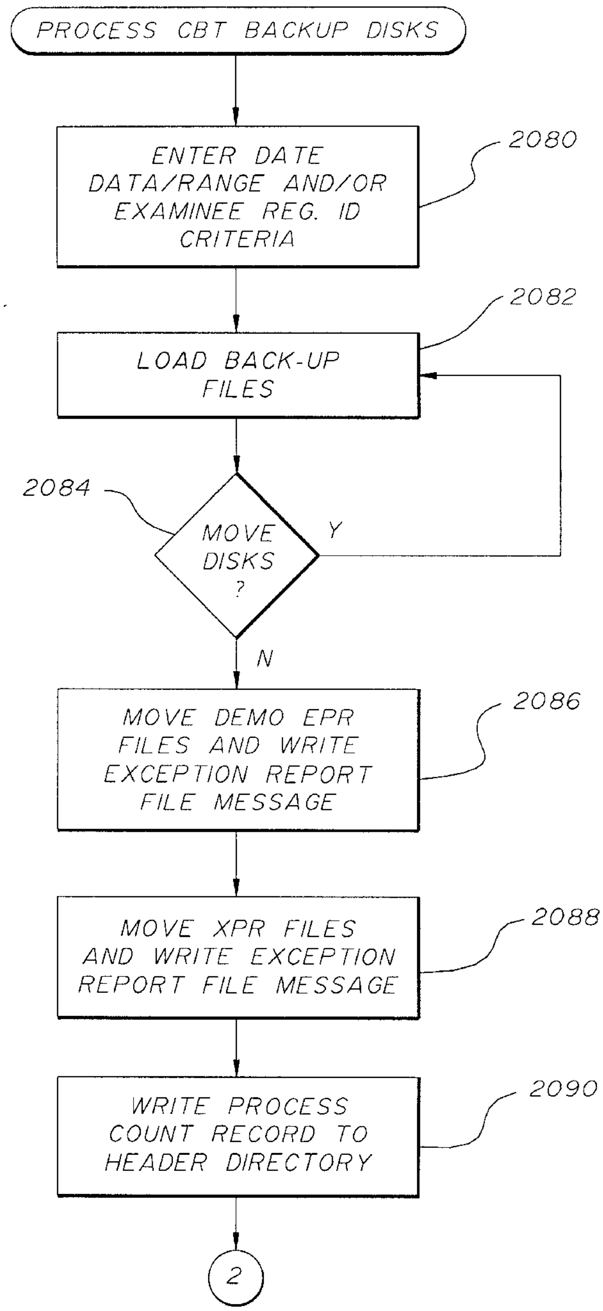
FIGS. 94A and 94B is a flowchart of a preferred procedure for processing the CBT Backup Disks.
Figure 94B:
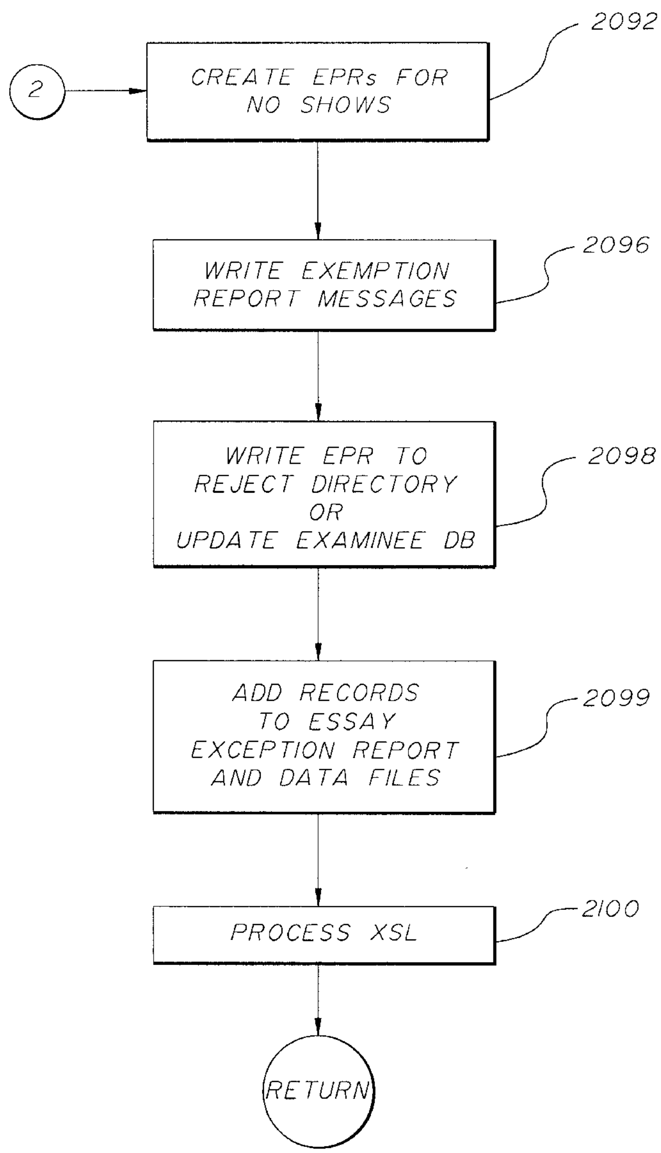

Referring to FIG. 94B, the XSL files may then be processed creating skeleton EPR records for "No Shows" at 2092. Appropriate Exception Report messages may then be written to the Exception Report File at 2096.

The EPR files may then be processed adding records to the Examinee database or the EPR file to the Reject Directory at 2098. Other records may be added to the Essay, Exception Report, and data files at 2099. The XSL files may then be processed adding records to the Security/Event Log database and the Exception Report file at 2100.

d. Process Count File Record Process

As described above the process count file records are preferably written to the process count file during the data or backup disk and transmission file processing. A count record for each test center's records that are processed will be written as shown at 2028 in FIG. 90A, at 2066 in FIG. 92A, and at 2090 in FIG. 94A. The counts in these records that will be written during the data or backup disk and transmission processes will be the number of EPR's, XSL's, DEMO EPR's and XRR's. Some examples of the process count file fields may include:

TEST CENTER NUMBER
EPR INPUT COUNT
XSL INPUT COUNT
DEMO EPR INPUT COUNT
XRR INPUT COUNT
NO SHOW EPR GEN COUNT
XSL PROCESSED COUNT
XSL REJECTED COUNT
EPR PROCESSED COUNT FOR EACH TEST PROGRAM
EPR REJECTED COUNT e. End of Day Process After all of the records are received from the test centers and processed by the NDDS, the End of Day Process may be selected from the main menu shown in FIG. 88. The End of Day Process generates an NDDS Processing Control Report. The NDDS Processing Control Report essentially provides a human readable form of the process count file. The CBT test center operations personnel may review this report to verify whether all of the transmitted records were received from the test centers.

2. Security\Event Log Data Component

The security event log data processing component receives XSL records from the file processing component. Specifically this process is initiated by the file processing procedures as shown at 2046 in FIG. 90C, at 2078 in FIG. 92B, and at 2100 in FIG. 94B. This process will preferably first verify the checksum of the XSL records. The files resulting in error will be added to a Reject file and an appropriate message will be written to the Exception Report file. The other records are added to the Security/Event Log database. The following are some examples of conditions which might produce security exception messages in preferred embodiments.

1. The occurrence of security violations.
2. A start rejection record was written as a result of the administrator being unable to properly log on.
3. A system logon time occurred at an unauthorized time.
4. The testing workstation was open for greater than a predetermined maximum number of hours without being closed.
5. The Start Log PC History reflects an entry for which there is no corresponding XSL Start Log record.

These conditions will be checked for and an appropriate warning message will be written to the Exception Report file for each record meeting the above criteria.

Each XSL file preferably generates one new master record, a number of event records, depending on their event record types and a reconciliation record or records in the Security/Event Log Database. The master record is written to the CBTN database and contains linking information to the other records in the database. The reconciliation record preferably contains system generated and administrator entered test administration and demonstration session counts and optional administrator text associated with each count group. These records may be used to generate Exception Report file records for count discrepancies between the system generated and administrator entered counts and for any administrator text returned in the record. Preferably, the printed Exception Report messages will subsequently show the counts and the text from these records.

Table 17, below provides a preferred structure of the Security/Event Log Database records which may be created during the security/event log processing component.

TABLE 17

SECURITY/EVENT LOG DATABASE FILES

| Field Name | Field Description |
|---|---|
| MASTER RECORD | |
| CBTN Center Code | Testing Center Code |
| Workstation Number | Testing Station Number |
| Time/Date Stamp | Time & Date from XSL Start Log or Accepted |
| Session Number | Testing Session Number |
| Processed Date | Data the NDDS processed this XSL |
| Start Time | Log start time |
| End Time | Log end time |
| Admin Version ID | Admin software version ID |
| PC History 1 | History of the last 5 |
| PC History 2 | sessions known to the admin |
| PC History 3 | software. Intended use is to |
| PC History 4 | detect unauthorized |
| PC History 5 | execution of the OSA software |
| EVENT RECORDS | |
| CBTN Center Code | Database Key information to |
| Workstation Number | locate the event records |
| Time/Date Stamp | below. |
| Time/Date Stamp | |
| Event Record Type | |
| Event Record Type * = XSL | |

TABLE 17-continued

SECURITY/EVENT LOG DATABASE FILES

| Field Name | Field Description |
|---|---|
| Logon Record | |
| Administrators Real Name | |
| Default Password Used | Indicator for default password use in logon |
| Event Record Type * = XSL | |
| Start Accepted | |
| Session Start Type | 0=Cold Start 1=Restart |
| Scua Violation Count #1 | If any Count field is > 0 |
| Scua Violation Stack #1 | this indicates a security |
| Scua Violation Count #2 | violation. the Stack fields |
| Scua Violation Stack #2 | were not used by the OSA |
| Scua Violation Count #3 | software. |
| Scua Violation Stack #3 | |
| Event Record Type * = XSL | |
| Start Rejected | |
| Reason | Rejection code 0–4. Refer to Admin doc. |
| Event Record Type * = XSL | |
| Administer Test | |
| Examinee Registration # | Reg Id of examinee tested |
| Package Control Ver ID | Examinee tested with this software package |
| Test Type | O=Operational 1=Demo |
| Software Used | O=Operational 1=Experimental |
| No Show | O=did not show for test 1=showed |
| Examinee Name | |
| Date of Birth | Self explanatory |
| Event Record Type * = XSL | |
| Logon Change | |
| Operation Flag | 1=add, 2=delete, 3=change rec, 4=change password |
| LogonID | 8 character ID |
| Administrators Real Name | |
| Authority | 1=can add new logons, 0=administer test only |
| Event Record Type * = XSL | |
| Maintenance Performed | |
| Admin Software Version ID | Updated Ver ID's of OSA |
| TDA Version ID | installed software |
| SKM Version ID | |
| Package Ctrl Version ID #1 | Package Id's for each test |
| Package Ctrl Version ID #2 | package updated by this |
| Package Ctrl Version ID #3 | Maintenance Performed |
| Package Ctrl Version ID #4 | record. |
| Package Ctrl Version ID #5 | |
| Package Ctrl Version ID #6 | |
| Package Ctrl Version ID #7 | |
| Event Record Type * = XSL Out of Date Password record | |
| Administrators Real Name | |
| Expiration Date (Time/Date Stamp) | |
| RECONCILIATION RECORD | XSL Close Day record |
| CBTN Center Code | Database key for this |
| Workstation Number | records type |
| Time/Date Stamp | |
| Program Name | GRE, PRX etc. |
| System Count | Count of EPR's and Demo's by the OSA system |
| Administrator Count | Count of EPR's and Demo's by the Administrator |
| Paper Report | 0=no report returned 1=report returned |
| Administrator Comments Free form text written by administrator | |

*These event records have been described in Section IV(B) hereinabove.

3. Examinee Performance Record (EPR) Processing

This process begins with duplicate record checking of the incoming EPR and Resolution EPR files. Any occurrence of an exact duplicate EPR file with an existing examinee database record will preferably post a warning message to the Exception Report file and that EPR file will not be processed. This process will also check the EPR files against the CBTN database for test delivery software version number discrepancies. Additionally, record checksum, improper EPR sequencing and missing, invalid or undefined EPR conditions are also checked. Records with these conditions will generate appropriate Exception Report file warning or error message records and will also cause the EPR files with errors to be written to the Reject file directory. The EPR's that pass the above checks will preferably generate new records in the Examinee database.

The EPR files will also be checked for EPR's containing essay response data. The essay EPR will be checked for the information required to produce the appropriate essay form. If the essay EPR is missing required data or contains invalid data an appropriate warning message will be written to the Exception Report file. This process will then extract the fields required to generate a handwritten or a typed essay form and write an essay record to the Essay file. Essay file processing is discussed in more detail below.

At the beginning of every testing session and every restarted testing session the test administrator can preferably enter free form text and have that text recorded in the EPR file. This text may be written to the Exception report file and reported in the Exception Report for that day.

Demonstration EPR records are preferably copied to a Demo directory by the EPR process and will not undergo any additional NDDS processing other than an Exception Report file record being written that notes the record was received. Table 8 below lists some examples of Examinee Database records created during the Examinee Performance Record File Processing.

TABLE 18

EXAMINEE DATABASE FILE

| Field Name | Field Description |
|---|---|
| DB KEY INFORMATION | |
| Testing Program Code | To identify test taken, e.g. GRE, SAT |
| Examinee Registration ID | Unique ID assigned to very examinee |
| Examinee Name | |
| Test Date | |
| OTHER EXAMINEE INFORMATION | |
| Examinee Registration Indicator | 0=not pre-registered 1=pre registered |
| Examinee Schedule Indicator | 0=walkin 1=schedule |
| Examinee No Show Indicator | 0=did not show for test 1=showed |
| Special Administration Indicator | 0=normal time test 1=untimed test |
| Essay Ind (Examinee Entry Mode) | 1=type the essay 2=handwritten essay |
| Activity Reported Indicator | 0=not Activity reported 1=Reported |
| AUDIT TRAIL INFORMATION | |
| CBTN Center Code | Testing Center Code |
| Workstation Number | Examinee tested on this |
| Session Number | station and was the x session of the day |
| Test Administration Date | Testing Date |
| Transmission Header Date | Date the record was transmitted |
| Processed Date | Date the NDDS processed this record |
| Post Process Turnover Date | Date the NDDS create the OSA |

TABLE 18-continued

EXAMINEE DATABASE FILE

| Field Name | Field Description |
|---|---|
| Package Control Version ID | Package ID from EPR |
| Admin Software version ID | OSA Admin version ID from EPR |
| TDA Version ID | OSA TDA version ID from EPR |
| SKM Version ID | OSA SKM version ID from EPR |
| NDDS Version ID | NDDS ID when record was processed |
| TU Logical Name #1 | The testing unit names from |
| TU Logical Name #2 | the EPR for this examinee. |
| TU Logical Name #3 | |
| TU Logical Name #4 | |
| TU Logical Name #5 | |
| SECURITY/EVENT REPORT INFORMATION | |
| Test Time In | Start Session time |
| Test Time Out | End Session time |
| Break Overtime | Extra time over normal break time |
| Session Restarts | Number of Restarts during testing |
| Termination Flag | EPR End Session Termination type |
| Downtime | Combined time for all restarts |

4. Format Post Processing Component

The Format Post Processing Component allows testing programs to specify the format of the file they will receive as input to their postprocessing database. This allows them to use existing databases of examinee results from paper-and-pencil tests to store results from computer-based tests. Using a definition file as input to this process the participating testing programs may select the order and EPR fields they wish to receive in their postprocess file or files. This process may also do the appropriate data translation and conversion to ASCII of the EPR fields selected. The file definition concept provides the ability to truly customize output files that can be changed at anytime with little or no the need of NDDS program coding changes. The CBTN database master file is also an input to this process providing center information that may be required for the postprocessing systems custom formatted record(s). In the case of essay scores and reader information, this data may need to be merged in the program specific post processing systems process.

5. Reporting Component a. Activity Report

Activity reports may be produced on a periodic basis, such as daily, weekly or monthly basis. These reports may be produced from the data and calculations on data contained in both the Examinee and Security\Event Log databases with additional information provided by staff who manage the network of test centers for test time and test fees. The daily reports may be produced by test centers and show the number and types of tests and income associated with each. They can also include a cumulative report for different types of centers, such as those managed by franchisees or educational institutions. Additional daily, weekly and monthly reports can generated based upon test center, a date or a date range when processing occurred, or the date or date range when the test was administered.

Figure 95:
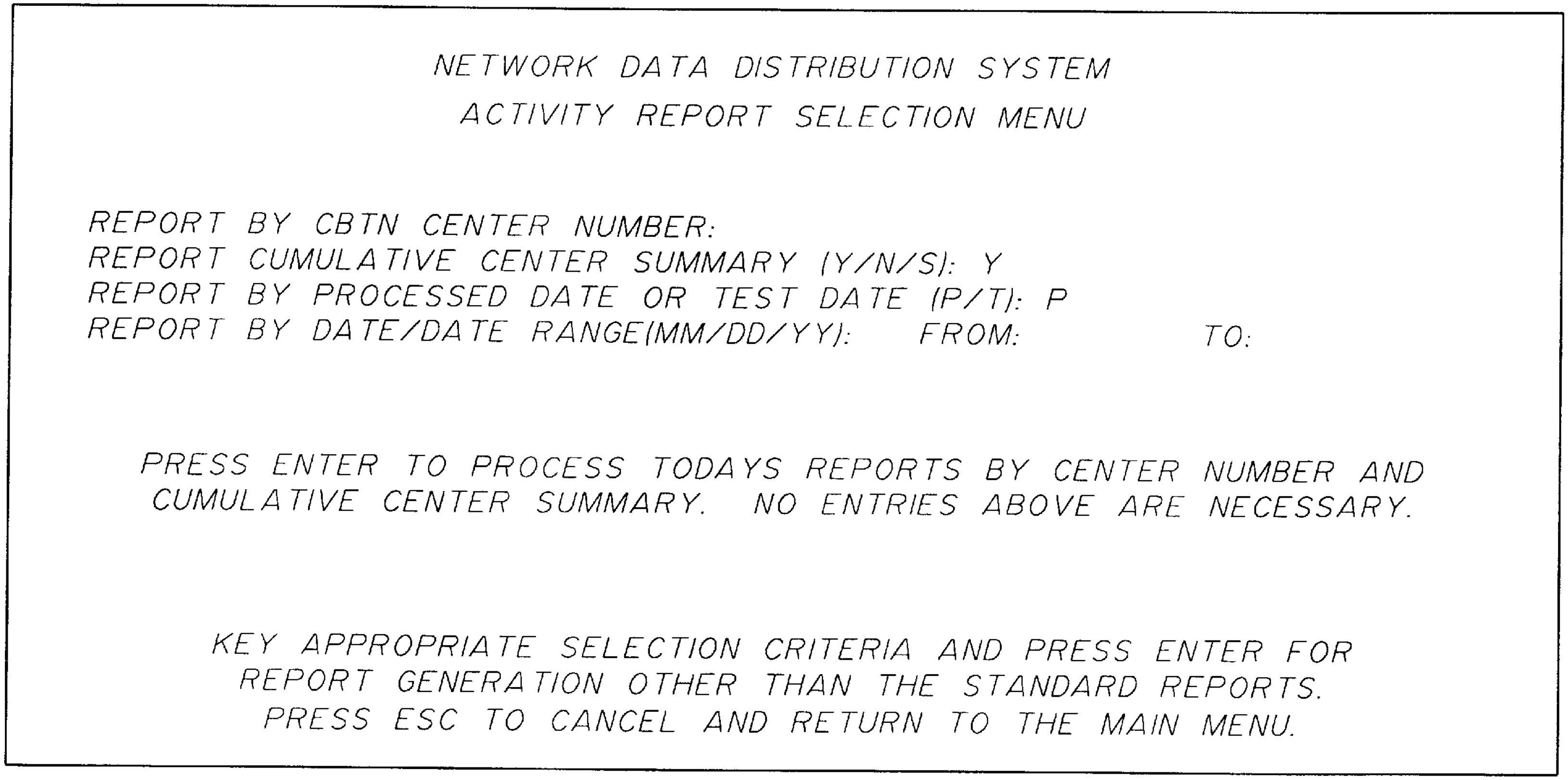
FIG. 95 is an example of the screen provided by the NDDS of an activity report selection menu.
Figure 96:
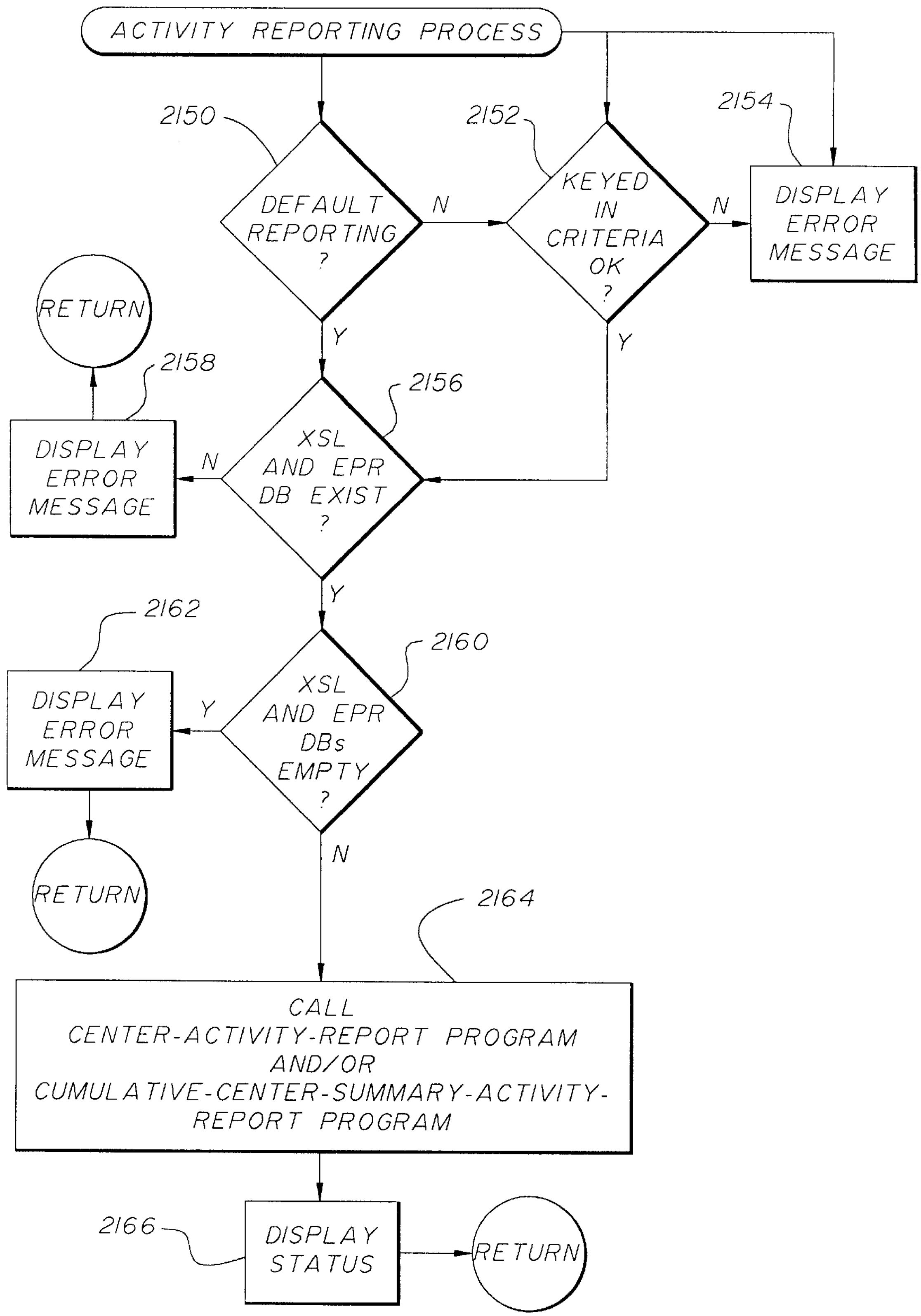
FIG. 96 is a flowchart of a preferred procedure for implementing the activity reporting process according to the present invention.

When the "Activity Reports" option is selected from the main menu shown in FIG. 88, a secondary screen prompting the "NDDS" operator for the report's criteria should be displayed. FIG. 95 provides one example of such a screen. In a preferred embodiment, a daily activity report will use the current date as a default value. FIG. 96 provides a flowchart of the activity reporting process according to this preferred embodiment.

Referring to FIG. 96, the activity reporting process first checks whether the NDDS operator has selected the daily default reporting option. As shown in the example screen of FIG. 88, this can be done by simply pressing the enter. If specific criteria has been keyed in by the NDDS operator the criteria is checked at 2152 to determine whether it is valid. For instance, if the cumulative center summary option is keyed, the NDDS operator keys in either a Y or an N. If the date or dates are keyed, they are preferably entered in an appropriate format such as two digits for the month, two digits for the day and two digits for the year and the year should not be greater than the current year. If the data keyed in does not conform to the edits displayed by the screen shown in FIG. 96, a message for instance, "INVALIDATED KEY. PLEASE CORRECT" is preferably displayed. After such a message is displayed at 2154, the process preferably returns to 2152 so that the NDDS operator may key in new criteria.

If either default reporting has been selected at 2150 or criteria has been correctly keyed in at 2152, the security log and examinee performance record databases are checked at 2156 to determine whether or not they both exist. If either one is found not to exist at 2156, an error message is preferably displayed at 2158 and the process returns control to the main menu. If both databases exist, then they are both checked to determine whether or not either is empty at 2160. If either the security log database or the examinee performance record database is empty, an error message is preferably displayed at 2162 and control is returned to the main menu.

Where both the security log and examinee performance record databases exist and are not empty, the process continues at 2164 by calling a center activity report program and/or a cumulative center summary activity report program depending upon the selections and entries made to the menu shown in FIG. 96. Preferably the default values and/or the keyed in criteria will be passed to those programs at 2164. These programs are standard database report programs that gather the data specified by the query from the CBTN Database and format the report for printing in a human readable form. Commercially available products, such as PROSORT OR BTRIEVE may be used.

In a preferred embodiment, both the center activity report program and the cumulative center summary activity report program will return the following status codes.

0=successful report

1=unsuccessful report

2=no records in range to report

3=no data on file or software error

The return status is preferably displayed for the NDDS operator. If other errors occur, such as the commercial database search program being used is not loaded, messages should preferably be displayed on the reporting menu screen.

b. Audit Trail Report

This report may be produced upon request and be generated from information in the Examinee database. The purpose of this report is to be able to track any examinee information from the testing session to the time his or her testing data, i.e. from EPR files, is turned over to the postprocessing system. When the "Audit Trail Reports" option is selected from the main menu shown in FIG. 88, a secondary screen prompting for selection criteria may be displayed. FIG. 88 provides an example of such a screen.

There is no standard report produced for the Audit Trail report. However, at least one selection criteria field should be keyed to produce a report. The following are examples of possible audit trail reporting selection alternatives.

1. Examinees with a specific registration ID.
2. Examinees with a specific name.
3. Examinees taking a CBT at a specific test center.
4. Examinees taking a CBT at a specific test center on a specific test date.
5. Examinees tested for all centers for a specific date range.
6. Examinees with a specific registration ID tested at a specific test center within specific date range.

Figure 98:
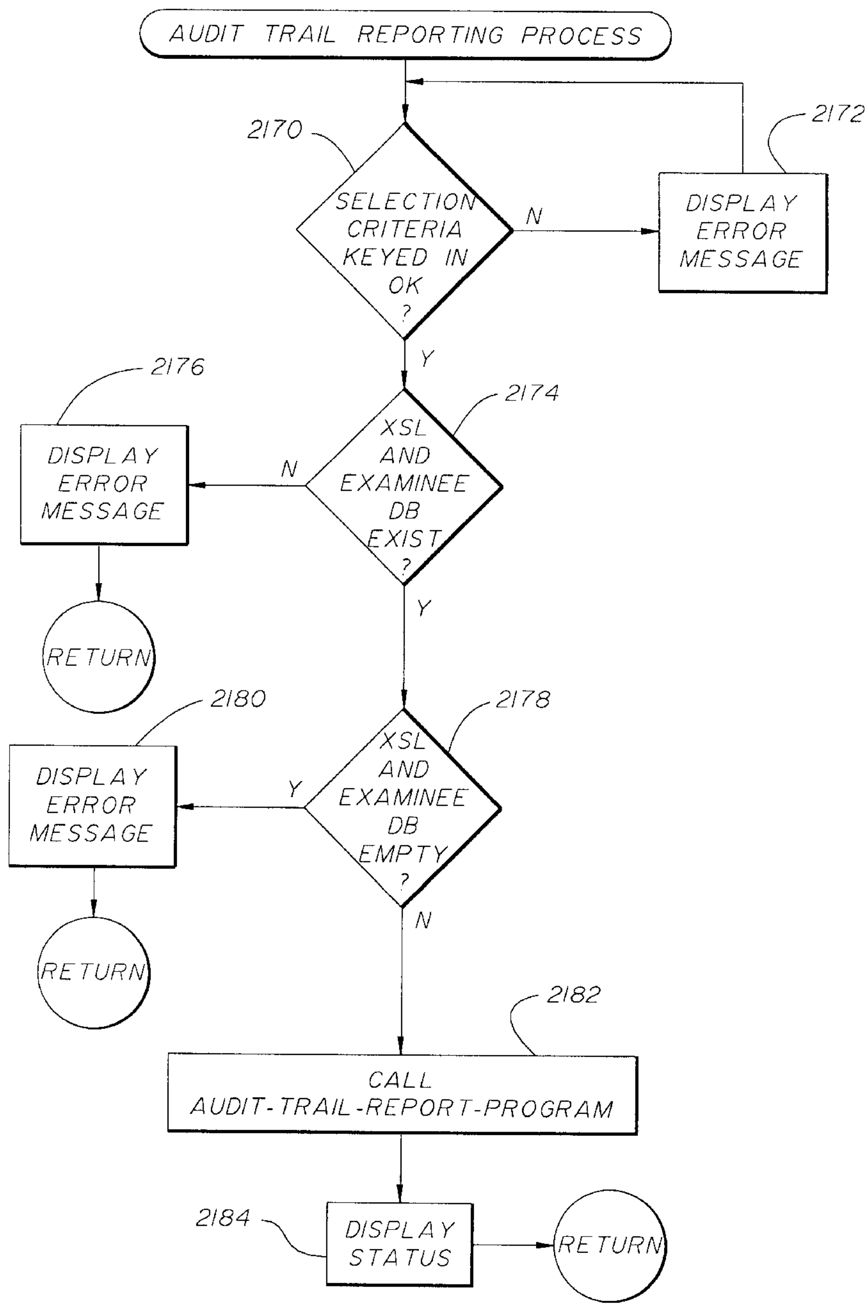
FIG. 98 is a flowchart of a preferred procedure for implementing the audit trail reporting process.

A flowchart implementing the Audit Trail Reporting process according to a preferred embodiment is shown in FIG. 98.

If specific criteria has been keyed in by the NDDS operator the criteria is checked at 2170 to determine whether it is valid. For instance, If the data keyed in does not conform to the edits displayed by the screen shown in FIG. 95, a message for instance, "INVALIDATED KEY. PLEASE CORRECT" is preferably displayed at 2172. After such a message is displayed at 2154, the process preferably returns to 2170 so that the NDDS operator may key in new criteria.

If the selection criteria has been correctly keyed in at 2170, the security log and examinee performance record databases are checked at 2174 to determine whether or not they both exist. If either one is found not to exist, an error message is preferably displayed at 2176 and the process returns control to the main menu. If both databases exist, then they are both checked to determine whether or not either is empty at 2178. If either the security log database or the examinee performance record database is empty, an error message is preferably displayed at 2180 and control is returned to the main menu.

Where both the security log and examinee performance record databases exist and are not empty, the process continues at 2182 by calling an Audit_Trail_Report Program. Preferably the keyed in criteria is passed to the Audit_Trail_Report Program at 2182. The Audit_Trail_Report Program is preferably a standard database report program which gathers the data specified by the selection criteria from the CBTN database and formats the data to generate a human readable report. Commercially available products such as PROSORT or BTRIEVE may be used.

The following status codes are returned by the Audit_Trail_Report Program in a preferred embodiment:

0=Successful report

1=Unsuccessful report

2=No records in range to report

3=No data in file or a software error

Preferably the returned status and any other error are displayed for the NDDS operator before returning to the main menu shown in FIG. 88.

c. Daily Processing Control Report

This report may be produced during the NDDS End of Day process and lists appropriate input, processed and rejectedrecord counts by test center. It is prepared by counting the number of Examinee Performance Records received ('Inputs') and classifying them as 'Processed' (successfully processed EPR files) or 'Rejected' (files requiring resolution). This report is used to track the location and status of examinee performance files and resolve any discrepancies in counts of records received from test centers and counts of records transferred to testing programs' post-processing databases.

d. Exception Report Generation

The Exception Report Messages can occur during any of the processing stages of the NDDS operation. When an exception occurs, an Exception Report File is written. This reporting process produces the exception reports from the messages accumulated in the Exception Report File. It should be understood that such reports, like the Activity and Audit Trail Reports may be generated based on a variety of selection criteria, e.g., test center number, date, message, etc.

In a preferred embodiment, the Exception Report Process would be implemented similarly to either the Activity Report or Audit Trail Report Process except that Exception_Report_Program would be called instead of the programs shown at 2164 of FIG. 96 or at 2182 of FIG. 98, respectively.

e. Security/Event Log Report

This report may be generated from information contained in both the XSL and examinee performance record databases. In a preferred embodiment an XSL report is produced for all test centers. When the "Security/Event Log Report" option is selected from the main menu, a secondary menu is preferably displayed. FIG. 99 is an example of a secondary menu that may be displayed prompting the NDDS operator for selection criteria.

In a preferred embodiment, no selection criteria is required. Rather a default report may be generated for the current day. However, if specific reporting selection criteria is desired the following are examples of some possible alternatives.

1. Report for a single test center for the date the XSL and EPR files were processed.
2. Report all test centers for a previous date.
3. Report all test centers for a previous date range.
4. Report a single test center for a previous date range.

Figure 97:
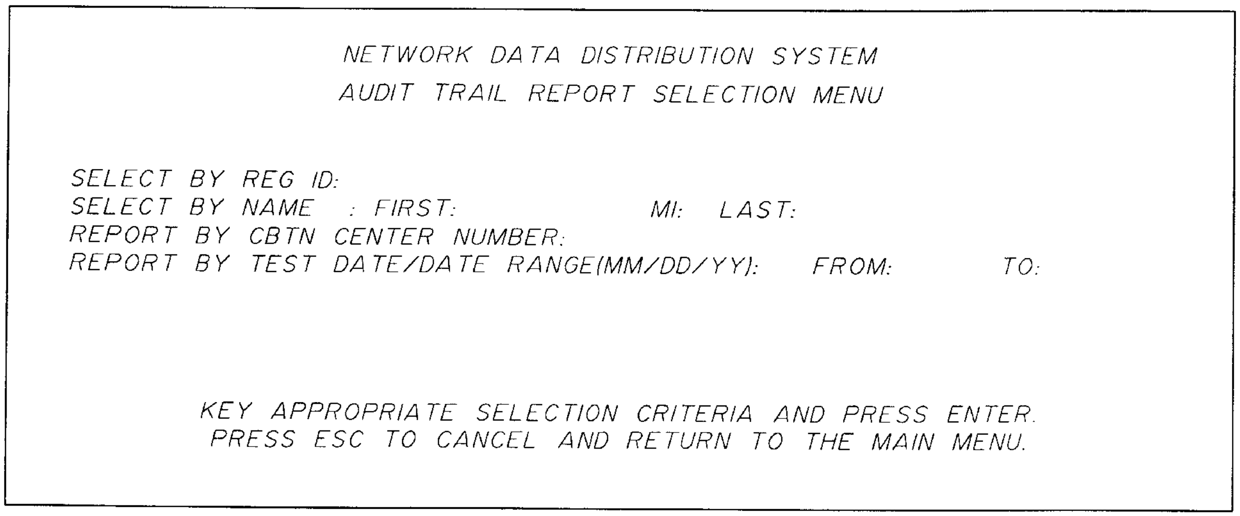
FIG. 97 is an example of a screen provided by the NDDS of an audit trail report selection menu.

It should be understood that this process is preferably implemented according to the flowchart shown in FIG. 97 for the Activity Report, except that the Security/Event Log Report Programs would be called at 2164 in place of the Activity Report Programs.

6. Essay File Processing

During the CBT file process the NDDS preferably writes an essay record into the NDDS Essay File for every EPR that contains Examinee Response records. The EPR file for these examinees preferably contains two Essay response records. These correspond to the two topics presented to the examinee during the essay test. The EPR should be written to the Reject directory if one or both records are missing. One of the records preferably contains the essay text that is to be scored with its topic number while the other response record contains the topic number of the alternate topic text presented to the examinee and possibly essay text that is not to be scored.

When the Essay Printing option is selected from the Main Menu the NDDS produces, based on the Essay Type indicator in NDDS Essay file, either a Handwritten or Typed essay form for each record in the file. To print the text for the essay topics this process searches the NDDS Topic file by Topic Number for the text to print for the Essay Topic and Alternate Essay Topic fields on the forms.

These forms may be used by the essay readers and returned to the appropriate postprocessing system for further processing. Should there be a need to reprint these forms the Examinee Essay files will be archived and saved by the NDDS.

7. Reject/Resolution processing component

During both the Security\Event Log and File Process components, records can be written to the Reject file directory. The files in this directory are copies of the original EPR or XSL files received from the test centers. EPR and XSL files that are written to the Reject file are generally not processed successfully by the system and, therefore, the data from those rejected files is not written to the Examinee or Security\Event Log databases. However, those records are counted in that day's Daily Processing Control Report as rejected EPR or XSL files. In a preferred embodiment, the files in error that are written to the Reject file will require an individual case by case manual resolution process. Records may however be corrected by other means (editors, etc) and moved to a resolution directory for processing during the next NDDS processing run.

As mentioned above files that actually match existing examinee database records (e.g., the same Registration number, Full Name and Time/Date stamp) are preferably not processed. It is further preferred that these records will also not be written to the Reject file since it should be assumed that these records were mistaken retransmissions of records already received and processed. Additionally, EPR files received that have the same registration number and full name as an existing examinee record but have a different time/date stamp, or EPR files with the same registration number but a different full name as an existing database record are preferably processed as separate examinee records.

8. CBTN Information Component

This component consists of an application for adding, updating and deleting the CBTN database records. The NDDS may access this database to check the test delivery system version number information and also update the database with version numbers supplied by the XSL file Maintenance Performed records. The NDDS will preferably use the CBTN database as a list of current test centers with their transmission schedules and will check daily transmission and diskette receipts against that list. In preferred embodiments, warning message records are written to the Exception Report file for the test centers from which no records were received, but were scheduled or for files received at a time transmission was not scheduled.

Figure 100A:
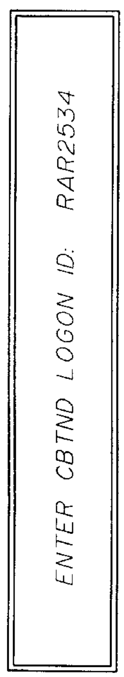
Figure 100B:
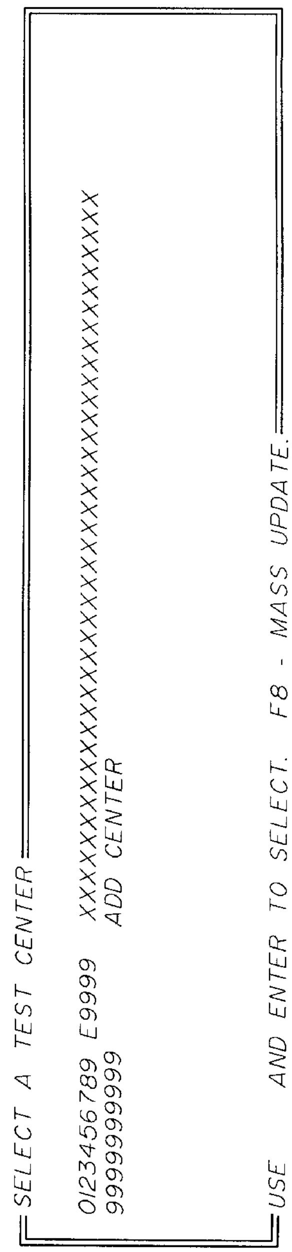

In a preferred embodiment, the operation of the CBTN database may be described as follows. It should be understood that functional key assignments and valid entry criteria described below are purely for explanatory purposes and that the invention is not to be limited thereto. The CBTN application is entered from the NDDS main menu screen. The first screen displayed is the signon screen shown in FIG. 100A. The function of this screen is to allow entry of the user's ID which is preferably verified against a valid user ID table. After acceptance of a valid user ID, a second screen may be presented as shown in FIG. 100B. This screen may be used to select or add a test center's record to the CBTN database. To add a new CBTN database record, place the cursor on ADD CENTER and depress the key. Preferably a blank formatted screen such as that in FIG. 100C will then be displayed. To display the information for any other record on the screen listed in FIG. 101C, the cursor should be placed on the desired record and the enter key depressed.

The X's in the screen fields shown in FIG. 100C indicate that any character is allowed. The 9's indicate that only numeric data should be entered. The AUTH field is a 0 or 1 and the Transmission Schedule field is a Y (yes), N (No) or D (Diskette).

The CBTN Center, Address, City, State, Zip, Version Information and Transmission Schedule fields are preferably entered while, all other fields may be optional. F2 is used to Save the record, F3 is used to Delete the record and ESC is used to Cancel Changes on CBTN processing screens where applicable.

Depressing the F4 key from the screen shown in FIG. 100C preferably invokes an administrator selection screen shown in 100D, which provides information about the administrators at that test center and is used for example to interpret the logon IDs recorded in the security log or to track which administrators are at which test centers. Depressing the F5 key from the test center screen preferably brings up a Package Control ID selection screen shown in FIG. 100E which provides information about the various testing program packages and their versions that are installed at the center. When the F6 key is depressed from the test center screen a comment selection screen shown in FIG. 100F is preferably displayed which allows staff to review the comments entered by administrators during testing sessions.

The ENTERED BY field shown in FIG. 100F is preferably inserted by the application from the User ID keyed in on the Logon screen. The current date is also displayed in the DATE field. The PROGRAM CODE field prompts for the program code designating a specific test, e.g. SAT, GRE, etc. The AIR (indicates that Administrator has provided a paper report describing some occurrence during a test session) and ANNOT (indicating that the administrator had made an annotation during the Close-of-Day Process) preferably requires a Y or N. The EVENT CODE and CAT (category) fields may be checked against a table of allowable choices for these fields, which can be seen by depressing the F1 key. Allowable characters for the ACTION IND field are preferably R and T and the ACTION BY field is the Logon ID. The COMMENTS and NOTES are free form non edited entry fields.

A computer based testing system and a method of computer based testing have been described. The following appendices have been provided to further supplement the detailed description by providing exemplary pseudo code and flowcharts for several of the procedures described herein implemented by the computer based testing system of the present invention.

| | |
|---|---|
| Appendix A | Pseudo Code and Corresponding Flowcharts for the Item Preparation System |
| Appendix B | Pseudo Code and Corresponding Flowcharts for the Item Preparation Tool |
| Appendix C | Pseudo Code and Corresponding Flowcharts for the Test Packaging Application |
| Appendix D | Pseudo Code and Corresponding Flowcharts for the Test Delivery Application |

While the invention has been described and illustrated with reference to specific embodiments, those skilled in the art will recognize that modifications and variations may be made without departing from the principles of the invention as described hereinabove and set forth in the following claims.

08/485628

APPENDIX A

Pseudo Code and Corresponding Flowcharts for the Item Preparation Tool

A-1

Main_Procedure:

A flowchart depicting the MAIN_PROCEDURE is shown in Figure A-1.

100 Display the main menu as shown in figure 0.

200 Initialize the Directions Subsystem.

300 Fetch the next event from the event queue. If the event is END_PROGRAM, continue at 500; else, dispatch to the event's processing routine and continue at step 400.

400 If there is an item on screen perform the Check_Integrity_Procedure (described below)

500 If the item or any of its parameters have changed, display a query asking the user if s/he wants to save the changes. If so, save all information.

600 Exit to the operating system.

A-2

Icon Events

Icon Events

ICON_NEXT:

A flowchart of the ICON_NEXT procedure is shown in Figure A2.

100 Perform the Check_Integrity_Procedure (described below).

200 If the item or any of its parameters have changed, display a query asking the user if s/he wants to save the changes. If so, save all information.

300 Load the display panes with the contents of the next item (the contents of the panes and pane arrangements are assigned by the PRESENTATION procedures described below)

350 Enable the Prev icon.

400 If this is the last item in the batch, disable the Next icon.

1000 Return to caller.

ICON_PREV:

A flowchart of the ICON_PREV procedure is shown in Figure A3.

100 Perform the Check_Integrity_Procedure (described below).

200 If the item or any of its parameters have changed, display a query asking the user if s/he wants to save the changes. If so, save all information.

300 Load the display panes with the contents of the previous item (the contents of the panes and pane arrangements are assigned by the PRESENTATION procedures described below)

400 If this is the first item in the batch, disable the Prev icon.

1000 Return to caller.

ICON_HELP:
ICON_TIME:
ICON_REV:

100 Return to caller.

A-3

Icon Events

ICON_MARK:

A flowchart of the ICON_MARK procedure is shown in Figure A-4(A).

100 If the 'marked' image of the Mark icon is current displayed, display the 'unmarked' image; else, display the 'marked' image.

200 Return to caller.

ICON_QUIT and ICON_EXIT:

A flowchart of these procedures is shown in Figure A-4(B).

100 Post event END_PROGRAM

200 Return to caller.

A-4

Internal Menu Events

IP_GREY_BAR:

A flowchart of this procedure is shown in Figure A-5(A).

100 Disable each main menu option specified by the event parameter.

200 Return to caller.

IP_UNGREY_BAR:

A flowchart of this procedure is shown in Figure A-5(B).

100 Enable each main menu option specified by the event parameter.

200 Return to caller.

M_MESSAGE:

A flowchart of this procedure is shown in Figure A-6.

100 Eliminate the main menu.

200 Fetch the file name to display from the list using the index passed as a parameter to the event.

300 Display the specified message.

400 If the message was <u>not</u> terminated via the special key sequence:

- post event M_MESSAGE -- parameter is index + 1.
- continue at 600.

500 Post event M_MAIN

550 Post event M_FILE_OPEN

600 Return to caller.

M_MAIN:

A flowchart of this procedure is shown in Figure A-7.

100 Display the main menu

200 Return to caller.

A-5

Internal Menu Events

KEY_COMPLETE:

A flowchart of this procedure is shown is Figure A-8.

100 If state is CREATING_KEY

- If the user has not entered the number of keys defined via the 'Number of Required Responses' entry in figure 12 during event M_RESPONSE
  - display an error message
  - continue at 1000.
- Post event M_KEYS_EDIT.
- Continue at 1000.

200 If state is CREATING_RANGE_LOWER or CREATING_RANGE_UPPER:

- post event M_KEYS_EDIT
- continue at 1000.

1000 Return to caller.

A-6

Menu Option Events File Option

M_FILE_ABOUT:

A flowchart of this procedure is shown in Figure A-9.

100 Display the dialog bos graphically depicted in figure A-9(A) (the Sign Off button is non-functional).

200 Wait for the user to click on OK.

300 Return to caller.

M_FILE_OPEN:

A flowchart of this procedure is shown in Figures A-10 through A-14.

50 Set search directory to current working directory

100 Display the screen graphically depicted in figure A-10(A).

200 If this event was performed previously, set file extension to the last one used; else, set file extension to .STE.

300 Search specified directory for files matching currently selected extension and display in the Files section of the dialog.

400 Respond to user input as follows:

- Open Button:
    - If no file is selected, display error message and continue at 400.
    - Process the Open request according to the file type currently selected as follows:
        - .STE
            - set state to ITEMS
            - disable the 'Batch Item Components' selection of the 'View' option in the main menu
            - read in data for the selected item and load the item panes with display data (the item will be displayed when this dialog ends)

A-7

- continue at 1000.

- .IAL
  - set state to BATCHES
  - show the icons
  - enable the 'Batch Item Components' selection of the 'View' option in the main menu
  - load all file names in the batch
  - read in data for the first item in the batch and load the item panes with display data (the item will be displayed when this dialog ends)
  - disable the Prev icon if the batch contains more than one item, enable the Next icon; else, disable it
  - continue at 1000.
- .DIR
  - set state to DIRECTIONS
  - disable the 'Batch Item Components' selection of the 'View' option in the main menu
  - Perform event OSAM_DIRECT -- subevent DIRECT_REQUEST -- in the Directions Subsystem, now, specify the selected directions file for display
  - Continue at 1000.
- .GIS and .MSG
  - set state to MESSAGES
  - if .GIS, set message number to 25; else, isolate message number from the last two characters of the file name

A-8

- save the file name of the .GIS or .MSG in a list at the index number determined in the step above
- post event M_MESSAGE -- subevent M_MESSAGE -- parameter is the message number to display
- continue at 1000.

- .TOP

- hide the icons, if displayed
  - set state to ESSAY
  - disable the 'Batch Item Components' selection of the 'View' option in the main menu
  - display the text of the selected topic, wait for user to dismiss display
  - continue at 400.

- Cancel Button:
  - continue at 1000.
- Items Radio Button:
  - Set file extension to .STE
  - Continue at 300.
- Batches Radio Button:
  - Set file extension to .IAL
  - Continue at 300.
- Directions Radio Button:
  - Set file extension to .DIR
  - Continue at 300.

- GIS Radio Button:
  - Set file extension to .GIS
  - Continue at 300.
- Messages Radio Button:
  - Set file extension to .MSG
  - Continue at 300.
- Essay Topics Radio Button:
  - Set file extension to .TOP
  - Continue at 300.
- Directory
  - Change current search directory to the specified directory.
  - Continue at 300.

1000 Remove the dialog displayed in step 100

1100 Return to caller.

M_FILE_SAVE:

A flowchart of this procedure is shown in Figure A-15(A).

100 If an item is currently displayed

- if the item or any of its parameters have changed, display a query asking the user if s/he wants to save the changes; if so, save all information 200 Return to caller.

M_FILE_PRINT:

A flowchart of this procedure is shown in Figure A-15(B).

100 Print the screen to the currently selected printer

200 Return to caller.

A-10

Menu Option Events View Option

M_VIEW_SUMMARY:

A flowchart of this proceudre is shown in Figure A-16.

100 Display the dialog graphically depicted in figure 4.

200 Accept user input and process as follows:

- OK
  - continue at 1000
- Print
  - print a summary of the information contained in the dialog on the printer as per figure 3(a)
  - continue at 200.

1000 Remove the dialog displayed in step 100

1100 Return to caller.

M_COMPONENT_LIST:

A flowchart of this procedure is shown in Figures A-17 to A-18.

100 Scan the current working directory for .CTL files.

200 For each .CTL file, extract the .STE, .RSP, .DIR, and .REF file references contained therein.

300 Display the identification numbers of each file type referenced in each .CTL file in the scrollable area of the dialog graphically depicted in figure A-17(A).

400 Accept user input and process as follows:

- OK
  - continue at 1000.
- Print
  - print a summary of the information contained in the dialog on the printer as per figure A-17(B)
  - continue at 400.

A-11

Menu Option Events View Option

- Stem
  - sort the lines displayed in the scrollable area by identification number of the .STE file
  - redisplay the scrollable area in sorted order
  - continue 400
- Stimulus
  - sort the lines displayed in the scrollable area by identification number of the .REF file
  - redisplay the scrollable area in sorted order
  - continue 400
- Response
  - sort the lines displayed in the scrollable area by identification number of the .RSP file
  - redisplay the scrollable area in sorted order
  - continue 400
- Directions
  - sort the lines displayed in the scrollable area by identification number of the .DIR file
  - redisplay the scrollable area in sorted order
  - continue 400

1000 Remove the dialog displayed in step 300.

1100 Return to caller.

M_BATCH_COMPONENT_LIST:

A flowchart of this procedure is shown in Figures A-19 through A-21.

200 For each .CTL file enumerated in the batch list, extract the .STE, .RSP, .DIR, and .REF files references and keys contained therein.

A-12

Menu Option Events View Option

300 Display the order within the batch, identification numbers of each file type referenced in each .CTL file, and answer keys in the scrollable area of the dialog graphically depicted in figure A-19(A).

400 Accept user input and process as follows:

- OK
  - continue at 1000.
- Print
  - print a summary of the information contained in the dialog on the printer as per figure A-20(A)
  - continue at 400.
- Print All
  - print a summary of the information contained in each .CTL file referenced by the batch list on the printer as per figures A-20(B) and A-20(C)
  - continue at 400.
- Batch Order
  - sort the lines displayed in the scrollable area by batch order number
  - redisplay the scrollable area in sorted order
  - continue at 400.
- Stem
  - sort the lines displayed in the scrollable area by identification number of the .STE file
  - redisplay the scrollable area in sorted order
  - continue 400
- Stimulus
  - sort the lines displayed in the scrollable area by identification number of the .REF file

A-13

- redisplay the scrollable area in sorted order
- continue 400

- Response
  - sort the lines displayed in the scrollable area by identification number of the .RSP file
  - redisplay the scrollable area in sorted order
  - continue 400
- Directions
  - sort the lines displayed in the scrollable area by identification number of the .DIR file
  - redisplay the scrollable area in sorted order
  - continue 400

1000 Remove the dialog displayed in step 300.

1100 Return to caller.

M_COMPONENT_DIRECTIONS:

A flowchart of this procedure is shown in Figures A-22 through A-24.

100 Display the dialog graphically depicted in figure A-22(A). Fill the list with all .DIR files found in the current working directory. Disable the Popup Window radio button.

200 If Directions are already selected for this item, highlight the .DIR file used in the list and set the radio button corresponding to the type previously selected.

300 Accept user input and process as follows:

- OK
    - If the None radio button is selected:
        - clear the Directions component from the current item
        - continue at 1000.
    - If the user did not select a .DIR file from the list:
        - display an error message
        - continue at 300.
    - If the Fixed Window radio button is selected and the Number of Lines entered by the user is zero:
        - display an error message
        - continue at 300.
    - Save the selected .DIR file name and Display Type for the current item.
    - Continue at 1000.
- Cancel
    - Restore the parameters of the current item to the values that existed prior to step 100.
    - Continue at 1000.

A-15

Menu Option Events Components Option

- None Radio Button
  - Continue at 300
- Fixed Window Radio Button
  - Continue at 300
- Embedded in Component Radio Button
  - Continue at 300.

1000 Remove the dialog displayed in step 100

1100 Redisplay the current item with the directions type and file specified in the steps above using the presentation format previously selected using the Presentation - Template menu option (described below).

1200 Return to caller.

M_COMPONENT_STIMULUS:

A flowchart of this procedure is shown in Figure A-25.

100 Display the dialog graphically depicted in figure 25(A). Fill the list with all .REF files found in the current working directory.

200 If Stimulus is already selected for this item, highlight the .REF file used.

300 Accept user input and process as follows:

- OK
  - If the Stimulus (.REF) file selected is - None - or the user did not select a Stimulus file
    - clear the Stimulus component from the current item
    - continue at 1000.
  - Save the selected .REF file name for the current item.
  - Continue at 1000.

- Cancel
  - Restore the parameters of the current item to the values that existed prior to step 100.
  - Continue at 1000.

1000 Remove the dialog displayed in step 100

1100 Redisplay the current item with the Stimulus specified in the steps above using the presentation format previously selected using the Presentation - Template menu option (described below).

1200 Return to caller.

M_COMPONENT_RESPONSE:

A flowchart of this procedure is shown in Figure A-26.

100 Display the dialog graphically depicted in figure A-26(A). Fill the list with all .RSP files found in the current working directory.

200 If a Response is already selected for this item, highlight the .RSP file used.

300 Accept user input and process as follows:

- OK
  - If the Response (.RSP) file selected is - None - or the user did not select a Stimulus file
    - clear the Stimulus component from the current item
    - continue at 1000.
  - Save the selected .RSP file name for the current item.
  - Continue at 1000.
- Cancel
  - Restore the parameters of the current item to the values that existed prior to step 100.

A-17

Menu Option Events Components Option

- Continue at 1000.

1000 Remove the dialog displayed in step 100

1100 Redisplay the current item with the Response specified in the steps above using the presentation format previously selected using the Presentation - Template menu option (described below).

1200 Return to caller.

A-18

Menu Option Events Presentation Option

M_PRESENT_TEMPLATE:

A flowchart of this procdure is shown in Figures A-27 through A-30.

100 Display the dialog graphically depicted in figure A-27(A).

200 If the user previously selected different options using this dialog:

- highlight a template shown across the top of the dialog box in Figure A-27(A), set the Pane Sizing, and set the pane organization previously selected.

Else

- highlight template #1, set pane sizing to 50%, and set pane organization to display all currently specified components in pane #1 in the following default order:
    - Directions
    - Stimulus
    - Stem
    - Response 300 Accept user input and process as follows:

- OK
    - If the Top % is equal to 0 or the Bottom % is equal to 0, display error message and continue at 300.
    - If any pane does not have at least one component assigned to it, display error message and continue at 300.
    - Save percentages, template and pane organization with the item.
    - Continue at 1000.
- Cancel
    - Restore the parameters of the current item to the values that existed prior to step 100.
    - Continue at 1000.

A-19

- Template Selection
  - Unhighlight the previously selected template.
  - Highlight the newly selected template.
  - Reset the pane organization as follows:
    - If a one pane template was selected, list all currently selected components in the default order graphically depicted in figure A-30(A).
    - If a two pane template was selected, list all currently selected components in the default order graphically depicted in figure A-30(B).
    - If a three pane template was selected, list all currently selected components in the default order graphically depicted in figure A-30(C).

Note: the Directions component is preferably displayed only if Components - Directions was selected from the main menu and the 'Embedded in Component' display type was selected (see M_COMPONENT_DIRECTIONS).
  - Continue at 300.
- Move Component
  - Move the highlighted component from the current pane to the specified pane. Figure A-30(D) and A-30(E) depict the before and after displayed affected by moving the Stimulus component from pane 1 to pane 3.
  - Continue at 300.

1000 Remove the dialog displayed in step 100

1100 Redisplay the current item with the Response specified in the steps above using the presentation format previously selected using the Presentation - Template menu option.

1200 Return to caller.

A-20

Menu Option Events — Presentation Option

M_PRESENT_PARAPHRASE:

A flowchart of this procedure is shown in Figure A-31.

100 Display the dialog graphically depicted in figure A-31(A).

200 Accept user input of characters defining paraphrase.

300 If dialog is canceled, restore previous, possibly null, paraphrase and continue at 1000.

400 Store paraphrase with item.

1000 Return to caller.

M_PRESENT_POSITION:

A flowchart of this procedure is shown in Figure A-32.

100 Display the dialog graphically depicted in figure A-32(A).

200 If positioning values are specified for the current item, display the values in the dialog; else, display the default values shown.

300 Accept user input and process as follows:

- OK
  - Save the highlight and centering ID with the current item
  - Continue at 1000.
- Cancel
  - Restore the parameters of the current item to the values that existed prior to step 100.
  - Continue at 1000.

1000 Remove the dialog displayed in step 100

1100 Redisplay the current item with the Stimulus block specified in the steps above highlighted and centered in the Stimulus pane. (Ignore if no stimulus.)

1200 Return to caller.

A-21

Menu Option Events Response Option

M_RESPONSE:

A flowchart of this procedure is shown in Figures A-33 through A-36.

100 Display the dialog graphically depicted in figure A-33(A) -- setting the radio buttons and 'Number of Responses' to the values previously defined for the item.

200 Accept user input and process as follows:

- OK
  - Save the following attributes with the current item:
    - Number of Required Responses
    - Response Class
    - Response Type
    - Response parameters declared during display of the Params... dialog.
  - Continue at 1000.
- Cancel
  - Restore the parameters of the current item to the values that existed prior to step 100.
  - Continue at 1000.
- Parms...
  - Display a dialog through which the user enters parameters attuned to the Response Class and Response Type selected. (Representative dialog for single selection, multiple choice graphically depicted in figure A-35(A).
  - Hold parameters
  - Continue at 200.
- Single Selection Radio Button
  - Enable the following Response Type radio buttons:

A-22

Menu Option Events Response Option

- Multiple Choice
- Scale
- Bar Chart/Histogram
- Grid
- Zones
- Insert Text

- Disable all others
- Continue at 200.

- Multiple Selection Radio Button
  - Enable the following Response Type radio buttons:
    - Multiple Choice
    - Scale
    - Bar Chart/Histogram
    - Grid
    - Zones
    - Ordering/Matching
  - Disable all others
  - Continue at 200.
- Free Response Radio Button
  - Enable the following Response Type radio buttons:
    - Numeric Entry
    - Fraction
  - Disable all others
  - Continue at 200.

A-23

Menu Option Events Response Option

- Response Type Radio Buttons

- Set the response type of the current item to match that of the radio button selected.

- Continue at 200.

1000 Remove the dialog displayed in step 100

1100 Redisplay the current item using the response class and type, number of required responses, and parameters defined in the steps above.

1200 Return to caller.

A-24

M_OPTIONS_INTEGRITY:

A flowchart of this procedure is shown in Figure A-37.

100 If integrity checking is in effect, turn it off; else, turn it on.

200 Return to caller.

A-25

Menu Option Events Test Option

M_TEST_INTEGRITY:

A flowchart of this procedure is shown in Figure A-38(A).

100 Perform the Check_Integrity_Procedure.

200 Return to caller.

M_TEST_PROMPTING:

A flowchart of this procedure is shown in Figure A-38(B).

100 Check whether the user has chosen the number of responses specified for this item via event M_RESPONSE. If not, display an informational screen notifying the user that all required responses have not been entered.

200 Return to caller.

M_TEST_SCORING:

A flowchart of this procedure is shown in Figure A-39.

100 Compare the user's testing answer with the currently defined answer keys. Possible results and actions for each condition are as follows:

- SCORE UNANSWERED: (The number of required responses as defined via the M_RESPONSE event is 0, or no response is selected.)
  - Display an informational message indicating that no response has been selected.
  - Continue at 1000.
- SCORE IMPROPER: (The number of required responses does not match the number of responses selected.)
  - Display an informational message indicating that the incorrect number of responses has been selected.
  - Continue at 1000.
- KEY MISSING: (No scoring keys have been entered via the M_KEYS_* events.)
  - Display an informational message indicating that no keys have been defined for the current item.

- Continue at 1000.

- WRONG: (The correct number of responses has been supplied and keys are defined, but the selected response is incorrect.)
  - Display an informational message indicating that incorrect responses have been selected.
  - Continue at 1000.

- RIGHT: (The correct number of responses has been supplied, keys are defined, and the selected response is correct.)
  - Display an informational message indicating that correct responses have been selected.
  - Continue at 1000.

1000 Return to caller.

A-27

Menu Option Events Keys Option

M_KEYS_CREATE:

A flowchart of this procedure is shown in Figures A-40 through A-43.

100 Check whether a response type has been declared for the current item via the M_RESPONSE event. If not, display an error message and continue at 2000.

200 Check whether the score type for this item has been set to 'Number of Selections for Key' via the M_SCORE event using figure A-40(A). If not, continue at 400.

300 Display the dialog graphically depicted in figure A-40(A) with 'Use Keys' deselected and 'number of selections for key' set to 0. Accept user response and process as follows:

- OK
  - Check whether the user has selected 'Use Keys' or has entered a number of selections for the key.
    - If neither
      - display error message
      - continue at 300.
    - Else
      - save score type selected in the dialog with the current item
      - continue at 1000.
- Cancel
  - Restore the score type of the current item to the values that existed prior to step 100.
  - Continue at 1000.

400 Set the state to CREATING_KEY.

500 If the response type of the current item is 'Free Response':

- If no key sets are defined for the item yet:
  - display the dialog graphically depicted in figure A-

A-28

Menu Option Events Keys Option

41(A)

550 - accept and process user input as follows:

- Exact Match Radio Button
  - set flag with current item indicating that the examinee's free response must match the key exactly
  - continue at 550.
- Range Radio Button
  - set flag with current item indicating that the examinee's free response may fall into a numeric range
  - continue at 550.
- Cancel
  - restore the matching type of the current item to the value that existed prior to display of the dialog
  - continue at 1000
- Key>>>
  - Save the key values with the item
  - continue at 1000.

- Else
  - if range matching was defined for the current item via the dialog depicted in A-41(A)
    - set state to CREATING_RANGE_LOWER.
    - continue at 1000.

1000 Disable all menu options by posting event IP_GREY_BAR specifying all menu options are to be disabled.

1100 Remove the dialog displayed in step 300.

A-29

Menu Option Events Keys Option

1200 Redisplay the current item.

1300 Process interaction with the response while the user identifies the keys. Continue until user signals key is complete via event KEY_COMPLETE.

2000 Return to caller.

M_KEYS_EDIT:

A flowchart of this procedure is shown in Figures A-44 through A-48.

100 If state is not CREATING_KEY, CREATING_RANGE_LOWER, or CREATING_RANGE_UPPER

- continue at 1100.

200 Get the number of responses entered by the user. If not, display error message and continue at 1100.

300 Save the response information with the current item.

400 If the response class is 'Free Response'

- if the state is CREATING KEY
    - continue at 450.
- if the state is CREATING_RANGE_UPPER
    - set state to CREATING_KEY
    - continue at 450.
- if the state is CREATING_RANGE_LOWER
    - clear the users response from the screen
    - continue at 1000.

450 If a response is defined, save the response.

500 Set state to NULL_STATE.

600 Post event IP_UNGREY_BAR specifying all menu options are to be enabled.

700 Display the dialog graphically depicted in figure A-46(A), updating the scrollable area of the dialog with all key sets defined for the current item.

800 Accept user input and process as follows:

- OK
  - continue at 1000.
- Delete All
  - erase all key sets accumulated for the current item
  - continue at 800.
- View
  - highlight the response for the key set selected in the scrollable area
  - continue at 1000.
- Delete
  - delete the key set highlighted in the scrollable area
  - continue at 800.
- Create
  - post event M_KEYS_CREATE
  - continue at 1000.

1000 Remove the dialog displayed in step 700.

1100 Return to caller.

M_KEYS_REVIEW:

A flowchart of this procedure is shown in Figure A-49.

100 If the item's key is merely a number of responses (as specified via figure A-40(A) during event M_SCORE)

- display error message

- continue at 1000.

200 Display the dialog graphically depicted in figure A-49(A).

300 Accept user input and process as follows:

- Cancel
  - remove the dialog
  - continue at 1000.

400 - Previous
  - unhighlight the response associated with the current key set (i.e. key set 'N')
  - highlight the response associated with the current key set
  - continue at 300.

- Next
  - unhighlight the response associated with the current key set (i.e. key set 'N')
  - highlight the response associated with the current key set
  - continue at 300.

1000 Return to caller.

M_SCORE:

A flowchart of this procedure is shown in Figure A-50.

100 If the response type of the current item, as defined via figure A-50(A) during event M_RESPONSE, is not GRID, MULTIPLE CHOICE, or ZONES, continue at 1000.

200 Display the dialog graphically depicted in figure A-40(A).

300 Accept user input and process as follows:

- OK

- check whether both the 'Use Keys' entry is undefined and 'number of selections for key' is zero; if so, display error message and continue at 300
- save score type with current item
- remove dialog displayed in step 200
- continue at 1000.

- Cancel
  - Restore the score type of the current item to the values that existed prior to step 100.
  - remove dialog displayed in step 200
  - Continue at 1000.

1000 Return to caller.

A-33

Check_Integrity_Procedure:

A flowchart of this procedure is shown in Figures A-51 to A-52.

100 If the current item has no identification number, add warning to error list.

200 If the current item's date/time of last modification is not set or is set to an invalidate date/time, add warning to error list.

300 If the current item has no stem component, the stem file does not exist or is assigned to an invalid pane, add warning to error list.

400 If there is a response component, and the response file does not exists or is assigned to an invalid pane, add warning to error list.

500 If there is a stimulus component, and the stimulus file does not exist or is assigned to an invalid pane, add warning to error list.

600 If there is a directions component, and the directions file does not exists or is assigned to an invalid pane, add warning to error list.

700 If an invalid template type is cataloged for the current item, or all panes of the selected template are not used, add warning to error list.

800 If there is a directions component and the directions type is illegal, or there is no directions component yet directions are assigned to a specific pane, add warning to error list.

900 If the item's response class is illegal, or no response type is defined, or the response type is illegal, or no parameters are defined for the response, add warning to error list.

1000 If any warning were added to the error list in the above steps, and/or integrity checking was specifically enabled via event M_INTEGRITY, display the error list.

1100 Erase the error list.

1200 Return to caller.

08/485628

APPENDIX B

Pseudo Code and Corresponding Flowcharts for the Item Preparation Tool

B-1

Main_Procedure

A flowchart of this procedure is shown in Figure B-1.

100 Initialize the data base manager.

200 Load the names of all available packages.

300 Perform event TP_MAIN -- subevent MAIN_INIT (described bwlow) -- in the Packaging Manager.

350 Display the screen graphically depicted in figure B-1(A).

390 Post event IDM_C_OPEN (described below).

400 Fetch next event from event queue

500 If event is END_PROGRAM

- continue at 800.

600 Perform procedure associated with event.

700 Continue at 400.

800 Shut down the data base manager.

900 Exit to operating system.

IDM_C_ABOUT

A flowchart of this procedure is shown in Figure B-2(A).

100 Display the screen graphically depicted in figure 1.

200 Process user input

- OK
    - Remove the screen display shown in Figure B-2(C) from the screen.
    - Continue at 300.

300 Return to caller.

B-2

IDM_C_EXIT

A flowchart of this procedure is shown in Figure B-2(B).

100 Perform event TP_MAIN -- subevent MAIN_CLOSE -- in the Packaging Manager.

200 Exit to the operating system.

IDM_C_NEW

A flowchart of this procedure is shown in Figure B-3.

100 Display the 'Create New Component' screen graphically depicted in figure B-3(A).

200 Fill the Packages field with the list of available packages.

300 Fill the Type Code field with the list of allowable component types.

400 Display the constructed Component ID for the default data.

500 Process user input

- Package Select
  - Display the list of available packages.
  - Allow user to select a new package.
  - Display constructed Component ID in the Component ID element.
  - Continue at 500.
- Type Select
  - Display the list of allowable component types.
  - Allow user to select a new component type.
  - Display constructed Component ID in the Component ID element.
  - Continue at 500.

B-3

- Ok
  - Continue at 600.
- Cancel
  - Continue at 800.

600 Perform event TP_MAIN -- subevent MAIN_CREATE (described below) -- in the Package Manager.

700 Perform Test_Preparation Procedure (described below).

800 Return to caller.

IDM_C_OPEN

A flowchart of this procedure is shown in Figures B-4 and B-5.

100 Display the 'Open Component' screen graphically depicted in figure B-4(A).

200 Fill the Packages element with the list of available packages.

300 Fill the Components element with the component Id of all components in the package whose type matches the currently selected type. If no type is selected, set type to PKG.

400 Check the radio button matching the currently selected component type.

500 Process user input

- Package Select
  - Display the list of available packages.
  - Allow user to select a new package.
  - Fill the Components element with the component Id of all components in the package whose type matches the currently selected type.
  - Continue at 500.
- Radio Button 'X' Select
  - Change the current component type to match the type associated with the radio button.
  - Fill the Components element with the component Id of all components in the package whose type matches the currently selected type.

- Continue at 500.

- Ok

550
  - If no component Id is selected in the Components element
    - Display an error message.
    - Continue at 500.
  - Continue at 600.
- Cancel
  - Continue at 800.
- Component Select
  - Continue at 550.

600 Perform event TP_MAIN -- subevent MAIN_OPEN -- in the Package Manager, now.

700 If step 600 failed

- post event IDM_C_OPEN.
- Continue at 800.

750 Perform Test_Preparation Procedure.

800 Return to caller.

IDM_C_SAVE

A flowchart of this procedure is shown in Figure B-6(A).

100 Perform event TP_MAIN -- subevent MAIN_SAVE -- in the Package Manager, now.

200 Return to caller.

IDM_C_SAVEAS

A flowchart of this procedure is shown in Figure B-6(B).

100 Perform event TP_MAIN -- subevent MAIN_SAVEAS -- in the Package Manager, now.

B-5

200 Return to caller.

IDM_E_UNDO

A flowchart of this procedure is shown in Figure B-6(C).

100 Perform event TP_MAIN -- subevent MAIN_UNDO -- in the Package Manager, now.

200 Return to caller.

IDM_O_AUTO

A flowchart of this procedure is shown in Figure B-7(A).

100 Set the Auto/Manual flag to Auto.

200 Return to caller.

IDM_O_MAN

A flowchart of this procedure is shown in Figure B-7(B).

100 Set the Auto/Manual flag to Manual.

200 Return to caller.

IDM_V_* (View Option)

A flowchart of this procedure is shown in Figure B-7(C).

100 Perform event TP_MAIN -- subevent MAIN_VIEW -- in the Package Manager, now, with a copy of the IDM_V_* event as a parameter.

200 Return to caller.

Package Manager

Event TP_MAIN

MAIN_CLOSE

A flowchart of this procedure is shown in Figure B-8.

100 Loop through each of the component types. For each type check to determine if there is altered data present. If so,

- Perform event TP_MAIN -- subevent MAIN_SAVE -- for the component, now.

B-6

- Release the lock on the component.

200 Return to caller.

MAIN_INIT

A flowchart of this procedure is shown in Figure B-9.

100 Initialize all parameter and unit screens used in the application.

200 Return to caller.

MAIN_CREATE
MAIN_OPEN

A flowchart of these procedures are shown in Figures 10(A) to 10(C).

100 Check to determine if there is already a component of the same type as the caller's parameter open. If so,

- Perform event TP_MAIN -- subevent MAIN_SAVE -- in the Package Manager, now.
- If the user canceled the save during processing of the MAIN_SAVE subevent
    - continue at 1000.
- Release the lock on the component.

300 Hide the current Unit Screen display, if any.

400 Initialize holding areas for the new component type about to be created/loaded.

500 If the subevent is MAIN_CREATE

- Create the component in the database.

else

- Load the specified component from the database.
- Lock the component.

600 Enable the component type of the specified component in the View option of the main menu.

700 Display the screen graphically depicted in figure B-10(D).

B-7

800 Display the Unit Screen for the component type just created or opened in the Unit Screen area of figure B-10(D). The Unit Screen displayed may be one of: Scoring Unit Screen (figure B-10(E), Review Unit Screen (figure B-10(F), GIS Unit Screen (figure B-10(G), Break Unit Screen (figure B-10(H), Testing Unit Screen (figure B-10(I), Tutorial Unit Screen (figure B-10(J).

1000 Return to caller.

MAIN_SAVE

A flowchart of this procedure is shown in Figure B-11.

100 Display a query screen asking the user if he wants to save the component. The possible responses and courses of action are as follows;

- Yes
  - Save the information of the previous component in the database.
  - Set return indicator to 'saved'.
  - Continue at 1000.
- No
  - Set return indicator to 'not saved'.
  - Continue at 1000.
- Cancel
  - Set return indicator to 'canceled'.
  - Continue at 1000.

1000 Return saved/not-saved/canceled indicator to caller.

MAIN_SAVEAS

A flowchart of this procedure is shwon in Figure B-12(A).

100 Display the 'Save As' screen graphically depicted in figure B-12(B).

200 Allow user to select a Package and Type Code, and enter Name Code, Sequence Number, etc.

B-8

300 Process user input:

- Ok
  - Create the component in the database using the package specified by the user via the 'Save As' screen (ignore errors if the component already exists).
  - Save the component information.
  - Continue at 1000.
- Cancel
  - Continue at 1000.

1000 Remove the screen displayed in step 100.

1100 Return to caller.

MAIN_VIEW

A flowchart of this procedure is shown in Figure B-13.

100 Hide the current Unit screen.

200 Show the screen associated with the component specified by the caller's parameter.

300 Return to caller.

MAIN_UNDO

A flowchart of this procedure is shown in Figure B-14.

100 Undo the last action performed against the current component.

200 Return to caller.

Test_Preparation Procedure

A flowchart of this procedure is shown in Figures B-15(A) and B-15(B).

100 Process user input or menu events as follows:

- Review
  - If no component is selected in the Component List Area
    - Continue at 100.

B-9

- Else
  - Display the Unit Screen (e.g. Scoring Unit, Review Unit, etc.) associated with the selected component in the Unit Screen Area.
  - Set screen values to the saved values of the component (non-editable).
  - Continue at 100.
- Del
  - If a component is selected in the Component List Area
    - Delete the selected component from the Component List Area (not from the database).
  - Continue at 100.
- Open
  - If a component is selected in the Component Select Area
    - Perform event TP_MAIN -- subevent MAIN_OPEN -- in the Package Manager, now.
  - Continue at 100.
- Package Select (Select Area)
  - Display list of available packages.
  - Open package selected by user.
  - Display list of components (from the Package) in the Select Area that match the current requested type.
  - Continue at 100.
- Element Select (Select Area)
  - Copy selected element to Component List Area
  - Continue at 100.

B-10

- IDM_*
  - Post event IDM_*
  - Continue at 1000.

1000 Return to caller.

08/485628

APPENDIX C

Pseudo Code and Corresponding Flowcharts for the Test Packaging Application

C-1

Main Procedure

A flowchart of this procedure is shown in Figure C-1.

100 Display the screen (graphically depicted in figure C-1(A) containing the four menu options and sub-options itemized below:

- File
  - Open (Menu_File_Open)
  - Exit (Menu_Exit)
- Create Package (Menu_Create_Package)
- View Package (Menu_View_Package)
- Final Lock Package (Menu_Final_Lock_Package)

200 Wait for user to choose menu option. Dispatch to the menu option procedure. The procedure for each menu option is listed in parenthesis to the right of the option name, above.

300 Continue at 200.

C-2

Menu_File_Open:

A flowchart of this prcedure is shown in Figure C-2(A).

100 Display the screen graphically depicted in figure C-3 to obtain the name of a BLOB from the user. The package name is saved for use in Menu_View_Package.

200 Return to caller.

Menu_Exit:

A flowchart of this procedure is shown in Figure C-2(B).

100 Exit to the operating system.

C-3

Menu_Create_Package

A flowchart of this procedure is shown in Figures C-4 through C-6.

100 Display the screen graphically depicted in figure C-4(A) through which the user enters control information to the process.

200 Accept user data into the screen until one of three events occurs: OK, CANCEL, or GENERATE is chosen. The main data elements accepted from the user are as follows:

- the name of an existing package rebuild or a new package to create
- the type of build, namely, draft, blue line, or final
- where the component data is located
- whether to encrypt the BLOB that's produced.

Processing for each of the events is as follows:

- OK:
    - Continue at 2000.
- CANCEL:
    - Continue at 2000.
- GENERATE:
    - Continue at 300.

300 Initialize an empty working index of components.

400 If in step 200 the user chose to start the build at the Test Unit level:

- Perform the Build_Index_Procedure (described below) starting at the specified Test Unit.
- Continue at 900.

500 If in step 200 the user chose to start the build at the Session level:

- Perform the Build_Index_Procedure (described below) starting at the specified Session.
- Continue at 900.

C-4

600 Add a reference to the package component to the working index.

700 List each session referenced in the package.

800 For each session referenced in the package, perform the Build_Index_Procedure (described below).

900 Sort the working index and remove duplicate component references.

1000 Add each component referenced in the index to the working BLOB.

1100 Add the default Test Delivery Application Message to the BLOB.

1200 Add the default Test Delivery Application Help Screens to the BLOB.

1300 Produce the ancillary files that are by-products of packaging, namely,

- the .PP file, which is used by the Administrative Application to list the available tests and spiral delivery
- the .PPS file, which is used by the Administrative Application to control spiraling
- the .PKG file, which contains the component identifier of each Test Script in the BLOB
- the .ITB file, which contains the component identifier of each Item Table in the BLOB
- the .SKM file, which contains the Scoring Keys of each testable item in the BLOB.

1400 Save the BLOB, its associated index, and all ancillary files.

2000 Return to caller.

Build_Index_Procedure:

A flowchart of this procedure is shown in Figure C-7.

100 Add the specified component to the working index.

C-5

200 For each referenced component in the specified component:

- Perform the Build_Index_Procedure for the referenced component.

300 Return to caller.

C-6

Menu_View_Package:

A flowchart of this procedure is shown in Figure C-8.

100 Load the BLOB specified by the user in Menu_File_Open. If none defined, display error and continue at 1000.

200 Display the screen graphically depicted in figure C-8(A).

300 Read the index and display the component id, offset within the BLOB, size, level, tree, and last modification date/time stamp of all index members:

- sort the index by component id
- display the result in the scrollable area
- display information from the BLOB header, namely, the number of elements in the package, package type, created by, and whether the BLOB is encrypted.

400 Respond to user controls present on the screen as follows:

- OK
    - remove the screen from the display
    - continue at 1000.
- Sort List By:
    - display a list of the options by which the scrollable area can be sorted
    - accept the user's choice
    - sort the list according to the user's choice
    - display the result in the scrollable area
    - continue at 400.
- Limit List To:
    - display a list of all component types present in the BLOB, plus the default type "ALL"
    - accept users choice of component type (or "ALL")

C-7

- scan the BLOB for all components of the specified type and display components of the specified type in the scrollable area

- continue at 400.

1000 Return to caller.

C-8

Menu_Final_Lock_Package:

A flowchart of this procedure is shown in Figure C-9.

100 Obtain the package to lock from the user.

200 Load the Package Index.

300 For each component named in the Index, apply the final lock.

400 Copy the various files of the build to the FINAL area, namely, the BLOB, BLOB index, .PP, .PPS, and all .PKGs, .ITBs, and .SKMs 500 Display screen informing user that final locking is complete.

600 Return to caller.

08/485628

APPENDIX D

Pseudo Code and Corresponding Flowcharts for the Test Delivery Application

A-1

Main_Procedure:

A flowchart of this procedure is shown in Figures D-1(A) and D-1(B).

- Set the base system state to STATE_NULL.
- Link to the security file to obtain permission to run. If failure, return to operating system.
- Read parameter file passed from the administrative application. Obtain the Examinee information (e.g. name), test session information, and 'Start Session' record for the Examinee Performance Record (EPR) file.
- Initialize the system display: set colors, etc.
- Initialize the subsystems of the delivery application, namely,
    - Review_Subsystem
    - Directions_Subsystem
    - Help_Subsystem
    - Break_Subsystem
- Load the normal and disabled images of the primary icons.
- Post event OSAM_SELECT -- subevent SELECT_INITIALIZED.
- Fetch the next event from the event queue. Perform the procedure associated with the event. Loop until 'END_PROGRAM' event is retrieved from the queue.
- Inform the Administrative Application of termination and termination type.
- Restore the display and display colors to the condition that existed at the start of processing.
- Return to the operating system.

A-2

OSAM_SEQ:

SEQ_SHOWTIME:

A flowchart of this procedure is shown in Figure D-2(A).

100 Set the state of the Remaining Time display to the specified condition (on or off).

200 Return to caller.

SEQ_DISPLAYTIME:

A flowchart of this procedure is shown in Figure D-2(B).

100 Display the title line. Include the remaining time display if allowed for the current state.

200 Return to caller.

SEQ_STARTTEST:

A flowchart of this procedure is shown in Figures D-3(A) and D-3(C).

100 Initialize the default icons to be used in the test from the Test Unit defaults.

200 Show the current icons.

300 Broadcast the OSAM_STARTTEST event to all subsystems.

400 If not recovering a previously failed session:

- If the current unit is a UNIT_TESTUNIT
    - Write a 'Start Test' record to the examinee's EPR file.

else

- Write a 'Start EDC' record to the examinee's EPR file.

500 If there are Test Directions and they have not been 'seen':

- If recovering a previously failed session, write a 'Restart Session' record to the examinee's EPR file.
- Set the system state to STATE_DIRECTIONS
- If recovering a previously failed session and a 'Start Directions' record has not been written, or not recovering a session, write a 'Start Directions' record to the examinee's EPR file.
- Indicate recovery is complete

A-3

- Post event OSAM_DIRECT -- subevent DIRECT_REQUEST -- to the Directions Subsystem.
- Continue at 1000.

600 If recovering a previously failed session:

- Post event OSAM_SEQ -- subevent SEQ_STARTUNIT. Event includes a parameter indicating the starting Test Unit.
- Continue at 1000.

700 Post event OSAM_SEQ -- subevent SEQ_STARTUNIT. Event includes a parameter indicating start at the Test Unit number 1.

1000 Return to caller.

SEQ_STARTUNIT:

A flowchart of this procedure is shown in Figures D-4(A) and D-4(E).

100 If the current state is STATE_INTEST:

- If the requested test unit is at or beyond the number of units in the Testing Unit:
    - set the base system state to STATE_ENDTEST
    - post event OSAM_SEQ -- subevent SEQ_ENDTEST
    - continue at 1000.

else

- If the requested session unit is at or beyond the number of units in the session:
    - post event OSAM_SEQ -- subevent SEQ_ENDSESSION
    - continue at 1000.

200 Determine type of unit to be delivered. Process each type as follows:

- Regular Testing Unit
    - Set the base system state to STATE_INTEST.
    - Post event OSAM_SEQ -- subevent SEQ_STARTTEST -- specifying the unit number.
    - Continue at 1000.

A-4

- Section Unit
    - Save the current system state and set the new system state to STATE_STARTSECTION.
    - Post event OSAM_SEQ -- subevent SEQ_STARTSECTION.
    - Continue at 1000.
- GIS Unit
    - If recovering a previously failed testing session
        - If the current session unit is a Testing Unit or Examinee Data Collection Unit, write a 'Restart Session' record to the examinee's EPR file.
        - Write an 'End GIS' record to the examinee's EPR file.
        - Indicate recovery is complete.
        - Post event OSAM_SEQ -- subevent SEQ_STARTUNIT. Parameter indicates advance to the next unit.
        - Continue at 1000.
    - Save current system state and set new state to STATE_GIS.
    - Write a 'Start GIS' record to the examinee's EPR file.
    - Display the General Information Screen specified by the unit's configuration data until dismissed by user.
    - Write an 'End GIS' record to the examinee's EPR file.
    - Restore the system state to its previous value.
    - Post event OSAM_SEQ -- subevent SEQ_STARTUNIT. Parameter indicates advance to the next unit.
    - Continue at 1000.
- Tutorial Unit
    - Post event OSAM_SEQ -- subevent SEQ_RUN_TUTORIAL. Event includes indicator specifying the tutorial to run.
    - Continue at 1000.

A-5

- Break Unit
  - If not performing recovery of a previous failed testing session:
    - Save the current system state and set the new state to STATE_BREAK.
    - Post event OSAM_SEQ -- subevent SEQ_BREAK.
    - Continue at 1000.
  - Else
    - If the current session unit is a Testing Unit, write a 'Restart Session' record to the examinee's EPR file
    - If the testing session failed before the 'End Break' record was written, write an 'End Break' record to the examinee's EPR file.
    - Indicate recovery is complete.
    - Post event OSAM_SEQ -- subevent SEQ_STARTUNIT. Parameter indicates advance to the next unit.
    - Continue at 1000.
- Score Reporting Unit
  - If not recovering from a previously failed testing session, write a 'Start Score Report' record to the examinee's EPR file.
  - Calculate the score for each scrollable testing unit in the session.
  - Check the session configuration information to determine if scores are reported on screen. If so, display the scores.
    - If the score display is terminated by administrative override, continue at 1000.
  - Write an 'End Score Report' record to the examinee's EPR file.
  - Post event OSAM_SEQ -- subevent SEQ_STARTUNIT. Parameter indicates advance to the next unit.
  - Continue at 1000.

1000 Return to caller.

A-6

SEQ_STARTSECTION:

A flowchart of this procedure is shown in Figures D-5(A) to D-5(F).

100 Prepare the title line

200 Set up the icons for this section.

300 If the calculator is available in this section, initialize it.

400 Enable required icons and disable inappropriate ones.

500 If the confirm is used in this section, change the help information accordingly.

600 Load the item table(s).

700 If not recovering a previously failed session and the section is not adaptive:

- Write a 'Start Section' record to the examinee's EPR file.

800 Broadcast the OSAM_STARTSECTION event to all subsystems.

900 If the section is timed, prime the timer, but do not start timing. Also, indicate whether seconds are to be shown in the remaining time display.

1000 If recovering an adaptive test from a previously failed testing session, post event OSAM_CAT -- subevent CAT_READY.

1200 If recovering a previously failed testing session:

- If not recovering an item or the section ended:
    - End the current state and resume the previous state.
    - Post event OSAM_SEQ -- subevent SEQ_STARTUNIT.
    - Continue at 3000.
- If the time limit is less than the last threshold, post event OSAM_TIMER -- subevent TIMER_LASTTHRESHOLD.
- If this is an essay section, perform essay recovery operations.
- Write a 'Restart Session' record to the examinee's EPR file.

1300 If there are section directions and they haven't been 'seen':

- If there is a time limit for this section, and this is not an essay section, and timing is to begin when section directions are displayed, start the count down timer.

- Save the current system state and set the state to STATE_DIRECTIONS.
- If recovering a previously failed testing session and a 'Start Directions' record has not been written to the examinee's EPR file, or a recovery is not in process, write a 'Start Directions' record to the EPR file.
- Indicate recovery is complete.
- Perform event OSAM_DIRECT -- subevent DIRECT_REQUEST -- now.
- continue at 3000.

1400 If this is an adaptive section, continue at 3000.

1500 Change the system state to STATE_INSECTION.

1600 If there is a time limit for this section, and this is not an essay section, and timing is to begin when section directions are displayed, start the count down timer.

1700 If not recovering from a previously failed testing session:

- If displayed, hide and clear the calculator.
- Prime the system to start at the first item.
- Continue at 3000.

1800 (Else, recovering) If this is not an essay section and the section has a time limit:

- Enable the Time icon.
- Indicate that the timer is not counting, yet.

1900 If the last item did not end, redisplay the last item displayed and continue at 3000.

2000 If the last item ended via Next, perform the Move_To_Next procedure.

Else, if the last item ended via Prev, display the previous item.

Else, if the last item ended via Review:

- Save the current system state and set the new state to STATE_REVIEW.
- Write a 'Start Review' record to the examinee's EPR file.
- Post event OSAM_REVIEW -- subevent REVIEW_REQUEST -- to the Review Subsystem.

A-8

- Continue at 3000.

Else, display the current item.

3000 Return to caller.

SEQ_STARTITEM:

A flowchart of this procedure is shown in Figures D-6(A) to D-6(C).

100 If this is the first item in a group and there are group directions and the group directions have not been 'seen':

- Save the current system state and set the new state to STATE_DIRECTIONS.
- If recovering a previously failed testing session and a 'Start Directions' record was not written to the examinee's EPR file, or this is not a recovery, write a 'Start Directions' record to the EPR file.
- Indicate recovery is complete.
- Post event OSAM_DIRECT -- subevent DIRECT_REQUEST -- to the Directions Subsystem.
- Continue at 2000.

200 If this is the first item in a set:

- If the set directions have not been 'seen':
    - If this is an adaptive test, set the first item equal to the current item.
    - If there are set directions:
        - Save the current system state and set the new state to STATE_DIRECTIONS.
        - If recovering a previously failed testing session and a 'Start Directions' record has not been written to the examinee's EPR file, or not recovering, write a 'Start Directions' record to the EPR.
        - Indicate recovery is complete.
        - Post event OSAM_DIRECT -- subevent DIRECT_REQUEST -- to the Directions Subsystem.
        - Continue at 2000.
    - Else, indicate set directions were 'seen'.

300 Adjust icons and title line to match the state.

A-9

400 Replace the current system state with STATE_DISPLAYITEM.

500 Post event OSAM_SEQ -- subevent SEQ_DISPLAYITEM.

2000 Return to caller.

SEQ_DISPLAYITEM:

A flowchart of this procedure is shown in Figures D-7(A) and D-7(B).

100 If directions are on screen:

- Perform event OSAM_STOP in the Directions Subsystem, now.
- Adjust icons and title line to match the state.

200 If not recovering a previously failed testing session, or recovering an examinee quit, or recovering and administrator quit:

- If this is an adaptive section, write a 'Start CAT Item' record to the examinee's EPR file.
- else, write a 'Start Linear Item' record to the examinee's EPR file.

300 Display the current item.

400 Display the calculator, if it should be displayed.

500 Set flags used by the Review Subsystem to indicate the item has been 'seen'.

700 If this is an adaptive section, post event OSAM_CAT -- subevent CAT_PRESELECT -- to the Cat Subsystem.

800 Else, if this is an essay section:

- Stop timing.
- If recovering from a previously failed testing session, read in the up-to-the-minute response information.
- Disable inappropriate keys on the keyboard.
- Perform essay initialization.
- Indicate recovery is complete.

2000 Return to caller.

A-10

SEQ_ENDSECTION:

A flowchart of this procedure is shown in Figure D-8.

100 Perform the Close_Section procedure.

200 Restore the previous system state.

300 Post event OSAM_SEQ -- subevent SEQ_STARTUNIT -- advancing to the next unit.

400 Return to caller.

SEQ_ENDTEST:

A flowchart of this procedure is shown in Figure D-9.

100 If the section has not been closed, perform the Close_Section procedure.

200 Hide the current icons.

300 If the current unit is a Test Unit, write an 'End Test' record to the examinee's EPR file 400 else, write an 'End EDC' record to the EPR file.

500 Broadcast event OSAM_ENDTEST to all subsystems.

600 Forget all saved states and set the system state to STATE_NULL.

700 Post event OSAM_SEQ -- subevent SEQ_STARTUNIT -- advancing to the next unit.

800 Return to caller.

SEQ_ENDSESSION:

A flowchart of this procedure is shown in Figure D-10(A).

100 Write an 'End Session' record to the examinee's EPR file.

200 If tutorials are running, end them.

300 Post event END_PROGRAM.

400 Return to caller.

SEQ_STOPTIMER:

A flowchart of this procedure is shown in Figure D-10(B).

100 If a timer is running, stop it.

200 Return to caller.

A-11

SEQ_STARTTIMER:

A flowchart of this procedure is shown in Figure D-11(A).

100 Start an operating system timer.

200 Return to caller.

SEQ_BREAK:

A flowchart of this procedure is shown in Figure D-11(B).

100 Notify the operating system to send OSA_END_BREAK if the special key combination (Administrative Override) is struck.

200 Perform event OSAM_BREAK -- subevent BREAK_REQUEST -- in the Break Subsystem -- now.

300 Return to caller.

SEQ_RUN_TUTORIAL:

A flowchart of this procedure is shown in Figure D-12(A).

100 Save the current system state and set the state to STATE_TUTORIAL.

200 Start the Tutorial Delivery Program.

300 Post event OSAM_SEQ -- subevent SEQ_DRIVE_TUTORIAL.

400 Return to caller.

SEQ_DRIVE_TUTORIAL:

A flowchart of this procedure is shown in Figure D-12(B).

100 Inform the Tutorial Delivery Program of the next tutorial to deliver.

200 If not recovering a previously failed testing session, or performing recovery and the current state is STATE_INSECTION, write a 'Start Tutorial' record to the examinee's EPR file.

300 Indicate recovery is complete.

400 Return to caller.

A-12

OSAM_SELECT:

SELECT_INITIALIZED:

A flowchart of this procedure is shown in Figure D-13.

100 If recovering a previously failed testing session:

- If the last unit of the test was completed:
  - Post event OSAM_SEQ -- subevent SEQ_ENDSESSION.
  - Continue at 1000.
- If the unit recovered to is not a 'Test Unit' nor an 'Examinee Data Collection Unit':
  - Write a 'Restart Session' record to the examinee's EPR file.
- Else
  - Set the current system state to STATE_INTEST.
  - Post event OSAM_SEQ -- subevent SEQ_STARTTEST.
  - Load system data associated with the unit.
  - Continue at 1000.
- Post event OSAM_SEQ -- subevent SEQ_STARTUNIT -- indicating the recovered unit.
- Continue at 1000.

200 Initialize the examinee's EPR file.

300 Write a 'Start Session' record to the examinee's EPR file.

400 Post event OSAM_SEQ -- subevent SEQ_STARTUNIT -- indicating start at the first unit.

1000 Return to caller.

A-13

OSAM_CAT:

CAT_READY:

A flowchart of this procedure is shown in Figure D-14.

100 If not recovering a previously failed testing session, continue at 1000.

200 If this section is timed, start the remaining time counter and enable the Time icon.

300 Load information required to restart at the point of failure from the examinee's EPR record.

400 If the current section has a time limit, and timing needs to start before section directions are displayed, and this is not an essay section, start the remaining time counter and enable the Time icon.

500 If there are section directions and they have not been 'seen' by the examinee:

- Save the current system state and set the system state to STATE_DIRECTIONS.
- Perform event OSAM_DIRECT -- subevent DIRECT_REQUEST -- in the Directions Subsystem, now.
- Continue at 1000.

600 Display the next item.

700 If the testing session failed while in Review, post event ICON_REV.

1000 Return to caller.

CAT_SELECT:

A flowchart of this procedure is shown in Figure D-15.

100 Write an 'End Item' record to the examinee's EPR file.

200 If there are no more items in the test:

- Display the 'End of Test' message to the examinee.
- Change the current system state to STATE_ENDSECTION.
- Post event OSAM_SEQ -- subevent SEQ_ENDSECTION.
- Continue at 1000.

A-14

300 Display the next item.

100 Return to caller.

A-15

OSAM_REVIEW:

A flowchart of this procedure is shown in Figure D-16.

100 End STATE_REVIEW. Pop the previous system state.

200 Write an 'End Review' record to the examinee's EPR file.

300 If during Review a new item was selected (see Review_Subsystem:Review_Select), display the specified item. Continue at 500.

400 Else, re-display the item that was on screen when Review was entered.

500 If the calculator was displayed before Review was entered, re-display it.

600 If the state, which is restored in step 300, is STATE_ENDITEM, post event OSAM_SEQ -- subevent SEQ_STARTITEM.

700 Return to caller.

A-16

OSAM_HELP:

A flowchart of this procedure is shown in Figure D-17.

100 If subevent is not HELP_RETURN, continue at 700.

200 Perform event OSA_STOP in the Help_Subsystem, which causes it to clean up from the most recent Help_Request.

300 If the calculator was on screen prior to Help, redisplay it.

400 Write an 'End Help' EPR record to the examinee's EPR file.

500 Restore the system state that was in effect prior to switching to STATE_HELP.

600 Restore the display to the condition that existed prior to switching to Help.

700 Return to caller.

A-17

OSAM_DIRECT:

A flowchart of this procedure is shown in Figures D-18(A) and D-18(B).

100 If subevent is not DIRECT_RETURN, continue at 700.

200 Restore the system state that was in effect prior to switching to STATE_DIRECTIONS.

300 Write an 'End Directions' record to the examinee's EPR file.

400 If the current state is STATE_INTEST:

- mark the directions as 'seen'
- post event OSAM_SEQ -- subevent SEQ_STARTUNIT
- continue at 700.

500 If the current state is STATE_STARTSECTION:

- mark the directions as 'seen'
- replace the current system state with STATE_INSECTION
- start the section timer, if required
- display the first item of the section
- continue at 700.

600 If the current state is STATE_STARTITEM:

- If only Group Directions were displayed:
  - mark them as 'seen'
  - post event OSAM_SEQ -- subevent SEQ_STARTITEM
  - continue at 700.
- If Set Directions were displayed:
  - mark them as seen
  - change the current state to STATE_DISPLAYITEM
  - post event OSAM_SEQ -- subevent SEQ_DISPLAYITEM
  - continue at 700.

700 Return to caller.

A-18

OSAM_BREAK:

A flowchart of this procedure is shown in Figure D-19.

100 If subevent is not BREAK_RETURN, continue at 400.

200 Restore the system state that was in effect prior to executing the Break.

300 Post event OSAM_SEQ -- subevent SEQ_STARTUNIT.

400 Return to caller.

A-19

OSAM_CALC:

A flowchart of this procedure is shown in Figure D-20.

100 If subevent is not CALC_TRANS_REQUEST, continue at 300.

200 Transfer the calculator value to the response.

300 Return to caller.

A-20

OSAM_END_BREAK:

A flowchart of this procedure is shown in Figure D-21.

!!!!This message is received directly from admin override !!!!!

100 Display a query screen asking the administrator to confirm his intention to end the break.

200 If the administrator responds affirmatively, redirect special key sequences to Osa_Admin_Override.

300 Remove the query screen.

400 Return to caller.

A-21

Timer Events OSAM_TIMER

OSAM_TIMER:

TIMER_LIMIT:

A flowchart of this procedure is shown in Figures D-22(A) to D-22(B).

100 If the remaining time display is active, update the remaining time display.

200 Stop timing.

300 If a message is currently displayed, clear it.

400 If the current system state is STATE_HELP, write an 'End Help' record to the examinee's EPR file.

500 If the current system state is STATE_DIRECTIONS, write an 'End Directions' record to the examinee's EPR file.

600 If the current system state is STATE_DISPLAYITEM, but Review is not active:

- If this is an essay section, instruct the essay system to clean up and close down.
- Else:
    - Hide the current item display
    - If the current item was answered previously:
        - If the answer was erased, display a time out message.
        - Else, determine if the previous answer matches the current answer. If so, the item has not changed; display a time out message. Otherwise, display a message informing the examinee of the time out condition and asking if he wants the previous or current answer. Record specified answer.
    - Else, the item was not previously answered:
        - If no answer is currently selected, display a time out message.
        - Else, display a message informing the examinee of the time out condition and ask if he wants to record the current answer. Record answer accordingly.
    - Write an 'End Item' record to the examinee's EPR file.

A-22

Timer Events OSAM_TIMER

700 - If the current system state is STATE_REVIEW:

- Perform event OSAM_STOP in the Review_Subsystem -- now.
- Write an 'End Review' record to the examinee's EPR file.
- End STATE_REVIEW and restore the system state to what is was before Review was entered.
- Display a time out message.

800 - Drop all saved system states and return to the base state.

900 - Set the current system state to STATE_ENDSECTION.

950 - Post event OSAM_SEQ -- subevent SEQ_ENDSECTION.

1000 - Return to caller.

TIMER_THRESHOLD:

A flowchart of this procedure is shown in Figure D-23(A).

100 - Set the remaining time display to flash 6 times.

200 - Post event OSAM_TIMER -- subevent TIMER_CHANGED.

300 - Return to caller.

TIMER_CHANGED:

A flowchart of this procedure is shown in Figures D-23(B).

100 - Update the remaining time display in the title line.

200 - Return to caller.

A-23

Timer Events OSAM_TIMER

ICON_CALC:

A flowchart of this procedure is shown in Figure D-24.

100 If the calculator is not enabled for this section, continue at 500.

200 If the calculator is currently displayed, hide the calculator and continue at 400.

300 Else, since the calculator is not currently displayed, show the calculator.

400 Write a 'Calculator' record to the examinee's EPR record.

500 Return to caller.

ICON_CONF:

A flowchart of this procedure is shown in Figure D-25(A).

100 Enable all currently displayed icons

200 Disable the Confirm icon.

300 Perform the Move_To_Next_Procedure.

400 Return to caller.

ICON_ERASE:

A flowchart of this procedure is shown in Figure D-25(B).

100 Signal the item's response manager to erase all examinee choices and restore the item to it's unanswered state.

200 Return to caller.

ICON_EXIT:

A flowchart of this procedure is shown in Figures D-26(A) to D-26(C).

100 Disable all icons currently displayed.

200 If an item is currently displayed (state = STATE_DISPLAYITEM), perform the Check_Response_Procedure. If a fail indicator is returned, continue at 2000.

300 Hide the current screen display.

Figure 36A:
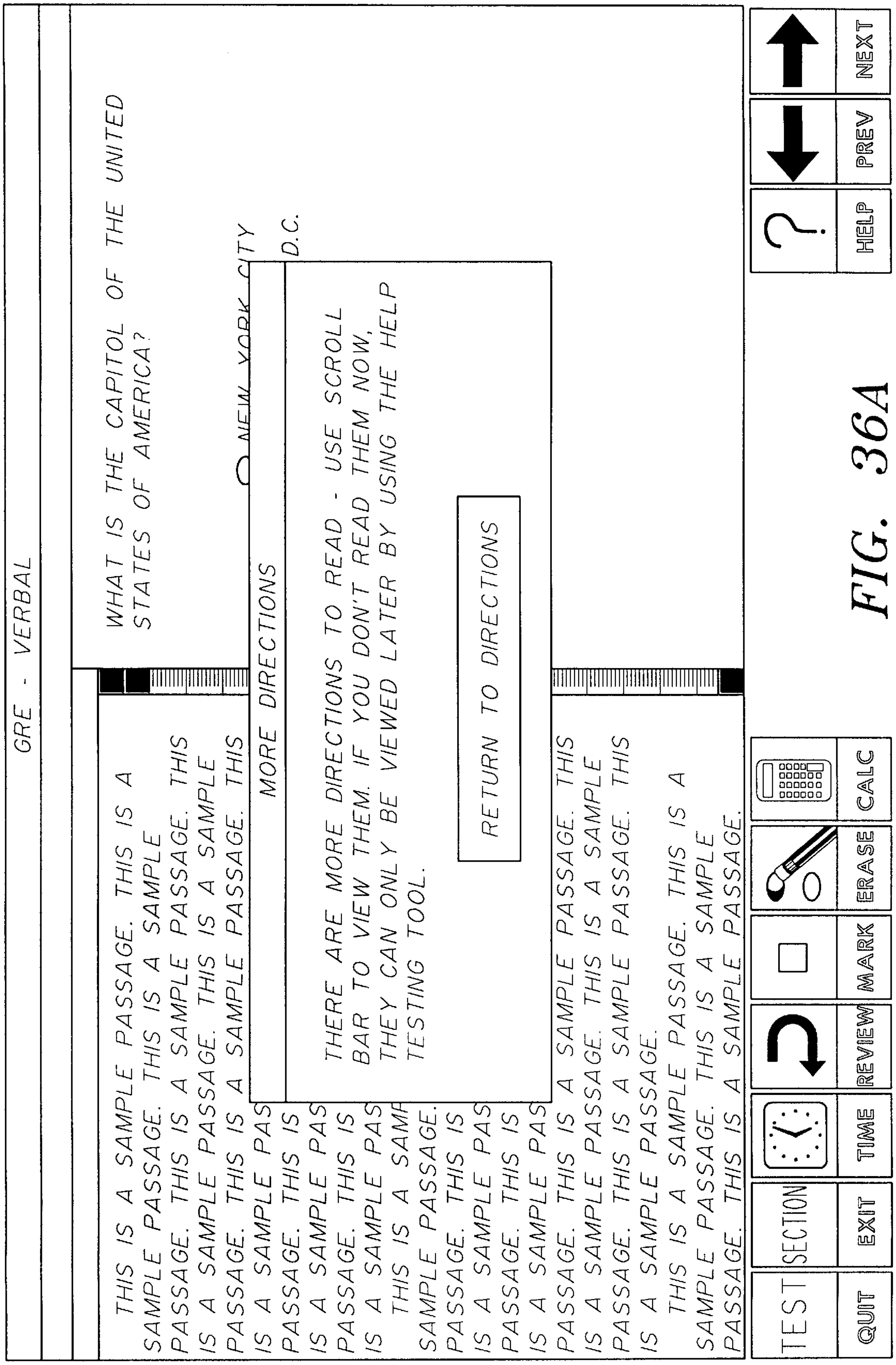
FIGS. 36(*a*)–(*l*) show examples of message screens supported by the present invention.
Figure 36B:
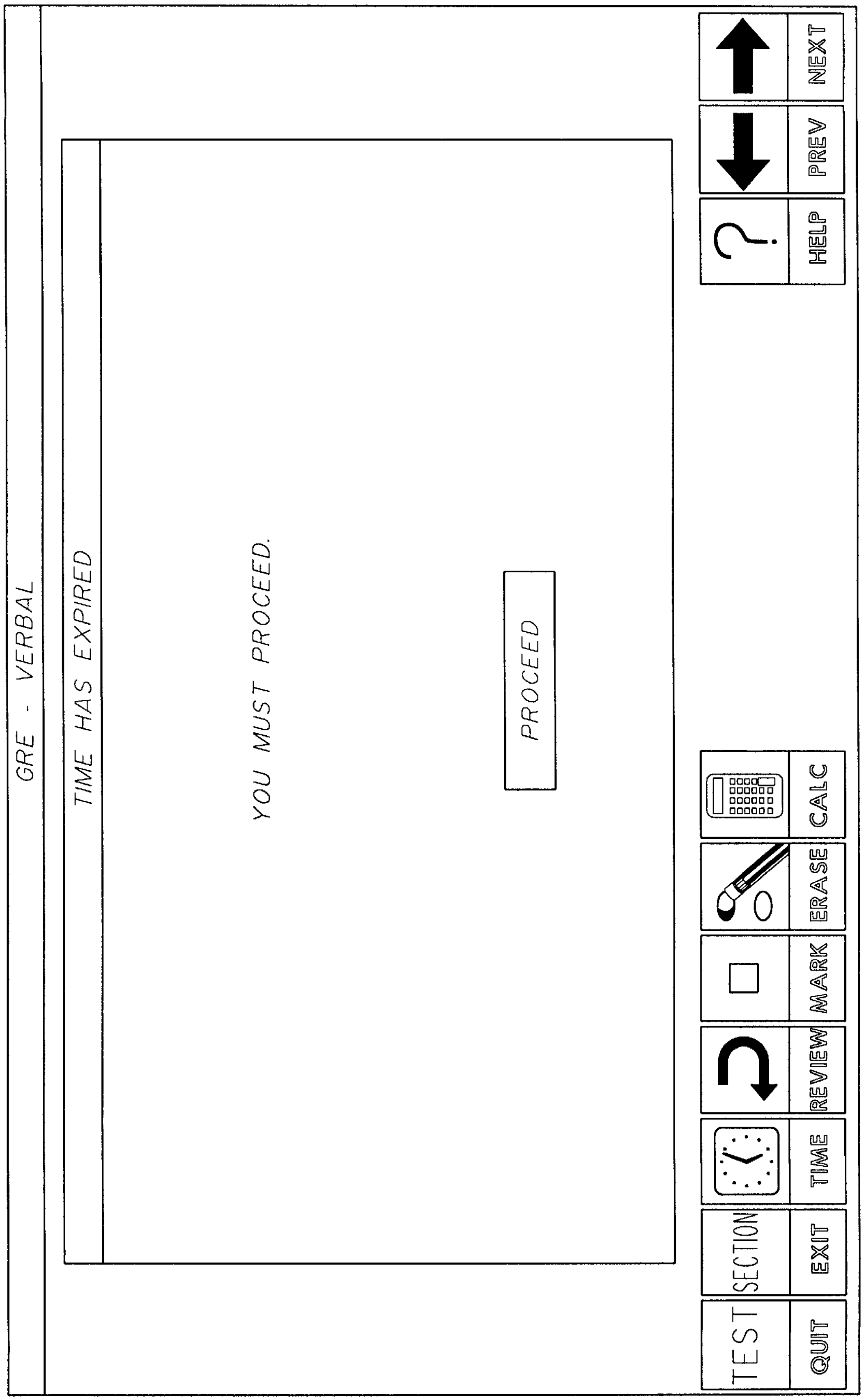
Figure 36C:
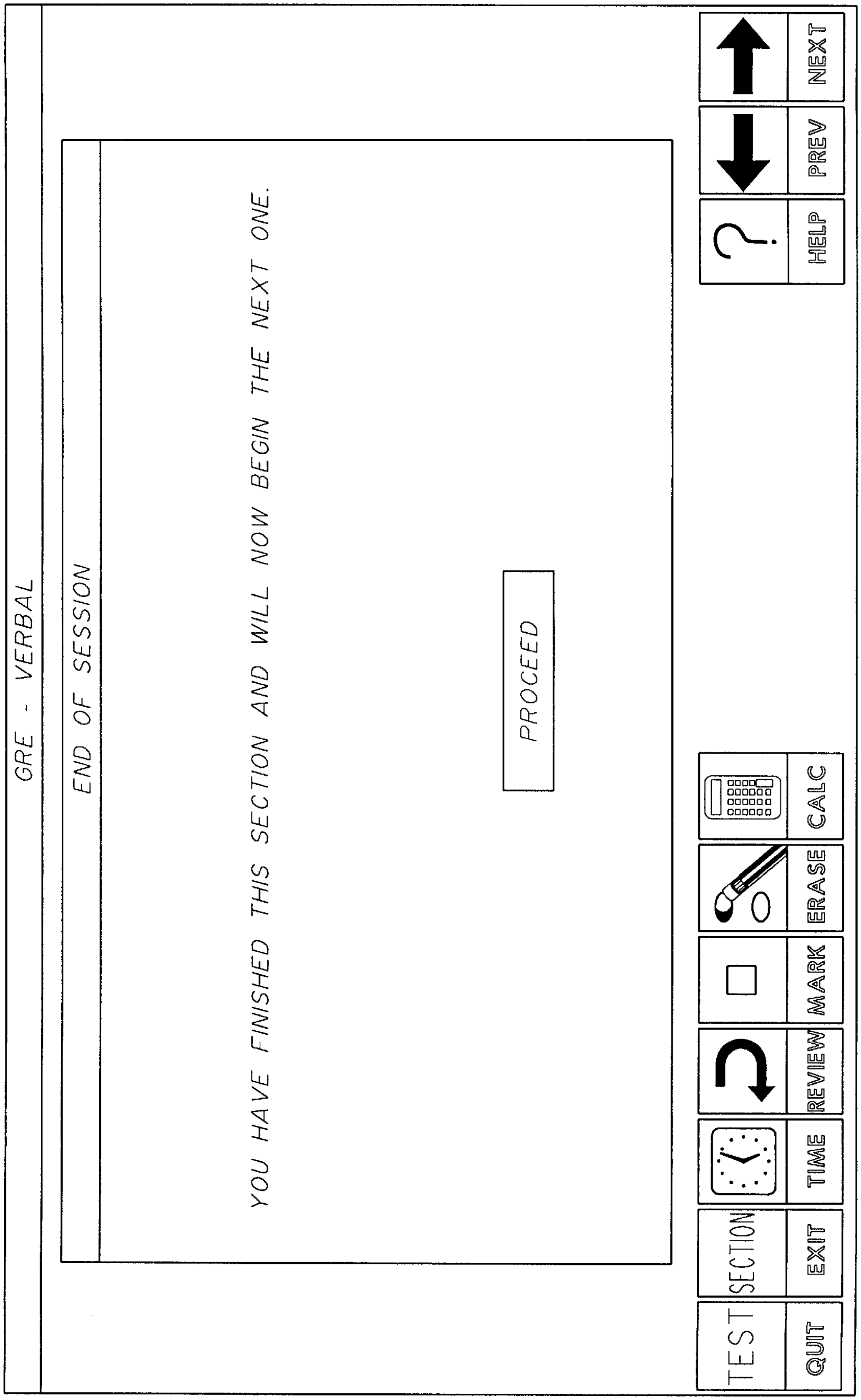
Figure 36D:
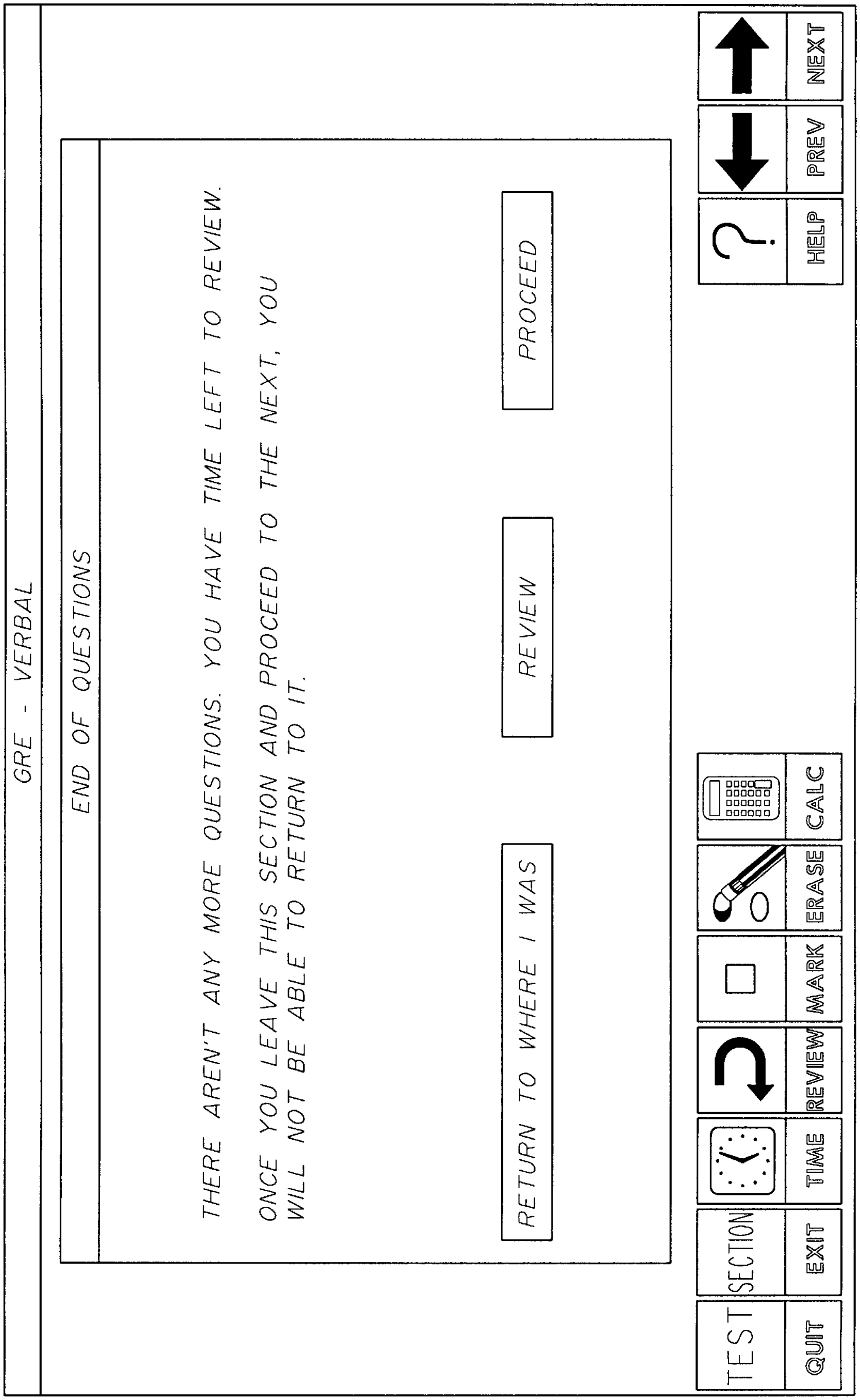
Figure 36E:
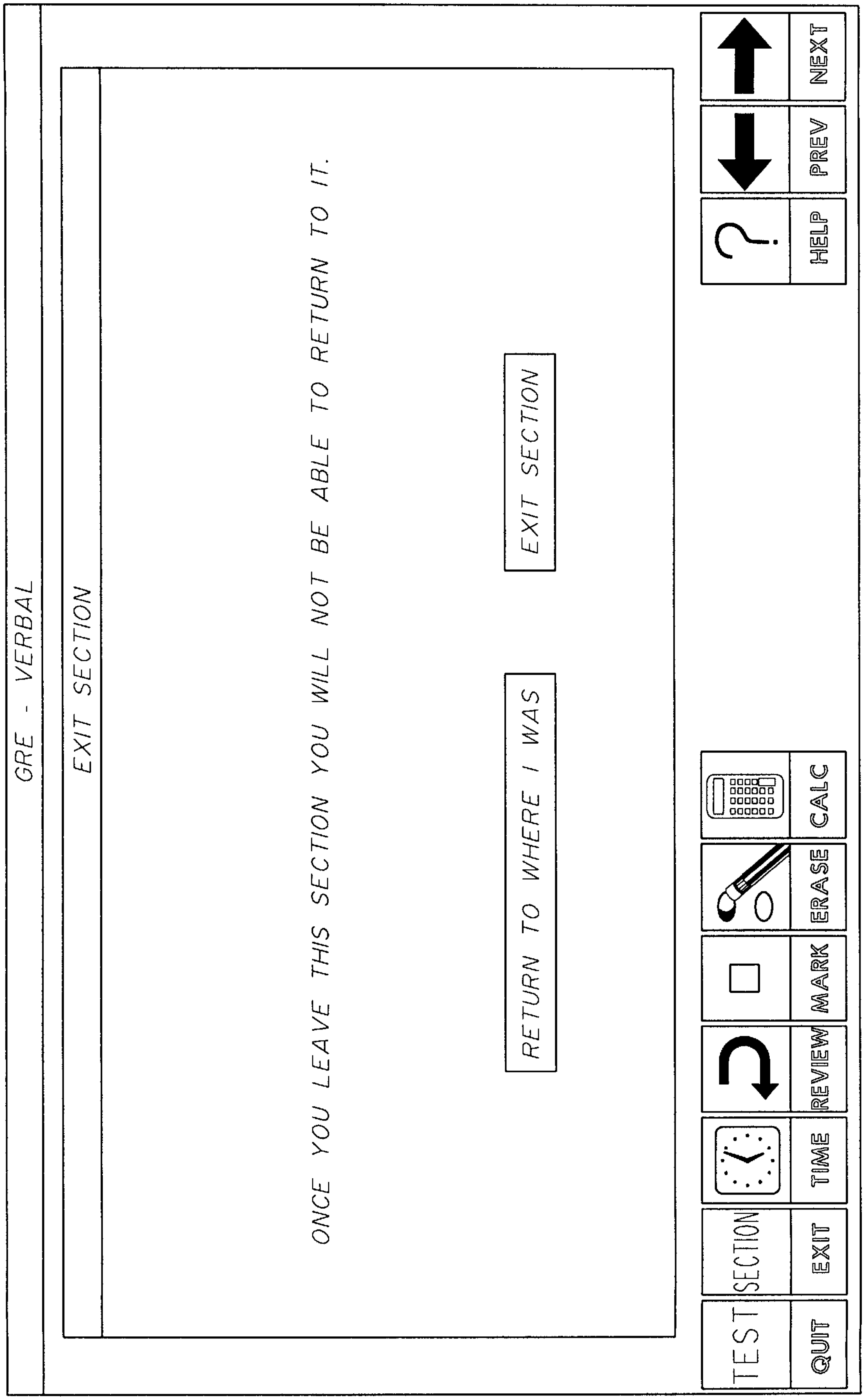

400 Display a screen (figure 36(e)) containing a message informing the examinee of the consequences of exiting the test. The screen contains two choices: 'Proceed' and 'Return to where you were'. The examinee may select either option.

A-24

Timer Events OSAM_TIMER

Additionally, the administrator may enter the special key sequence to produce an Administrative Override, or a timeout may occur while the message is displayed. Process each of the choices/events as follows:

- 'Proceed':
  - Continue at 600.
- 'Return...':
  - Re-enable the current icons.
  - Un-hide the current display.
  - Continue at 2000.
- Timeout or Administrative Override
  - Continue at 2000.

600 Stop timing

700 If the current state is STATE_DISPLAYITEM:

- If the current section is an essay section
  - Hide the currently displayed icons
  - Signal the essay handler to clean up and close down.
  - If the essay section was terminated via Administrative Override, continue at 2000.
- Write an 'End Item' record to the examinee's EPR file.

900 If directions are currently displayed (state = STATE_DIRECTIONS):

- Signal the Directions_Subsystem to clean up and close down.
- Write an 'End Directions' record to the examinee's EPR file.
- Continue at 1100.

1000 If Review is currently displayed (state = STATE_REVIEW):

- Signal the Review_Subsystem to clean up and shut down.
- Write an 'End Review' record to the examinee's EPR file.

1100 Set the application state to STATE_ENDSECTION.

A-25

Timer Events OSAM_TIMER

1150 Post event OSAM_SEQ -- subevent SEQ_ENDSECTION.

2000 Return to caller.

ICON_TIME:

A flowchart of this procedure is shown in Figure D-27.

100 Toggle the state of the countdown timer. If the remaining time is displayed, stop displaying it, and vice versa.

200 Post event OSA_TIMER -- subevent TIMER_CHANGED.

300 Return to caller.

ICON_QUIT:

A flowchart of this procedure is shown in Figures D-28(A) to D-28(C).

100 Disable all currently displayed icons.

300 If an item is currently displayed (i.e. state = STATE_DISPLAYITEM), obtain and save the examinee's response.

400 Hide the current display.

Figure 36F:
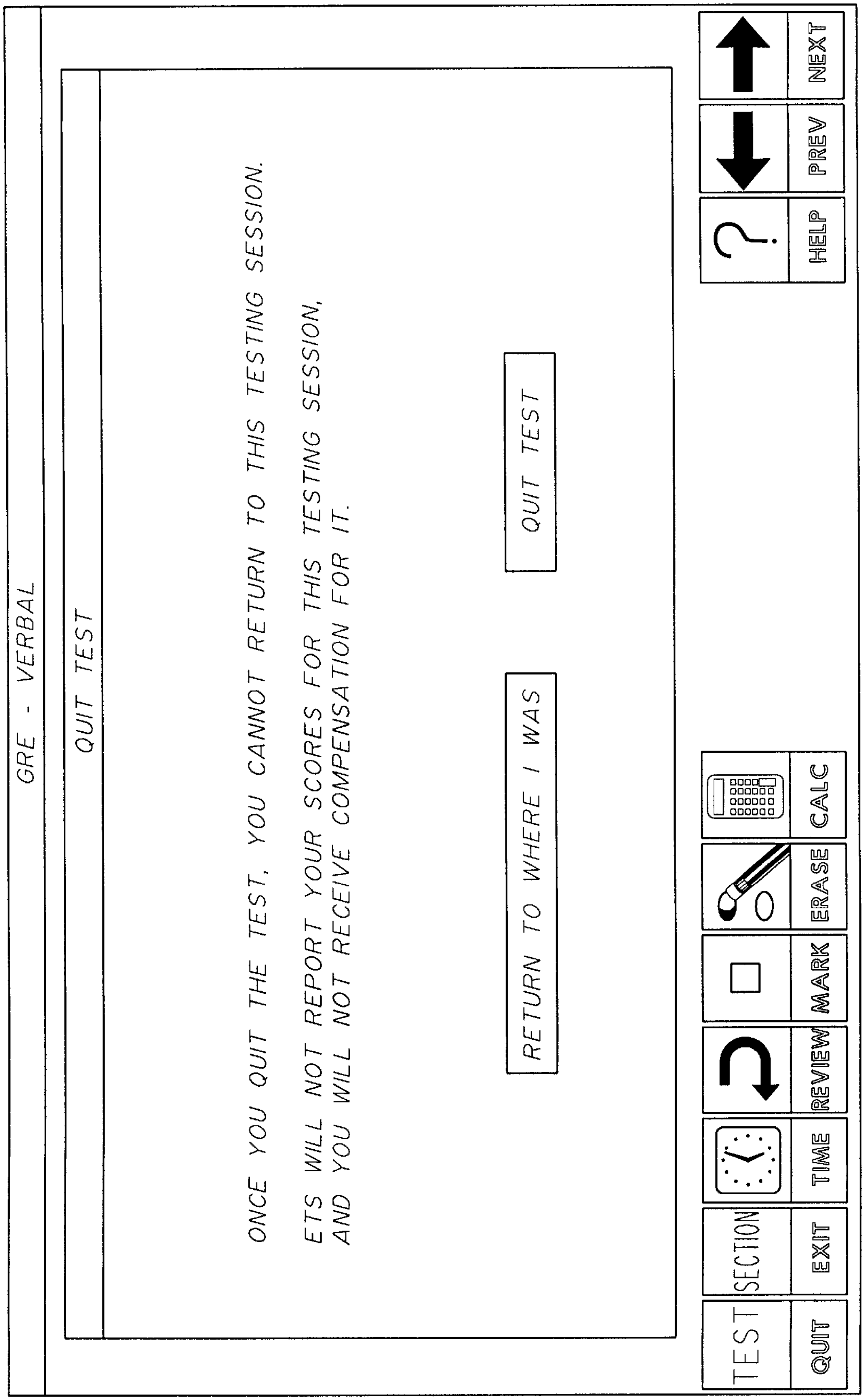
Figure 36G:
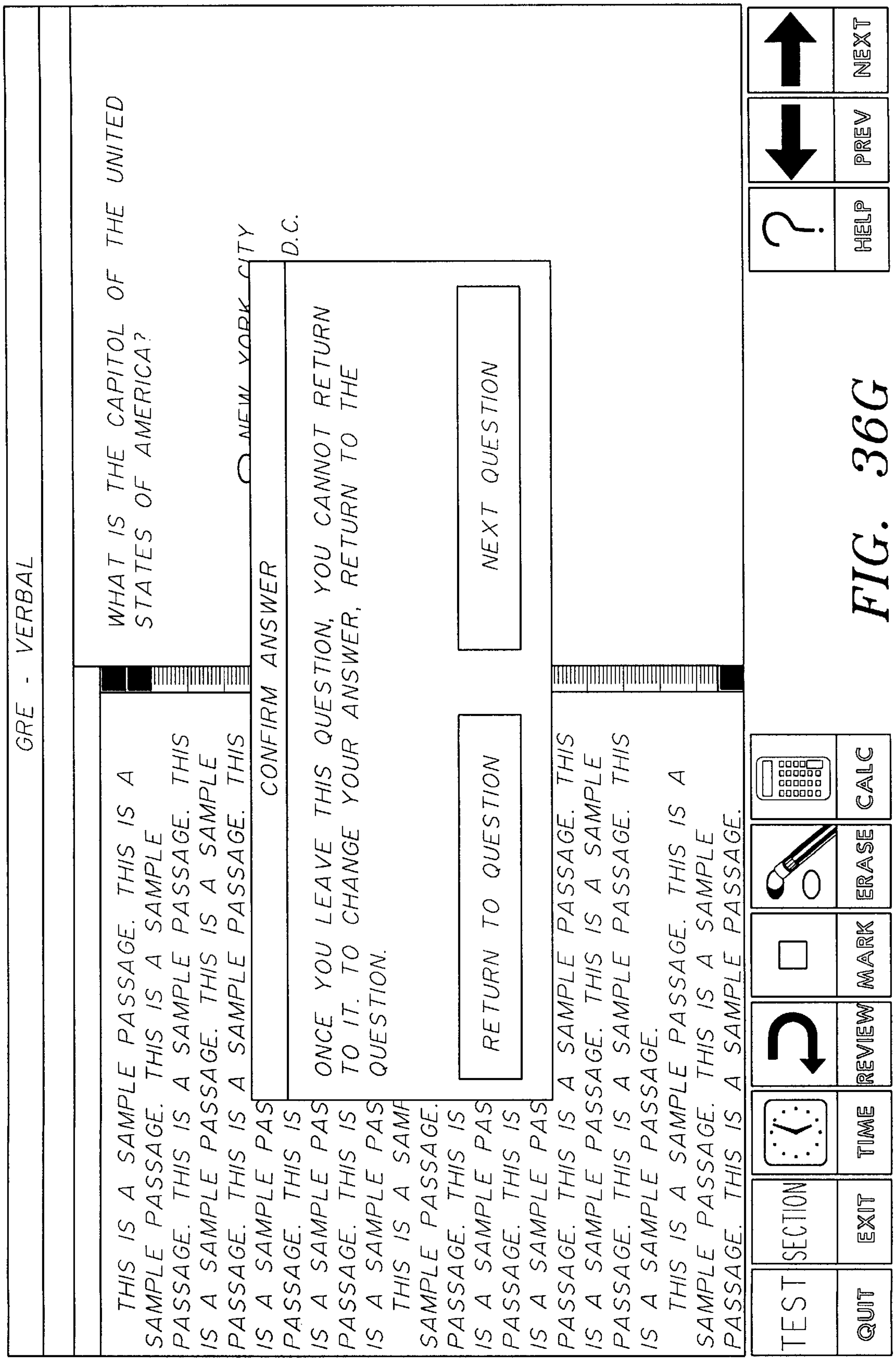
Figure 36H:
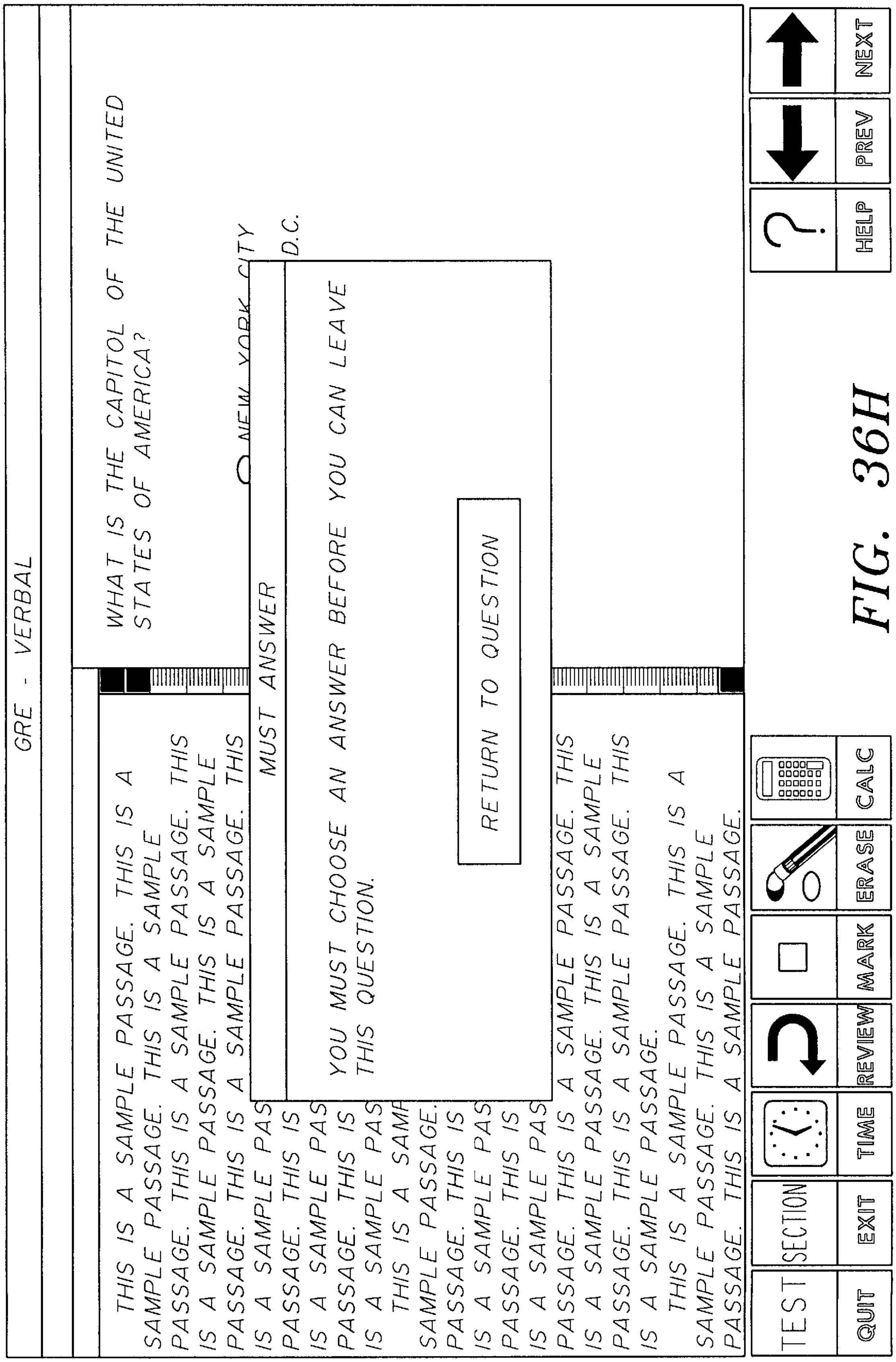
Figure 36I:
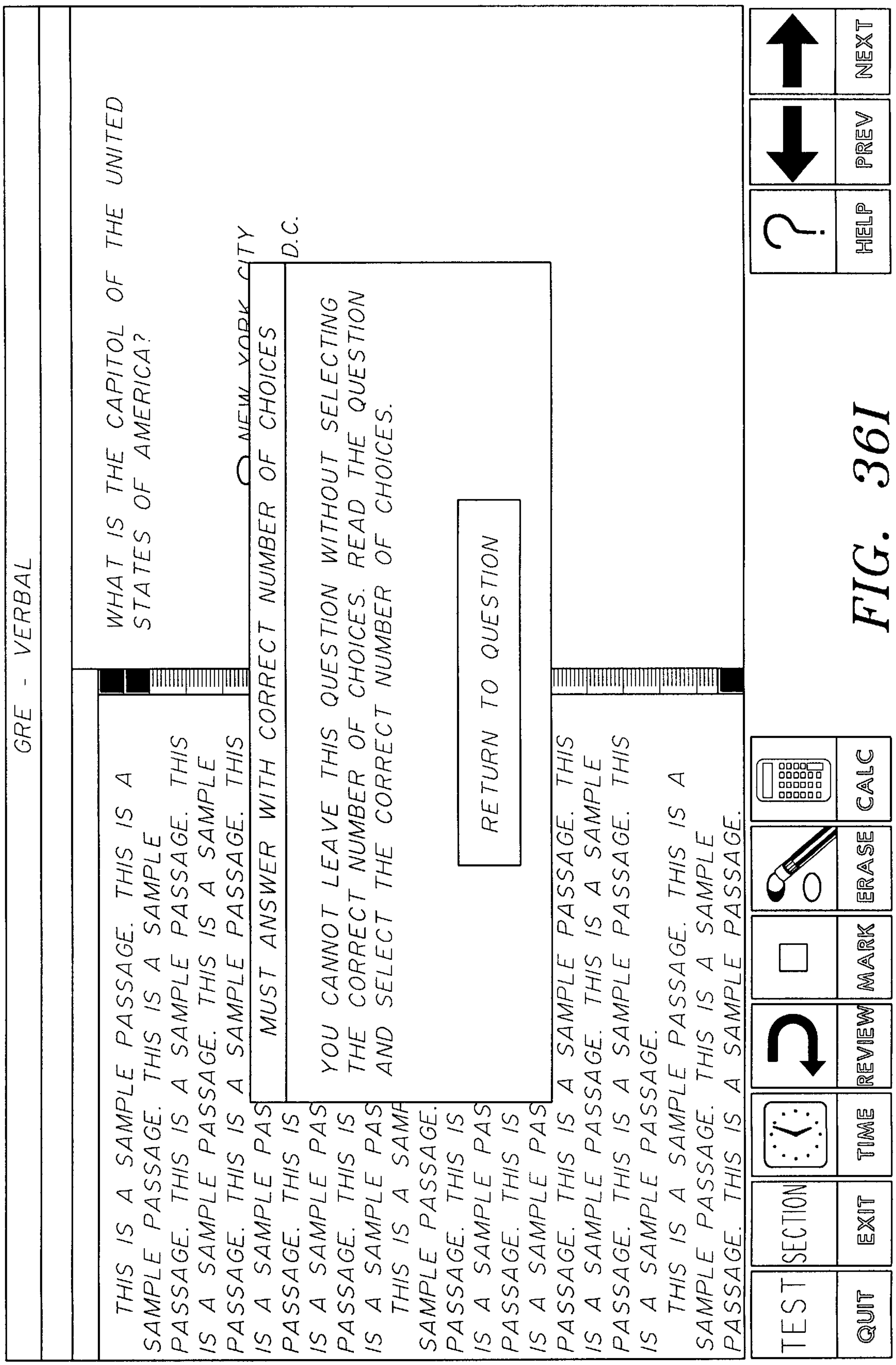
Figure 36J:
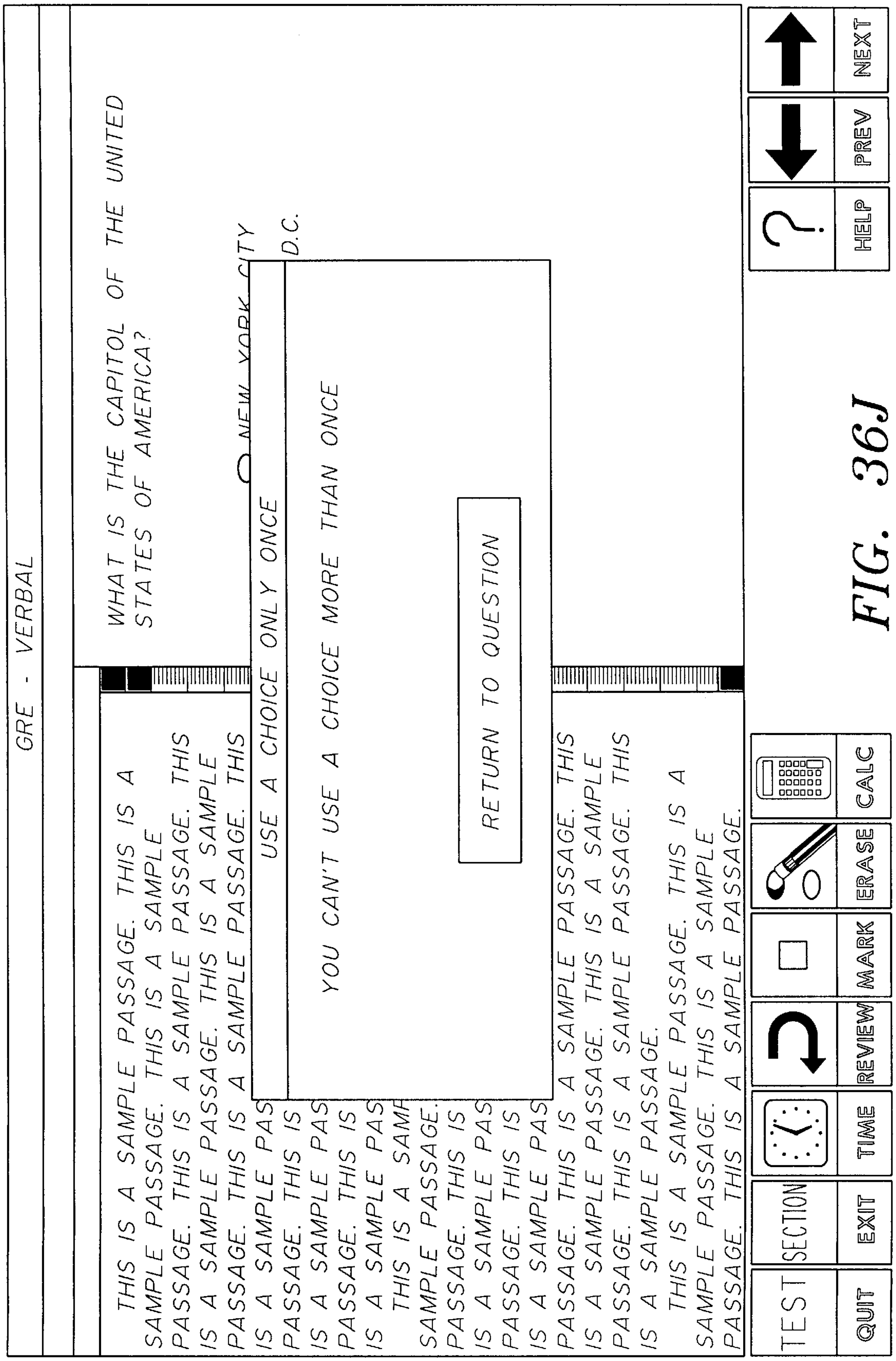
Figure 36K:
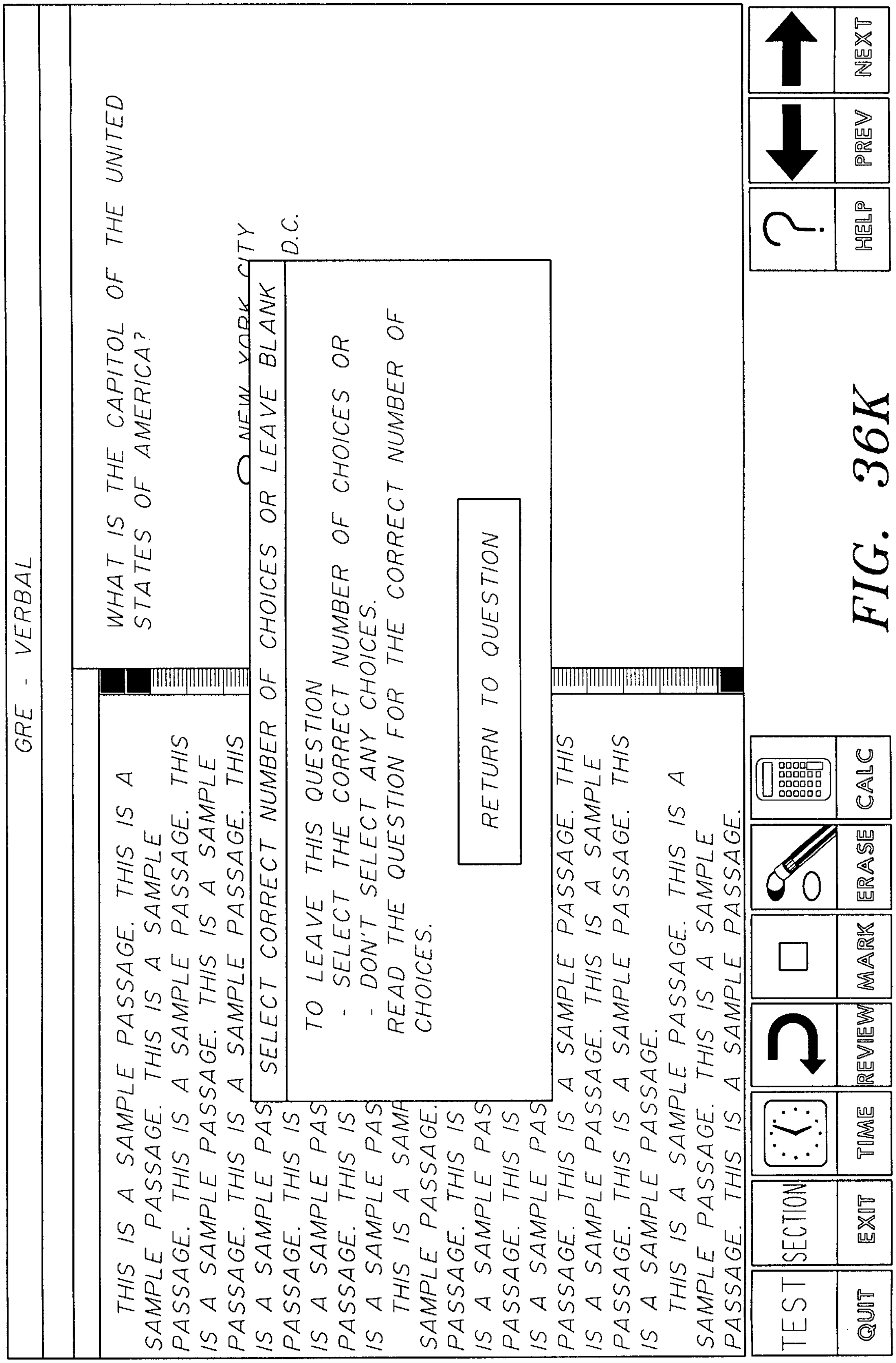
Figure 36L:
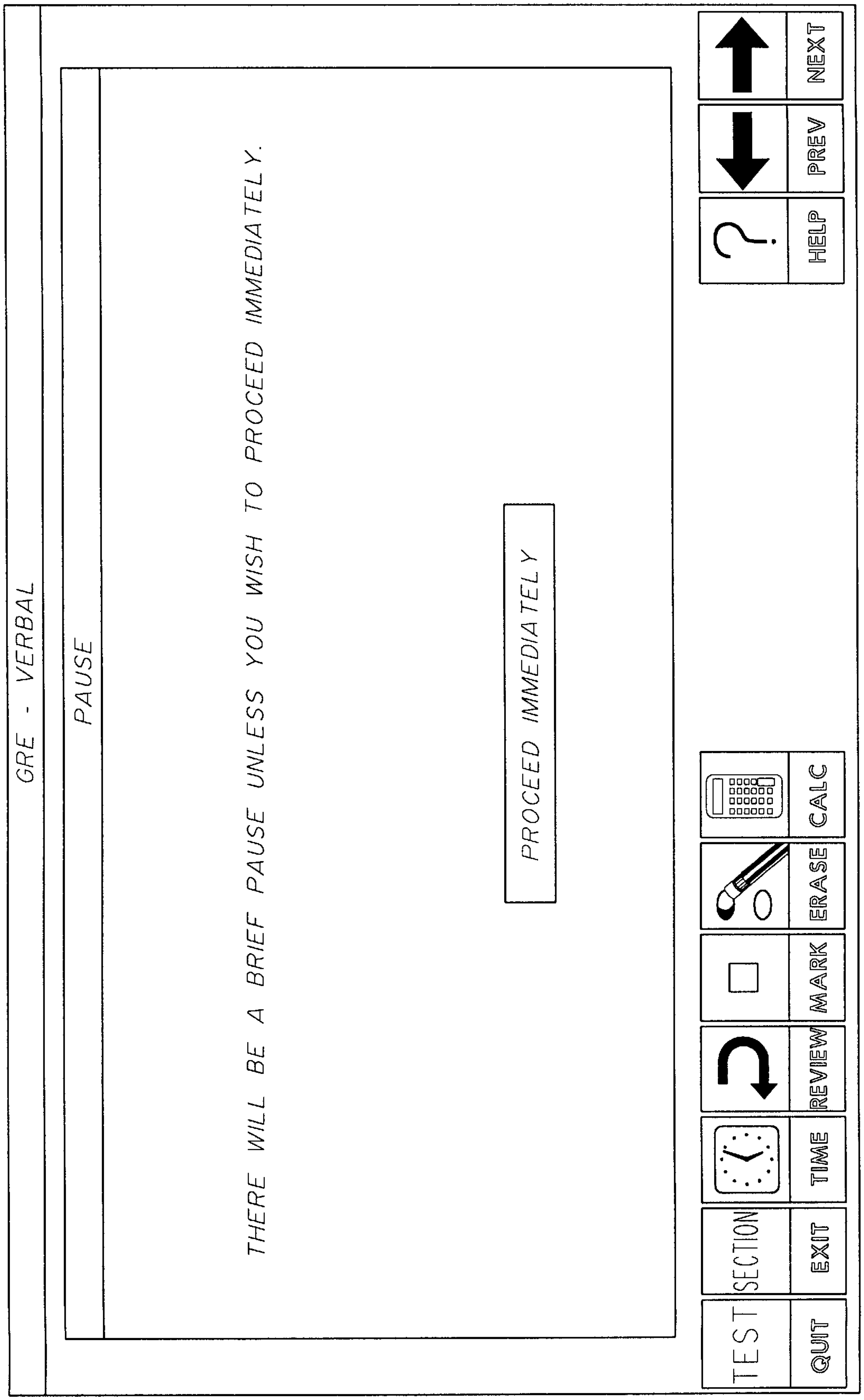

500 Display a screen (figure 36(f)) informing the examinee of the consequences of quitting the test. The screen contains two choices: 'Proceed' and 'Return to where you were'. The examinee may select either option. Additionally, the administrator may enter the special key sequence to produce an Administrative Override, or a timeout may occur while the message is displayed. Process each of the choices/events as follows:

- 'Return...':
    - Re-enable the current icons.
    - Un-hide the current display.
    - Continue at 2000.
- 'Proceed':
    - Continue at 600.
- Timeout or Administrative Override
    - Continue at 2000.

600 Hide the currently displayed icons.

A-26

Timer Events OSAM_TIMER

700 If the screen displayed in step 500 was ended by a time out or administrative override, continue at 2000.

800 If an item was on screen at entry to this procedure (state = STATE_DISPLAYITEM):

- If this is an essay section, signal the essay item handler to clean up and close down.
- Write an 'End Item' record to the examinee's EPR file.
- Continue at 1100.

900 If directions were displayed (state = STATE_DIRECTIONS) at entry to this procedure:

- Perform event OSAM_STOP in the Directions_Subsystem, which causes the subsystem to clean up and close down.
- Write an 'End Directions' record to the examinee's EPR file.
- Continue at 1100.

1000 If Review was displayed (state = STATE_REVIEW) upon entry to this procedure:

- Perform event OSAM_STOP in the Review_Subsystem, which causes the subsystem to clean up and shut down.
- Write an 'End Review' record to the examinee's EPR file.

1100 Set the application state to STATE_ENDTEST.

1150 Post event OSAM_SEQ -- subevent SEQ_ENDTEST.

2000 Return to caller.

ICON_REV:

A flowchart of this procedure is shown in Figures D-29(A) and D-29(B).

100 Get and save the examinee's response to the currently displayed item.

200 Perform the Check_Response_Procedure. If a fail indicator is returned, continue at 800.

300 Hide the calculator if it's showing.

400 Write an 'End Item' record to the Examinee's Performance Record (EPR) file.

450 Change the application state to STATE_ENDITEM.

Timer Events OSAM_TIMER

500 Save the application state (STATE_ENDITEM) and set the new state to STATE_REVIEW.

600 Write a 'Start Review' record to the examinee's EPR file.

700 Post event OSAM_REVIEW -- subevent REVIEW_REQUEST -- to the Review Subsystem.

800 Return to caller.

ICON_MARK:

A flowchart of this procedure is shown in Figure D-30.

100 Toggle the appearance of the Mark icon. If the 'Marked' version was display, change to 'Unmarked', and vice versa. Also toggle the 'Marked' state of the item.

200 Return to caller.

ICON_HELP:

A flowchart of this procedure is shown in Figure D-31.

100 Write a 'Start Help' record to the EPR file.

200 Hide the calculator, if it's currently displayed.

300 Prepare a parcel of information used by the Help procedure. Information included in the parcel is as follows:

- Test level directions, if they've been seen by the examinee.
- If the examinee has entered a section, the following information is also included in the parcel:
  - Group directions, if they exist and have been seen.
  - Set directions, if they exist and have been seen.
  - Pop-up item directions, if they exist and have been seen.

400 Include in the parcel an indicator as to the what's currently displayed. Indicators are as follows:

- Directions, if test, section, group, set, or pop-up item directions are currently displayed (state = STATE_DIRECTIONS).
- Review, if the review screen is currently displayed (state = STATE_REVIEW).

- Item, if an item is currently displayed (state = STATE_DISPLAYITEM).

500 Save the previous application state and set the new state to STATE_HELP.

600 Post event OSAM_HELP -- subevent HELP_REQUEST -- to the Help Subsystem.

700 Return to caller.

ICON_PREV:

A flowchart of this procedure is shown in Figure D-32.

100 If an item is not currently displayed (state != STATE_DISPLAYITEM), continue at 500.

200 Perform the Check_Response_Procedure. If a fail indicator is returned, continue at 500.

300 Write an 'End Item' record to the EPR file.

400 Display the previous item.

500 Return to caller

ICON_NEXT:

A flowchart of this procedure is shown in Figure D-33.

100 If an item is not currently displayed (state != STATE_DISPLAYITEM), continue at 500.

200 Perform the Check_Response_Procedure. If a fail indicator is returned, continue at 500.

300 If the 'Confirm Answer' option is elected for this section, disable the NEXT icon and enable the CONFIRM icon.

400 Perform the Move_To_Next_Procedure.

500 Return to caller.

A-29

Timer Events OSAM_TIMER

Review Subsystem

REVIEW_REQUEST:

A flowchart of this procedure is shown in Figure D-34.

100 Prepare a screen for display as per figure 40. The screen is hidden while it's being built.

200 Loop through the list of items in the section, examine the item, and emit lines to the scrollable area as follows:

- If the item belongs to a different group than the previous item and the group has a paraphrase, add the group paraphrase to the scrollable area.
- If the item belongs to a different set than the previous item and the set has a paraphrase, add the set paraphrase to the scrollable area.
- Construct a line describing the item and add same to the scrollable area. Item descriptions contain the following:
  - item number within the section
  - the item's paraphrase, if any
  - an indicator as to whether the item is 'answered', 'not answered', or 'not seen'
  - an indicator as to whether the item is 'marked'.

300 Automatically scroll up the list so the current item is displayed in the middle of the scrollable region.

400 Display an indicator at the top of the list to indicate the relative position of the list within the scrollable area. Rules for displaying the indicator are as follows:

- If the first line in the list is on screen, display the 'beginning' indicator.
- If the last line of the list is on screen, display the 'end' indicator.
- Otherwise, display the 'middle' indicator.

500 Show the screen.

600 Return to caller.

A-30

Timer Events OSAM_TIMER

OSAM_STOP:

A flowchart of this procedure is shown in Figure D-35(A).

A flowchart of this procedure is shown in Figure D-34.

100 Erase the Review display.

200 Hide the Review display screen.

300 Return to caller.

SCROLL_REQUEST:

A flowchart of this procedure is shown in Figure D-35(B).

100 Respond to controls to move the list up and down through the scrollable area. Maintain relative position indicator as described in step Review_Request@400.

200 Return to caller.

SELECT_REQUEST:

A flowchart of this procedure is shown in Figure D-36(A).

100 De-select any previously selected line.

200 Highlight the line.

300 Return to caller.

GOTO_BUTTON:

A flowchart of this procedure is shown in Figure D-36(B).

100 Obtain the item number from the highlighted line in the scrollable area. If a group or set paraphrase is highlighted, use the first item in the group or set.

200 Post event OSAM_REVIEW -- specify the item number to display

300 Return to caller.

RETURN_BUTTON:

A flowchart of this procedure is shown in Figure D-37.

100 Post event OSAM_REVIEW -- specify that the item displayed when Review_Request was initiated is to be re-displayed.

200 Return to caller.

A-31

Timer Events OSAM_TIMER

Help Subsystem

HELP_REQUEST:

A flowchart of this procedure is shown in Figures D-38(A) to D-38(B).

100 Prepare a screen for display as per figure 37. The screen is hidden while it's being built.

200 Enable all buttons shown in figure 37.

300 If Test Directions have not been 'seen' yet or they do not exist, disable the General Directions button.

400 If Section Directions have not been 'seen' yet or they do not exist, disable the Section Directions button.

500 If Group, Set or Pop up Item Directions have not been 'seen' yet or they do not exist, disable the Question Directions button.

600 If this is not an essay section, hide the Typing Directions button.

700 Determine which opening (or welcome) message to display. The determination is made as follows:

- If Test, Section, Group, Set or pop up Item Directions are currently on screen, a canned welcome message is selected. Continue at 800.
- If Review is currently on screen, a different canned message, which is context sensitive, is selected. Continue at 800.
- If an item is currently on screen, one of the following is selected:
  - The item's Group, Set and pop up Item Directions are concatenated into a single message. If the resulting message is <u>not</u> empty, because one or more of these exist for the item, continue at 800.
  - If Section Directions exist, the message is set to the contents thereof, and the Section Directions button is disabled; continue at 800.
  - If Test Directions exist, the message is set to the contents thereof, and the General Directions button is disabled; continue at 800.
  - If none of the above exist, the message is set to a canned message; continue at 800.

A-32

800 The 'message' constructed in step 700 is written to the scrollable region of the screen.

900 The screen is displayed.

1000 Return to caller.

OSAM_STOP:

A flowchart of this procedure is shown in Figure D-39(A).

100 Restore the help display to a cleared condition.

200 Hide the help display screen.

300 Return to caller.

RETURN_BUTTON:

A flowchart of this procedure is shown in Figure D-39(B).

100 Post event OSAM_HELP -- subevent HELP_RETURN.

200 Return to caller.

QUESTION_DIRECTIONS_BUTTON:

A flowchart of this procedure is shown in Figure D-39(C).

100 Disable the Question Directions button. Enable whatever button was previously disabled.

200 Concatenate any of the Group, Set or pop up Item directions available for the current item and display same in the scrollable area of the screen.

300 Return to caller.

SECTION_DIRECTIONS_BUTTON:

A flowchart of this procedure is shown in Figure D-40(A).

100 Disable the Section Directions button. Enable whatever button was previously disabled.

200 Display the Section Directions in the scrollable area of the screen.

300 Return to caller.

A-33

Timer Events OSAM_TIMER

GENERAL_DIRECTIONS_BUTTON:

A flowchart of this procedure is shown in Figure D-40(B).

100 Disable the General Directions button. Enable whatever button was previously disabled.

200 Display the Test Directions in the scrollable area of the screen.

300 Return to caller.

HOW_TO_SCROLL_BUTTON:

A flowchart of this procedure is shown in Figure D-41(A).

100 Disable the How-to-Scroll button. Enable whatever button was previously disabled.

200 Display the canned Scrolling Directions in the scrollable area of the screen.

300 Return to caller.

TYPING_BUTTON:

A flowchart of this procedure is shown in Figure D-41(B).

100 Disable the Typing button. Enable whatever button was previously disabled.

200 Disable the canned Typing Directions in the scrollable area of the screen.

300 Return to caller.

TESTING_TOOLS_BUTTON:

A flowchart of this procedure is shown in Figure D-42(A).

100 Disable the Testing Tools button. Enable whatever button was previously disabled.

200 Display the Testing Tools screen as per figure 38. Testing Tools not enabled in this section are elided prior to display.

300 Return to caller.

A-34

Timer Events OSAM_TIMER

TESTING_TOOL 'X':

A flowchart of this procedure is shown in Figure D-42(B).

100 Load and display the information file associated with the chosen Testing Tool button.

200 Return to caller.

A-35

Timer Events OSAM_TIMER

Break Subsystem

OSAM_BREAK:

BREAK_REQUEST:

A flowchart of this procedure is shown in Figures D-43(A) to D-43(D).

100 Start a countdown timer. Period is specified by the caller.

200 Display a screen asking the examinee if he wants to take a break. Accept the examinee's response. There are four events that may occur at this time:

300 - Examinee Declines the Break:

- Post event OSAM_BREAK -- subevent BREAK_RETURN.
- Continue at 1000.

400 - Administrator Overrides the Break:

- Continue at 1000.

500 - Message Times Out:

- Set a 5 second timer.
- Display a 'No Response' screen. There are two events that may occur at this time:
  - Message Times Out:
    - Continue at 600.
  - Administrator Overrides the Break:
    - Continue at 1000.

600 - Examinee Accepts the Break:

- Write a 'Start Break' record to the examinee's EPR file.
- Set a 5 second timer.
- Display the 'On Break' screen. There are two events that may occur at this time:
  - Timer Expires:
    - Continue at 700.

A-36

Timer Events OSAM_TIMER

- Administrator Overrides the Break:
  - Continue at 1000.

700 Set timer to count down the break period. There are two events that may occur at this time:

- Timer Ticks:
  - Decrement remaining time. Process remaining time display as follows:
    - Time Remains:
      - Update the remaining time display.
      - Continue at 1000.
    - No Time Remains:
      - Clear the remaining time display.
      - Set indicator that the break is in overtime.
      - Continue at 1000.
    - In Overtime:
      - Increment overtime count.
      - Continue at 1000.
- Administrator Ends the Break:
  - Continue at 800.

800 Display the 'End Break' confirmation screen. There are three events that may occur at this time:

- Timer Tick:
  - Process as per 'Timer Tick' in step 700.
- Examinee Confirms Screen:
  - Stop timer.
  - Calculate overtime, if any.
  - Write 'End Break' record to examinee's EPR file. Record overtime.

A-37

- Post event OSAM_BREAK -- subevent BREAK_RETURN.
- Continue at 1000.

- Administrator Overrides:
  - Stop timer.
  - Calculate overtime, if any.
  - Write 'End Break' record to examinee's EPR file. Record overtime.
  - Continue at 1000.

1000 Return to caller.

OSAM_STOP:

A flowchart of this procedure is shown in Figure D-44.

100 If a Break Subsystem message is currently displayed, remove it from the screen.

200 Return to caller.

A-38

Directions Subsystem

OSAM_DIRECT:

DIRECT_REQUEST:

A flowchart of this procedure is shown in Figure D-45(A).

100 Check the parcel for the next directions file to display. If none:

- Post event OSAM_DIRECT -- subevent DIRECT_RETURN.
- Continue at 400.

200 Display a Directions screen as shown in figure 35.

300 Load the next directions file specified in the parcel into the scrollable area of the screen.

400 Return to caller.

OSAM_STOP:

A flowchart of this procedure is shown in Figure D-45(B).

100 Terminate directions display, if any.

300 Return to caller.

SCROLL_REQUEST:

A flowchart of this procedure is shown in Figure D-46.

100 Respond to controls to move the directions up and down in the scrollable area. Maintain relative position indicator.

200 Return to caller.

RETURN_BUTTON:

A flowchart of this procedure is shown in Figure D-47.

100 If the return button has already been 'pressed' for the current directions file:

- Dismiss current directions file.
- Advance to next file in list.
- Post event OSAM_DIRECT -- subevent DIRECT_REQUEST.
- Continue at 1000.

A-39

Timer Events OSAM_TIMER

Else

- If the bottommost portion of the directions has been displayed:
  - post event OSAM_DIRECT -- subevent DIRECT_REQUEST.
  - Continue at 1000.
- Else
  - Indicate that the return button has been pressed for the current directions file.
  - Display an error message informing the examinee that directions remain to be seen.
  - Continue at 1000.

1000 Return to caller.

A-40

Timer Events OSAM_TIMER

Check_Response_Procedure:

A flowchart of this procedure is shown in Figure D-48.

100 Get and save the examinee's current response.

200 Check for and react to the following conditions:

- Incomplete Response: If the examinee has supplied any response, but the response is nonetheless incomplete, and explicit prompting is specified for this section, display an error message and continue at 400.
- No Response: If the examinee has supplied no response and 'Must Answer' is specified for this section, display an error message and continue at 400.

300 Return success indicator.

400 Return fail indicator.

Timer Events OSAM_TIMER

Move_To_Next_Procedure:

A flowchart of this procedure is shown in Figures D-49(A) and D-49(B).

100 If this section is computer adaptive and the next item is ready for display, continue at 2000.

200 If this section is not linear, continue at 1000.

300 If the caller indicates the previous item is ended, write an 'End Item' record to the examinee's EPR file.

400 If there are remaining unseen items in this section, prime the system to display the next item and continue at 2000.

500 Hide the current item display.

600 Examine the section configuration information to determine if REVIEW is permitted for this section. Process as follows:

- Review permitted: Display a screen (figure 36(d)) informing the examinee that there are no more items. The screen provides three choices: 'Return to where you were', 'Proceed', or 'Go to Review'.
- Review not permitted: Display a screen (figure 36(d) minus 'Review' option) informing the examinee that there are no more items. The screen provides two choices: 'Return to where you were', and 'Proceed'.

700 At this time 5 events are possible: either the examinee chooses one of the options on the screen, or a timeout or Administrative Override occurs while the message displayed in step 500 is on screen. Process the possible choices/events as follows:

- 'Return...':
  - Re-display the current item and continue at 2000.
- 'Go to Review':
  - Save the current state and set the new state to STATE_REVIEW.
  - Write a 'Start Review' record to the examinee's EPR file.
  - Post event OSAM_REVIEW -- subevent REVIEW_REQUEST -- to the Review Subsystem.
  - Continue at 2000

A-42

Timer Events OSAM_TIMER

- 'Proceed':
  - Indicate that the termination type is via NEXT.
  - Forget any saved system states. Set the new state to STATE_ENDSECTION.
  - Post event OSAM_SEQ -- subevent SEQ_ENDSECTION.
  - Continue at 2000.
- Timeout or Administrative Override
  - Continue at 2000.

1000 Score this item (adaptive only)

2000 Return to caller.

A-43

Timer Events OSAM_TIMER

Close_Section_Procedure

A flowchart of this procedure is shown in Figure D-50.

100 If this is an essay section

- shutdown the essay subsystem

200 Hide and clear the calculator.

300 Stop timing and clear the remaining time display.

400 If this is an adaptive section

- compute the score

500 Write 'End Section' record to the examinee's EPR file.

600 Broadcast event OSAM_ENDSECTION to all subsystems.

700 If this is an adaptive section, shut down the adaptive subsystem.

800 Shutdown the calculator.

1000 Return to caller.

We claim:

1. A data distribution system for use with a computer based testing (CBT) system, said CBT system delivering at least one computerized test to at least one examinee and said data distribution system processing information related to each said delivery, wherein the CBT system supports a plurality of program-specific tests, and said CBT system having a designated post processing system for scoring each examinee's responses for each program-specific test, each said post processing system providing a definition file defining specific information said post processing system requires and a format in which said specific information is to be provided, the data distribution system comprising:

an examinee performance database having examinee performance records indicative of responses provided by each examinee during each said delivery;

a file processing component interfaced with said examinee performance database for receiving transmission files generated by said CBT system and having data indicative of said information, said file processing component generating from said data at least one said examinee performance record for at least some of said deliveries and updating said examinee performance database with each said examinee performance record so generated; and a format post processing component interfaced with each post processing system and to said examinee performance database, said format post processing component retrieving at least some examinee performance records from said examinee performance file database and formatting said retrieved examinee performance records based on said definition file.

2. The system of claim 1, wherein said transmission files comprise examinee performance files having data indicative of events initiated by one said examinee during each said delivery, error log files having data indicative of CBT system errors, if any, occurring during any said delivery, and security log files having data indicative of security-related events occurring during any said delivery.

3. The system of claim 2, wherein said file processing component determines whether an accurate number of examinee performance files, error log files, and security log files have been received.

4. The system of claim 1, wherein said data distribution system is located at a central processing site and at least some of said computerized tests are delivered at at least one test center located remote from said central processing site.

5. The system of claim 4, wherein modem to modem communications is available between said central processing site and said at least one test center for transmitting said transmission files from said test centers to said central processing site.

6. The system of claim 4, wherein transmission files are stored on a magnetic media at said at least one test center and transported to said central processing site.

7. The system of claim 4, further comprising:

a computer based testing network (CBTN) database interfaced with said file processing component, said file processing component generating from said data contained in said transmission files at least one computer based testing record having data used for test center control and wherein the format post processing component is interfaced with said CBTN database, said format post processing component retrieving at least some computer based testing records from said CBTN database and formatting said retrieved records based on said definition file.

8. The system of claim 7, wherein the transmission files contain compressed data.

9. The system of claim 7, wherein said file processing component checks the data of said transmission files so received for data errors.

10. The system of claim 1, wherein said information includes data indicative of security-related events, said security-related events being recorded in at least one security log file during the delivery of each said computerized test, further comprising:

a security log database having security log records indicative of security-related events; and a security log processing component interfaced with said file processing component, said file processing component receiving an input of said security log files and transferring said security log files to said security log processing component, said security log processing component generating security log records from said security log files and updating said security log database with said security log records so generated.

11. The system of claim 10, further comprising:

a report processing component interfaced with the examinee performance database and the security log database for retrieving examinee performance records and security log records from said databases and generating at least one report from said retrieved records.

12. The system of claim 10, wherein said data distribution system is located at a central processing site and at least some of said computerized tests are delivered at at least one test center located remote from said central processing site.

13. The system of claim 12, further comprising:

a computer based testing network (CBTN) database interfaced with said file processing component, said file processing component generating from said data contained in said transmission files at least one computer based testing record having data used for test center control.

14. The system of claim 13, further comprising:

a report processing component interfaced with said examinee performance database, said security log database and said CBTN database for retrieving examinee performance records, security log records, and computer based testing records from said respective databases and generating at least one report from said retrieved records.

15. The system of claim 14, wherein said at least one report is generated for at least one said test center and provides information indicative of activities at each test center for which said reports are so generated.

16. The system of claim 14, wherein said at least one report is generated for at least one examinee and provides information permitting said examinee to track said examinee's performance.

17. The system of claim 14, wherein said tests are delivered on workstations located at said test centers and at least one report is generated for at least one workstation and provides information indicative of said security-related events.

18. The system of claim 1, wherein said information includes data indicative of events initiated by each said examinee during each said delivery of one said computerized test, said events being recorded in an examinee performance file during the delivery of said one computerized test, further comprising:

an examinee performance file processing component interfaced with said file processing component, said file processing component receiving an input of said examinee performance files and transferring said examinee performance files to said examinee performance file processing component, said examinee performance file processing component analyzing said data contained therein for the existence of at least one predetermined condition.

19. The system of claim 18, wherein said at least one predetermined condition includes the existence of one of said examinee performance files so received having data duplicated by at least one examinee performance record existing in said examinee performance database.

20. The system of claim 18, wherein the existence of said at least one predetermined condition is based upon whether the data in the examinee performance files is valid.

21. The system of claim 18, wherein said information includes data indicative of security-related events, said security-related events being recorded in at least one security log file during the delivery of each said computerized test, further comprising:

a security log database having security log records indicative of security-related events; and a security log processing component interfaced with said file processing component, said file processing component receiving an input of said security log files and transferring said security log files to said security log processing component, said security log processing component analyzing said security log files for at least said one predetermined condition and defining those files having at least one said predetermined condition as a reject record;

said security log processing component generating security log records from said security log files where no said predetermined conditions exist and updating said security log database with said security log records so generated.

22. The system of claim 21, further comprising:

a rejection and resolution processing component interfaced with said examinee performance file processing component and said security log processing component, said rejection and resolution processing component receiving an input of each said examinee performance and security log files for which at least one of said predetermined conditions exists, said reject and resolution processing component altering each of those files to eliminate any existing predetermined condition associated therewith.

23. The system of claim 1, further comprising:

a report processing component interfaced with the examinee performance database for retrieving information from said examinee performance database and generating at least one report from said retrieved information.

24. A method of delivering a computerized test for standardized testing using a computer based testing (CBT) system having at least one workstation at which test questions are presented to examinees and operable to accept responses from examinees, wherein the standardized test comprises a session script defining the sequence of tasks to be performed in delivering the computerized test to an examinee by a data distribution system of the CBT system, the method comprising the steps of:

reading, by the examinee's workstation, the session script to identify a test script defining the rules for determining a sequence of the questions to be delivered to said examinee, wherein the rules are based on a measurement model for linear and non-linear tests;

determining, by the examinee's workstation, the sequence of the questions to be delivered as defined by the rules of said test script; and presenting, by the data distribution system, the questions to said examinee in the same sequence at the examinee's workstation.

25. A method of delivering a computerized test for standardized testing using a computer based testing (CBT) system having at least one workstation at which test questions are presented to examinees and operable to accept responses from examinees, wherein the standardized test comprises a session script defining the sequence of tasks to be performed in delivering the computerized test to an examinee by a data distribution system of the CBT system, the method comprising the steps of:

reading, by the examinee's workstation, the session script to identify the delivery units to be delivered and the order in which said delivery units are to be presented at the examinee's workstation, wherein the delivery units includes at least one of general information screens, tutorial units, break units, data collection units, scoring and reporting units, and testing units; and invoking, by the data distribution system, each delivery units in the order specified by said session script.

26. A method of delivering a computerized test as recited in claim 25 wherein said general information screen contains information regarding the actual text and graphics that will be presented to the examinee, the type of dismissal, whether the dismissal is automatic or manual, and the time after which the dismissal should occur.

27. A method of delivering a computerized test as recited in claim 25 wherein said tutorial units contain references to a tutorial which presents test familiarization materials to the examinee including at least one of operation of a mouse, how to scroll a screen, how to use testing tools, and how to answer.

28. A method of delivering a computerized test as recited in claim 25 wherein said break units implement a scheduled break within a session.

29. A method of delivering a computerized test as recited in claim 25 wherein said data collection units obtain additional information from the examinee including at least one of demographic and debriefing information.

30. A method of delivering a computerized test as recited in claim 25 wherein said scoring and reporting units score and report the results of at least one testing unit delivered in a session.

31. A method of delivering a computerized test as recited in claim 25 wherein said testing units present a test based on the contents of a test script that may have been selected at runtime.

32. A method of delivering a computerized test as recited in claim 25 wherein said testing units contain information regarding whether dynamic runtime selection is to be used to select a test script and a reference to a test script which controls the sequence of events and options used during testing unit.

33. A method of delivering a computerized test for standardized testing using a computer based testing (CBT) system having a data distribution system and at least one workstation at which test questions are presented to examinees and operable to accept responses from examinees, the method comprising the steps of:

electronically and dynamically selecting, using an examinee's workstation, a test script accessible to the examinee's workstation, wherein the test script includes at least one testing unit specifying a predetermined delivery mode for the computerized test; and presenting, by the data distribution system, the test questions to the examinee at the examinee's workstation in a sequence based on the predetermined delivery mode.

* * * * *